March 11, 1952 W. HATTON 2,588,923

CALCULATOR

Filed Jan. 16, 1946 106 Sheets-Sheet 1

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 2

INVENTOR.
WILLIAM HATTON
BY Robert Harbury, Jr
ATTORNEY

March 11, 1952 W. HATTON 2,588,923

CALCULATOR

Filed Jan. 16, 1946 106 Sheets-Sheet 3

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 4

Section 1 (Figs 3-5). Key Set, Printer and Line Circuit.

INVENTOR.
WILLIAM HATTON
BY Robert Harding Jr.
ATTORNEY

INVENTOR.
WILLIAM HATTON
BY Robert Harding, Jr.
ATTORNEY

Fig. 5. Connecting Relays for 1st Calculator

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 7

INVENTOR.
WILLIAM HATTON
BY Robert Harding, Jr.
ATTORNEY

INVENTOR.
WILLIAM HATTON
BY Robert Harding, Jr
ATTORNEY

INVENTOR.
WILLIAM HATTON
BY Robert Harding Jr.
ATTORNEY

March 11, 1952

W. HATTON 2,588,923

CALCULATOR

Filed Jan. 16, 1946

106 Sheets-Sheet 10

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 11

INVENTOR.
WILLIAM HATTON
BY Robert Harding, Jr.
ATTORNEY

INVENTOR.
WILLIAM HATTON
BY Robert Harding Jr.
ATTORNEY

March 11, 1952 W. HATTON 2,588,923

CALCULATOR

Filed Jan. 16, 1946 106 Sheets-Sheet 13

INVENTOR.
WILLIAM HATTON
BY Robert Harding, Jr.
ATTORNEY

INVENTOR.
WILLIAM HATTON
BY Robert Hardwig, Jr.
ATTORNEY

INVENTOR.
WILLIAM HATTON
BY Robert Hardwig, Jr.
ATTORNEY

March 11, 1952 W. HATTON 2,588,923

CALCULATOR

Filed Jan. 16, 1946 106 Sheets-Sheet 16

INVENTOR.
WILLIAM HATTON

BY Robert Harding, Jr.

ATTORNEYS

March 11, 1952 W. HATTON 2,588,923

CALCULATOR

Filed Jan. 16, 1946 106 Sheets-Sheet 17

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 18

INVENTOR.
WILLIAM HATTON

BY Robert Harding Jr.

ATTORNEY

March 11, 1952 W. HATTON 2,588,923

CALCULATOR

Filed Jan. 16, 1946 106 Sheets-Sheet 19

INVENTOR.
WILLIAM HATTON
BY Robert Harding, Jr.
ATTORNEYS

INVENTOR.
WILLIAM HATTON
BY Robert Harding Jr.
ATTORNEY

INVENTOR.
WILLIAM HATTON
BY Robert Harding Jr.
ATTORNEY

INVENTOR.
WILLIAM HATTON
BY Robert Harding Jr.
ATTORNEY

March 11, 1952 W. HATTON 2,588,923

CALCULATOR

Filed Jan. 16, 1946 106 Sheets-Sheet 23

Fig. 18. Distributor Switch for Storage Relays

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 24

INVENTOR.
WILLIAM HATTON
BY Robert Harding, Jr.
ATTORNEY

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 26

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 27

INVENTOR.
WILLIAM HATTON
BY Robert Harding Jr.
ATTORNEY

INVENTOR.
WILLIAM HATTON
BY Robert Harding, Jr.
ATTORNEY

INVENTOR.
WILLIAM HATTON
BY Robert Harding, Jr.
ATTORNEY

INVENTOR.
WILLIAM HATTON
BY Robert Harding, Jr.
ATTORNEY

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 32

INVENTOR.
WILLIAM HATTON
BY Robert Harding, Jr.
ATTORNEY

March 11, 1952
W. HATTON
2,588,923
CALCULATOR
Filed Jan. 16, 1946
106 Sheets-Sheet 33

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 34

INVENTOR.
WILLIAM HATTON
BY Robert Harding, Jr.
ATTORNEY

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 36

INVENTOR.
WILLIAM HATTON
BY Robert Harding, Jr.
ATTORNEY

INVENTOR.
WILLIAM HATTON
BY Robert Harding, Jr.
ATTORNEY

INVENTOR.
WILLIAM HATTON
BY Robert Harding Jr.

March 11, 1952 W. HATTON 2,588,923

CALCULATOR

Filed Jan. 16, 1946 106 Sheets-Sheet 39

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 40

INVENTOR.
WILLIAM HATTON
BY Robert Harding, Jr.
ATTORNEY

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 42

INVENTOR.
WILLIAM HATTON
BY Robert Hardwig Jr.
ATTORNEY

March 11, 1952 W. HATTON 2,588,923

CALCULATOR

Filed Jan. 16, 1946 106 Sheets-Sheet 43

INVENTOR.
WILLIAM HATTON
BY Robert Harding Jr.
ATTORNEY

March 11, 1952 W. HATTON 2,588,923

CALCULATOR

Filed Jan. 16, 1946 106 Sheets-Sheet 44

INVENTOR.
WILLIAM HATTON
BY Robert Harding Jr.
ATTORNEY

INVENTOR.
WILLIAM HATTON
BY Robert Harding, Jr.
ATTORNEY

INVENTOR.
WILLIAM HATTON
BY Robert Harding, Jr.
ATTORNEY

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 48

INVENTOR.
WILLIAM HATTON
BY Robert Harding, Jr.
ATTORNEY

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 50

Section 8 (Figs.44-49)
Solution Storing
Circuit (S)

INVENTOR.
WILLIAM HATTON
BY Robert Harding Jr.
ATTORNEY

March 11, 1952 W. HATTON 2,588,923

CALCULATOR

Filed Jan. 16, 1946 106 Sheets-Sheet 51

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 52

INVENTOR.
WILLIAM HATTON
BY Robert Harding, Jr.
ATTORNEY

March 11, 1952

W. HATTON 2,588,923

CALCULATOR

Filed Jan. 16, 1946

106 Sheets-Sheet 53

INVENTOR.
WILLIAM HATTON
BY Robert Harding Jr.
ATTORNEY

INVENTOR.
WILLIAM HATTON
BY Robert Harding, Jr.
ATTORNEY

INVENTOR.
WILLIAM HATTON
BY Robert Harding, Jr.
ATTORNEY

Section 9 (Figs. 50-57)
Decimal Point Circuit (P)

INVENTOR.
WILLIAM HATTON
BY Robert Harding, Jr.
ATTORNEY

INVENTOR.
WILLIAM HATTON
BY Robert Harding, Jr.
ATTORNEY

INVENTOR.
WILLIAM HATTON
BY Robert Harding, Jr.
ATTORNEY

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 60

INVENTOR.
WILLIAM HATTON
BY Robert Harding, Jr.
ATTORNEY

INVENTOR.
WILLIAM HATTON
BY Robert Harding Jr.
ATTORNEY

March 11, 1952 W. HATTON 2,588,923

CALCULATOR

Filed Jan. 16, 1946 106 Sheets-Sheet 62

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 63

INVENTOR.
WILLIAM HATTON
BY Robert Harding Jr.
ATTORNEY

INVENTOR.
WILLIAM HATTON
BY Robert Harding Jr.
ATTORNEY

March 11, 1952 W. HATTON 2,588,923

CALCULATOR

Filed Jan. 16, 1946 106 Sheets-Sheet 65

INVENTOR.
WILLIAM HATTON
BY Robert Harding Jr
ATTORNEY

March 11, 1952 W. HATTON 2,588,923

CALCULATOR

Filed Jan. 16, 1946 106 Sheets-Sheet 66

INVENTOR.
WILLIAM HATTON
BY Robert Harding Jr.
ATTORNEY

March 11, 1952

W. HATTON 2,588,923

CALCULATOR

Filed Jan. 16, 1946

106 Sheets-Sheet 67

INVENTOR.
WILLIAM HATTON
BY Robert Harding Jr.
ATTORNEY

March 11, 1952 W. HATTON 2,588,923

CALCULATOR

Filed Jan. 16, 1946 106 Sheets-Sheet 68

INVENTOR.
WILLIAM HATTON
BY Robert Harding Jr.
ATTORNEY

March 11, 1952 W. HATTON 2,588,923

CALCULATOR

Filed Jan. 16, 1946 106 Sheets-Sheet 69

INVENTOR.
WILLIAM HATTON
BY Robert Harding Jr.
ATTORNEY

March 11, 1952

W. HATTON 2,588,923

CALCULATOR

Filed Jan. 16, 1946

106 Sheets-Sheet 70

INVENTOR.
WILLIAM HATTON
BY Robert Harding Jr.
ATTORNEY

March 11, 1952 W. HATTON 2,588,923

CALCULATOR

Filed Jan. 16, 1946 106 Sheets-Sheet 71

INVENTOR.
WILLIAM HATTON

BY Robert Harding Jr.

ATTORNEY

Fig. 68.

Outgoing Signals to Calculator

| Key Operated | Contacts of Wires Closed and Corresponding Relays Operated | | | | | |
|---|---|---|---|---|---|---|
| | 1 CA | 2 CB | 3 CC | 4 CE | 5 CF | 6 CG |
| 0 | | | | | + | |
| 1 | + | + | | + | + | |
| 2 | | + | | + | + | |
| 3 | + | | | + | + | |
| 4 | + | + | + | | + | |
| 5 | | + | + | | + | |
| 6 | + | | + | | + | |
| 7 | + | + | | | + | |
| 8 | | + | | | + | |
| 9 | + | | | | + | |
| , | | | | + | + | |
| . | | | + | | + | |
| + | | + | | | | + |
| − | | | + | | | + |
| × | + | | + | | | + |
| ÷ | | + | + | | | + |
| = | | | | + | | + |
| SUB ⊨ | + | | | + | | + |
| CM ≚ | | + | | + | | + |
| CNL / | | | | | | + |

Fig. 69.

Incoming Signals from Calculator

| Type Printed | Magnets Operated Over Wires | | | | | | Color of Printing | Key Lock |
|---|---|---|---|---|---|---|---|---|
| | K1 11 | K2 12 | K3 13 | K4 14 | K5 15 | K6 16 | | K7 10 |
| 0 | | | | | | + | Black | + |
| 1 | + | + | | + | | + | | + |
| 2 | | + | | + | | + | | + |
| 3 | + | | | + | | + | | + |
| 4 | + | + | + | | | + | | + |
| 5 | | + | + | | | + | | + |
| 6 | + | | + | | | + | | + |
| 7 | + | + | | | | + | | + |
| 8 | | + | | | | + | | + |
| 9 | + | | | | | + | | + |
| , | | | | + | | + | | + |
| . | | | + | | | + | | + |
| + | | + | | | + | + | Red | + |
| − | | | + | | + | + | | + |
| × | + | | + | | + | + | | + |
| ÷ | | + | + | | + | + | | + |
| = | | | | + | + | + | | + |
| ⊨ | + | | | + | + | + | | + |
| ≚ | | + | | + | + | + | | + |
| / | | | | | + | + | | + |

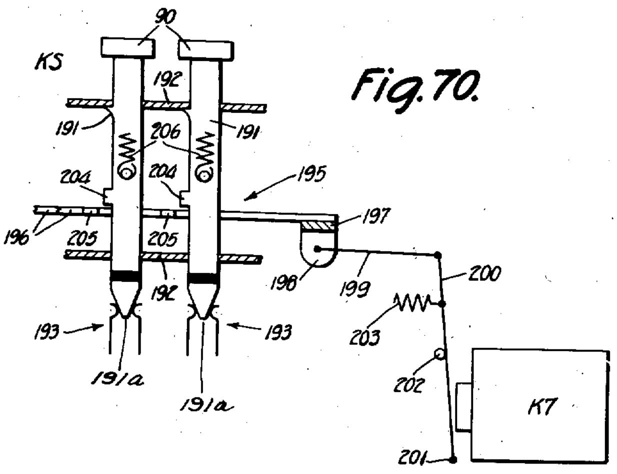

Fig. 70.

INVENTOR.
WILLIAM HATTON
BY Robert Harding Jr.
ATTORNEY

Fig. 71.

Addition and Subtraction

| | | S1 | S2 | S3 | S4 | S5 | S6 | S7 | S8 | S9 | S10 | S11 | S12 | S13 | S14 | S15 | S16 | S17 |
|---|---|---|---|---|---|---|---|---|---|---|---|---|---|---|---|---|---|---|
| I | Calculator Idle | 0 | 0 | 0, | 0 | 0 | 0, | 0 | 0 | 0. | 0 | 0 | 0 | 0 | 0 | 0 | 0 | 0 |
| | Transfer 1,280 | | | | | | (1, | 2 | 8 | 0. | 0 | 0 | 0 | 0) | | | | |
| II | Accumulate | 0 | 0 | 0, | 0 | 0 | 1, | 2 | 8 | 0. | 0 | 0 | 0 | 0 | 0 | 0 | 0 | 0 |
| | Transfer 59 | | | | | | | | (5 | 9. | 0 | 0 | 0 | 0 | 0 | 0) | | |
| III | Accumulate | 0 | 0 | 0, | 0 | 0 | 1, | 2 | 2 | 9. | 0 | 0 | 0 | 0 | 0 | 0 | 0 | 0 |
| IV | Correct for Carry-over | 0 | 0 | 0, | 0 | 0 | 1, | 3 | 2 | 9. | 0 | 0 | 0 | 0 | 0 | 0 | 0 | 0 |
| V | Compensate for 11th Step | 0 | 0 | 0, | 0 | 0 | 1, | 3 | 3 | 9. | 0 | 0 | 0 | 0 | 0 | 0 | 0 | 0 |
| | Correct for Subtraction | | | | | | | | | | (1) | | | | | | | |
| VI | Accumulate | 0 | 0 | 0, | 0 | 0 | 1, | 3 | 3 | 9. | 1 | 0 | 0 | 0 | 0 | 0 | 0 | 0 |
| | Transfer Complement of 935.1 to 999,999,999.9 | (9 | 9 | 9, | 9 | 9 | 9, | 0 | 6 | 4. | 8 | 0 | 0 | 0 | 0) | | | |
| VII | Accumulate | 9 | 9 | 9, | 9 | 9 | 10, | 3 | 9 | 2. | 9 | 0 | 0 | 0 | 0 | 0 | 0 | 0 |
| VIII | Correct for Carry-over | 10 | 10 | 10, | 10 | 10 | 10, | 4 | 10 | 2. | 9 | 0 | 0 | 0 | 0 | 0 | 0 | 0 |
| IX | Compensate for 11th Step | 0 | 0 | 0, | 0 | 0 | 0, | 4 | 0 | 3. | 9 | 0 | 0 | 0 | 0 | 0 | 0 | 0 |

INVENTOR.
WILLIAM HATTON
BY Robert Harding Jr.
ATTORNEY

Fig.72.

Multiplication

| | Switches → | S2 | S3 | S4 | S5 | S6 | S7 | S8 | S9 | S10 | S11 | S12 | S13 | S14 | S15 | S16 | S17 |
|---|---|---|---|---|---|---|---|---|---|---|---|---|---|---|---|---|---|
| I | Calculator Idle | 0 | 0 | 0 | 0 | 0 | 0 | 0 | 0 | 0 | 0 | 0 | 0 | 0 | 0 | 0 | 0 |
| | Higher Partial Products (x5) | (0 | 1 | 4 | 0 | 0 | 0 | 0 | 0) | | | | | | | | |
| II | Accumulate | 0 | 1 | 4 | 0 | 0 | 0 | 0 | 0 | 0 | 0 | 0 | 0 | 0 | 0 | 0 | 0 |
| | Lower Partial Products (x5) | | (5 | 0. | 0 | 0 | 0 | 0 | 0 | 0) | | | | | | | |
| III | Accumulate | 0 | 6 | 4 | 0 | 0 | 0 | 0 | 0 | 0 | 0 | 0 | 0 | 0 | 0 | 0 | 0 |
| | Higher Partial Products (x9) | | (0 | 1 | 7 | 0 | 0 | 0 | 0 | 0) | | | | | | | |
| IV | Accumulate | 0 | 6 | 5 | 7 | 0 | 0 | 0 | 0 | 0 | 0 | 0 | 0 | 0 | 0 | 0 | 0 |
| | Lower Partial Products (x9) | | | (9 | 8 | 2 | 0 | 0 | 0 | 0 | 0) | | | | | | |
| V | Accumulate | 0 | 6 | 3 | 4 | 2 | 0 | 0 | 0 | 0 | 0 | 0 | 0 | 0 | 0 | 0 | 0 |
| VI | Correct for Carry-over | 0 | 7 | 4 | 4 | 2 | 0 | 0 | 0 | 0 | 0 | 0 | 0 | 0 | 0 | 0 | 0 |
| VII | Compensate for 11th Step | 0 | 7 | 5 | 5 | 2 | 0 | 0 | 0 | 0 | 0 | 0 | 0 | 0 | 0 | 0 | 0 |
| VIII | Delete Aggregate | 0 | 0 | 0 | 0 | 0 | 0 | 0 | 0 | 0 | 0 | 0 | 0 | 0 | 0 | 0 | 0 |
| | Lower Partial Products (x1) | | | | (1 | 2 | 8 | 0 | 0 | 0 | 0 | 0) | | | | | |
| IX | Accumulate | 0 | 0 | 0 | 1 | 2 | 8 | 0 | 0 | 0 | 0 | 0 | 0 | 0 | 0 | 0 | 0 |
| X | Delete Aggregate | 0 | 0 | 0 | 0 | 0 | 0 | 0 | 0 | 0 | 0 | 0 | 0 | 0 | 0 | 0 | 0 |

INVENTOR.
WILLIAM HATTON
BY Robert Harding Jr.
ATTORNEY

March 11, 1952 | W. HATTON | 2,588,923

CALCULATOR

Filed Jan. 16, 1946 | 106 Sheets-Sheet 75

INVENTOR.
WILLIAM HATTON
BY Robert Harding, Jr.
ATTORNEY

March 11, 1952 W. HATTON 2,588,923

CALCULATOR

Filed Jan. 16, 1946 106 Sheets-Sheet 76

INVENTOR.
WILLIAM HATTON

BY Robert Harding, Jr.

ATTORNEY

Fig. 77.

| Code Signals of Digits | Digits | | | | | | | | | Storage Relays | | | | | | | |
|---|---|---|---|---|---|---|---|---|---|---|---|---|---|---|---|---|---|
| | 1 | 2 | 3 | 4 | 5 | 6 | 7 | 8 | 9 | | | | | | | | |
| | + | + | + | | | | | | | IAD | IBD | ICD | IDD | IED | IFD | IGD | IHD |
| | | | | + | + | + | | | | IAC | IBC | ICC | IDC | IEC | IFC | IGC | IHC |
| | + | + | | + | + | | + | + | | IAB | IBB | ICB | IDB | IEB | IFB | IGB | IHB |
| | + | | + | + | | + | + | | + | IAA | IBA | ICA | IDA | IEA | IFA | IGA | IHA |

INVENTOR.
WILLIAM HATTON
BY Robert Harding Jr.
ATTORNEY

March 11, 1952 W. HATTON 2,588,923

CALCULATOR

Filed Jan. 16, 1946 106 Sheets-Sheet 78

INVENTOR.
WILLIAM HATTON
BY
Robert Harding Jr.
ATTORNEY

March 11, 1952
W. HATTON
CALCULATOR
2,588,923
Filed Jan. 16, 1946
106 Sheets-Sheet 79
FIG. A1(A)
SELECTION OF CALCULATOR
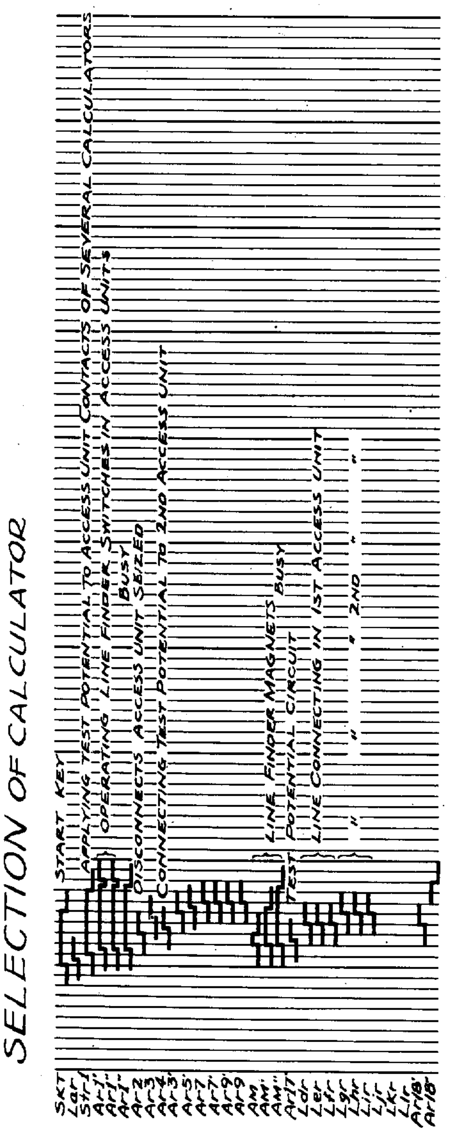
INVENTOR
WILLIAM HATTON
BY
Robert Harding Jr.
ATTORNEY March 11, 1952
W. HATTON
CALCULATOR
2,588,923
Filed Jan. 16, 1946
106 Sheets-Sheet 80
FIG. A1 (B)
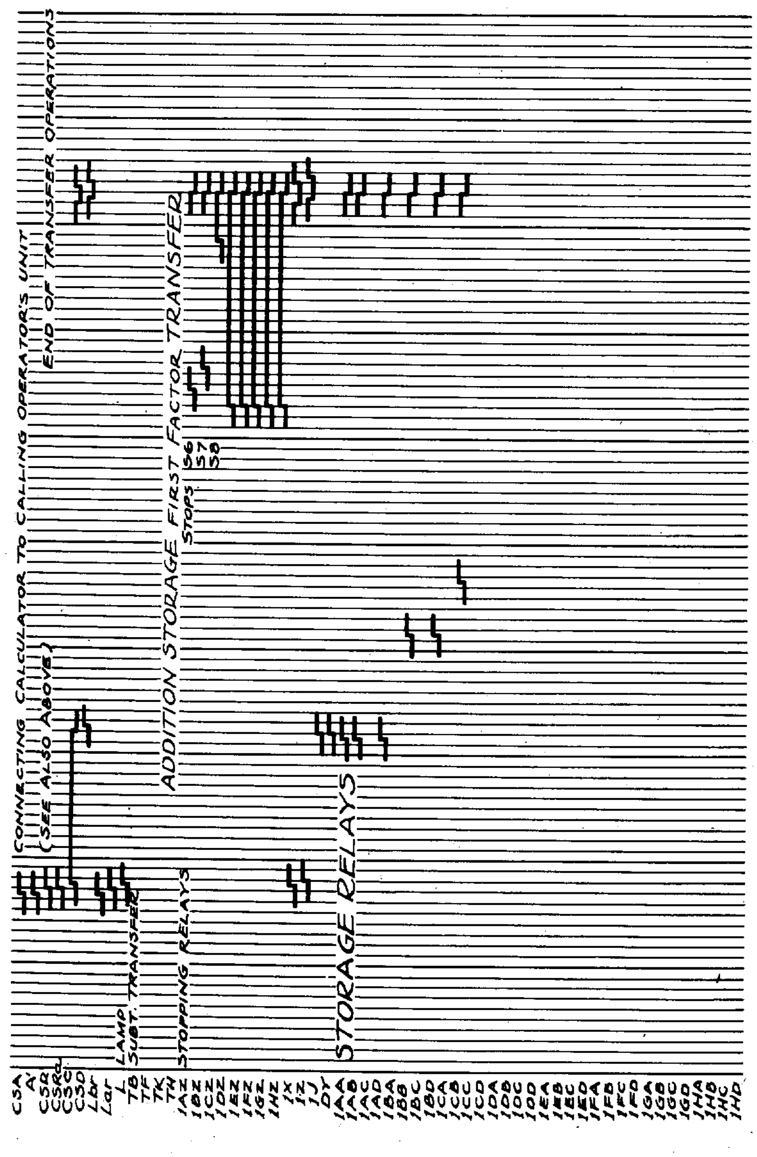
INVENTOR
WILLIAM HATTON
BY
Robert Harding Jr.
ATTORNEY March 11, 1952
W. HATTON
CALCULATOR
2,588,923
Filed Jan. 16, 1946
106 Sheets-Sheet 81
FIG. A1 (C)
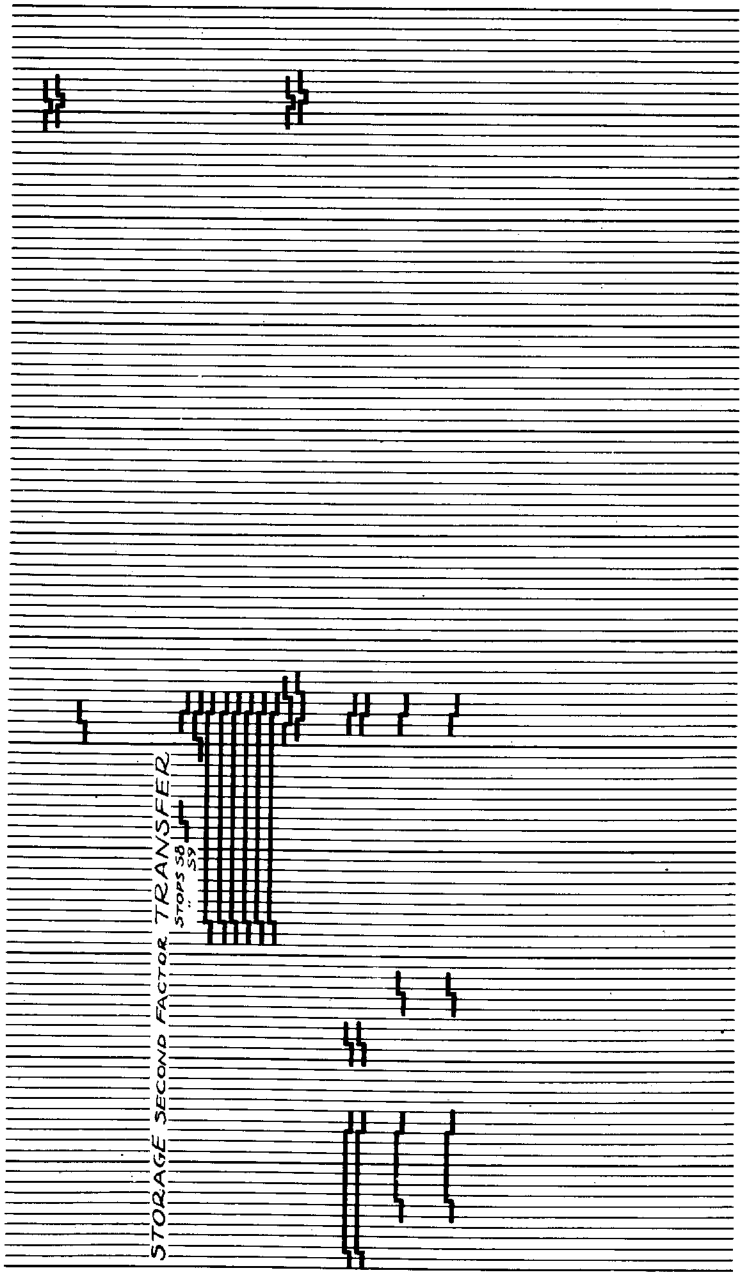
INVENTOR
WILLIAM HATTON
BY
Robert Harding Jr.
ATTORNEY March 11, 1952 W. HATTON 2,588,923
CALCULATOR
Filed Jan. 16, 1946 106 Sheets-Sheet 82
FIG. A2 (A)
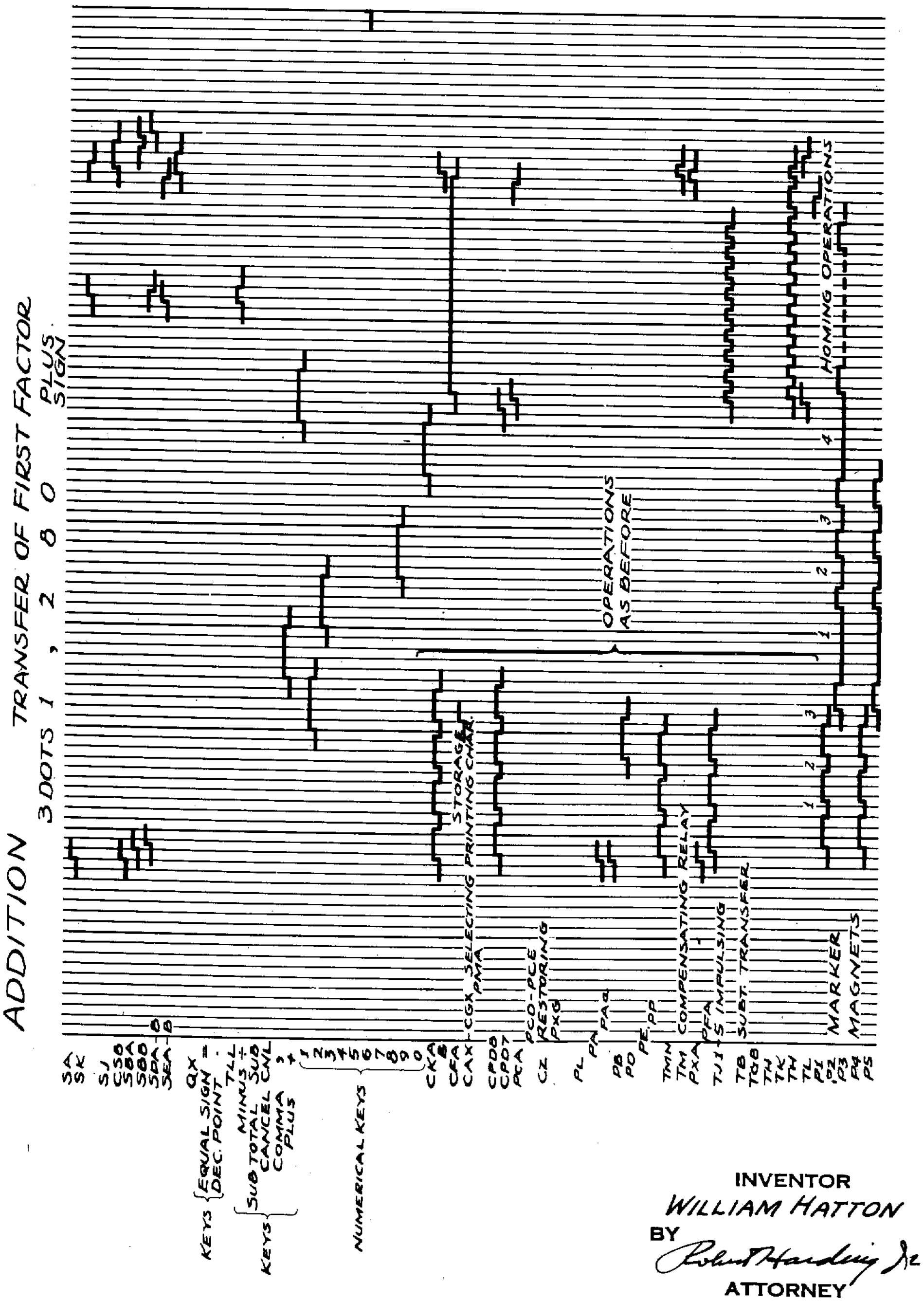
INVENTOR
WILLIAM HATTON
BY Robert Harding Jr.
ATTORNEY March 11, 1952 W. HATTON 2,588,923
CALCULATOR
Filed Jan. 16, 1946 106 Sheets-Sheet 83
FIG. A2 (B)
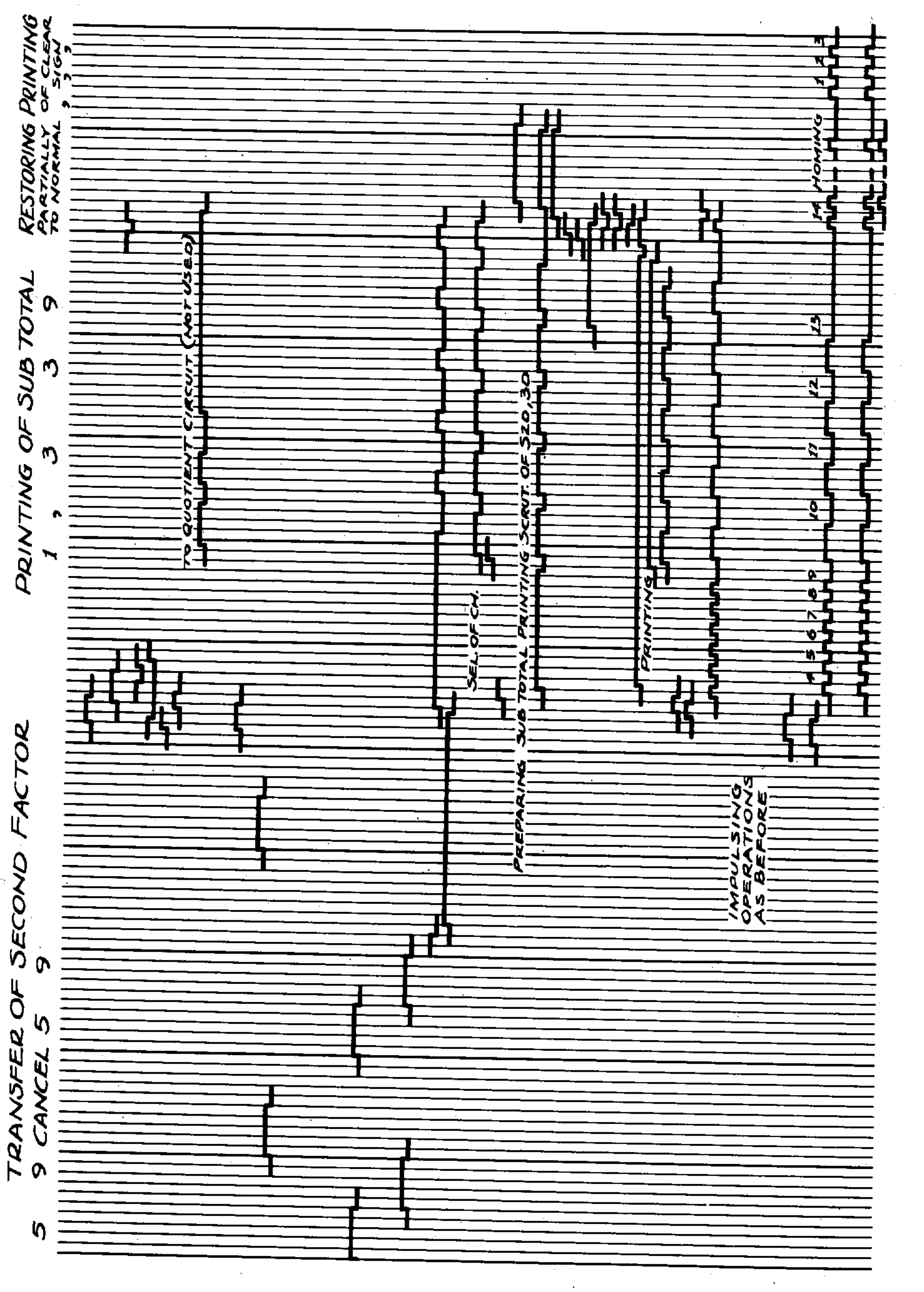
INVENTOR
WILLIAM HATTON
BY
Robert Harding Jr.
ATTORNEY March 11, 1952 W. HATTON 2,588,923
CALCULATOR
Filed Jan. 16, 1946 106 Sheets-Sheet 84
FIG. A2 (C)
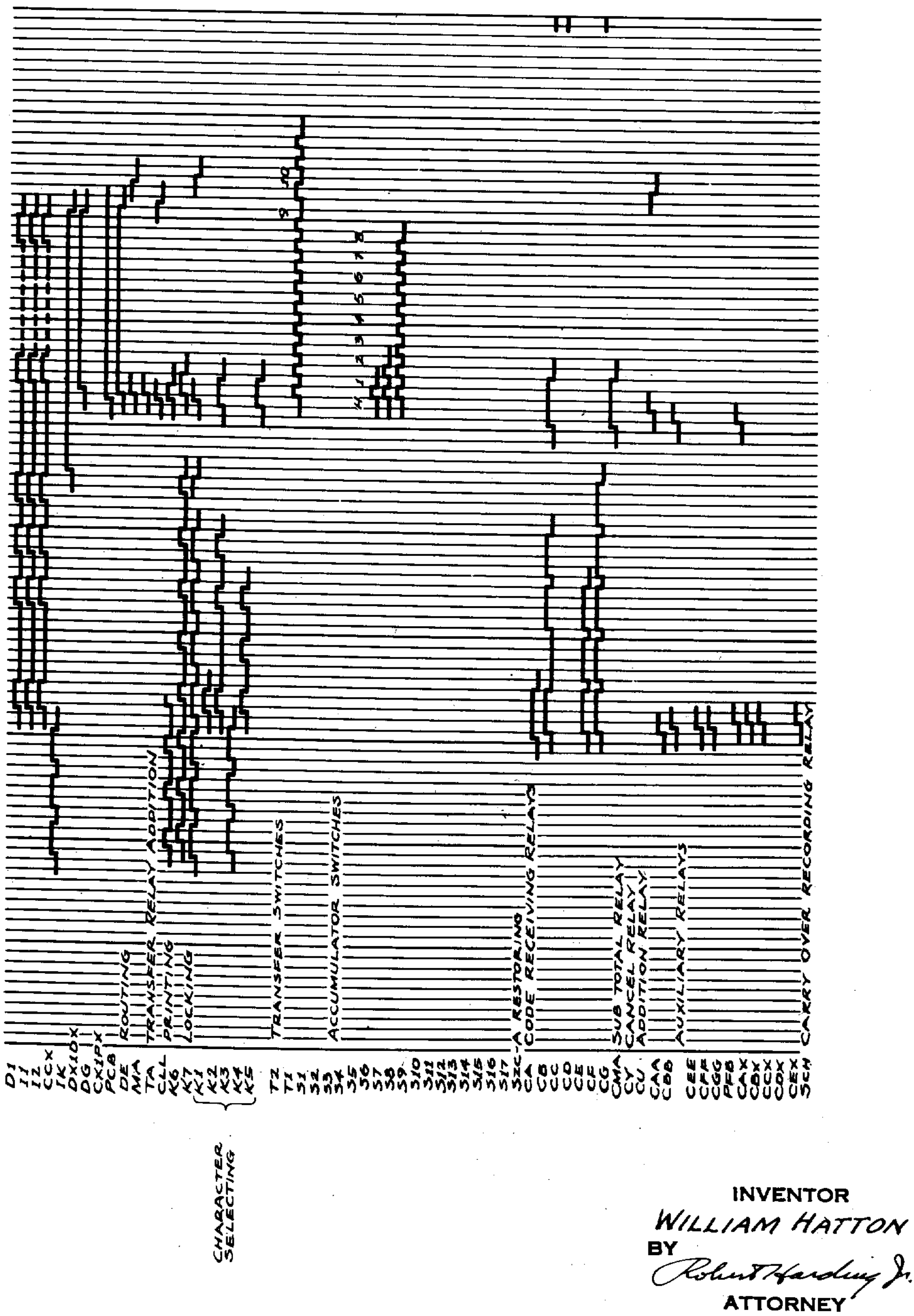
INVENTOR
WILLIAM HATTON
BY
Robert Harding Jr.
ATTORNEY March 11, 1952 W. HATTON 2,588,923
CALCULATOR
Filed Jan. 16, 1946 106 Sheets-Sheet 85
FIG. A2(D)
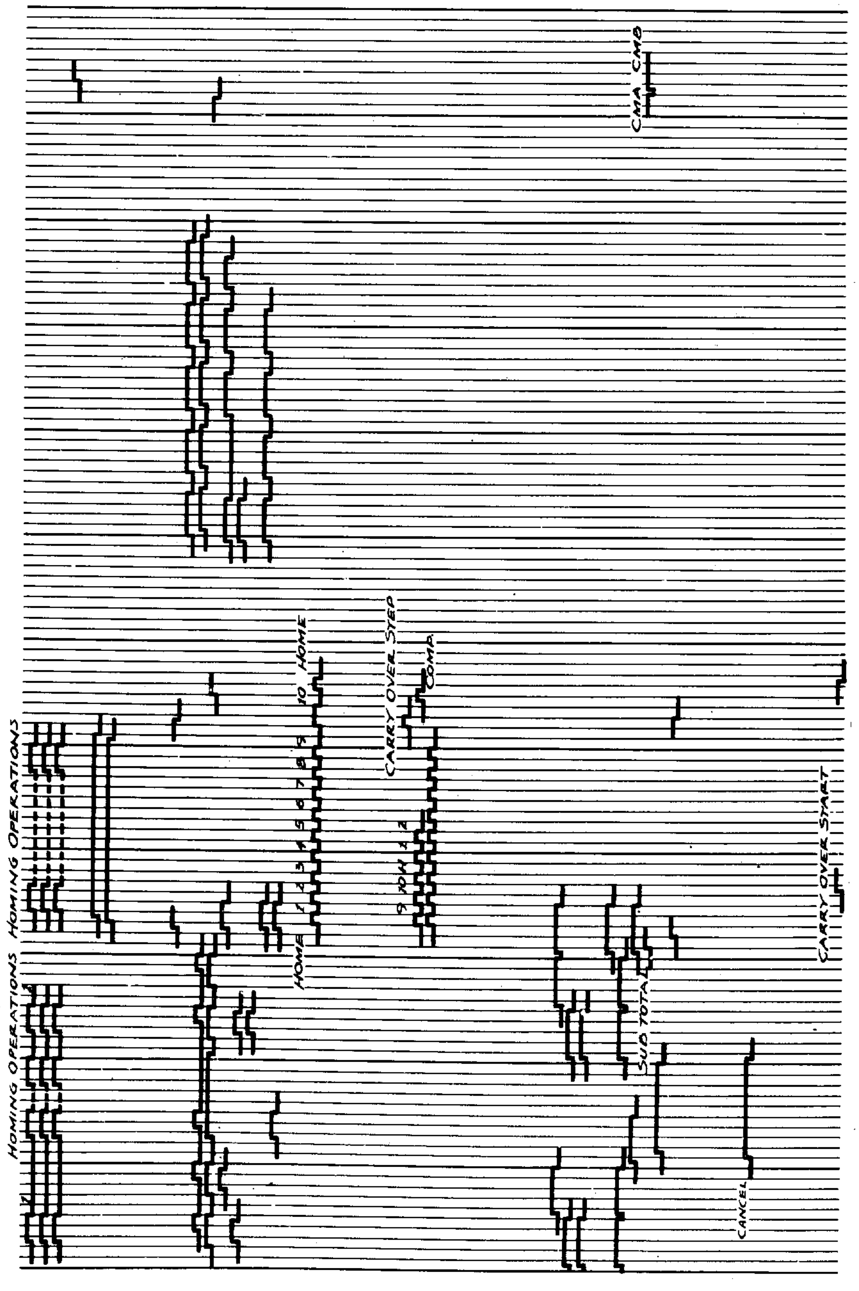
INVENTOR
WILLIAM HATTON
BY
Robert Harding Jr.
ATTORNEY March 11, 1952 W. HATTON 2,588,923
CALCULATOR
Filed Jan. 16, 1946 106 Sheets-Sheet 86
FIG M1 (A)
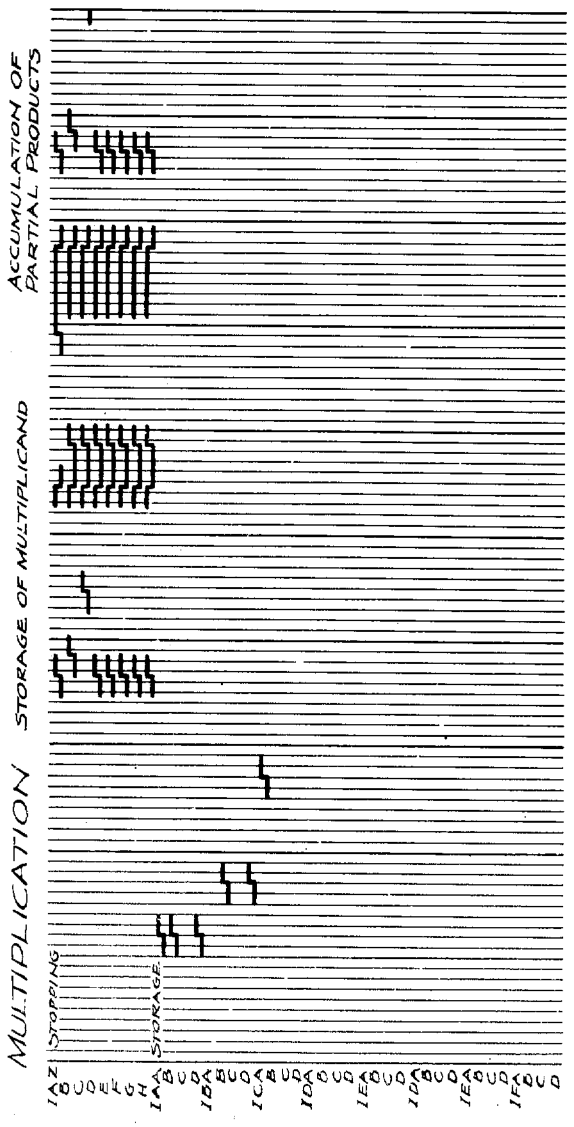
INVENTOR.
WILLIAM HATTON
BY
Robert Harding Jr.
ATTORNEY March 11, 1952 W. HATTON 2,588,923
CALCULATOR
Filed Jan. 16, 1946 106 Sheets-Sheet 87
FIG. M1 (B)
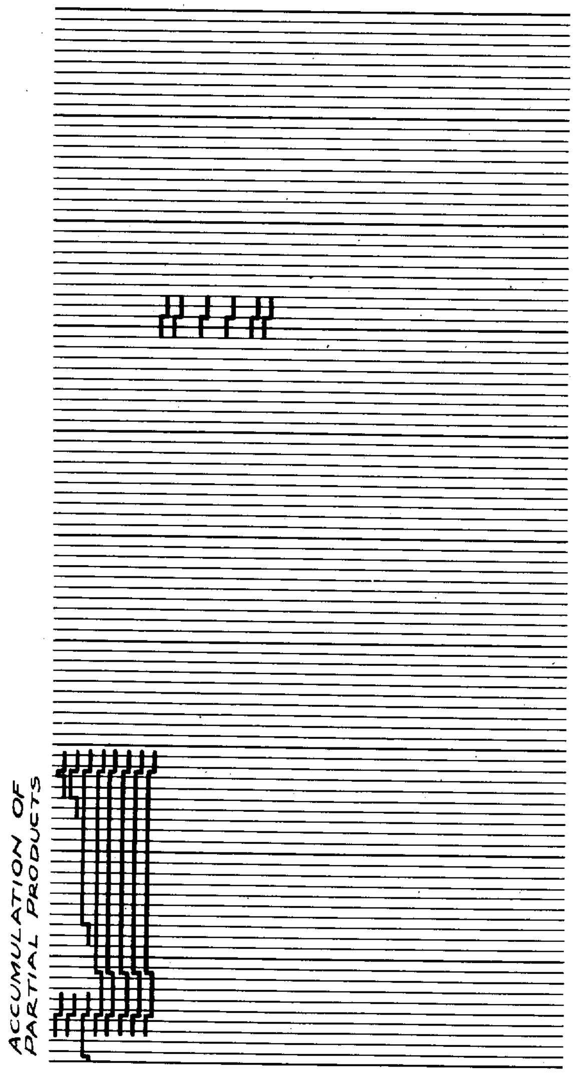
INVENTOR.
WILLIAM HATTON
BY Robert Harding Jr.
ATTORNEY March 11, 1952 W. HATTON 2,588,923
CALCULATOR
Filed Jan. 16, 1946 106 Sheets-Sheet 88
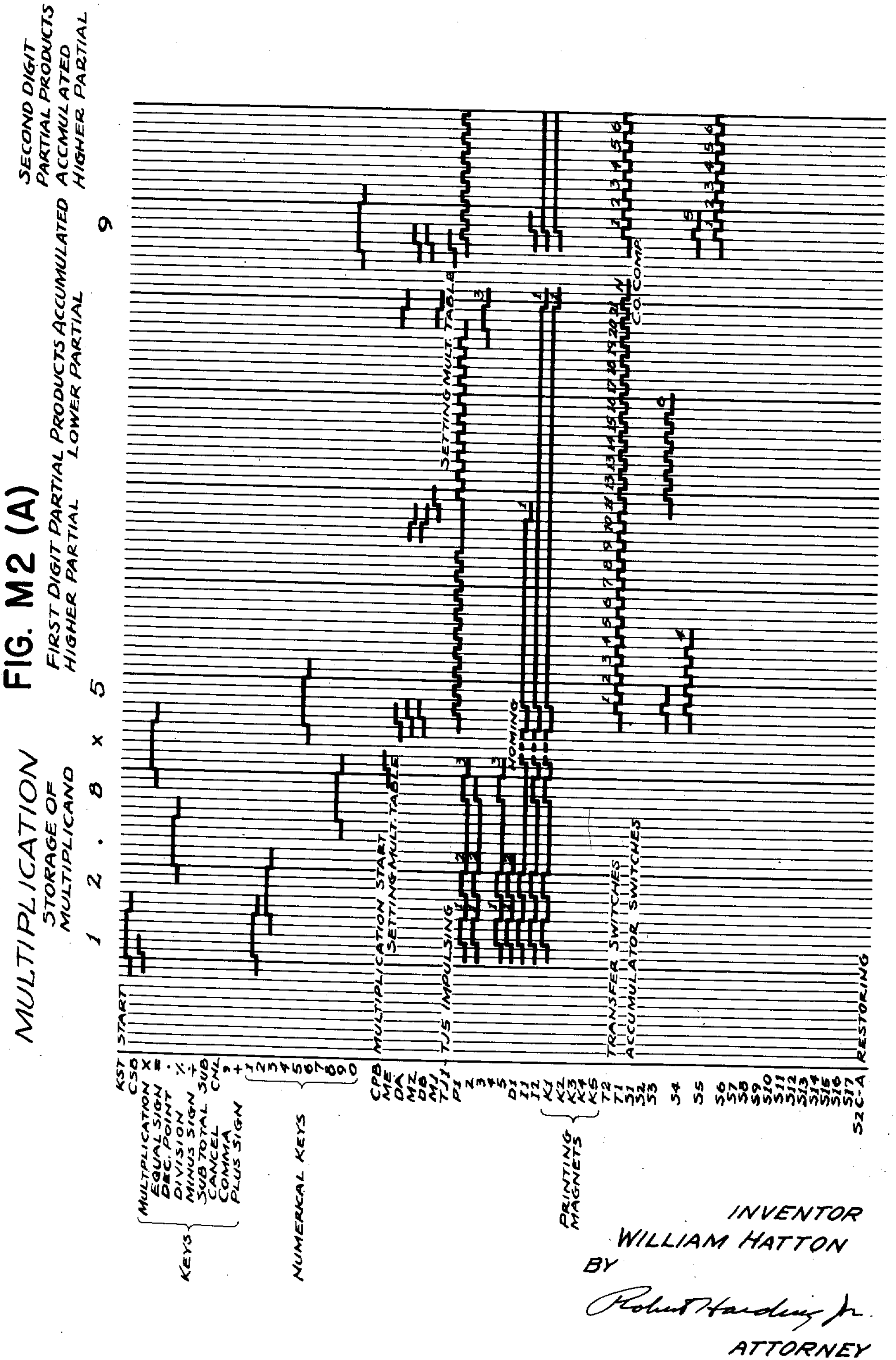
FIG. M2 (A)
INVENTOR
WILLIAM HATTON
BY
Robert Harding Jr.
ATTORNEY March 11, 1952 W. HATTON 2,588,923
CALCULATOR
Filed Jan. 16, 1946 106 Sheets-Sheet 89
FIG. M2 (B)
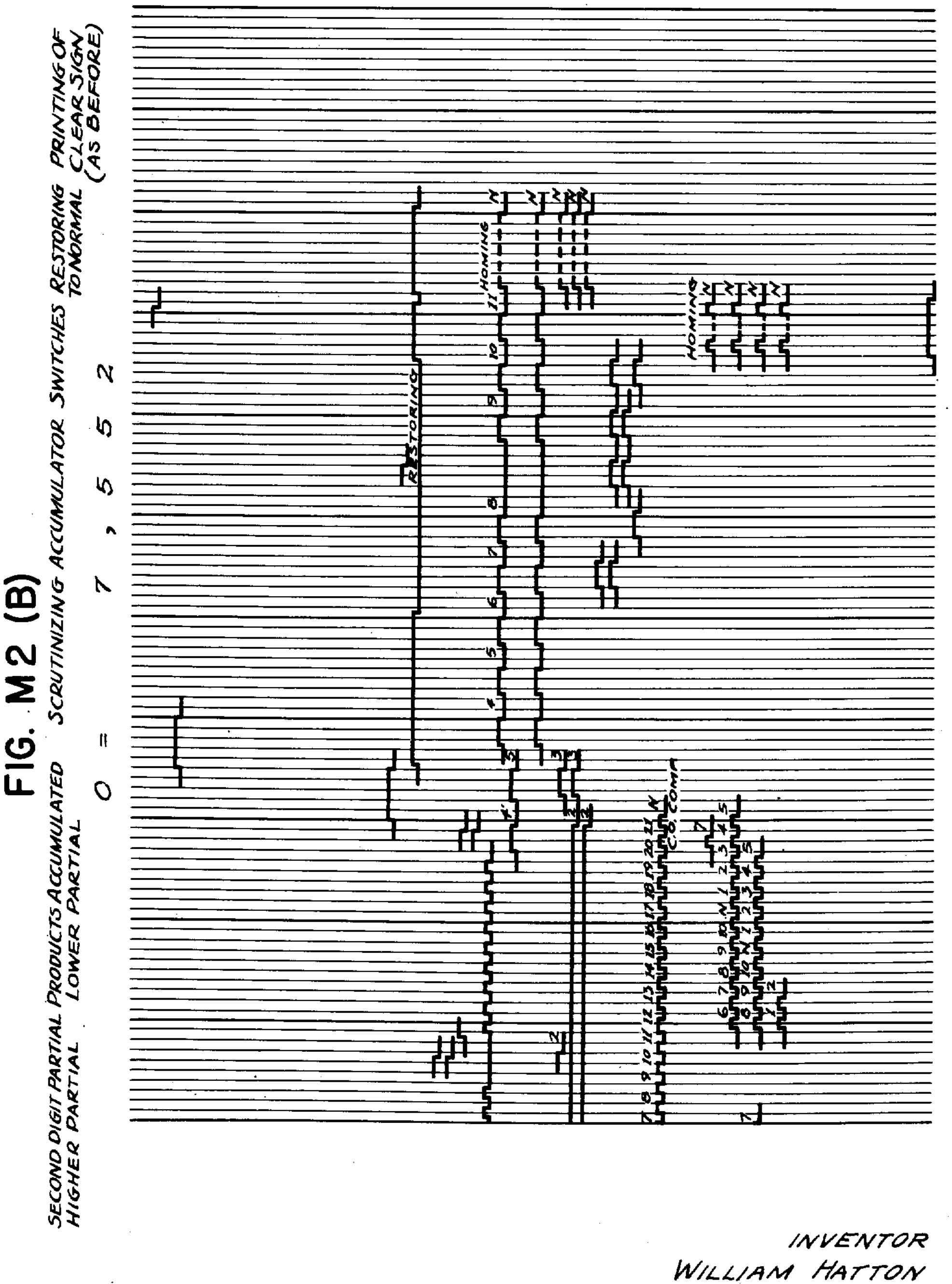
INVENTOR
WILLIAM HATTON
BY
Robert Hardie Jr.
ATTORNEY March 11, 1952 W. HATTON 2,588,923

CALCULATOR

Filed Jan. 16, 1946 106 Sheets-Sheet 90

INVENTOR.
WILLIAM HATTON
BY
Robert Harding Jr.
ATTORNEY

March 11, 1952 W. HATTON 2,588,923
CALCULATOR
Filed Jan. 16, 1946 106 Sheets-Sheet 91
FIG. S1 (B)
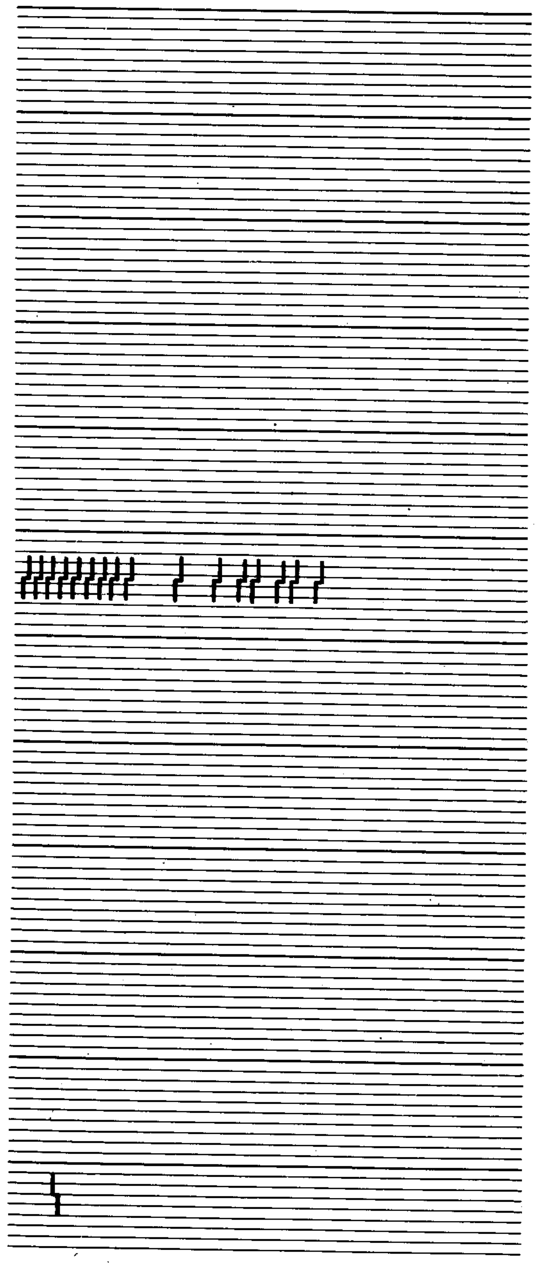
INVENTOR.
WILLIAM HATTON
BY
Robert Harding Jr.
ATTORNEY March 11, 1952 W. HATTON 2,588,923
CALCULATOR
Filed Jan. 16, 1946 106 Sheets-Sheet 92
FIG. S2 (A)
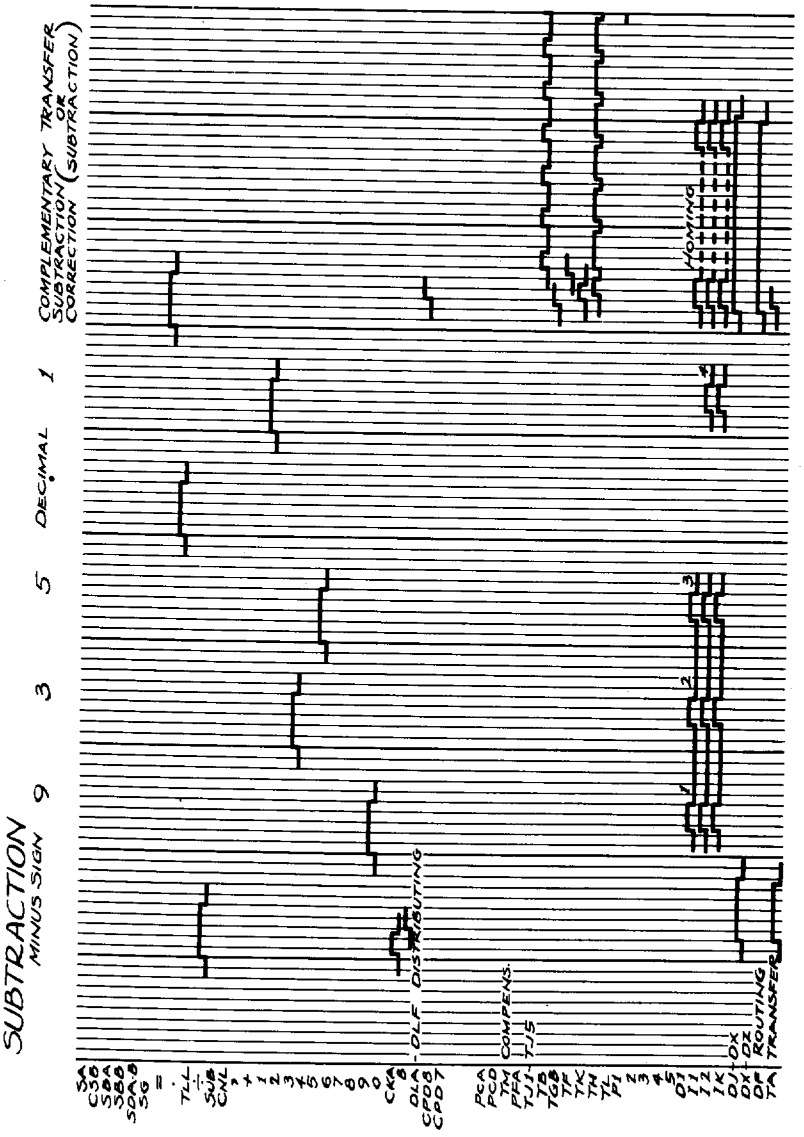
INVENTOR.
WILLIAM HATTON
BY
Robert Harding Jr.
ATTORNEY March 11, 1952 W. HATTON 2,588,923
CALCULATOR
Filed Jan. 16, 1946 106 Sheets-Sheet 93
FIG. S2 (B)
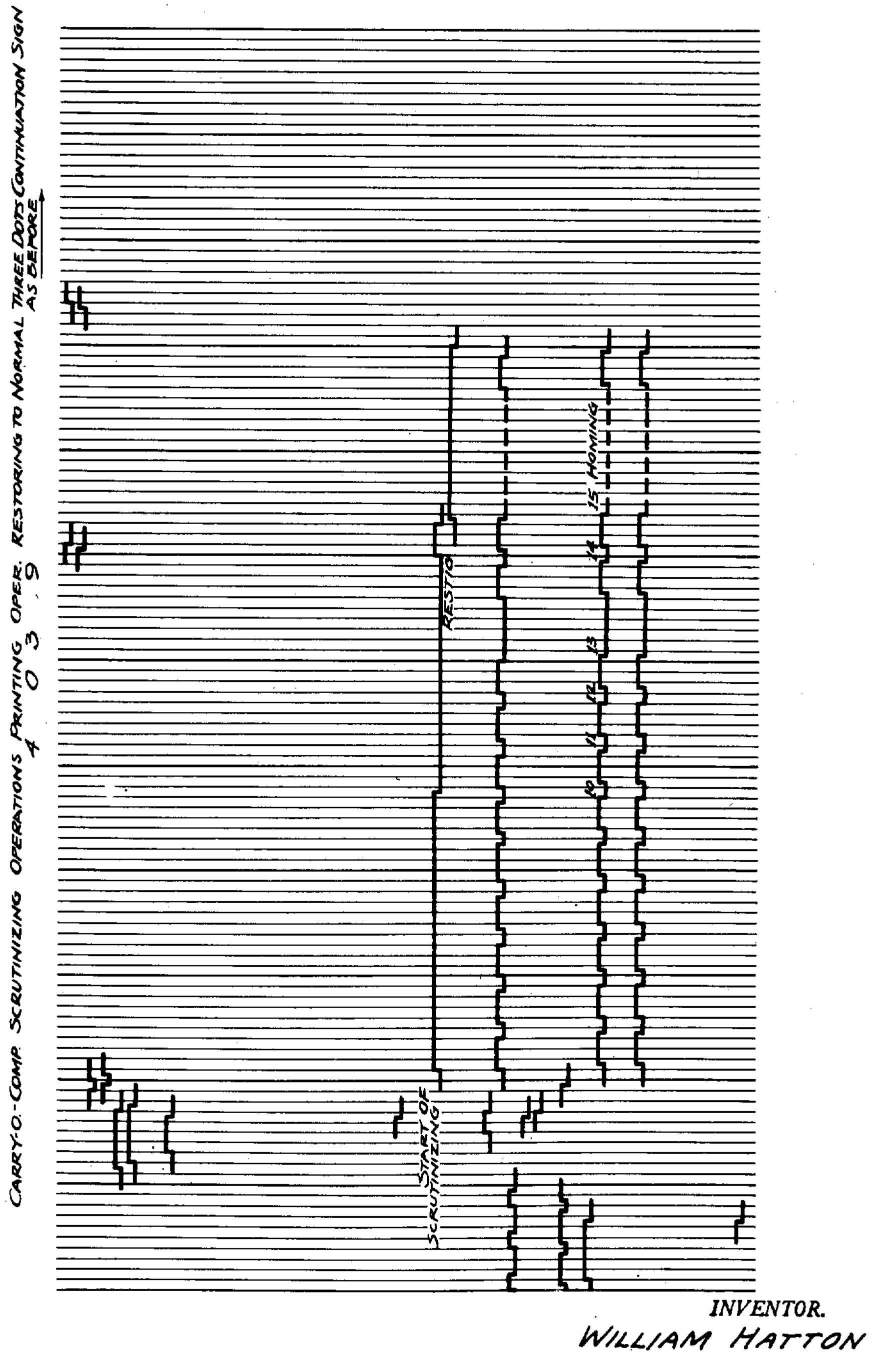
INVENTOR.
WILLIAM HATTON
BY
Robert Harding Jr.
ATTORNEY March 11, 1952 W. HATTON 2,588,923
CALCULATOR
Filed Jan. 16, 1946 106 Sheets-Sheet 94
FIG. S2 (C)
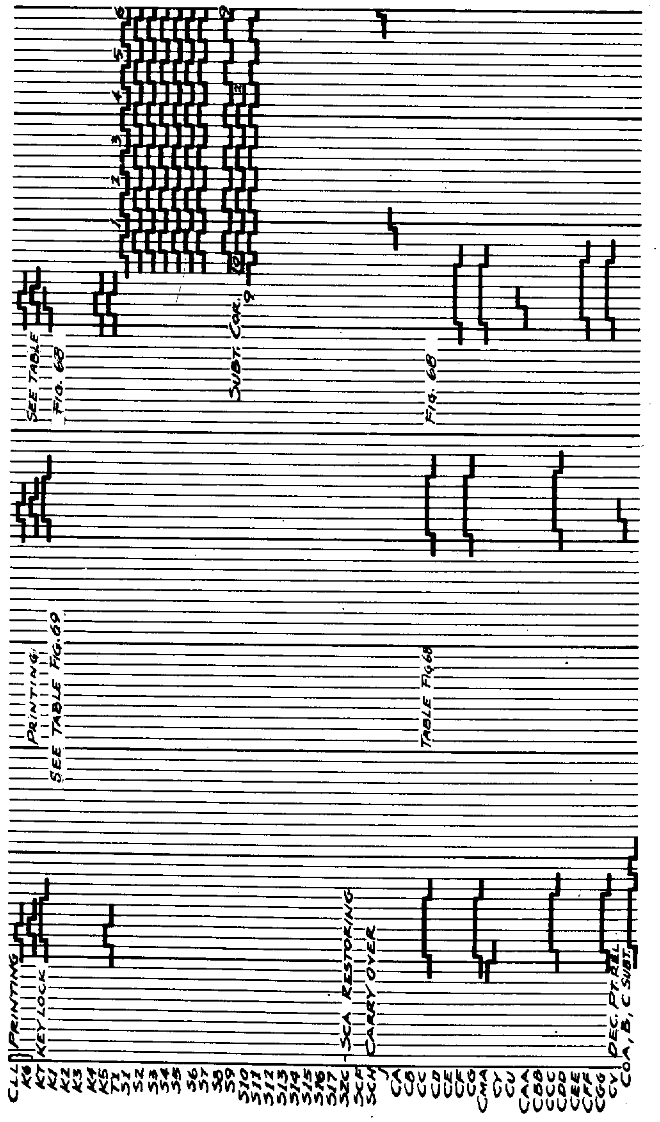
INVENTOR.
WILLIAM HATTON
BY
Robert Harding Jr.
ATTORNEY March 11, 1952 W. HATTON 2,588,923
CALCULATOR
Filed Jan. 16, 1946 106 Sheets-Sheet 95
FIG. S2 (D)
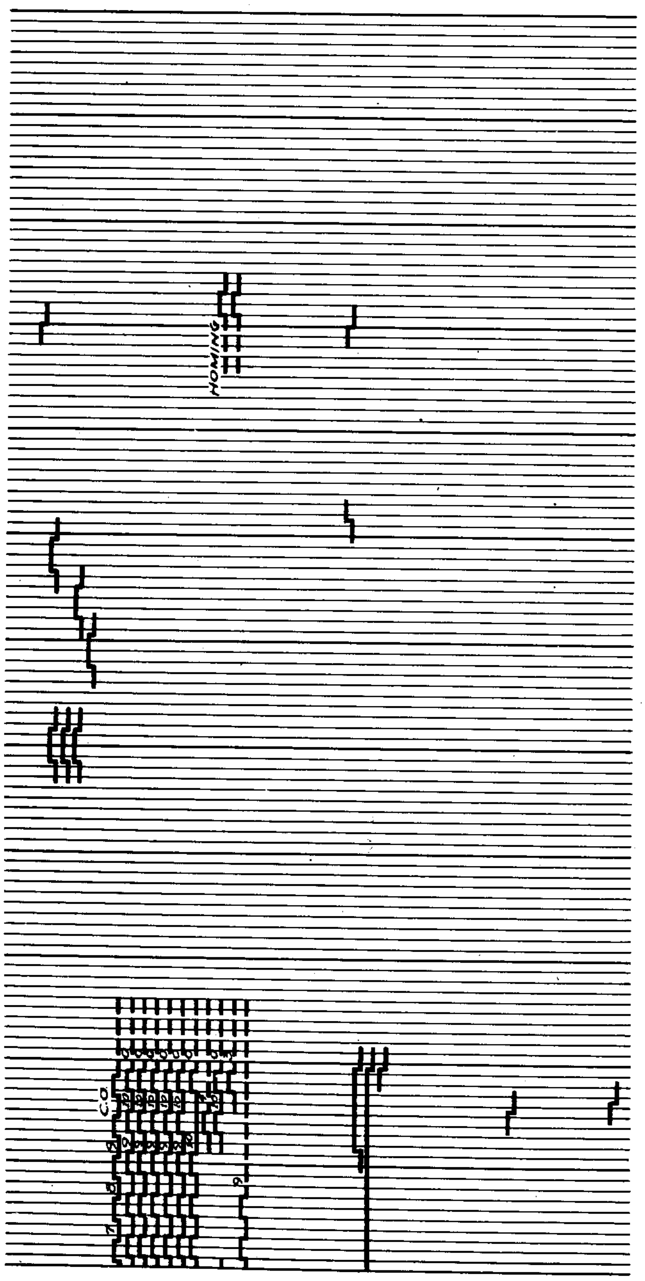
INVENTOR
WILLIAM HATTON
BY
Robert Harding Jr.
ATTORNEY March 11, 1952 W. HATTON 2,588,923
CALCULATOR
Filed Jan. 16, 1946 106 Sheets-Sheet 96
FIG. D1
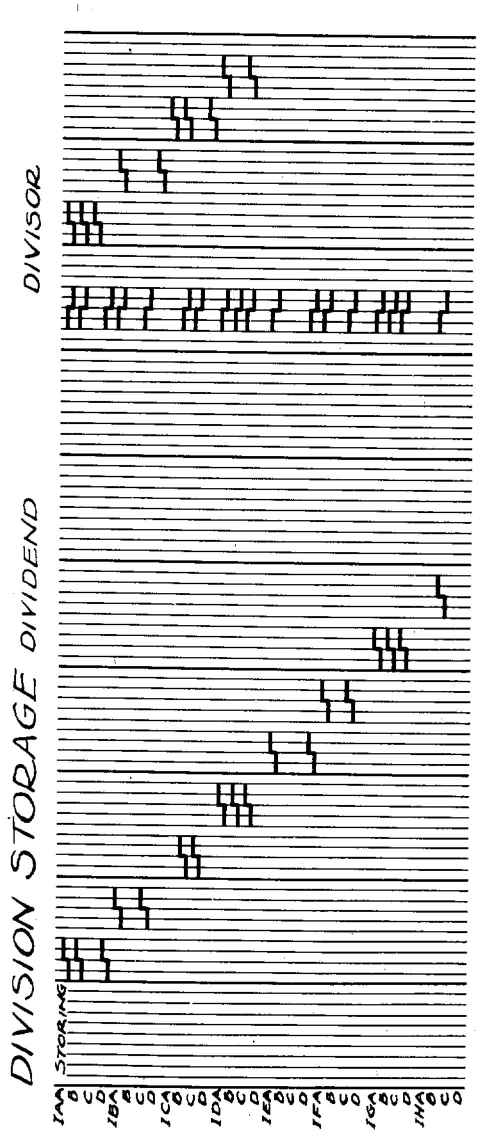
INVENTOR
WILLIAM HATTON
BY Robert Harding Jr.
ATTORNEY March 11, 1952 W. HATTON 2,588,923
CALCULATOR
Filed Jan. 16, 1946 106 Sheets-Sheet 97
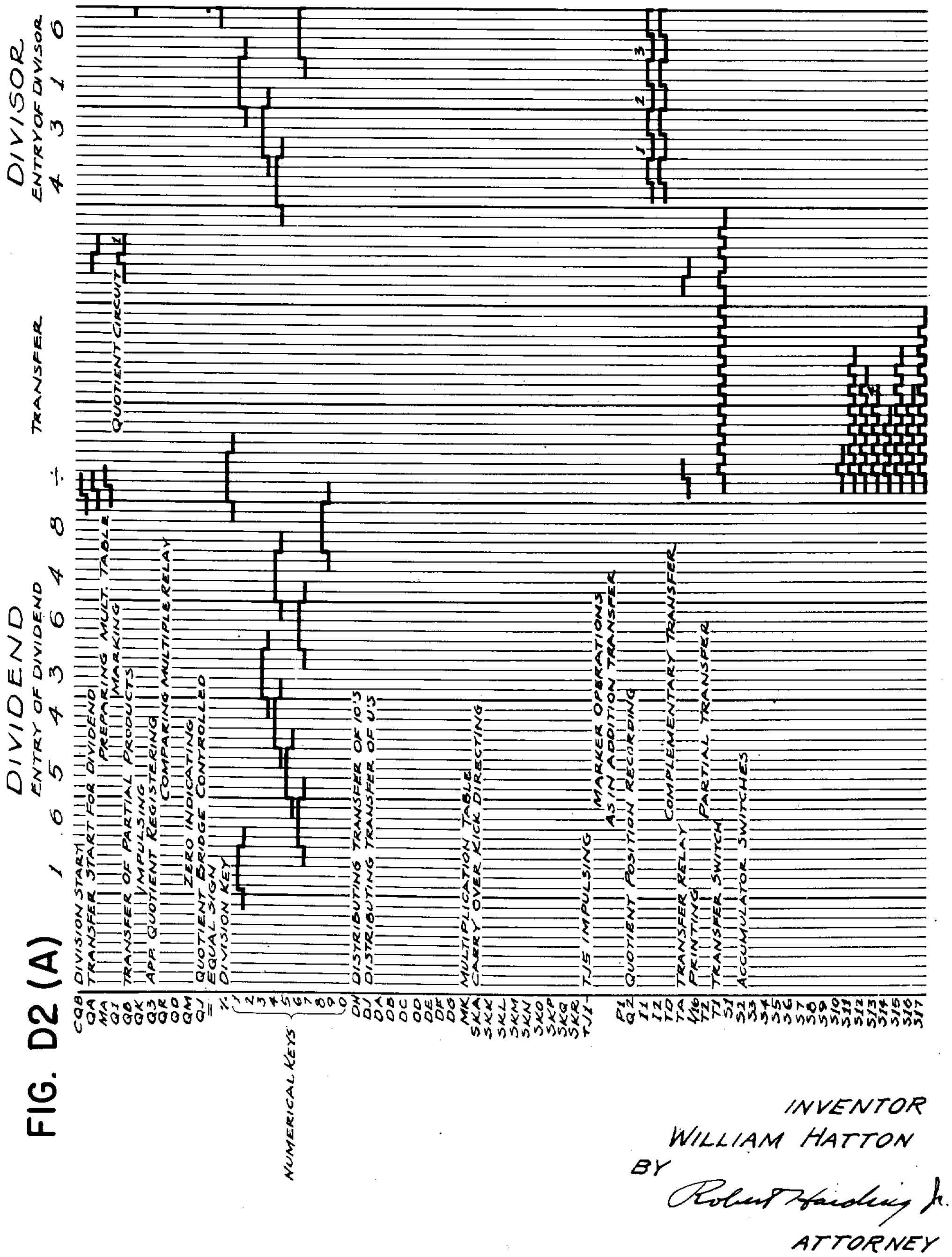
FIG. D2 (A)
INVENTOR
WILLIAM HATTON
BY
Robert Harding Jr.
ATTORNEY March 11, 1952 W. HATTON 2,588,923
CALCULATOR
Filed Jan. 16, 1946 106 Sheets-Sheet 98
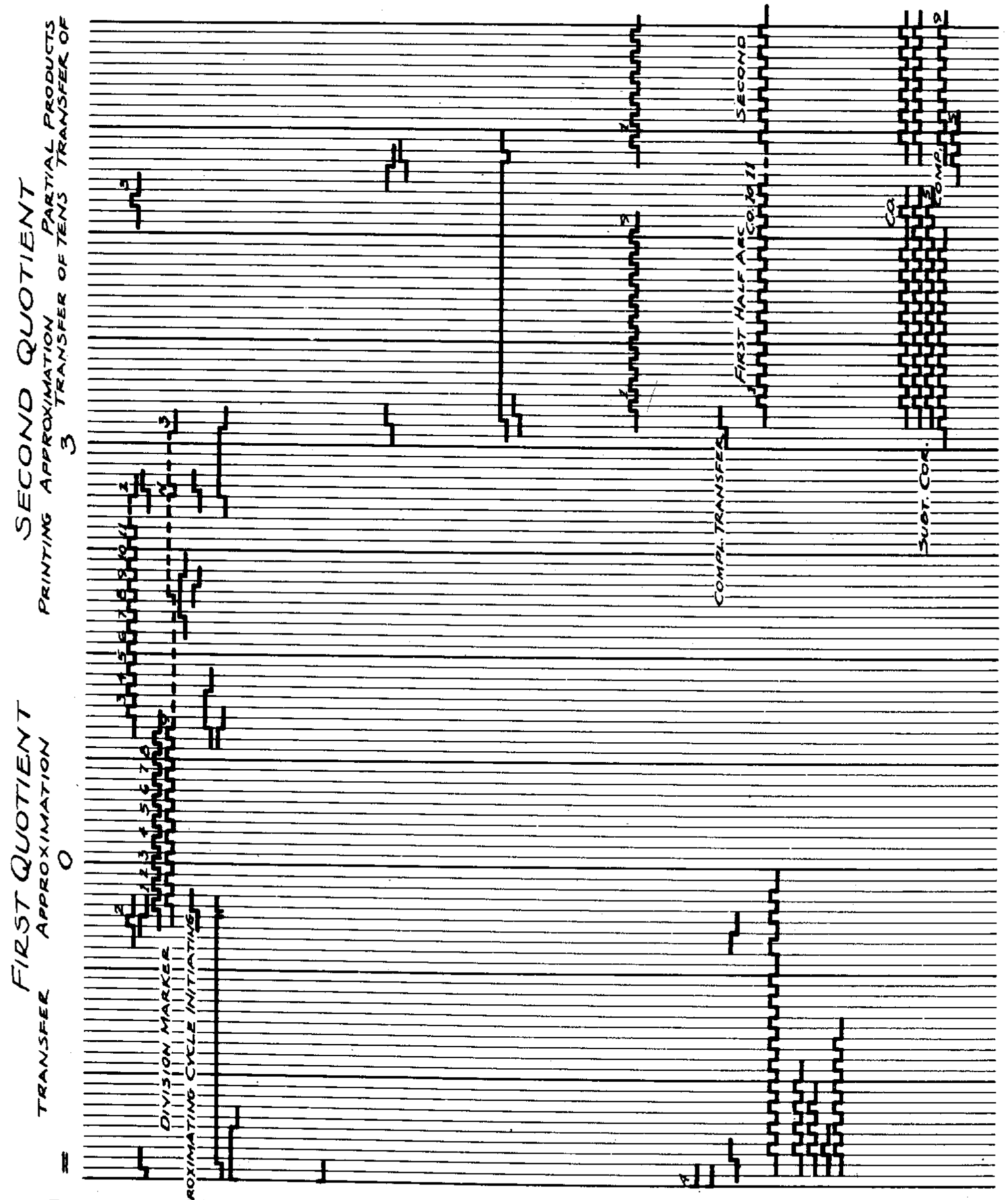
FIG. D2 (B)
INVENTOR
WILLIAM HATTON
BY
Robert Harding Jr.
ATTORNEY March 11, 1952 W. HATTON 2,588,923
CALCULATOR
Filed Jan. 16, 1946 106 Sheets-Sheet 99
FIG. D3 (A)
THIRD QUOTIENT
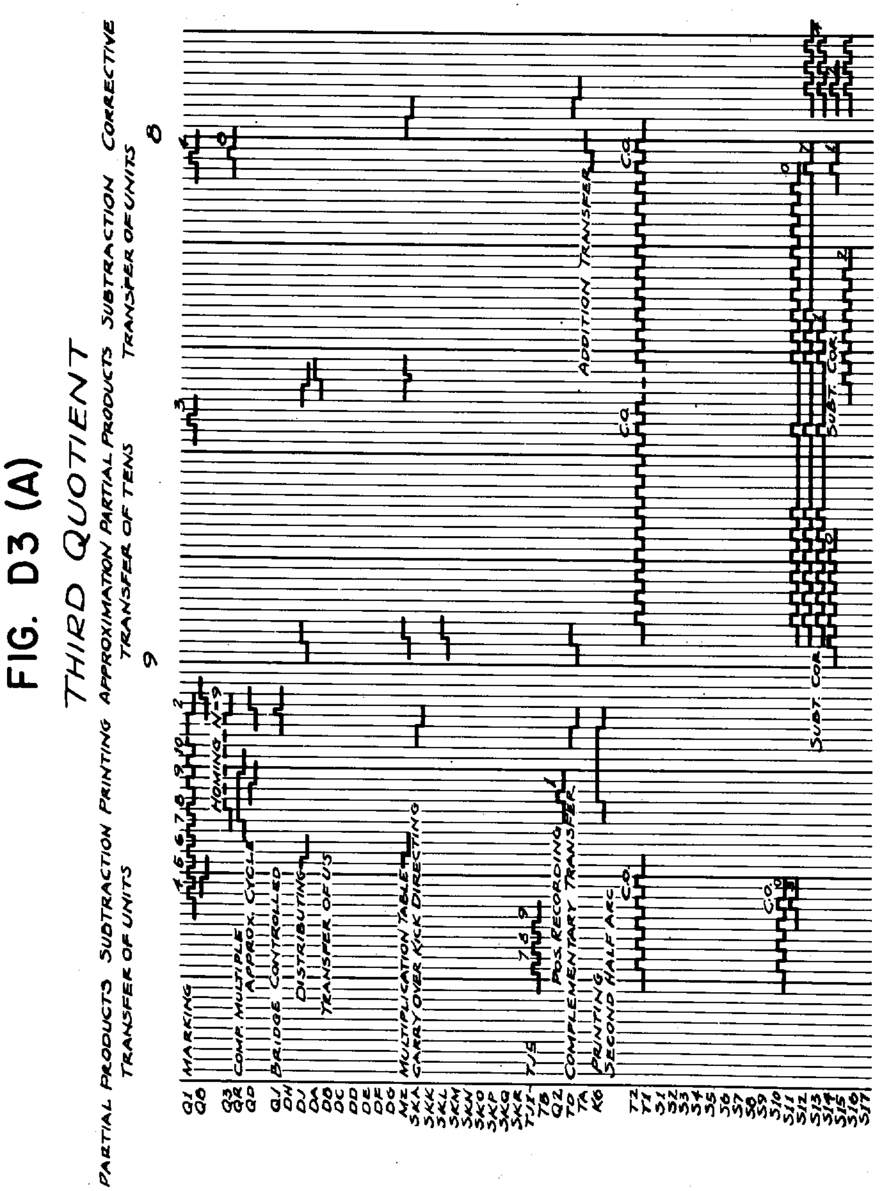
INVENTOR.
WILLIAM HATTON
BY
Robert Harding Jr.
ATTORNEY FIG. D3 (B)
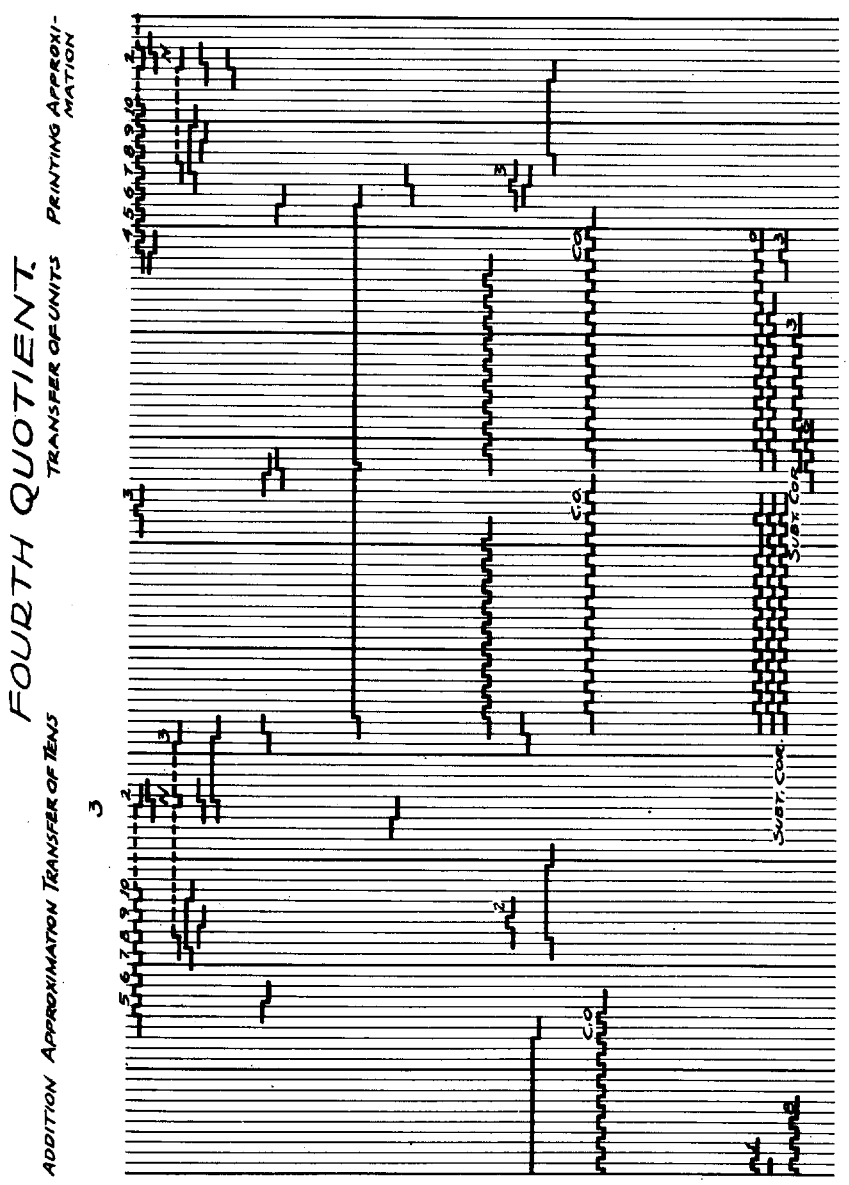
INVENTOR.
WILLIAM HATTON
BY
Robert Harding Jr.
ATTORNEY March 11, 1952
W. HATTON
2,588,923
CALCULATOR
Filed Jan. 16, 1946
106 Sheets-Sheet 101
FIG. D4 (A)
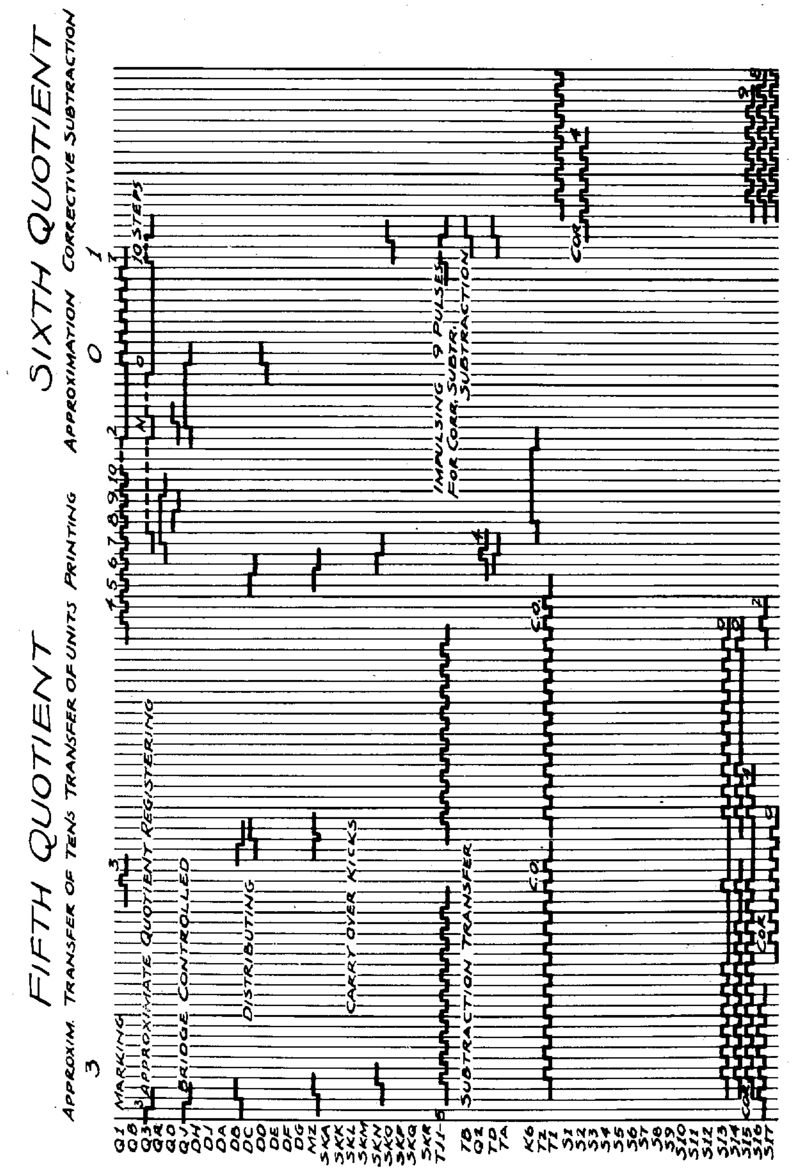
INVENTOR
WILLIAM HATTON
BY
Robert Harding Jr.
ATTORNEY March 11, 1952 W. HATTON 2,588,923
CALCULATOR
Filed Jan. 16, 1946 106 Sheets-Sheet 102
FIG. D4 (B)
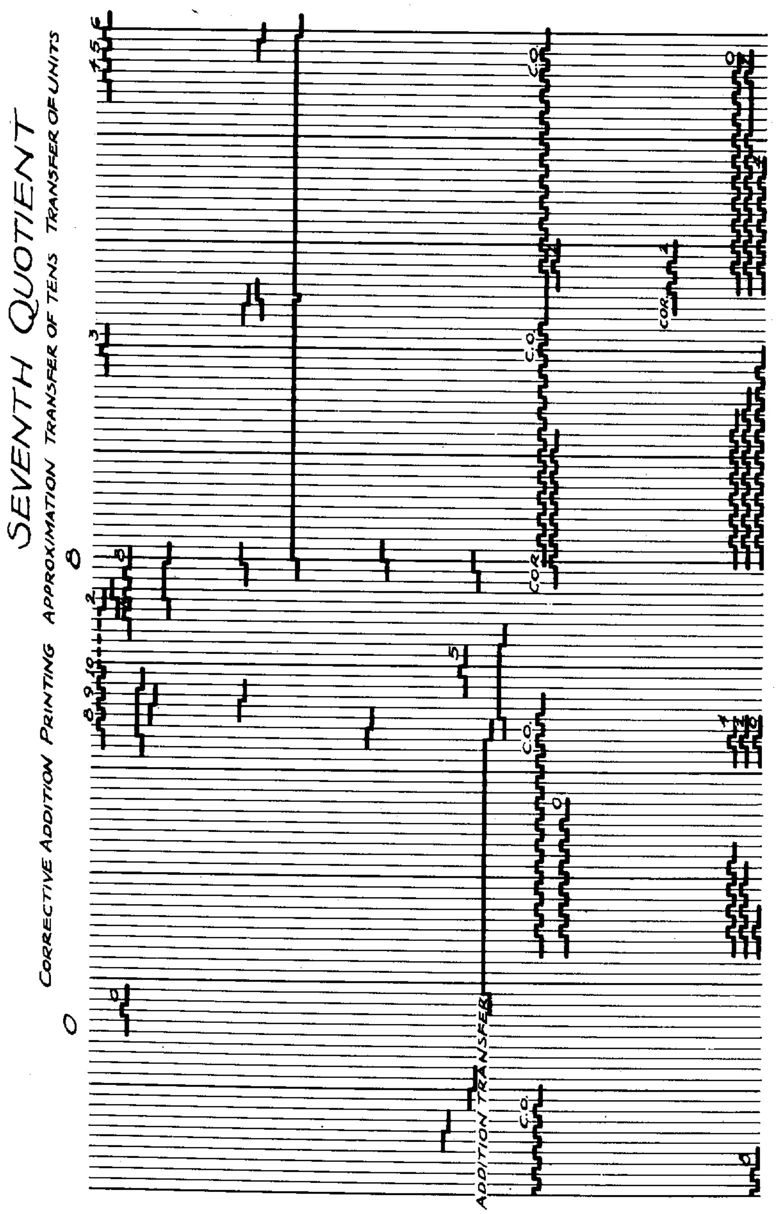
INVENTOR
WILLIAM HATTON
BY
Robert Harding Jr
ATTORNEY March 11, 1952 W. HATTON 2,588,923
CALCULATOR
Filed Jan. 16, 1946 106 Sheets-Sheet 103
FIG. D5 (A)
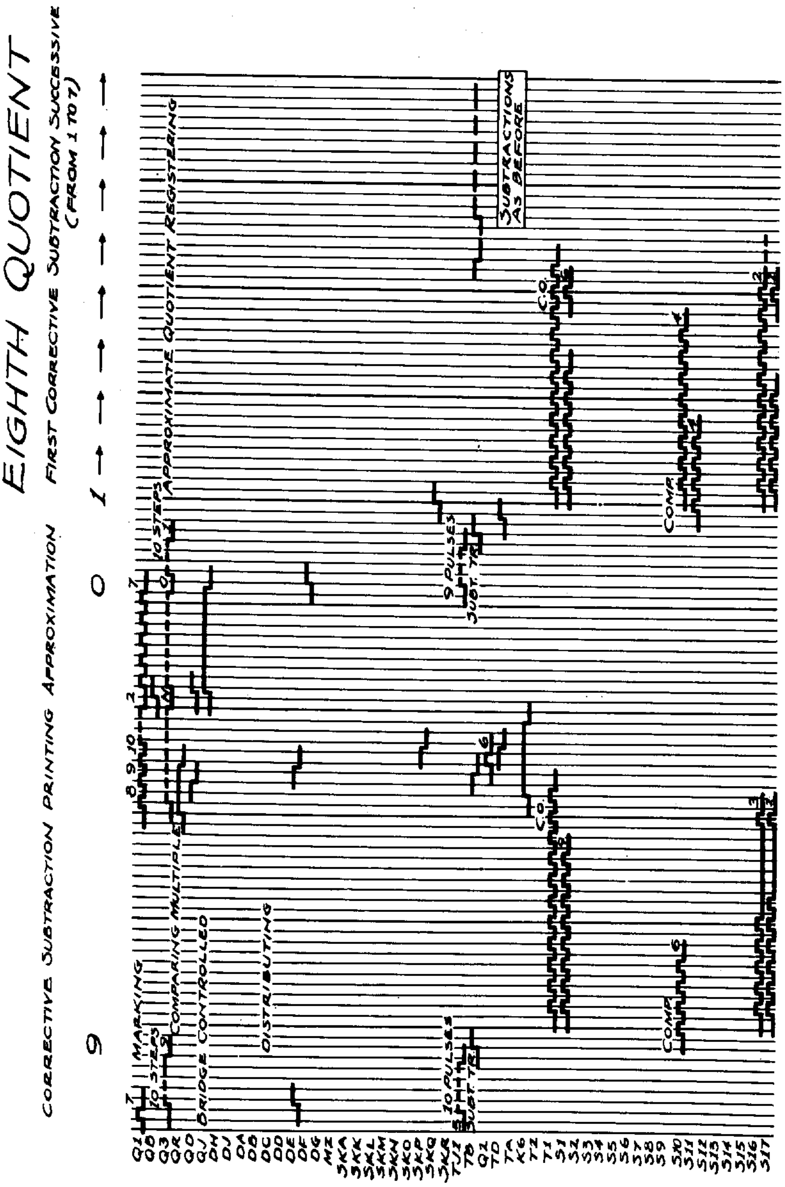
INVENTOR
WILLIAM HATTON
BY Robert Hardin Jr.
ATTORNEY March 11, 1952 W. HATTON 2,588,923
CALCULATOR
Filed Jan. 16, 1946 106 Sheets-Sheet 104
FIG. D5 (B)
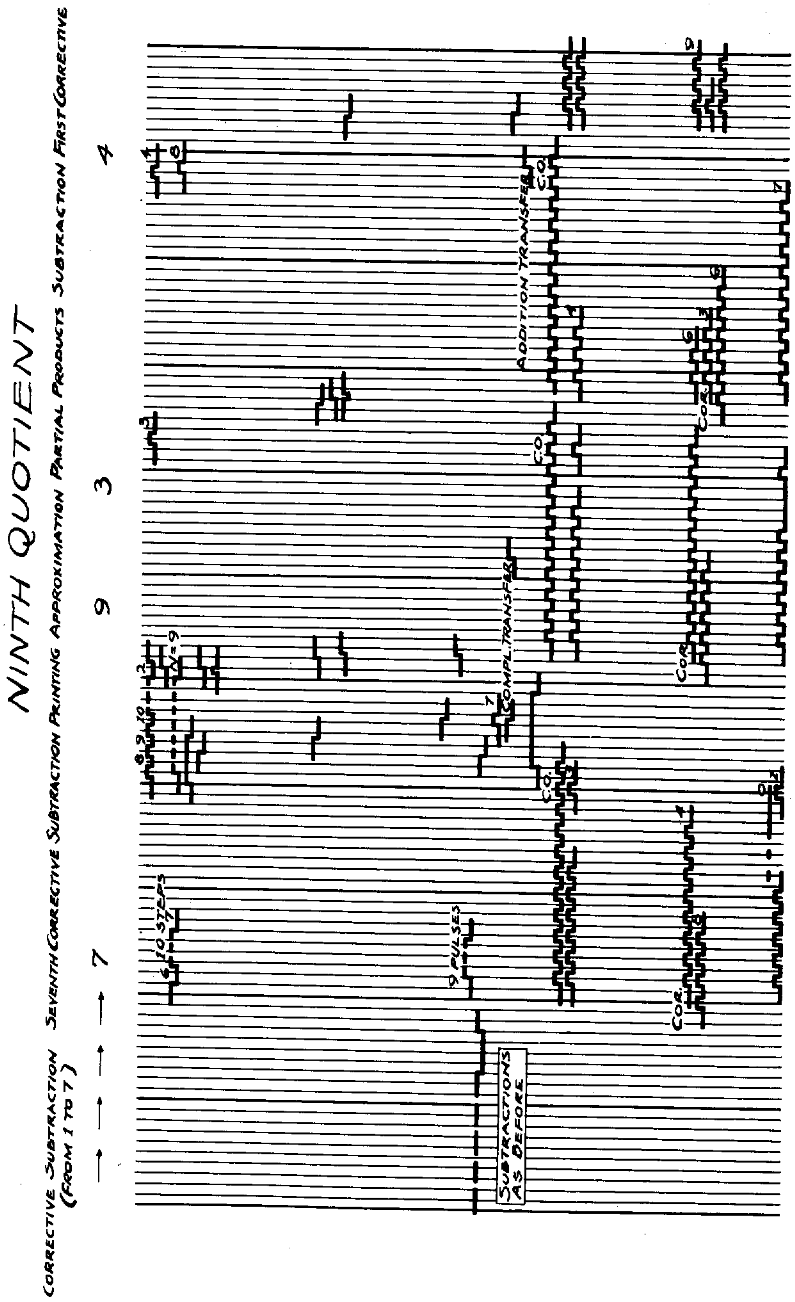
INVENTOR
WILLIAM HATTON
BY Robert Harding Jr.
ATTORNEY March 11, 1952 W. HATTON 2,588,923
CALCULATOR
Filed Jan. 16, 1946 106 Sheets-Sheet 105
FIG. D6 (B)
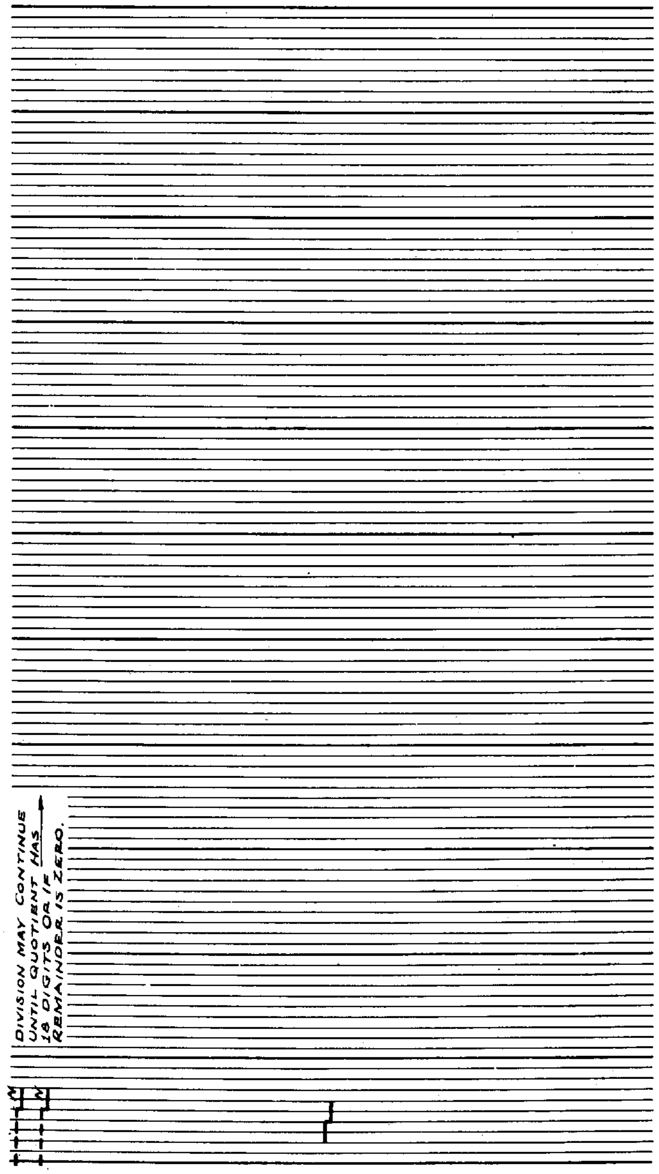
INVENTOR
WILLIAM HATTON
BY
Robert Harding Jr.
ATTORNEY March 11, 1952 W. HATTON 2,588,923
CALCULATOR
Filed Jan. 16, 1946 106 Sheets-Sheet 106
FIG. D6 (A)
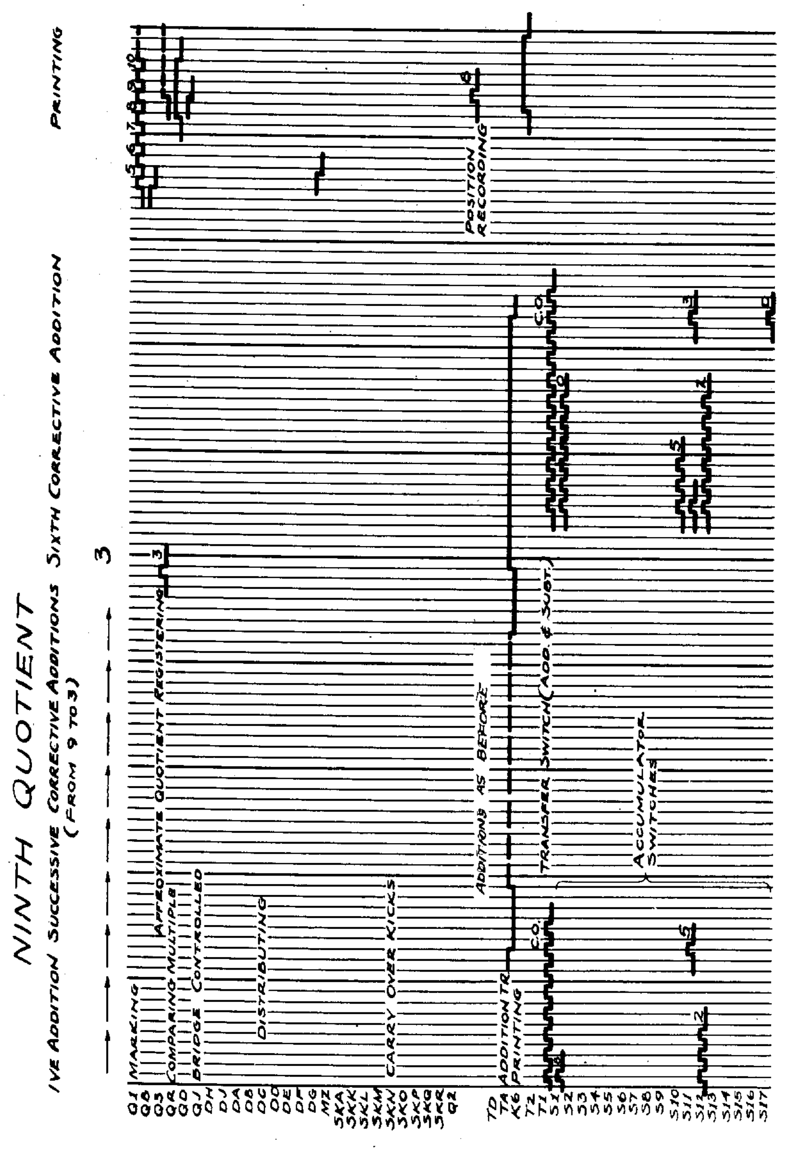
INVENTOR
WILLIAM HATTON
BY Robert Harding Jr.
ATTORNEY Patented Mar. 11, 1952

2,588,923

UNITED STATES PATENT OFFICE 2,588,923

CALCULATOR

William Hatton, South Orange, N. J., assignor to International Standard Electric Corporation, New York, N. Y., a corporation of Delaware Application January 16, 1946, Serial No. 641,436

11 Claims. (Cl. 235—61)

This invention relates to improvements in electrically controlled and operated calculator systems and equipment for performing addition, subtraction, multiplication and division. The present application is a continuation-in-part of my applications Serial Nos. 425,882, filed January 7, 1942; 430,629, filed February 12, 1942, and 439,364, filed April 17, 1942, all abandoned.

The invention relates more particularly to a calculator system which may be used by large concerns such as banks, department stores and insurance companies, which may be equipped, at a central location or exchange and, with a plurality of calculators made available to a large number of operators' units located in separate rooms remote from each other and from the exchange.

Access units are provided, one for each calculator, to which units all of the operators' sets are banked and each operator's unit has line finding equipment associated therewith including one line finder for each calculator. The arrangement is such that when an operator's unit calls for a calculator, the line finders of the calling unit begin searching for the access units of the idle calculators. As soon as an idle access unit is found the latter makes its associated calculator accessible to the calling operator's set, or in other words attaches it to the calling line so that the calculator may receive a problem for computation.

Provision is made to attach a second calculator, if available, to the calling operator's unit for the purpose of checking the result of a problem. The construction is such that each of the paired calculators, or in other words the two calculators attached to the calling unit, mutually check each other's results or output.

Three calculators are shown herein and if a second call arrives while two of the calculators are paired for checking, the third calculator becomes attached to the calling operator's unit.

Provision is made so that, when a third call arrives and all three calculators are busy (two in pair and one single), the last attached calculator of the pair is freed or disconnected and it then becomes attached to the third calling unit. The other calculator of the pair, that is the one first connected to the first operator's unit, continues to operate with the latter.

It is a feature of the invention to give notice to the operator, by a suitable signal, when the results of the paired calculators contradict each other. This signal includes a lamp in the operator's set which is caused to flicker, by suitable means, and thus indicate that the results in the paired calculators differ, or in other words, do not check.

Provision is also made to manually suppress the pairing of the calculators in the event that traffic becomes heavy so that each calculator operates separately.

A feature of the invention relates to means to indicate, preferably by lighting the lamp in the operator's unit, as soon as calculator has been attached to the calling unit which attachment is initiated by the operation of a suitable start key. The lamp goes out as soon as the calculator becomes detached, detachment being effected by the operation of a stop key.

Another feature relates to means to signify to the operator that the attached calculator is clear, after becoming attached, and ready for use, or in other words, ready to receive a problem. This is accomplished by means which causes a suitable printer, forming part of the operator's unit, to print a continuation sign composed of three successive dots (...).

Another feature of the invention relates to equipment including a printer adapted to indicate numerals and signs of a problem as they are submitted to a calculator for computation by printing them on paper and to indicate the solution of the problem by means of a printer which is controlled by the calculator.

Another feature of the invention relates to means to provide punctuation marks such as commas or spaces separating digits of the factors submitted and to automatically indicate the punctuation marks on the paper in the printer.

According to another feature of the invention provision is made by which the digits of a number which is the solution to a problem, are automatically indicated to the operator with the decimal point, if used in the proper place.

Another feature of the invention relates to means whereby an attached calculator becomes detached from the operator's unit if it is held inactive continuously by the operator for a definite period, about 30 seconds. In other words the calculator times out or becomes detached from the line so as to make it available to another calling line.

Each operator's unit includes a sender having keys corresponding to numerals and signs whereby signals may be sent to an attached calculator. The printer which forms part of the operator's set includes means to receive signals from the calculator and to print the digits of numbers and signs on a narrow strip of paper lengthwise thereof, in the order in which they are keyed on the sender and to receive from the calculator signals representing other signs and the solution of a problem.

The equipment is so constructed that an error, such as a wrong digit or digits produced by improper keying of the operator, may be remedied in a simple manner without disturbing the result registered prior to the error. For this purpose there is provided a cancel key which when operated causes the calculator to obliterate or delete the error and causes a suitable cancel sign to be printed on the tape. Subsequent to the cancel operation, the condition in the calculator is precisely the same as immediately before the submission of the error and problem may then be continued.

Provision is also made to make a correction in case an operation sign, such as an addition sign (+) is keyed in error instead of a subtraction sign (−). This is accomplished by subsequently keying the correct sign thereby deleting the condition set up by the key operated in error. In any problem involving addition and subtraction the keyed operation sign is effective upon the factor keyed subsequent thereto.

Subtraction is performed in the calculator of this invention by the process involving an addition operation known as the complementary method of subtraction in which the complement of each digit to the base 9 is added and in which the value of 1 is added in the units denominational position.

Provision is made so that if the subtrahend is greater than the minuend the calculator restores to normal. Means is also provided to indicate to the operator that the calculator has restored to normal, it being understood thereby that the problem must again be submitted.

According to another feature of the invention the equipment comprises a calculator and an operator's station provided with means for sending from said station to said calculator electric signals representing numbers and operation signs; and which calculator is provided with means responsive to signals representing a pair of numbers and one or the other of two particular operation signs for performing a calculation operation, means responsive to said one particular operation sign and a further operating sign for sending the result of the calculation performed and for returning the operated parts to their original conditions, and means responsive to said other particular operation sign and said further operating sign for sending the result of the calculation performed and for retaining one of said numbers as an element of a further calculation to be performed.

According to another feature of the invention, provision of means is made in the calculator, responsive to signals representing a pair of numbers and a combination of operation signs sent in relation to said numbers, for performing a calculation operation, sending the result of the calculation performed and returning the operated parts to their original conditions, and means in said calculator responsive to signals representing a pair of numbers and another combination of operation signs for performing a calculation operation, sending the result of the calculation performed and retaining one of said numbers as an element of a further calculation to be performed.

According to still another feature of the invention, the calculating equipment comprises an electrically controlled calculator which includes a set of storage devices, one for each digit of a number, and a set of accumulating switches, one for each digit of a number, means for receiving and entering into said storage devices a first number being a factor of a problem requiring computation, means for receiving a particular signal indicating the kind of computation required, means for receiving a second number, means for entering into said accumulating switches a third number which is a function of said first and second numbers, means responsive to the receipt of another signal for scrutinizing the conditions of said switches and for sending electrically the values of the digits of said third number, and means for thereafter restoring said accumulating switches to their normal conditions and for retaining said first number in said storage devices.

According to still another feature of the invention the calculating equipment comprises problem-setting means to effect the operation of means for entering into said calculator, by means of electric signals from said problem-setting means, a problem comprising a pair of numbers separated by an operation sign, and means for sending electrically from said calculator the solution of said problem, characterized in this, that said calculator, after the receipt of a particular operation sign, sends electrically the solution of the problem entered, and retains one of said numbers so that a further calculation can be performed thereon.

According to still another feature of the invention, the calculating equipment comprises an electrically-controlled calculator, means in said calculator for computing and sending electrically the solution of a problem submitted electrically thereto, means for retaining a factor of said problem, means for using said retained factor of said problem, and means for using said retained factor for the computation of a further problem.

According to still another feature of the invention, provision is made of a remotely-controlled electric calculator adapted to receive from an operator's station a multiplication problem, comprising a multiplicand and a multiplier separated by an operation sign, and to transmit the calculated solution of said problem to said operator's station, characterized in this, that upon receipt of one particular operation sign the calculator follows said solution by an indication that a new problem may be submitted, whereas upon receipt of another particular operation sign, said calculator retains said multiplicand and follows said solution by an indication that another multiplier may be submitted for application to said multiplicand.

The present invention contemplates direct division and employs a circuit similar to a Wheatstone bridge to expedite obtaining quotients. With this arrangement the first two digits of the divisor are compared in the bridge circuit with the first two digits of the material part of the dividend and an approximate value of the quotient digit is determined. The product of this quotient digit and the divisor is subtracted in one operation, and there remains to be carried out only a check of the accuracy of the operation and a correction if this proves necessary. The process is repeated for each quotient digit extracted.

Suitable means is provided whereby the quotient circuit may make a check to determine whether the remainder of the dividend is less or more than the divisor. For this purpose the first digit of the remainder and that of the divisor are compared. To make this comparison there is provided a chain of nine resistances, the resistance components of which are connected like a potentiometer between ten wires of a group which serve during other calculations to indicate the figures of the solution. For division, suitable relays are operated to switch these wires over to the chain of resistances.

Other features and advantages will hereinafter appear.

Figure 3:
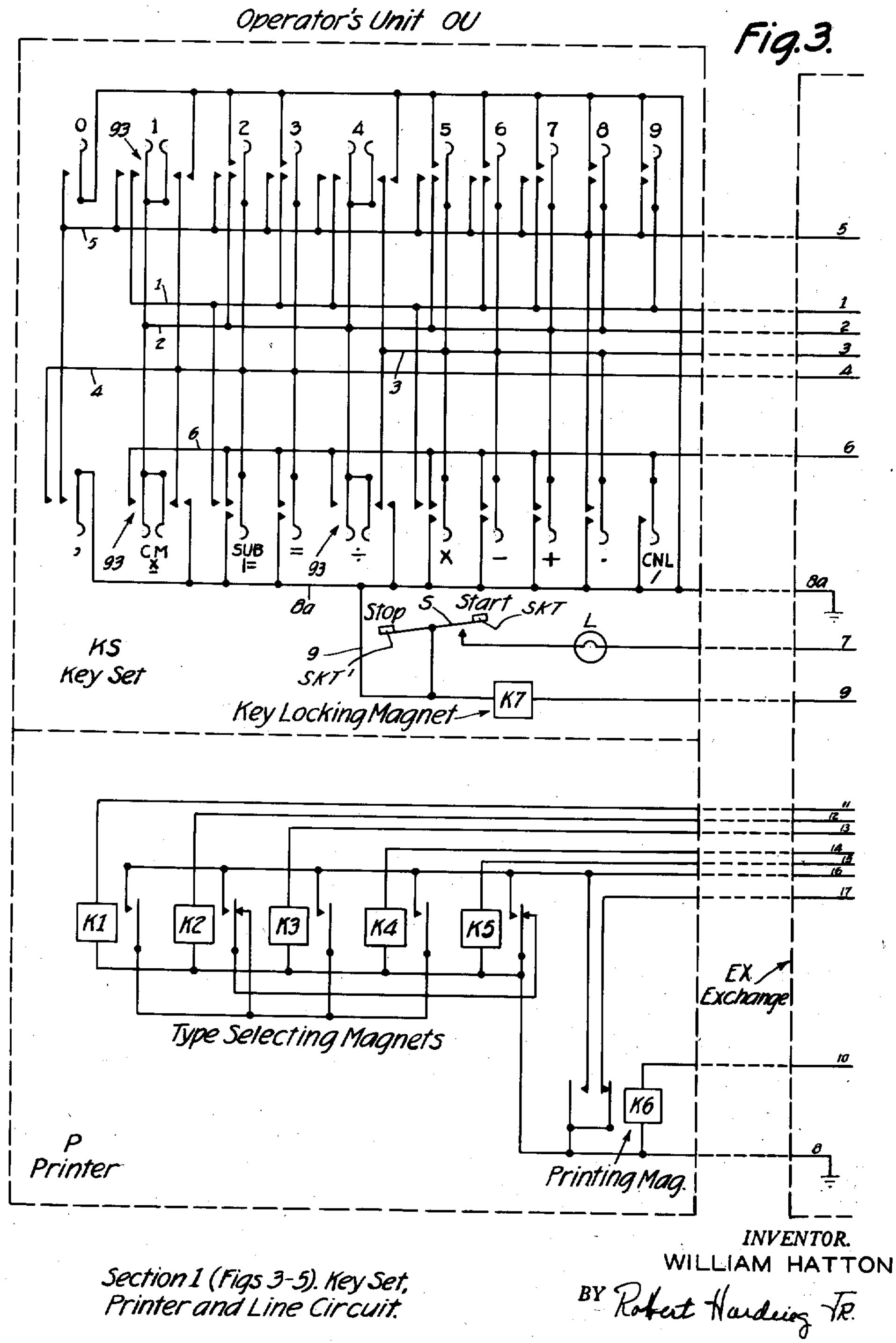
Figure 4:
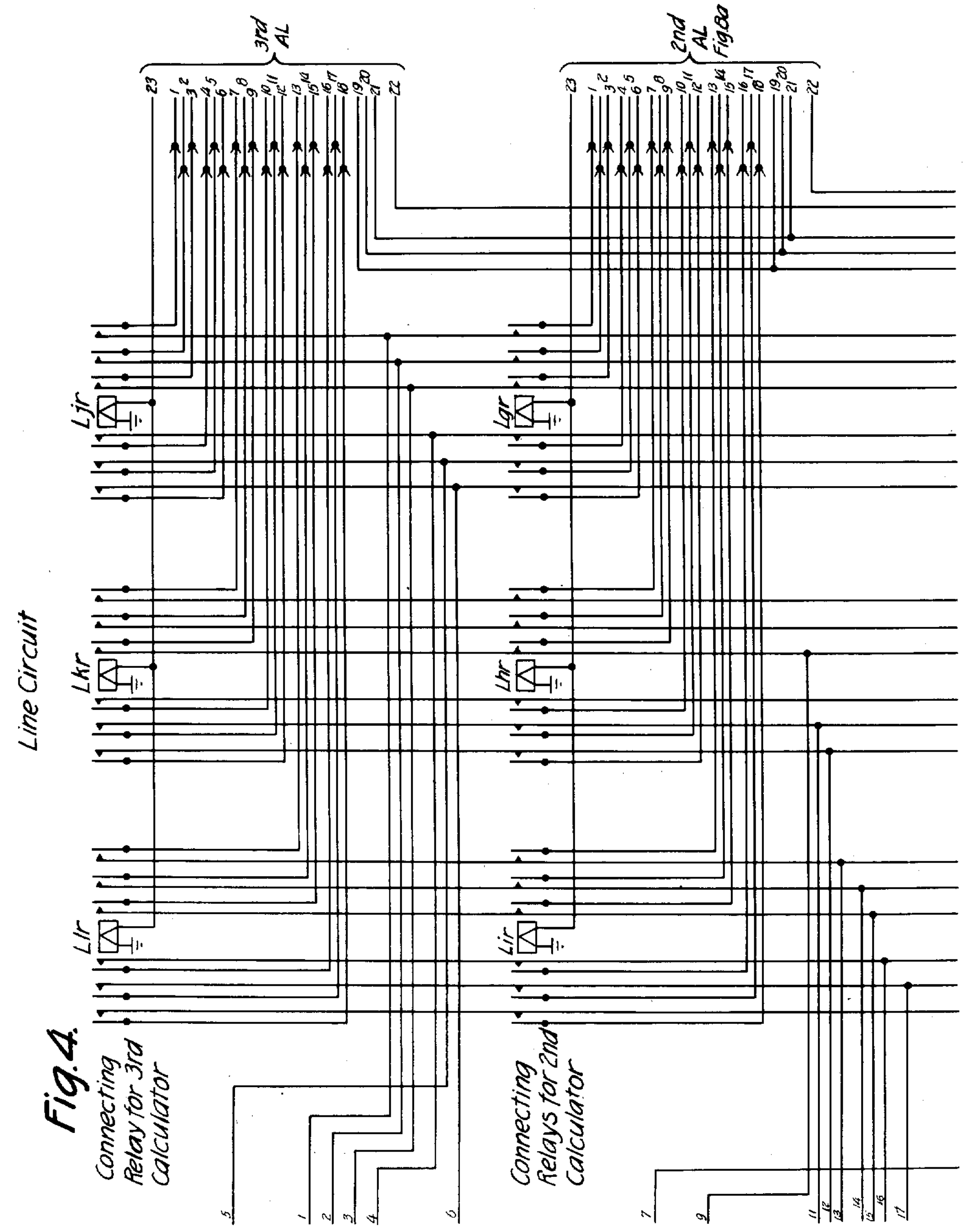
Figure 5:
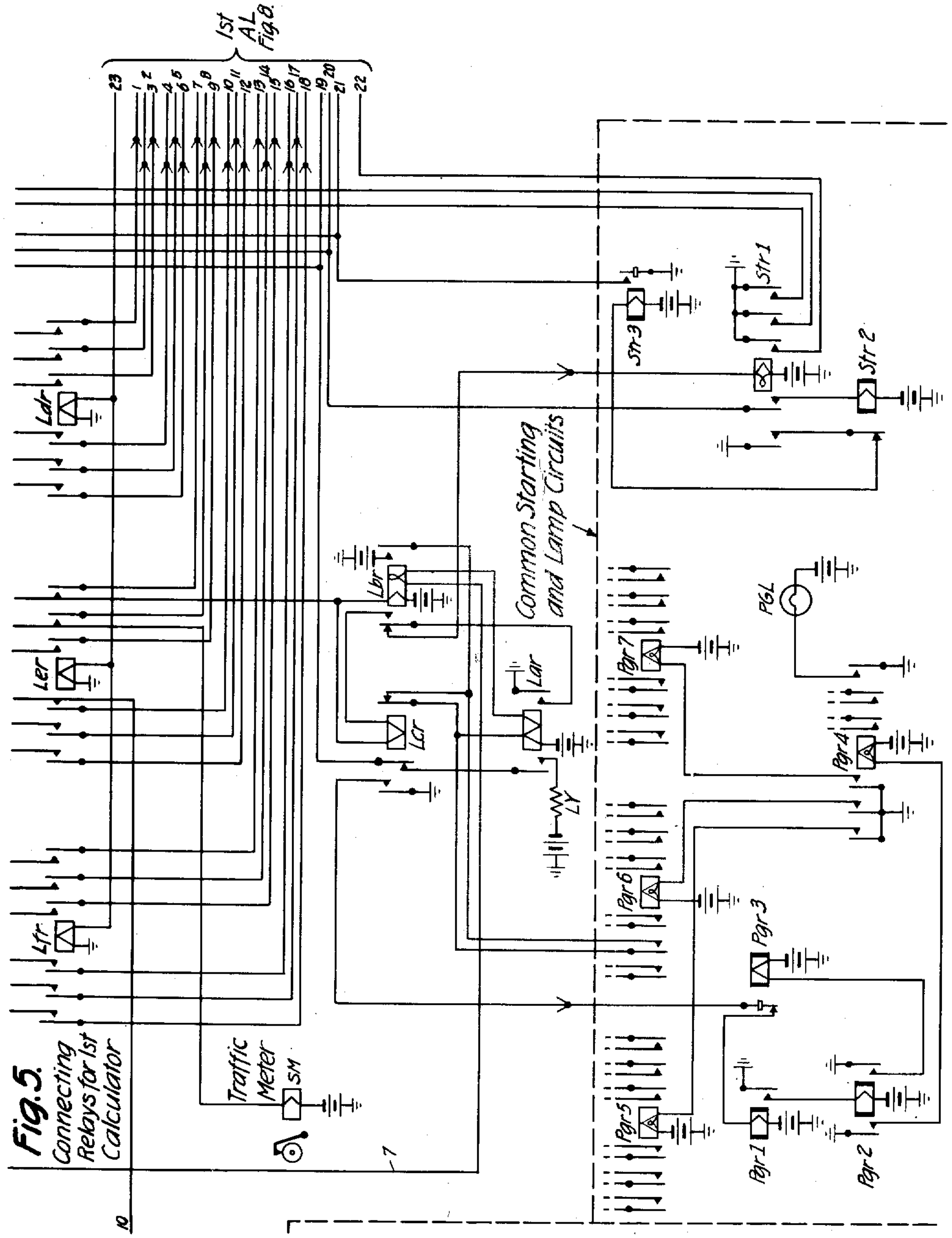
Figure 58:
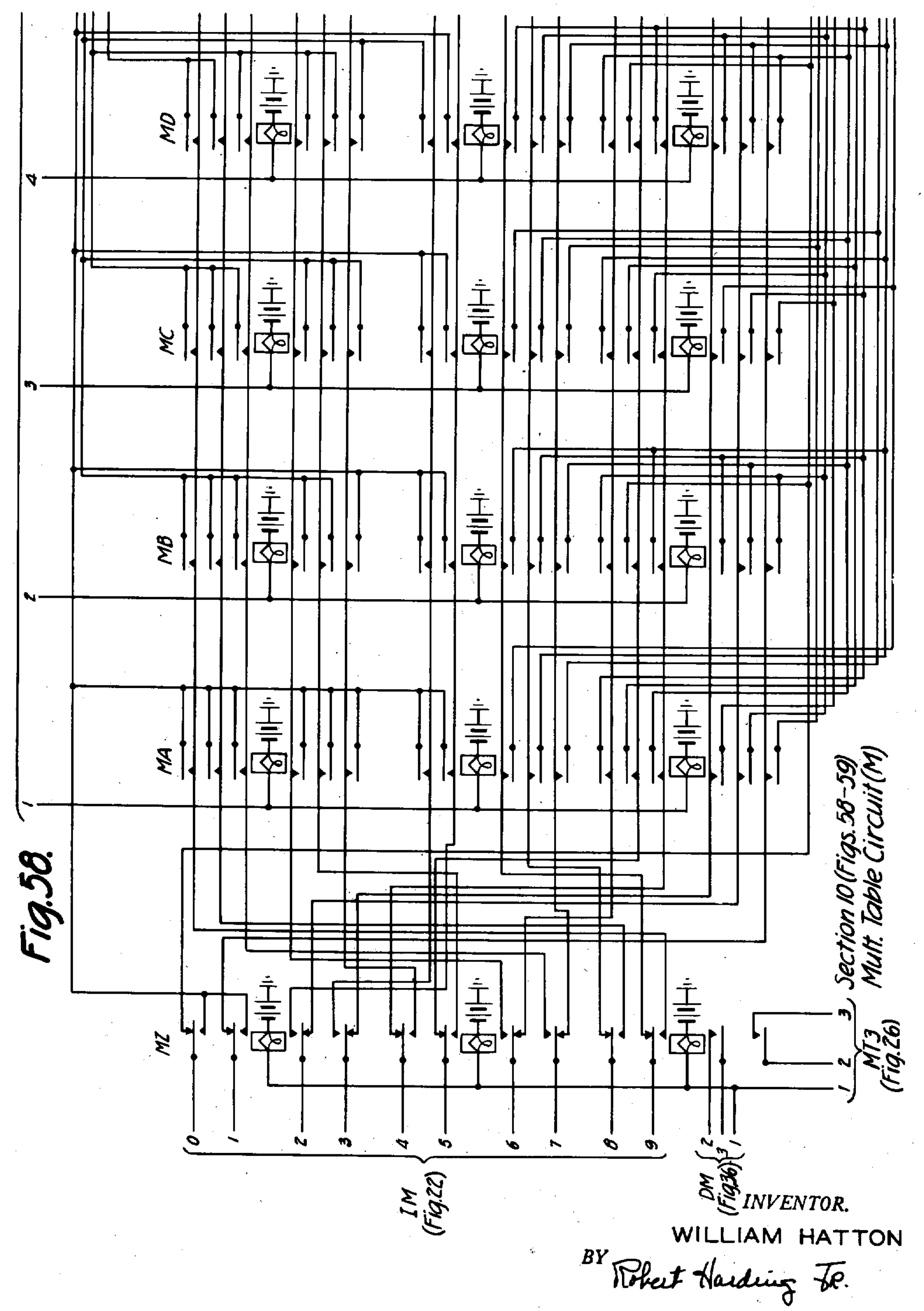
Figure 59:
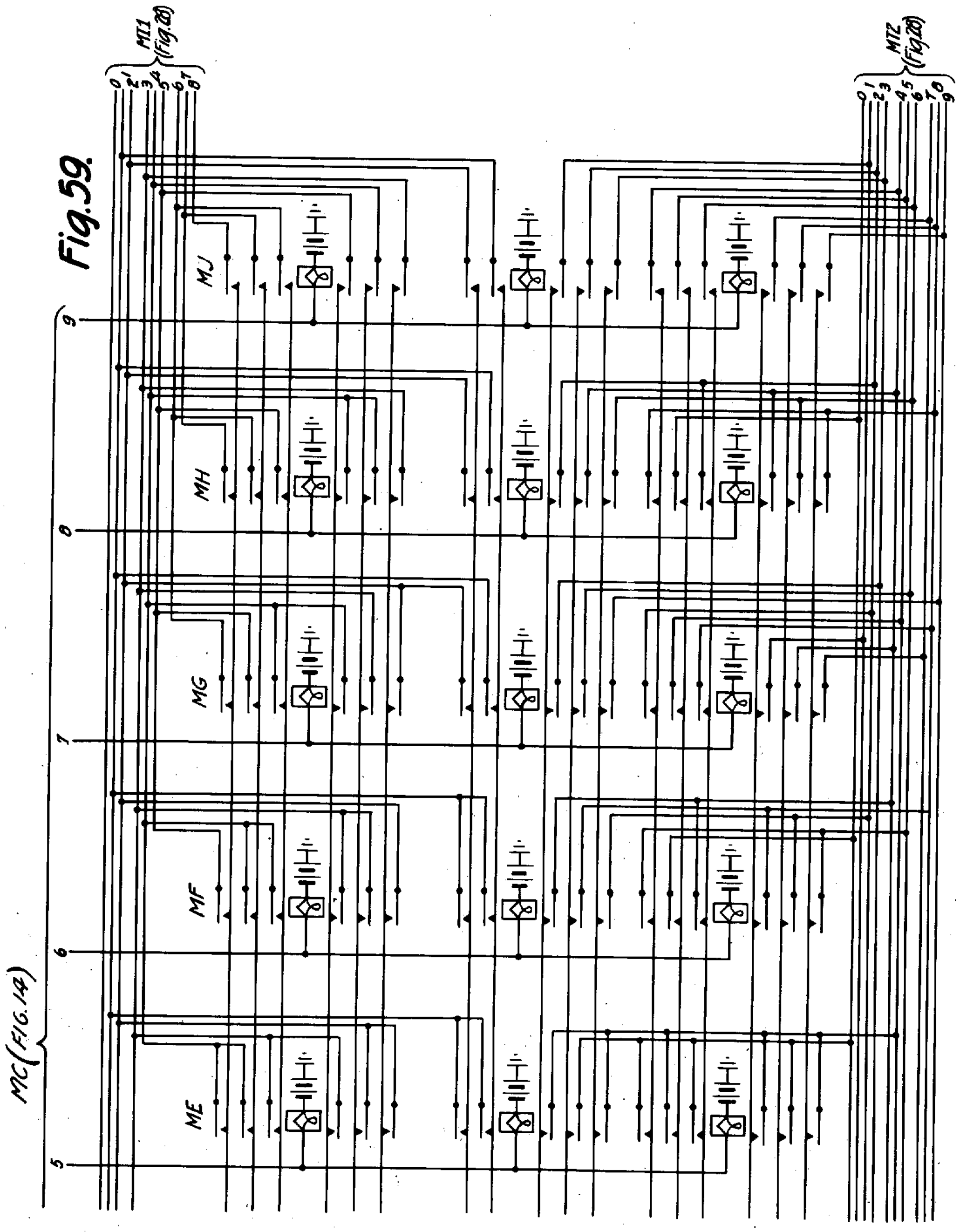
Figures 66, 67:
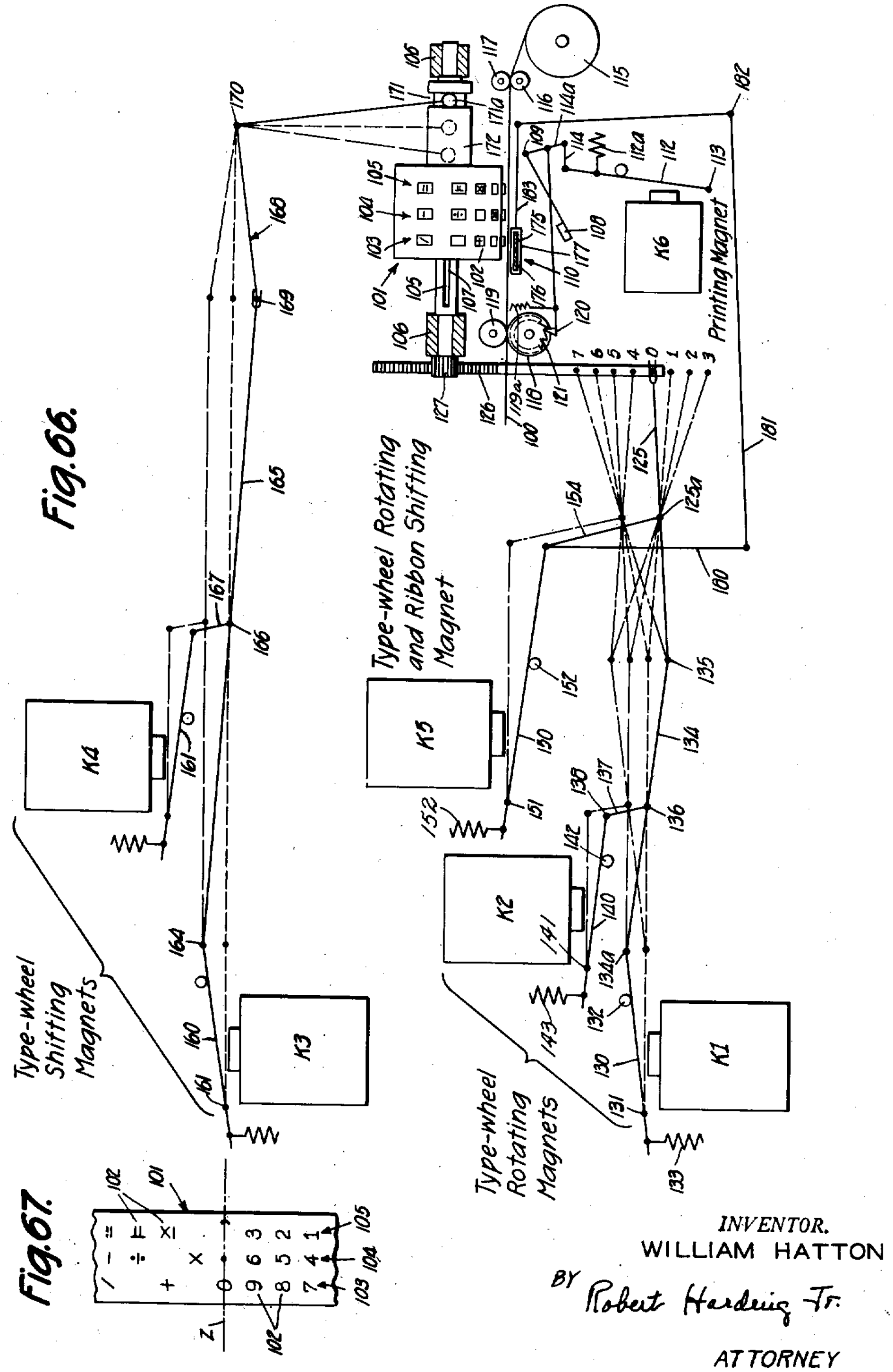
Figures 73, 74, 75:
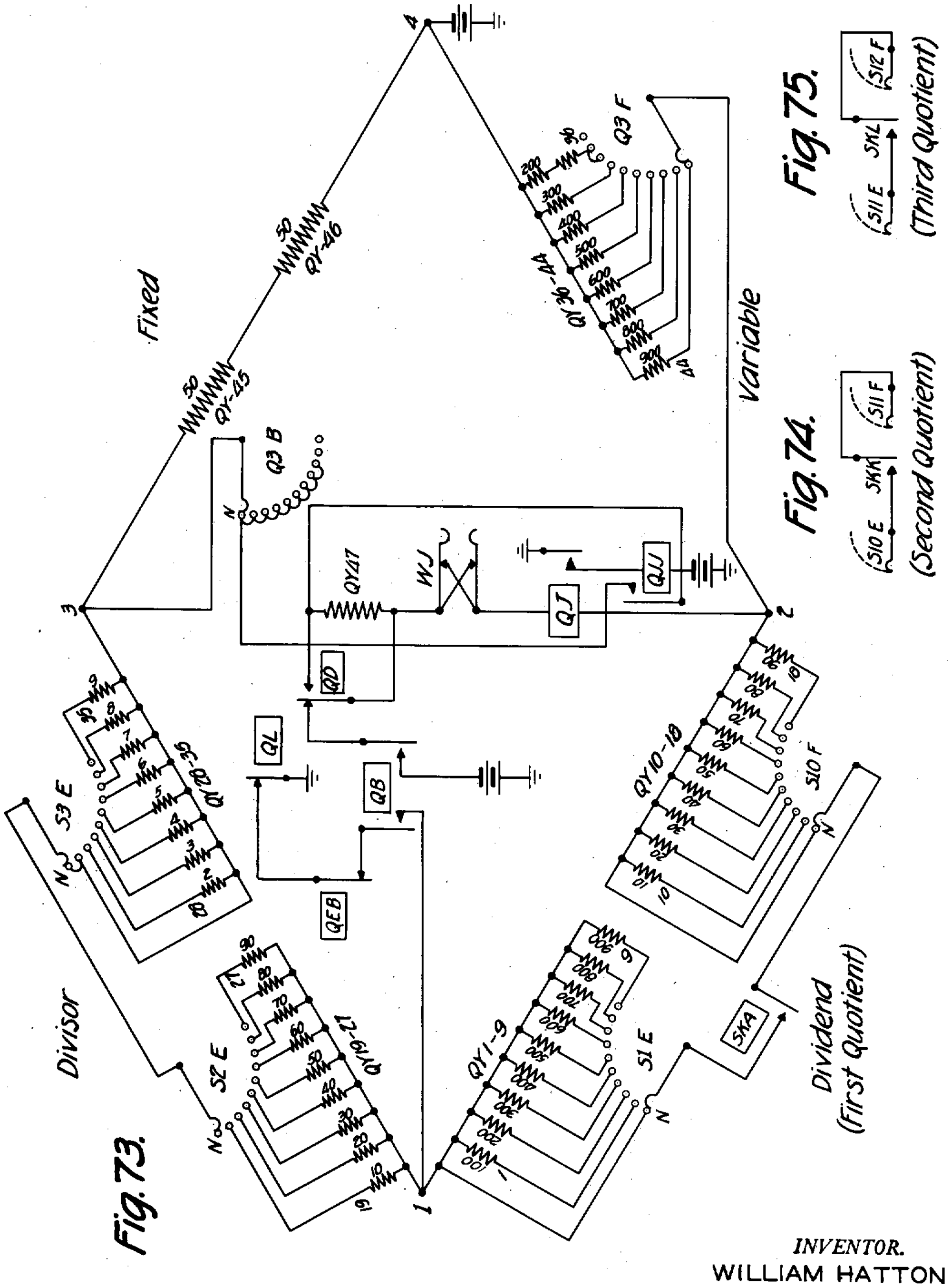
Figure 76:
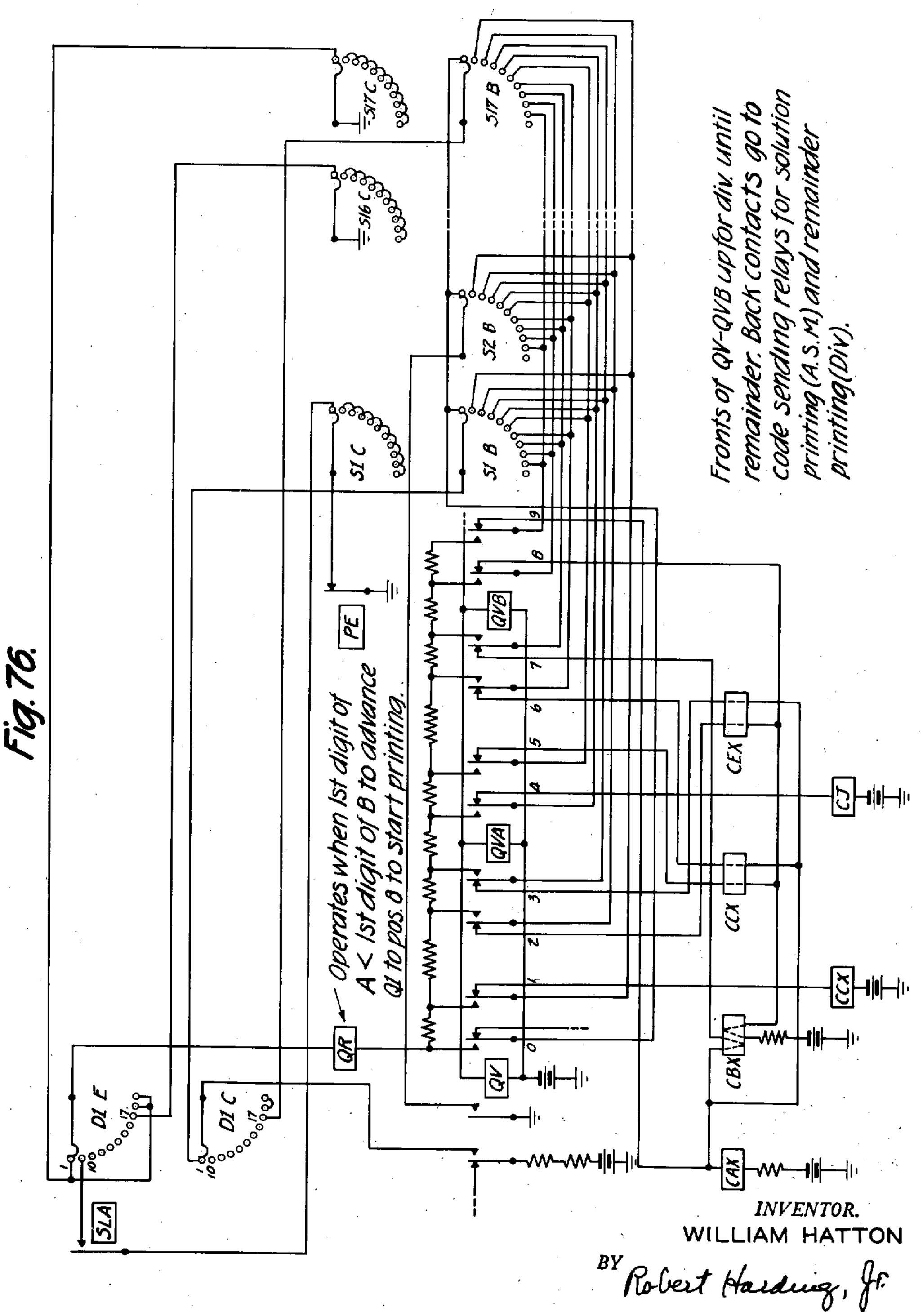

Figs. 3 to 5 form section 1, of the drawings, which shows an operator's unit and associated line circuits. The principal function is to send signals representing numbers and marks to the calculator. The reference characters used in the description of the line circuit include the initial letter L;

Figs. 6 to 9 form section 2, of the drawings, which illustrates an access circuit, the principal function of which is to seize an idle calculator, in other words, to connect it with an operator's station. The principal reference characters used in this section include the initial letter A;

Figs. 6a to 9a form section 2a of the drawings illustrating another access circuit used in the equipment;

Figs. 10 to 17 form section 3 of the drawings showing the code receiving and sending circuit. The principal reference characters used in this section have the initial letter C;

Figs. 18 to 23 form section 4 of the drawings showing the input circuit, the principal function of which is to register or store temporarily and in succession the digital values of the factors of a problem. The principal reference characters used in the section include the initial letter I;

Figs. 24 to 29 form section 5 of the drawings showing the transfer circuit, the principal function being to transfer factors of the problems from the input circuit, where they were stored, to accumulating switches. The principal reference characters used in this section include the initial letter T;

Figs. 30 to 37 form section 6 of the drawings showing the distributor circuit; the principal function being the distribution of the digits of a factor, in accordance with their denominational values, to appropriate accumulating switches. The reference characters used in this section include the initial letter D;

Figs. 38 to 43 form section 7 of the drawings illustrating the carry-over circuit of which the principal function is to effect the carry-over from one denominational position to that of next higher order. The reference characters used in this section include the initial letter S;

Figs. 44 to 49 form section 8 of the drawings showing the solution storing circuit by which the solutions of problems are obtained by a process of successive aggregation upon accumulating switches. The principal reference characters used in this section also include the initial letter S;

Figs. 50 to 57 form section 9 of the drawings showing the decimal point circuit. The principal function of this circuit is the ascertaining of the denominational values of the digits of the factors included in the problem submitted to the calculator. The reference characters used in this section include the initial letter P;

Figs. 58 and 59 form section 10 of the drawings showing the multiplication table circuit, the principal function of which is to indicate the partial products of a selected digital value and all other digital values. The principal reference characters used in this section of the circuit have the initial letter M;

Figs. 60 to 65 form section 11 of the drawings showing the quotient circuit which is concerned primarily with the extraction of quotients in division problems. The principal reference characters used in this section include the initial letter Q;

Fig. 66 is a diagrammatic illustration of the printer mechanism;

Fig. 67 is a developed view of a portion of the type wheel or shuttle showing the arrangement of types thereon;

Fig. 68 shows a table of the code signals representing digits and operation signs which are sent from the operator's unit to the calculator;

Fig. 69 shows a table indicating the type selecting magnets operated by code signals sent from the calculator. It also shows when the printing magnet and the key locking magnet operate;

Fig. 70 is a diagrammatic view of the key locking means;

Fig. 71 is a diagrammatic view illustrating computations of a typical problem involving addition and subtraction;

Fig. 72 is a similar view of a problem involving multiplication;

Fig. 73 is a view of the Wheatstone bridge circuit used in division;

Fig. 74 is a circuit diagram of some of the accumulator switches set for the second quotient;

Fig. 75 is a view similar to Fig. 74 showing other accumulator switches set for the third quotient;

Fig. 76 is a circuit diagram of the potentiometer circuit to determine whether the dividend A< or >B, the divisor, after division, addition or subtraction following multiplication by trial quotient; and Fig. 77 is a chart showing the digit storage relays in each vertical row and of which one or more may be operated, as indicated at the left of the chart, to store digital values from 0 to 9.

Figure 78:
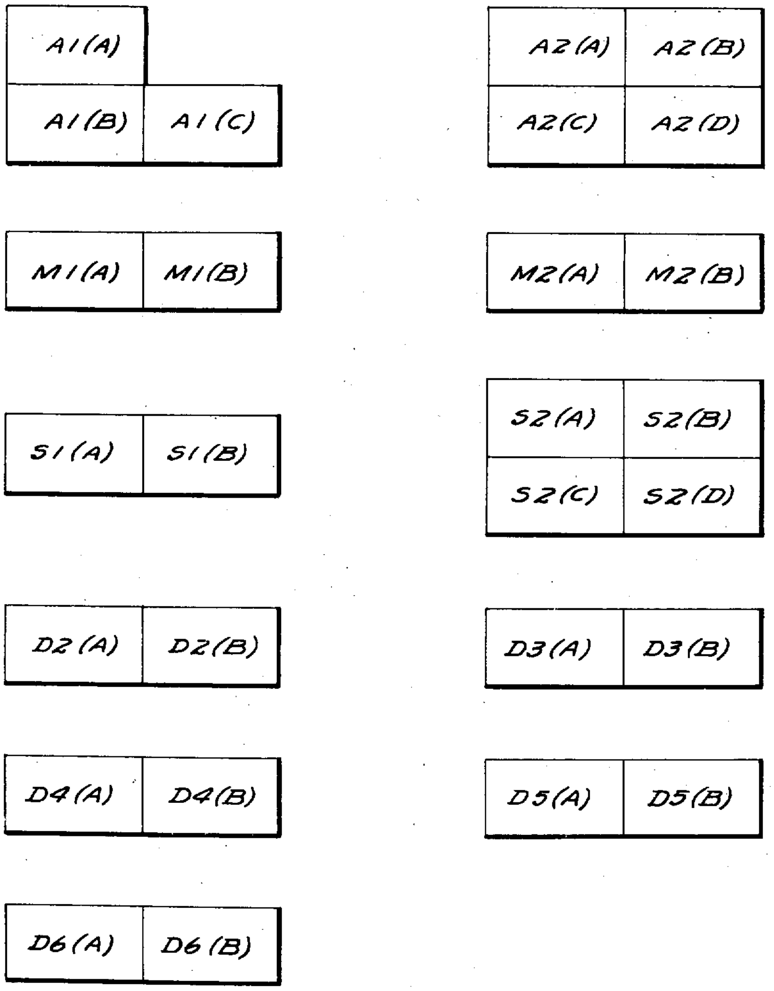
Figure 51:
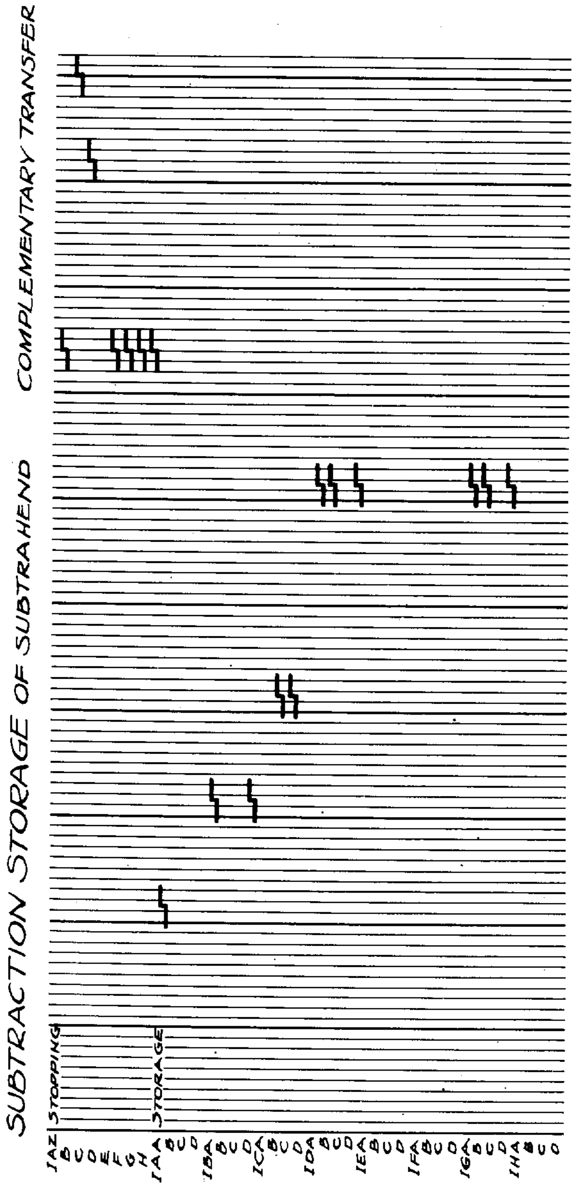

Figs. A1(A), A1(B) and A1(C) constitute a single timing chart showing the timed relations of the operations of the various relay covering a process of selection;

Figs. A2(A), A2(B), A2(C) and A2(D) constitute a single timing chart showing the timed relations of the operations of the various relays covering a process of addition;

Figs. M1(A) and M1(B) constitute a single timing chart showing the timed relations of the operations of the various relays covering a portion of a process of multiplication;

Figs. M2(A) and M2(B) constitute a single timing chart showing the timed relations of the operations of the various relays covering another portion of a process of multiplication;

Fig. 78 is a key figure showing how Figs. A1(A)–D6(B) should be assembled in groups to form the several timing charts illustrating the operation of the invention.

Figs. S1(A) and S1(B) constitute a single timing chart showing the timed relations of the operations of the various relays covering a portion of a process of subtraction;

Figs. S2(A), S2(B), S2(C) and S2(D) constitute a single timing chart showing the timed relations of the operations of the various relays covering another portion of a process of subtraction;

Fig. D1 is a timing chart showing the timed relations of the operations of the various storage relays covering a portion of a process of division;

Figs. D2(A) and D2(B) constitute a single timing chart showing the timed relations of the operations of the various dividend, divisor and quotient relays covering first and second quotients of a process of division;

Figs. D3(A) and D3(B) constitute a single timing chart showing the timed relations of the operations of the quotient relays covering the third and fourth quotients of a process of division;

Figs. D4(A) and D4(B) constitute a single timing chart showing the timed relations of the operations of the quotient relays covering the fifth, sixth and seventh quotients of a process of division;

Figs. D5(A) and D5(B) constitute a single timing chart showing the timed relations of the operations of the various quotient relays covering the eighth and a portion of the ninth quotients of a process of division;

Figs. D6(A) and D6(B) constitute a single timing chart showing the timed relations of the operations of the various quotient relays covering the balance of the ninth quotient of a process of division;

With reference to the drawings, Figs. A1A . . . Fig. D6B, when arranged as indicated in Fig. 78, enable a proper understanding of the several timing charts when read in conjunction with this specification.

GENERAL DESCRIPTION

Figure 2:
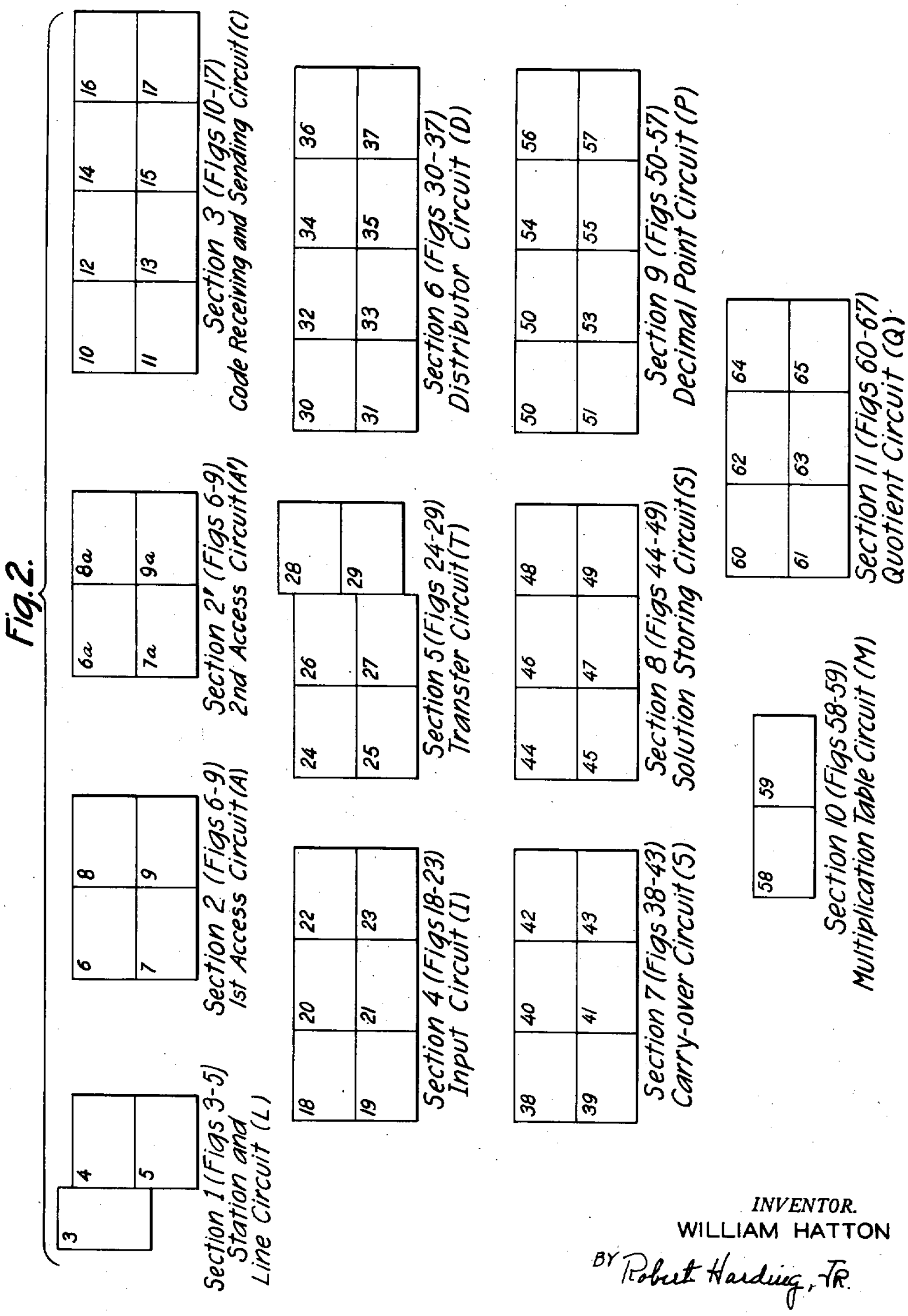
Fig. 2 is a key diagram showing how Figs. 3 to 67 may be assembled in groups to form various sections for convenience in reading the drawings.

To facilitate reading of the drawings, the various views illustrating the circuits may be assembled into eleven sections as indicated in the key diagram (Fig. 2) where the various views composing each section are represented by grouped rectangles or blocks, each rectangle bearing in its upper left corner the number of the figure which it represents.

Groups of interconnecting wires between the various drawing or circuit sections are embraced by a bracket bearing the principal reference characters of its section and the section in which they are continued. The wires are numbered alike in both sections. For example, in Fig. 9 a group of wires 19, 8, 21 and 7 are shown embraced by a bracket designated AC (Fig. 10) of the circuit section showing the access circuit A. This indicates that the wires of group AC of the access circuit section A (Fig. 9) connect with the wires of the group designated AC in Fig. 10 of the code receiving section C.

The equipment may include a plurality of operators' units OU (Figs. 1 and 3), approximately twenty, which are located remotely from each other. Each operator's unit has associated therewith a line finder *Li* by which it may become attached to or connected with one or two of three calculators marked *Ca*1, *Ca*2 or *Ca*3 for convenience. Each calculator may be housed in a separate compartment, and all of the calculators and the line finders may be placed in compact arrangement in an exchange *Ex* which may be remote from all of the operators' units, the only physical connection between each operator's unit and the apparatus in the exchange being a cable including conductor wires.

Each apparatus consists principally of relays, step-by-step switches and resistances such as are extensively used in telephone exchange systems. The source of power to operate these is D. C. battery having one pole grounded.

Each operator's unit OU (Fig. 1) includes a code sender having a key set KS and a code receiver or printer P. The key set KS includes ten character keys (Fig. 3) designated 0 to 9, respectively, for transmitting code signals, corresponding to digits, to a calculator *Ca*. It also includes ten other character keys as follows:

Four keys designated +, −, × and ÷, for performing addition, subtraction, multiplication and division, respectively, a decimal point key (.), an equals key =, a sub-total key

SUB
⊧ a constant multiplicand key

CM
× a comma key (,) and a cancel key

CNL
/

The comma key is ordinarily used for punctuation; it may also be used for extracting digits of that part of a quotient following the decimal point.

All of the characters as indicated above and in the vertical column at the left of Fig. 68, when printed, appear as indicated in the same position of the first vertical column in Fig. 69.

The key set or sender KS is further provided with a start key SKT and a stop key SKT' for respectively connecting it with or disconnecting it from one or two of three calculators *Ca*1, *Ca*2 and *Ca*3. By the depression of the start key SKT, the associated operator's unit becomes automatically attached to one or two calculators and such attachment is indicated by a signal lamp, L Fig. 3. This attachment or seizure is effected principally through the medium of the access equipment A (Fig. 1) illustrated in detail in Figs. 6–9.

To indicate that the calculator is clear after seizure, or in other words, ready to receive a problem, the printer P (Fig. 3) is caused to print a clear or continuation sign, herein illustrated as three dots (. . .), on a suitable tape of paper. This is effected principally by magnets CLL, CAX, CBX, and CEX (Fig. 12) which send appropriate signals to the printer where they operate various ones of magnets K1–K5 (Fig. 3) to selectively position a type wheel. A magnet K6 is subsequently operated to effect the printing of the selected type.

After at least one of the calculators has become attached to the active operator's unit and the clear sign (. . .) has been printed on the tape 100 of the printer P (Fig. 66), a specific problem may be presented. The operations involved in the calculation of a problem may include addition and subtraction, and the recording of the problem and also its solution, in accordance with the invention, and will now be described.

It is assumed that two calculators have been attached; that the solution of 1,280+59—935.1 is required; and that the sub-total at the stage 1,280+59 is also required.

The operator keys successively on his key set KS (Fig. 3), the digits of the first factor 1,280 duly punctuated with a comma sign between the digits 1 and 2 by manipulation of the comma key on the key set. This factor is followed by the operation of the plus key on the key set. The signals representing the characters keyed are received in the two attached calculators, one character at a time, and each causes the selection and operation of several of the six code receiving relays CA, CB, CC, CE, CF and CG (Fig. 10) in combination, according to the predetermined code (Fig. 68).

Figure 15:
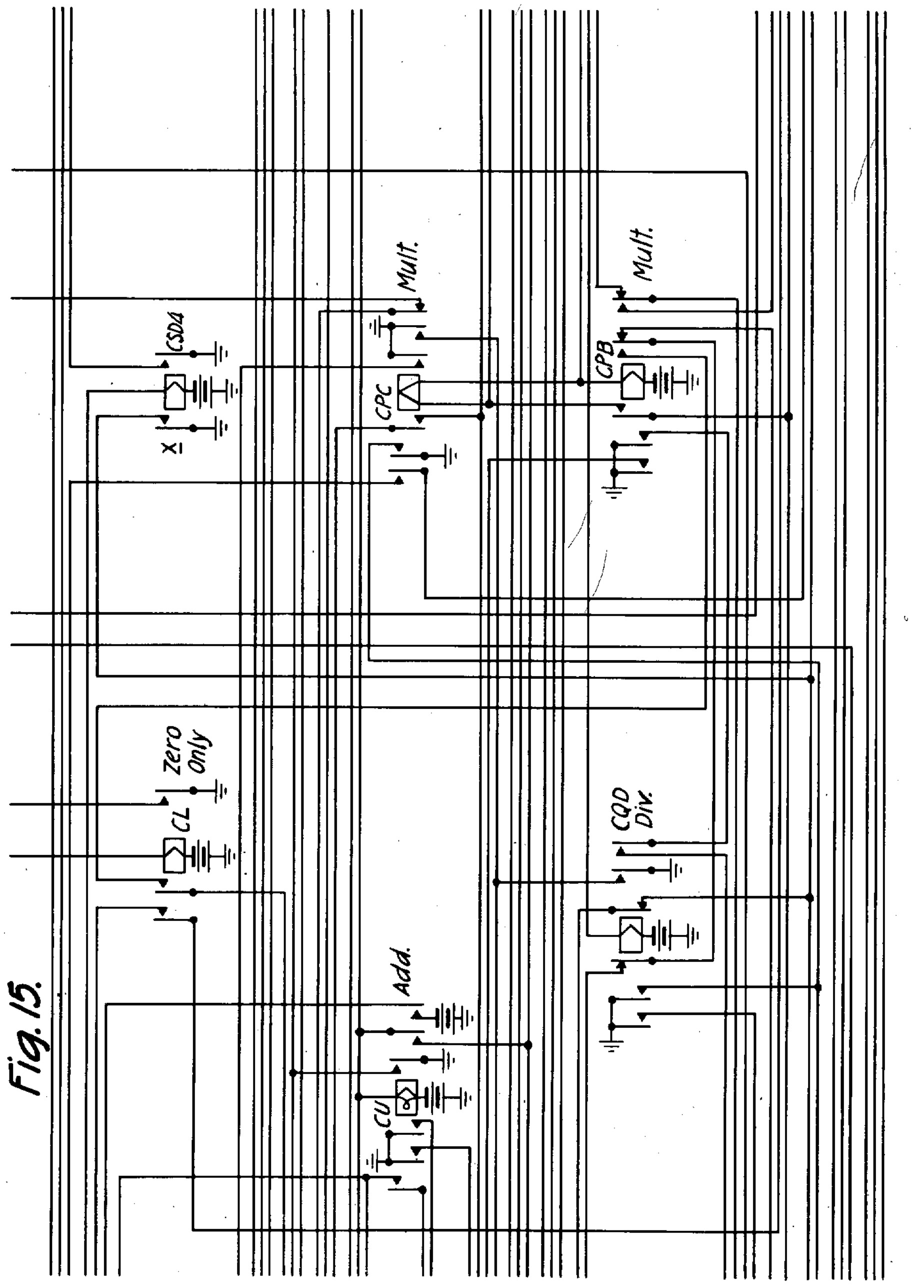

As each digit is received, the operated ones of code receiving relays CA–CE pass on a record, still in code, of its value, to certain ones of digit storage relays IAA–IHD (Figs. 18–23) in the input circuit through the medium of switch I1. The value of the first digit is registered and stored by the operation of one or more of the four relays IAA–IAD (Figs. 18 and 19) in the first vertical row from the left; the second digit being stored by relays IBA–IBD (Figs. 20 and 21) in the first vertical row from the left; the third digit being stored by relays (Figs. 18–21) ICA–ICD (Figs. 20 and 21) in the second vertical row from the left and so on; and wipers I1C, I1D, I1E and I1F of switch I1 (Figs. 18 and 19) advancing one step after each digital value has been registered. In the case of the comma sign being submitted, no storing takes place. When the signal representing + is received, the operated code receiving relays decode it and cause the operation of the addition-relay CU (Fig. 15). Concurrently, with these operations, the calculator causes printer P (Fig. 3) to print, in succession, the characters corresponding to all the signals received by it. Thus, the paper strip in the printer at this stage has thereon the printed record "...1,280+" and the factor 1,280 is stored on the 1st–4th rows of the storage relays.

The signal + serves to indicate that the first factor of the problem is complete and, in the absence of a decimal point in this number, determines the denominational positions of the digits composing it. Meanwhile, the wipers of switch D1 (Fig. 36) advance by one step for every digit received on the digit storing relays IAA–IDD until such time as the position of the decimal point is determined. The signal +, having indicated that the first factor of the problem is terminated, as previously stated, this switch D1 registers, by the position in which its wipers are standing, that there are four digits in this number before the decimal point, thus effecting suitable routing connections in a manner and for a purpose hereinafter explained.

As a consequence of the operation of the + key and the resultant operation of the addition relay CU (Fig. 15), the digital values stored in the input circuit (Figs. 18–23) are transferred to certain ones of accumulating switches S1–S17 (Figs. 44–49) in the solution circuit S. Of these seventeen accumulating switches, switch S1 (Figs. 44 and 45) is used for digital values of highest denominational order and switch S17 (Figs. 48 and 49) for digital values of lowest denominational order. Moreover, in problems involving addition and subtraction, the switch S9 (Figs. 46 and 47) is arbitrarily selected to accumulate digits of units denominational order. Thus, there being four digits before the decimal point in the number 1,280 to be transferred, it is necessary to transfer the digital value 1, stored on relay set IAA–IAD (Figs. 18 and 19) to switch S6 (Fig. 46); value 2, on set IBA–IBD, to S7; and value 8, on set ICA–IDA, to S8 so that the value of the units digit 0, stored on set IDA–IDD, may be duly transferred to the units accumulator switch S9. The four remaining rows or sets of storage relays IEA–IHD; not having been operated, are, in fact, registering the digital values 0.

The appropriate routing connections above referred to are effected between the eight storage relay sets IAA–IAD, IBA–IBD, etc. to IHD and eight of the seventeen accumulating switches SI–S17 by the operation of relay set DE (Fig. 32), selected from the nine sets of routing relay sets DA–DJ by wiper B of the switch D1. This relay set DE connects the eight switch magnets S6–S13 to eight impulse-generating contacts of TJ1–TJ5 in the transfer circuit (Figs. 24–29). Each of these generates nine ground impulses, and each of the connections to the eight switch magnets is opened, under the control of the associated storage relay set, when the switch concerned has made a number of steps corresponding to the digital value stored in that set. Thus, switch S6 makes one step, S7 two steps and S8 eight steps. The remaining fourteen accumulating switches not having left their normal positions, the aggregate registered at this stage (II, Fig. 71) is 000,001,280.00000000 which is the equivalent of 1,280.

During the transfer operations initiated by the receipt of the signal + in the calculators and the operation of the addition relay CU (Fig. 13), the keys of the operator's unit OU are locked by suitable means (Fig. 70) operable by magnet K1 (Fig. 3), and the wipers of the counting switch D1 and distributing switch I1 return to their normal positions. As soon as these operations are completed, the operated storage and routing relays are released and the keys are unlocked or freed. It will be understood that all these operations may take place very rapidly and that their duration may be such that the operator is not noticeably hindered by, if he is at all aware of, the locking of the keys, in the operator's unit, which is merely a safeguard against excessively rapid keying. The locking of the keys is effected also whenever the calculator is not clear, or in other words, unprepared to receive signals from the key set.

The operator, in continuing the submission of the problem, next keys the second factor 59, digit-by-digit, and then requests the sub-total by keying the sign

SUB
|= as hereinafter described.

In the event that the operator keys a wrong digit or digits a cancel key

CNL
/

(Fig. 3) may be operated whereupon the calculator releases the operated storage relays which are now storing the second factor, thus deleting the erroneous record in the calculator of the digit or digits keyed after the last operation sign +, and causing the cancel character / (Fig. 66) to be printed on the tape. The calculator then awaits further signals. Subsequently, the situation in the calculator is then precisely as though no signals had been received at all since the last operation sign was sent. It is supposed, however, that the operator correctly keyed the second factor 59 and then the sign

SUB
⊧ for the sub-total.

Figure 16:
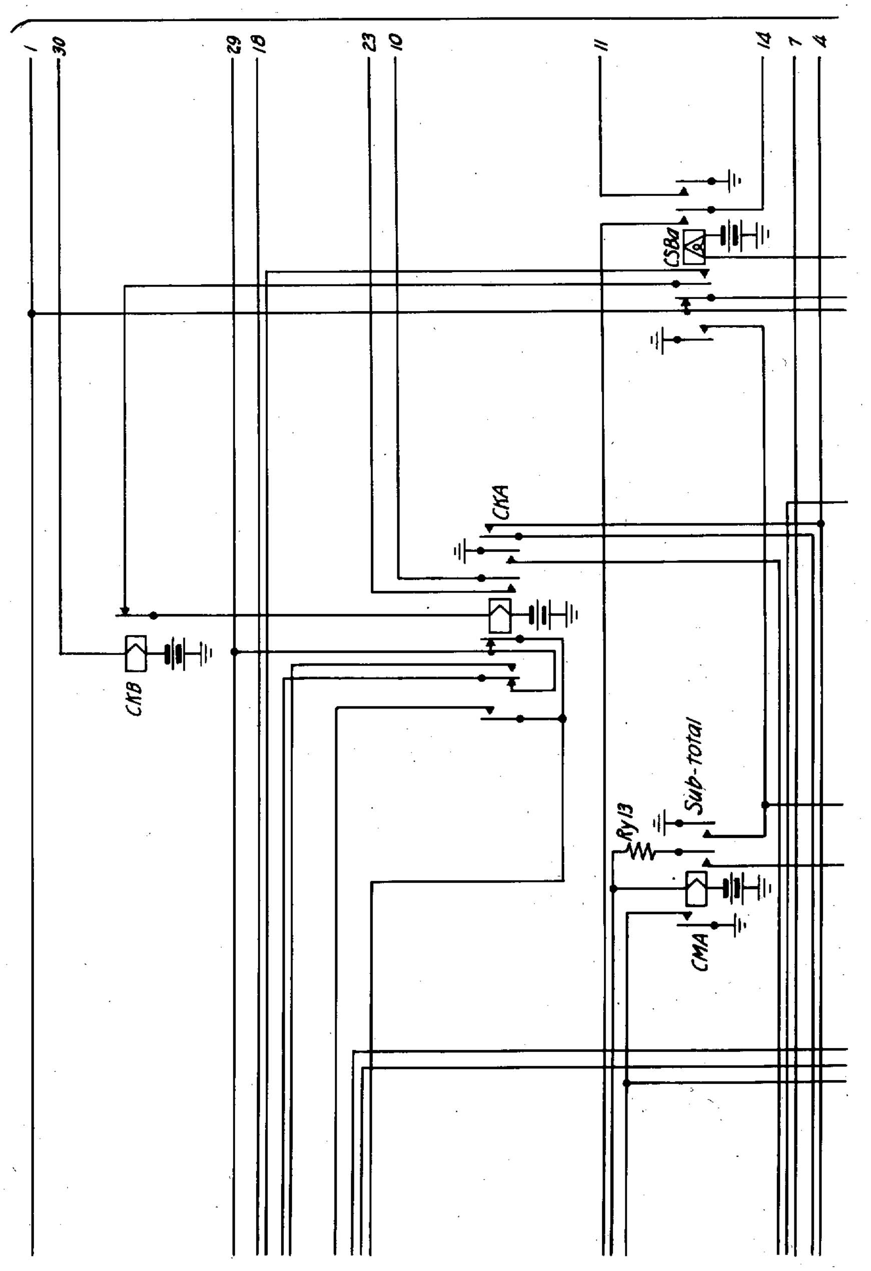

As previously described in connection with the first factor 1,280, the signals are received in the calculator upon the set of code receiving relays CA–CG (Fig. 10); the digital values 5 and 9 are passed on, in code form, to the storage relay sets IAA–IAD and IBA–IBD, respectively (Figs. 18–21); and the sub-total signal is decoded and causes the operation of the sub-total relay CMA (Fig. 16). Concurrently, with these operations, the calculator causes the printer P (Fig. 3) to print, in succession, characters corresponding to the signals it has received and the printed record at this stage accordingly reads ... 1,280+59 ⊧. It is to be understood that the sign ⊧ signifies sub-total (Fig. 66) but that any other suitable character may be used instead.

Meanwhile, as before, the wipers of switch D1 (Fig. 36) advance by one step for every digit received before the decimal point. The sub-total signal, similarly to the + signal, effects the termination of the second factor. There are then, in the number 59, two digits before the decimal point.

Figure 24:
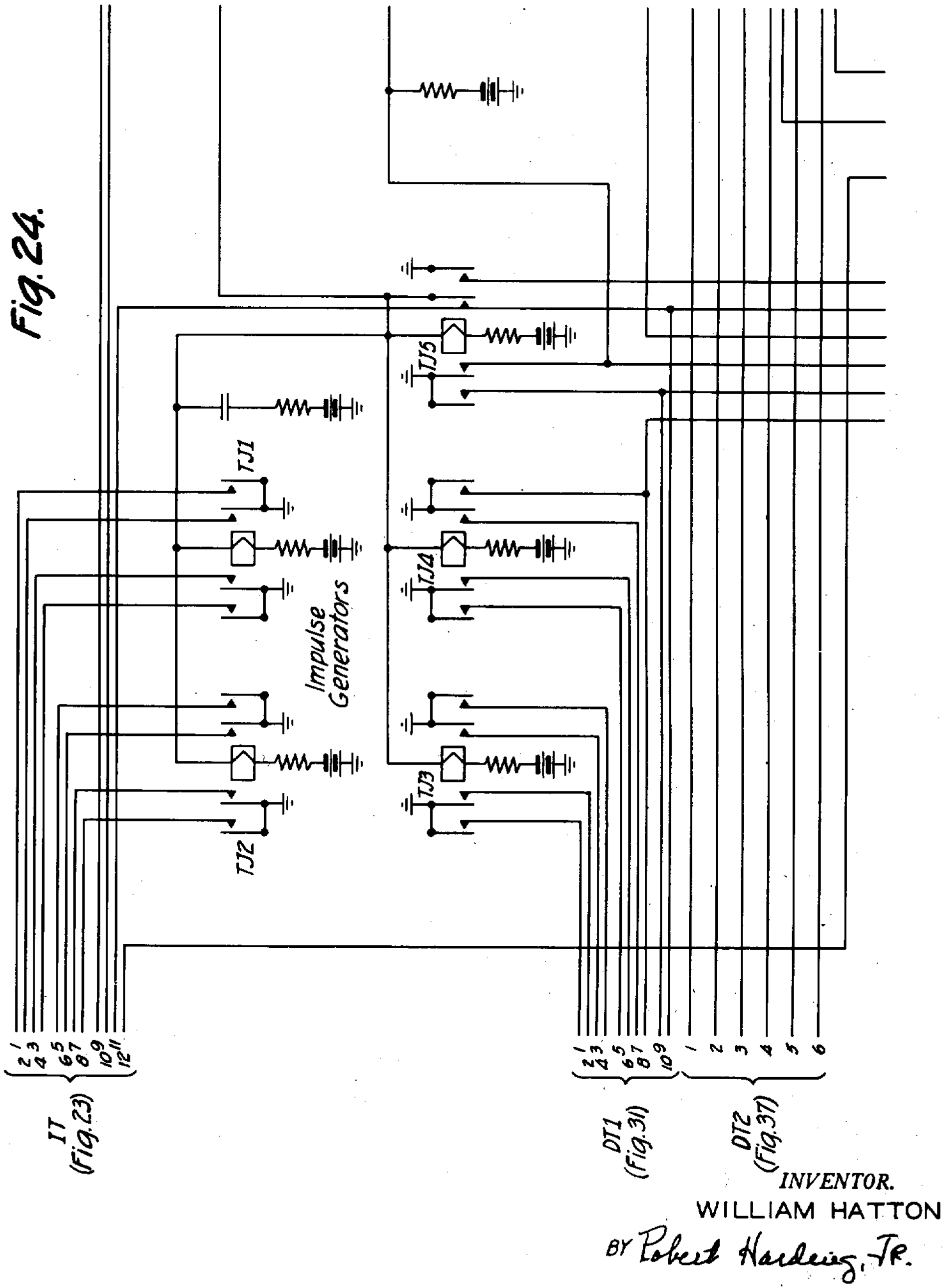

As a consequence of the operation of the sub-total relay CMA, the transfer of the digital values stored in the input circuit to accumulating switches S6–9, which still register the first factor 1,280, once again takes place. The manner in which these values are transferred, i. e., whether they shall be added to, or subtracted from, the aggregate registered on switches S6–9 in the solution circuit, depends upon the particular operation sign keyed immediately prior to the second factor 59, of the problem, and is independent of the nature of the operation sign keyed after this factor, i. e., the signal which initiates the transfer operation provided that the latter sign be compatible with a problem involving addition and subtraction operations. The operation sign in question is the sign + and the transfer operation is similar to that described above. This time, it is necessary to transfer the digital value stored on relay set IAA–IAD to switch S8 so that the value of the units digit, now stored on set IBA–IBD, may be duly transferred to the units switch S9. To ensure this, routing relay set DG (Fig. 34) operates and connects the eight switch magnets S8–S15 to the aforementioned eight impulse-generating contacts in the transfer circuit (Fig. 24). The number of impulses transmitted to the different switches is, as before, determined by the digital value stored in the corresponding storage relay set; the wipers of switch S8 accordingly make five steps, those of switch S9 nine steps, and the remaining switches are unaffected.

It is to be noted that the accumulating switches S1–S17 in the solution circuit are of the type in which the wipers advance over terminals always in the same direction and have eleven positions in their cycle, one normal position and ten off-normal positions. The terminals may be arranged in a complete circle. For convenience in the drawings they are shown in a part of a circle or arc. Consequently, whenever the wipers reach positions 10, they must be caused to make one additional step, referred to hereafter as a compensation step, to complete the cycle, since the calculator is of the type in which computations are performed on a decimal basis.

The wipers of switch S8, having made five steps from their previous positions 8, i. e. thirteen steps in all, or one complete cycle plus two steps, are now standing in positions 2 and the aggregate registered at this stage (III, Fig. 17) is 000,001.229.00000000 (that is, 1,229. Since the said wipers have made more than nine steps in all, the wipers of switch S7, registering digital values of the next higher denominational position, must be caused to make one additional step to correct for carry-over. For the same reason, the wipers of switch S8 itself must be caused to make one compensation step. Carry-over correction and compensation take place immediately after the transfer operation. After carry-over correction (IV, Fig. 71), the aggregate registered is therefore 000,001,329.00000000 (that is 1,329) and after compensation (V, Fig. 71), it is 000,001,339.00000000 (that is 1,339). This number is the desired sub-total, i. e. 1,280+59, and must be printed on the tape at the operator's station.

During the transfer operation, the wipers of the counting switch D1 and the distributing switch I1 return once more to their normal positions and the keys of the operator's unit are again locked; at the end of transfer, the operated storage and routing relays release, deleting the temporary record of the second factor keyed, but the keys remain locked until the sub-total has been printed.

This number (sub-total) is to be printed without unneccessary zeros preceding and following the significant digits, and duly punctuated with a comma, thus: 1,339. For this purpose, in accordance with the invention, the wipers of two step-by-step switches P1 and P4 (Fig. 56) are caused to advance step-by-step and at each step of switch P1 the positions of the wipers of the accumulating switches are scrutinized in succession in the order S1, S2, etc. until a switch is encountered whose wipers are off-normal and register a significant digital value. At this moment, a selected one, two, three or four of the five code sending relays CAX, CBX, CCX, CEX and CLL (Fig. 12) are operated, in accordance with the digital value registered by this last-mentioned switch, and the calculator causes the corresponding character to be printed on the tape by printer P (Fig. 3).

Since switch S9 has been arbitrarily assigned to accumulate digital values of units denominational position, it follows that switch S6 is concerned with digits of thousands position and switch S3 with digits of millions position. Switch P4 ensures that, after the digital value registered on switch S3 has been printed, if this value is significant, a halt is made and a comma is printed; the halt operation is repeated after the digital value registered on switch S6 has been printed.

In the example being described, the first significant digital value is found on switch S6. Thus, after character 1 has been printed in accordance with the value registered on switch S6, the calculator causes a comma (,) to be printed. At the next step of switch P1, character 3 corresponding to the value registered on switch S7 is printed, followed in a similar way by a second character 3 and character 9. At this moment, the positions of the wipers of the remaining switches S10–S17 are scrutinized simultaneously. If the wipers of any of these switches are off-normal, the number registered by the accumulating switches has not yet been completely printed; a halt is made and a decimal-point is printed.

Characters are then printed in succession, in accordance with the values registered on switches S10, S11, etc. until such time as the scrutiny of the wipers of the remaining switches indicates that none is off-normal, when the printing of digit characters ceases. In the example being described, the wipers of switches S10–S17 are all in their normal positions (V, Fig. 67). Accordingly, the printing of digit characters ceases after character 9 has been printed.

The desired sub-total having now been completely printed and duly punctuated, the calculator causes three commas (,,,) to be printed, as an indication that a further factor or factors may be submitted for addition to and/or subtraction from the sub-total registered on the accumulating switches. The calculator also unlocks or frees the keys of the operator's unit to to enable them to be operated for submission of further signs and factors. The printed record at this stage reads ... 1,280+59 ⊧ 1,339 ....

The operator continues the submission of the problem and keys the operation sign — followed by the third factor 935.1. The circuit is so arranged that, should the operator erroneously key the sign + instead of the sign —, the error can be corrected by subsequently keying the correct operation sign. More generally, in any problem involving addition and subtraction operations, the last-keyed operation sign is effective upon the factor following it.

Figure 13:
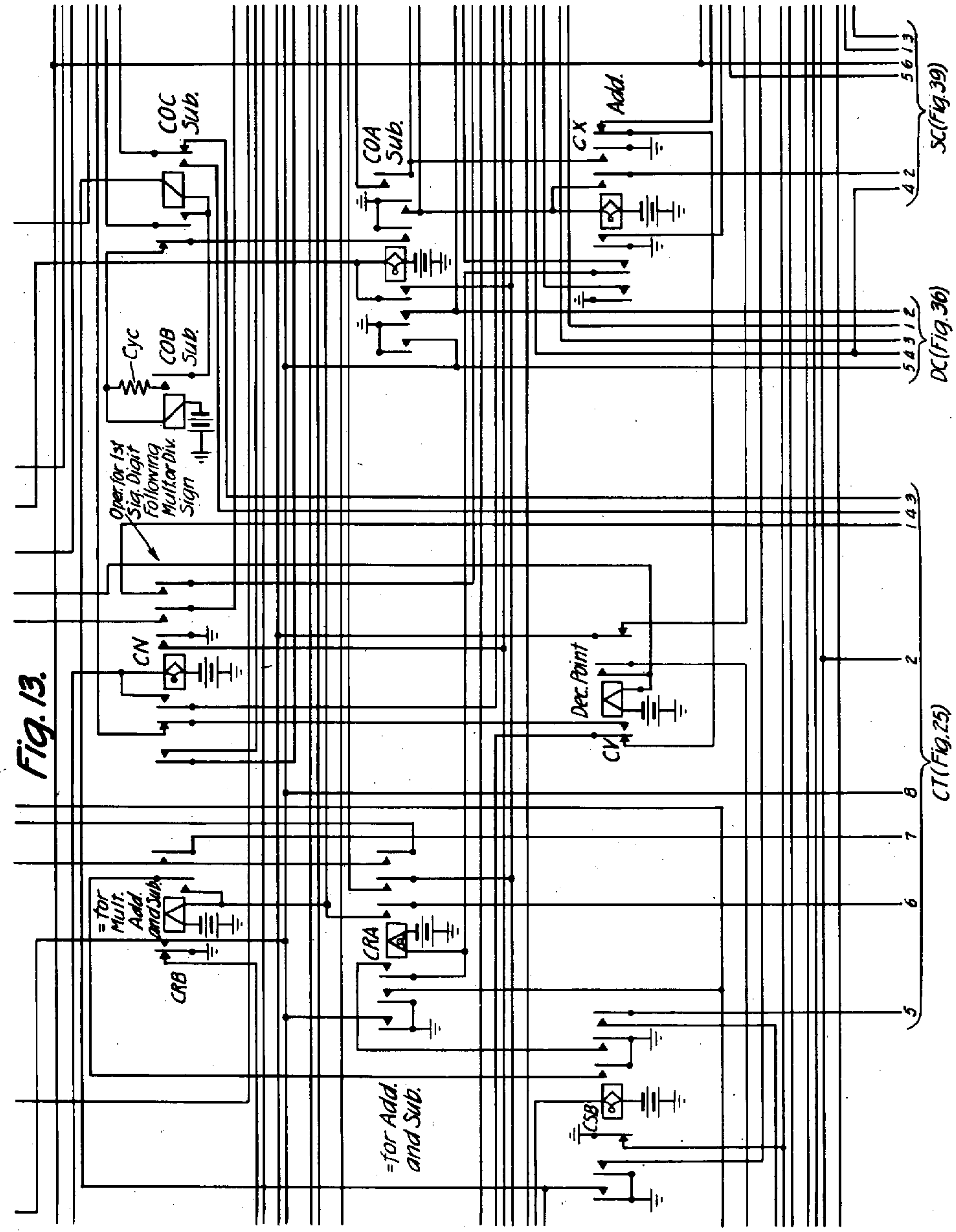
Figure 14:
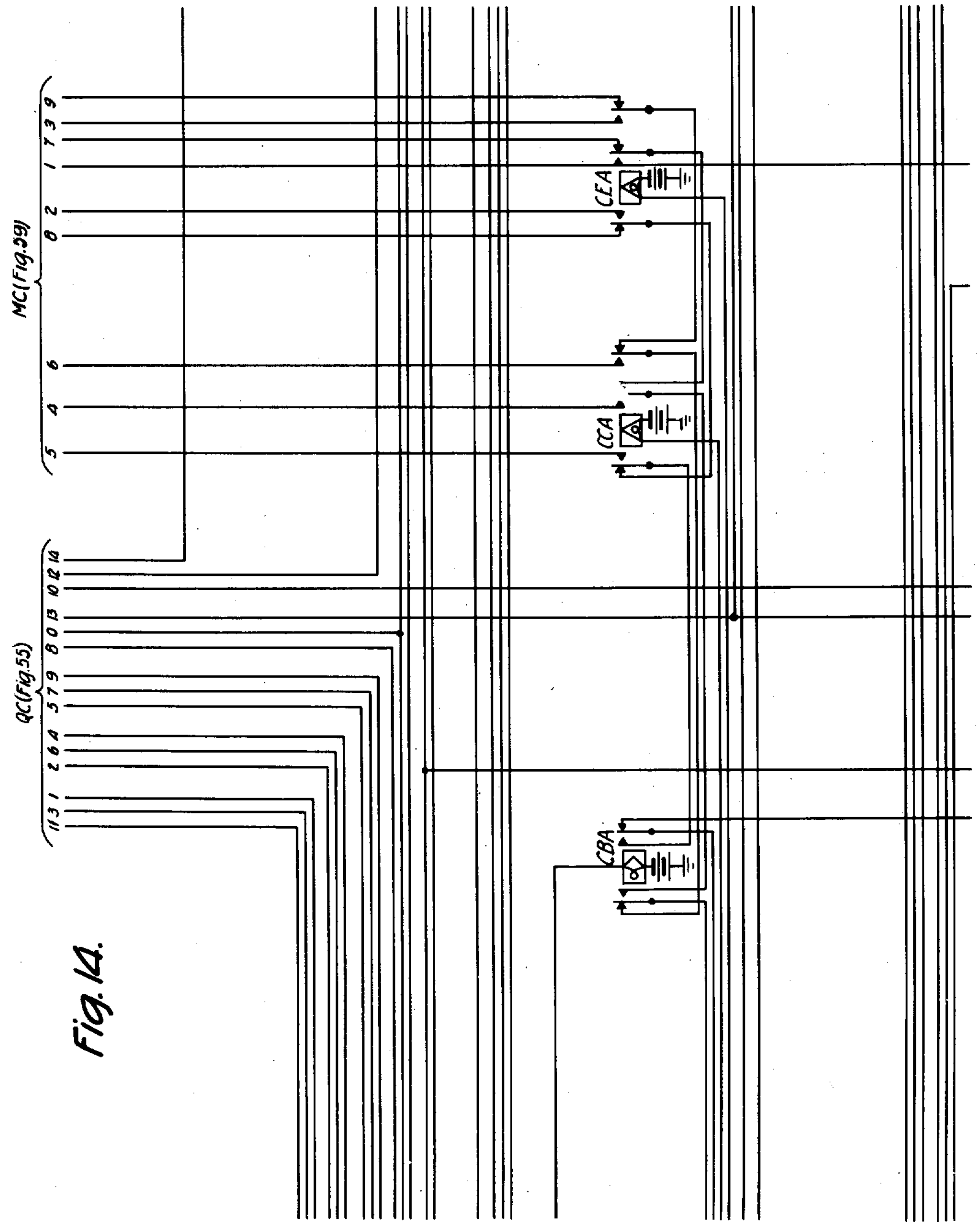

While the third factor is being keyed, the signals representing it are received in the calculator in a manner similar to that previously described. The signal — is decoded and causes the operation of the subtraction relay COA (Fig. 13). The digital values are passed on as before to the storage relays in the input circuit and are stored on the four sets IAA–IDD (Figs. 20 and 21) of said storage relays. The decimal point signal is also decoded and causes the operation of the decimal point relay CV (Fig. 13). The wipers of switch DI (Fig. 36), having advanced by one step for each digit received until the decimal point signal arrives as before, are standing in positions 3 and register that there are three digits in the third factor before the decimal point. Concurrently, with these operations, the calculator causes the printer P (Fig. 3) to print further characters corresponding to the signals it has received, thus −935.1.

The operator, having now completed the submission of the problem, requests the final solution by keying the sign =. The corresponding signal is decoded in the calculator and causes the operation of the equals relay CRA (Fig. 13). Concurrently, the calculator causes the printer to print the character =. The printed record on the tape at this stage accordingly reads ... 1,280+59 ⊧ 1,339 ,,, −935.1=.

As a consequence of the operation of the equals relay CRA, the transfer to accumulating switches of the digital values (third factor) stored in the input circuit once again takes place, but the manner of transfer is modified by the previous operation of the subtraction relay COA which indicates that the third factor must be subtracted from, instead of added to, the aggregate already registered in the solution circuit.

The accumulating switches S1–S17 are, as previously stated, of the type which can advance their wipers in one direction only. These switches can thus register increases, but not decreases, in the values of the digits to which they are assigned. Therefore, the complemental method of subtraction is employed which consists in adding the complement, to the base 9, of each digit and adding an extra unit in the lowest denominational position. Thus if it is required, for example, to subtract the factor 12 from the factor 246, the three-digit number 987, which is the complement of 012 (i. e. 12), to the base 9 is added to the minuend 246 digit-by-digit, that is 246+987. This makes a total of 1233. This number is manifestly too high by 999 than the required difference; to aid in correcting this, the number 1 is added in units position to 1233, making 1234. This last operation is referred to hereafter as subtraction correction. The number is now too great by 1000 and the first digit in the number 1234 arises from the carry-over from the digit of highest denominational position in the previous aggregate; this carry-over is only disregarded or in other words not affected by the calculator during the subtraction operation, thus leaving the correct difference 234 registered on the accumulating switches S7–S9.

The presence of the carry-over is, however, verified as an indication that after subtraction the aggregate is still positive. For, in the contrary case, if the subtrahend is greater than the minuend and the complement of the former is added to the latter, the necessary carry-over will not arise. In such a case, the calculator, which is not capable of handling negative quantities, restores to normal and indicates to the operator that the problem must be submitted afresh.

It will be evident that, by adding the four-digit number 9987, the complement of 0012, and ignoring the carry-over from the digit of highest denominational position, the same final result would have been attained, as also with numbers of more digits. On the other hand, had the two-digit number 87, the complement of 12, been used, the requisite carry-over would not have arisen. The number (complement) which is added to the minuend must, therefore, have at least as many digits before the decimal point as the number to which it is added, and the number of digits may be chosen according to convenience.

It will also be evident that, by adding the number 987.9, the complement of 012.0, a number 1,233.9 is obtained which is too high by 999.9. To correct this, the number 1 is added in the lowest denominational position, making 1,234 as before. Similarly, it is possible to add the number 987.99, the complement of 012.00, and to correct the sum by adding the number .01, and so on, whichever is most convenient. It is, in fact, found most convenient to add a number having nine digits before the decimal point and as many after it as the subtrahend has.

Accordingly, in the example being described, in which it is required to subtract the factor 935.1, or 000,000,935.1, from the aggregate 000,001,339 registered on the accumulating switches; the complement 999,999,064.8 of 000,000,935.1 must be transferred thereto. It is necessary to transfer the complement of the digital value 9, stored on the relay set IAA–IAD to switch S7 in order that the complement of the units digital value 5, stored on set ICA–ICD may be duly transferred to the units switch S9. To insure this, routing relay set DE (Fig. 32) operates and connects the eight switch magnets S7–S14 to the aforementioned eight impulse-generating contacts of TJ3 and TJ4 in the transfer circuit (Fig. 24). The number of impulses transmitted to the different switches is, as before, determined by the digital value stored in the corresponding storage relay set, but this time, on a complementary basis, as explained above. In addition to this, nine impulses, the complement of 0, are transmitted to each of the six switches S1–S6 from the six impulse-generating contacts (Fig. 24). One additional impulse is transmitted for subtraction correction to switch S10, the switch assigned to the significant digit of lowest denominational order in the subtrahend, and for the same purpose the nine impulses which would otherwise be transmitted to each of the four switches S11–S14 are suppressed.

At the end of these operations, the wipers of each of the five switches S1–S5 have made nine steps from their normal positions and are standing in positions 9; those of switch S6 have made nine steps from positions 1 and are in positions 10, while those of the seven switches S11–S17 are still in their normal positions. The wipers of switch S7 have made 0 steps, the complement of 9, and are still in positions 3; of switch S8 six steps, the complement of 3, from positions 3 and are in positions 9; those of switch S9 are four steps from positions 9 and in positions 2 in their second cycle; and those of switch S10 are eight steps and then one step from their normal positions and are in positions 9. The aggregate at this stage (VII, Fig. 71) is therefore 999,99*t*,392.90000000 (where *t* represents the number 10).

In the meantime, the wipers of switches D1 and I1 return once more to their normal positions and the keys at the operator's unit are again locked. Also, the operated storage and routing relays release, deleting the temporary record of the third factor keyed.

Carry-over correction follows the transfer operation, as before. The wipers of switches S5 and S8 advance by one step because the wipers of switches S6 and S9, respectively, have already passed their ninth positions. The wipers of switch S4 also advance by one step because, during the same carry-over correction, the wipers of switch S5 pass their ninth position. For similar reasons, the wipers of switches S3, S2, S1 and also S7 advance by one step. The aggregate registered at this stage (VIII, Fig. 71) is, therefore, *ttt,ttt,4t*2.90000000 (*t* denoting number 10).

During compensation, which follows carry-over correction as before, the wipers of these switches which have passed their ninth positions, either during carry-over correction or during the preceding transfer process, namely switches S1, S2, S3, S4, S5, S6, S8 and S9, make one step each. The aggregate registered at this stage (IX, Fig. 71) is, therefore, 000,000,403,90000000, that is, 403.9. The latter number represents the final solution to the problem, viz. 1,280+59−935.1, and the next step is to print it on the tape by the printer P.

For this purpose, switches P1 and P4 (Fig. 56) are again brought into use, P1 determining which accumulating switch is registering the value of the first and last significant digits in the aggregate and P4 determining the digit after which punctuation commas, if any, are to be printed. In the case under consideration both switches S3 and S6 are scrutinized and passed before a significant digital value is encountered, so that it is not necessary to print a comma. The digits 403 are, therefore, printed in succession, in accordance with the values registered upon switches S7, S8 and S9, respectively; a halt is made for the printing of the decimal point; and finally the character 9 is printed, in accordance with the value registered upon the switch S10.

The desired final solution having now been completely printed, the relays in the calculator, and all switch wipers which have been moved off-normal, return to their normal positions. The starting key SKT (Fig. 3) being presumably still operated, the calculator immediately causes the continuation, three dots (. . .), to be printed on the tape, as an indication that the calculator is clear and that a new problem may be submitted.

The complete printed record, on the tape in the operator's unit of the transaction, now reads as follows:

. . .1,280+59 |- 1,339; ,−935.1=403.9. . .

It is to be understood that the presentation of the problem and solution in this form makes the best use of a tape printer capable of printing twenty characters. If the printer were so constructed as to be capable of printing additional characters, such as a dash (—), also (and), and of advancing the paper strip without printing, it is clear that the calculator could be arranged, with slight modifications to its circuit, to cause the printed record of the transaction described above to be presented in several alternative forms, as desired, for example:

—1,280+59(=1339)—935.1=403.9—

MULTIPLICATION

The solution of the simple multiplication problem, 12.8×590 will first be considered after which a more extended problem, involving repeated multiplication with a constant or in other words invariable multiplicand, will be explained.

The equipment is placed in operation in the same manner as for addition by operating the starting key SKT (Fig. 3), whereupon the calculator causes continuation sign (. . .) to be printed on the paper tape by printer P. The operator then keys, digit-by-digit, the first factor 12.8, which is the multiplicand in a multiplication problem, with a decimal point duly inserted between the digits 2 and 8, and follows it by keying the multiplication sign (×). The signals are received in the calculator, one character at a time, and each causes the operation of a selection of the six code receiving relays CA–CG (Fig. 10) in combination, according to the predetermined code.

Figure 17:
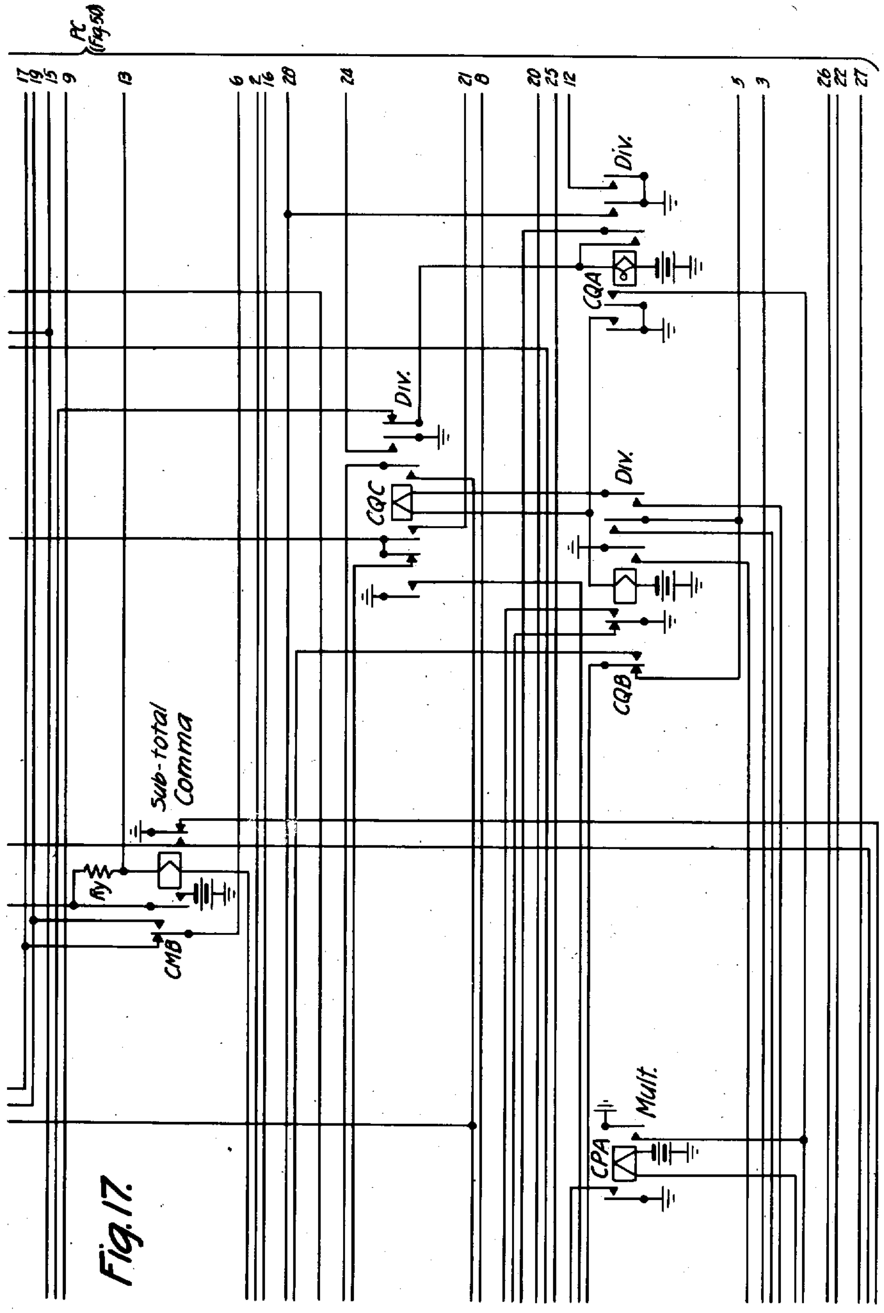

As each digit is received, the operated relays pass on a record of its value, still in code, to digit storage relays in the input circuit. The value of the first digit is registered and stored by the operation of a selection of the four relays IAA–IAD (Fig. 19); the second digit is stored on a selection of the four relays IBA–IBD; and the third digit on relays ICA–ICD, and so on, the wipers I1C, I1D, I1E and I1F (Fig. 18) of switch I1 advancing by one step for this purpose after each digital value has been registered. When the decimal point signal is received, the operated code receiving relays decode it and operate the decimal point relay CV (Fig. 13). When the multiplication signal (×) is received, the operated code receiving relays decode it and operate the multiplication relay CPA (Fig. 17). Concurrently with these operations, the calculator causes printer P (Fig. 3) to print in succession characters corresponding to all the signals it has received. Thus, the paper strip at this stage indicates the printed record . . . 12.8×.

During the operations of storing and printing, initiated by the operation of the code receiving relays as each character is received in the calculator, the keys at the operator's station are again locked by the operation of magnet K7 (Fig. 3). As soon as the storing and printing operations are terminated, the keys are unlocked. It will be understood that these operations are similar to those of addition and also take place very rapidly and do not hinder the operator.

The signal × designates that the first factor of the problem is to be treated as a multiplicand, also that the first factor is terminated and therefore, in the absence of a decimal point in this factor would determine also the denominational values of the digits composing it. Meanwhile, the wipers of two switches P2 and P5 (Fig. 56) advance by one step for every digit received, until such time as the position of the decimal point is determined, when said switches stop. The decimal point signal having been received after two digits 12, these switches register, by the positions 2 in which their wipers are standing and for a purpose later described, that there are two digits in the integral portion of the multiplicand.

In continuing the submission of the problem, the second factor 590, the multiplier, is keyed digit-by-digit, and then the product of the factors submitted is requested by keying the sign =.

As each digit of the multiplier is keyed, the signals are received in the calculator upon code receiving relays CA–CG (Fig. 10), as before; the digital value is automatically applied to the multiplicand already stored in the input circuit; and the product is registered by advancing a number of accumulating switches in the solution circuit. Of the seventeen accumulating switches provided, switch S2 (Fig. 18) is used for digital values of highest denominational value and switch S17 for digital values of lowest denominational value. Switch S1 is not utilized in computations involving multiplication. The registration of the successive products upon these switches is performed with the aid of a multiplication-table circuit (Figs. 57 and 58) and a switch T2 in the transfer circuit (Fig. 29) and takes place in two stages, as will be explained.

When the first digit 5 of the multiplier is keyed, the code receiving relays, operated by the received signals, energize a multiplying relay ME (Fig. 59) in the multiplication-table circuit, which enables all the digits of the multiplicand, whatever their number, to be multiplied concurrently by the value 5.

The mathematical process involved when the number 12.8, the multiplicand in the example being described, is multiplied by the number 5 to obtain the product 64, may be expressed thus:

| | | | |
|---|---|---|---|
| Multiplicand | | 1 | 2.8 |
| Multiplier | | | 5 |
| Lower partial products | | 5 | 0 0 |
| Higher partial products | 0 | 1 | 4 |
| Product | 0 | 6 | 4.0 |

In this expression, it will be observed that the number 014 consists of the digits of higher denominational value, and the number 500 the digits of lower denominational value, in the several partial products 05, 10 and 40 of the digits 1, 2 and 8, respectively, and the digit 5. Moreover, the digits 1 and 4 of the number 014 have the same denominational value as the digits 5 and 0, respectively, of the number 500, to which they must accordingly be added to produce the desired number 64.

In the calculator, operations analogous to those described above take place automatically. Although the values 1, 2 and 8 of the digits of the multiplicand are stored on three sets of storage relays, as described, eight such sets are provided. For the first stage in the calculation, eight accumulating switches are assigned to accumulate the higher partial products of the digital values stored and the value 5, viz. 0, 1, 4, respectively (strictly 0, 1, 4, 0, 0, 0, 0, 0, since the remaining five sets of storage relays, not having been affected, are, in fact, registering the digital values 0 and the partial products of these values are also 0; as this is the case with all values of multiplier, the partial products will for convenience be ignored herein). The appropriate routing connections for the purpose are effected by the operation of DA, selected from eight routing relays DA–DJ (Figs. 32 and 34), by wiper D1D of switch D1. DA associates the storage set storing the value 1 of the multiplicand with switch S2, that storing the value 2 with switch S3, that storing the value 8 with switch S4, and the five sets storing the value 0 with switches S5–S9, respectively. DA also connects the eight switch magnets S2–S9 to eight impulse-generating contacts of TJ3 and TJ5 in the transfer circuit (Fig. 24). Each of the latter creates nine ground impulses; and each of the connections to the eight magnets is opened by one of the stopping relays IAZ–IHZ (Figs. 19, 21 and 23) in the associated storage set when the wipers of the switch concerned have made a number of steps corresponding to the required partial product. The moment this condition is fulfilled is indicated, in a manner to be described, by the multiplication-table circuit, already set by the operation of ME for multiplication by the value 5.

Thus, the wipers of switch S3 make one step, those of switch S4 four steps and the wipers of switches S2, S5, S6, S7, S8 and S9 do not advance. The wipers of the sixteen accumulating switches have previously been all standing in their normal positions; the aggregate registered by them at this stage (II, Fig. 72) is 0140000000000000.

The higher partial products having thus been duly accumulated, the wipers of switch D1 are caused to make a step and in so doing release DA and operate another routing relay DB (Fig. 30), whereby the afore-mentioned storage relay sets are associated with the eight accumulating switches S3–S10, respectively. The second stage of the calculation process now takes place and these switches accumulate the lower partial products of the digital values stored and the value 5, viz. 5, 0, 0, respectively. The moment when the appropriate number of steps has been made by each of the switches is indicated, as before, by the multiplication-table circuit.

Thus, the wipers of switch S3 make five further steps from their positions 1 and are now standing in positions 6. The wipers of the other seven switches do not advance, so that the aggregate registered at this stage (III, Fig. 72) is 0640000000000000. It will be observed that this number, if the position of the decimal point be ignored, correctly represents the product of the number 12.8 and the number 5.

The manner in which the multiplication-table circuit controls the operation of the stopping relay in a storage relay set will now be explained with reference to a portion of the example being described. Referring to Fig. 59, the multiplying relay set ME has been pre-operated, as described, in accordance with the value 5 of a multiplier digit. The third storage relay set in the input circuit, selected by way of example, is associated with accumulating switch S4 by DA and then with switch S5 by DB, also as described. It is required to stop the wipers of the former switch after 4 steps during the first stage of the calculation and those of the latter switch after 0 steps during the second stage. The winding of the stopping relay ICZ (Fig. 21) associated with the aforementioned storage set is connected, because the set is storing the value 8 of a multiplicand digit, to wire 8 of group IM (Fig. 58). Now it will be observed that wire 8 is extended over a front contact of the partial product selecting relay MZ and a contact of ME of wire 4 of group MT1 (Fig. 28), and that it is extended over a back contact of the same relay MZ and another contact of ME to wire 0 of group MT2. It will also be observed that the numbers 4 and 0 are the higher and lower partial products, respectively, of the product 40 of the numbers 8 and 5. During the first transmission of impulses to the accumulating switches, described above, the wires of group MT1 (Fig. 28) are grounded in turn by wiper T2C (Fig. 29) of switch T2, whose wipers are advanced by impulses generated by contact 4 of TJ5. At this stage, MZ is operated in order to select the higher partial products. Accordingly, when four impulses have been transmitted to switch S4 and switch T2, wire 4 of group MT1 is grounded, the stopping relay ICZ operates and the wipers of switch S4 stop. During the second transmission of impulses to the accumulating switches, and switch T2, the wires of group MT2 are grounded in turn by wiper T2C. This time MZ is unoperated in order to select the lower partial products. Accordingly, before any impulses have been transmitted to the switches, wire 0 of group MT2 is grounded and the stopping relay ICZ operates again and prevents the wipers of the switch which the relay controls, this time switch S5, from advancing further. Thus, as the result of the numbers 8 and 5 entered into the calculator, their product 40 has been duly registered and accumulated by switches S4 and S5.

The stopping relays associated with the remaining seven storage relay sets are each connected in a similar manner, according to the digital value stored in the storage set, to a wire of group IM (Figs. 22 and 23), so that the wipers of the switch that is controlled by each stopping relay are stopped when they have made the requisite number of steps.

It will be apparent that when ME is operated, an electrical multiplication-table for the number 5 is established and that to change the value of the multiplier it is necessary only to operate another of the multiplying relays MA–MJ instead. Thus, to multiply by the value 1, MA would be operated and to multiply by the value 9, MJ would be operated. The part of the circuit shown in Figs. 58 and 59 constitutes, in fact, a complete electrical multiplication-table for obtaining the product of any of the ten numbers 0–9 and any of the nine numbers 1–9 and also for selecting therefrom, in succession, the digits of higher and lower denominational value.

Concurrently with the operations resulting from the keying of the digit 5, the calculator causes printer P (Fig. 3) to print the character 5 and the printed record at the operator's station accordingly reads . . .12.8×5.

During the whole of these operations, the keys at the operator's station are again locked. It is to be understood, however, that the said operations may be completed very rapidly and that the intervals at which the operator keys successive digits of a multiplier may be of the order of one second, however many digits there may be in the multiplicand.

When the second digit 9 of the multiplier is keyed, the code receiving relays, operated by the received signals, cause the multiplying relay MJ in the multiplication-table circuit to operate. This relay enables all the digits of the multiplicand to be multiplied concurrently by the value 9. The higher and lower partial products 0, 1, 7 and 9, 8, 2, respectively, are accumulated in turn, as before. It will be noted that the denominational values of the digits 0, 1, 7 are necessarily the same as the values of the digits 5, 0, 0 previously accumulated, since the latter are lower partial products whereas, although the former are higher partial products, the new multiplier 9 is a digit of denominational value one lower than the previous multiplier 5. The values 0, 1, 7 must, therefore, be accumulated on the same three switches S3, S4 and S5, and for this purpose the routing relay DB operates once more.

Accordingly, during the first stage of the new calculation process, the wipers of switch S4 make one step from positions 4 and are then standing in positions 5, the wipers of switch S5 make seven steps from their normal positions, and the wipers of the other switches are unaffected, so that at this stage (IV, Fig. 72) the aggregate registered is 0657000000000000.

At the end of these operations, the wipers of switch D1 make a step, as before, DB releases and another routing relay DC (Fig. 5) operates instead. The aforementioned storage relay sets are newly associated with the eight accumulating switches S4–S11 and the values 9, 8, 2 are accumulated on switches S4, S5, S6, respectively, in a similar manner.

It is to be noted that the accumulating switches of the solution circuit are of the type in which the wipers advance always in the same direction and have eleven positions in their cycle, one normal position and ten off-normal positions, and whenever the wipers reach positions 10, they must be caused to make one additional or compensation step.

Thus, during the second stage of the process, the wipers of switch S4 make nine steps from positions 5, and have then made fourteen steps in all, or one complete cycle plus three steps, and are then standing in positions 3 of their second cycle; the wipers of switch S5 make eight steps from positions 7 and are standing in positions 4 of their second cycle; the wipers of switch S6 make two steps from their normal positions; and the wipers of the other switches are unaffected. At this stage (V, Fig. 72), the aggregate registered is, therefore, 0634200000000000.

Since the wipers of switch S4 have made more than nine steps in all, the wipers of switch S3, registering digital values of next higher denominational value, must be caused to make one additional step to correct for carry-over. For the same reason, the wipers of switch S4 itself must be caused to make one compensation step. By the same token since the wipers of switch S5 have also made more than nine steps in all, the wipers of switch S4 must be caused to make one additional step to correct for carry-over and the wipers of switch S5 itself one compensation step. Carry-over correction and compensation take place in succession immediately after each process of accumulating partial products, whenever the need arises. Consequently, after carry-over correction (VI, Fig. 72) the aggregate registered is 0744200000000000, and after compensation (VII, Fig. 72) it is 0755200000000000. It will be observed that this number, if the position of the decimal point be ignored, correctly represents the product of the number 12.8 and the number 59 (or 590).

Concurrently with the operations resulting from the keying of the digit 9, the calculator causes printer P to print the character 9 and the record accordingly reads ...12.8×59. The keys at the operator's station are locked, as before, until the completion of these operations.

When the third digit 0 of the multiplier (590) is keyed, the code receiving relays operate none of the multiplying relays, and no further accumulation takes place. The wipers of switch D1, however, make a step, as before, in order that in the event of the said digit 0 being followed by another digit the partial products will be properly routed.

Concurrently with these operations, the calculator causes printer P to print the character 0 and the record accordingly reads ...12.8×590.

When the sign = is keyed, the code receiving relays decode it and operate the solution relay CRB (Fig. 13), whereupon the calculator causes printer P to print the character = and once more locks the keys. The printed record now reads . . .12.8×590=.

The sign = also serves to indicate that the multiplier is terminated and therefore, in the absence of a decimal point in this number (as in the example being described), determines the denominational values of the digits composing it. In the meantime, the wipers of switch P2 (Figs. 56 and 57), which have, as described, already made two steps because there were two digits in the integral portion of the multiplicand, continue to advance by one step for every digit of the multiplier until such time as the position therein of the decimal point is determined, when they stop. There being three digits in the integral portion of the multiplier (590) the wipers have then made a total of five steps, thus indicating, in a manner which will now be described, the position of the decimal point in the product which has been accumulated. It is to be noted that the wipers of switch P5, which also made two steps in company with those of switch P2, do not advance further in a calculation of the kind being described, and have in fact no useful function therein. Their function will be described in connection with another example.

It has been explained herein, and can be verified from Fig. 72, that the higher partial product of the first digits (i. e. those of highest denominational value) of the multiplicand and multiplier is routed to the first accumulating switch of the sixteen used in multiplication computations, i. e. switch S2; that the higher partial product of the first digit of the multiplicand and the second digit (i. e. that of next-to-highest denominational value) of the multiplier, and also the higher partial product of the second digit of the multiplicand and the first digit of the multiplier, are both routed to the second switch, i. e. S3; and so on. It has also been explained that the lower partial products are routed in each case to the switch accumulating digits of denominational value one lower than the corresponding higher partial products. It is to be understood that in the calculator now being described this procedure is invariable, whatever be the number of digits composing the multiplicand and multiplier, the digital values thereof and the position of the decimal point relative thereto (even if the first digit of the multiplicand and/or multiplier be 0 and thus insignificant). It can, therefore, be stated that in the general case, the lower partial product of the Nth digit of the multiplicand and the $n$th digit of the multiplier is always routed to the $(N+n)$th accumulating switch. Now, if there are N digits in the integral portion of the multiplicand, the Nth digit is clearly of units denominational value; similarly, if there are $n$ digits in the integral portion of the multiplier, the $n$th digit is of units value. It follows that the digit registered by the $(N+n)$th accumulating switch, which is now the lower partial product of the two units digits, is also of units denominational value, and that the decimal point in the product is to be placed between the digits registered by the $(N+n)$th and $(N+n+1)$th switches.

Accordingly, in the example being described, namely the evaluation of 12.8×590, N is equal to 2 and $n$ to 3; and switch P2 which has computed the value $(N+n)$, as explained, is thus able to indicate directly, and does so by its wiper P2B (Fig. 56), that the decimal point in the solution is to be placed between the digits registered by the 5th and 6th accumulating switches, i. e. switches S6 and S7.

With the decimal point inserted in accordance with this indication, the aggregate registered at this stage is 07552.00000000000, the required product.

This number must now be printed on the tape without unnecessary zeros preceding and following the signficant digits and duly punctuated with a comma, thus: 7,552.

For this purpose, two switches P1 and P4 (Fig. 56) are caused to advance step-by-step and at each step of switch P1 the position of a wiper of one of the accumulating switches is scrutinized by wiper P1A (Fig. 56), in the order of S1D, S2D, etc., until a switch is encountered whose wipers are off-normal and thus register a signficant digital value. At this moment, a selection of the five coding relays, CAX, CBX, CCX, CEX and CLL (Fig. 12) is operated in accordance with the digital value registered by this switch and the calculator causes the corresponding character to be printed on the tape by printer P (Figs. 3 and 66).

Since switch S6 is registering the denominational value of units in the example being described, it follows that switch S3 is concerned with the thousands digit. Switch P4, by means of its wiper P4C (Fig. 57), ensures that after the digital value registered on switch S3 has been printed (if this value is significant), a halt is made and a comma is printed.

Figure 56:
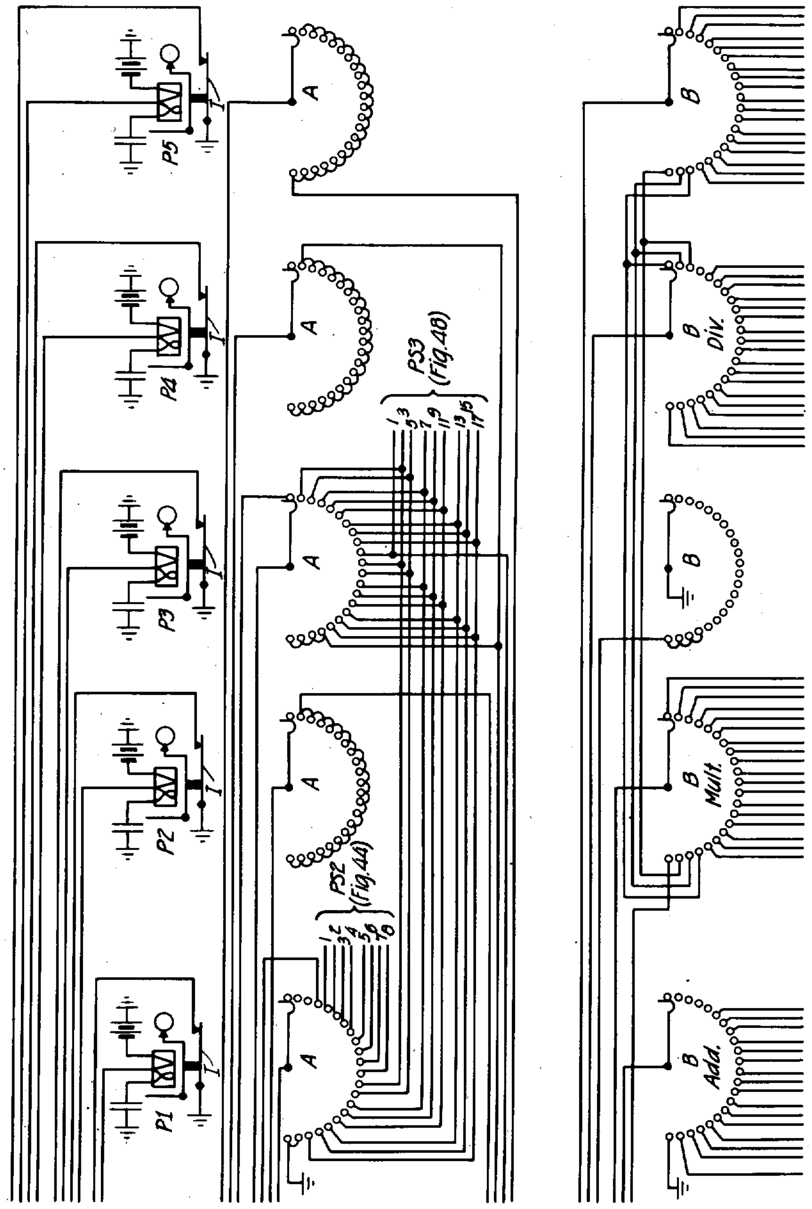
Figure 57:
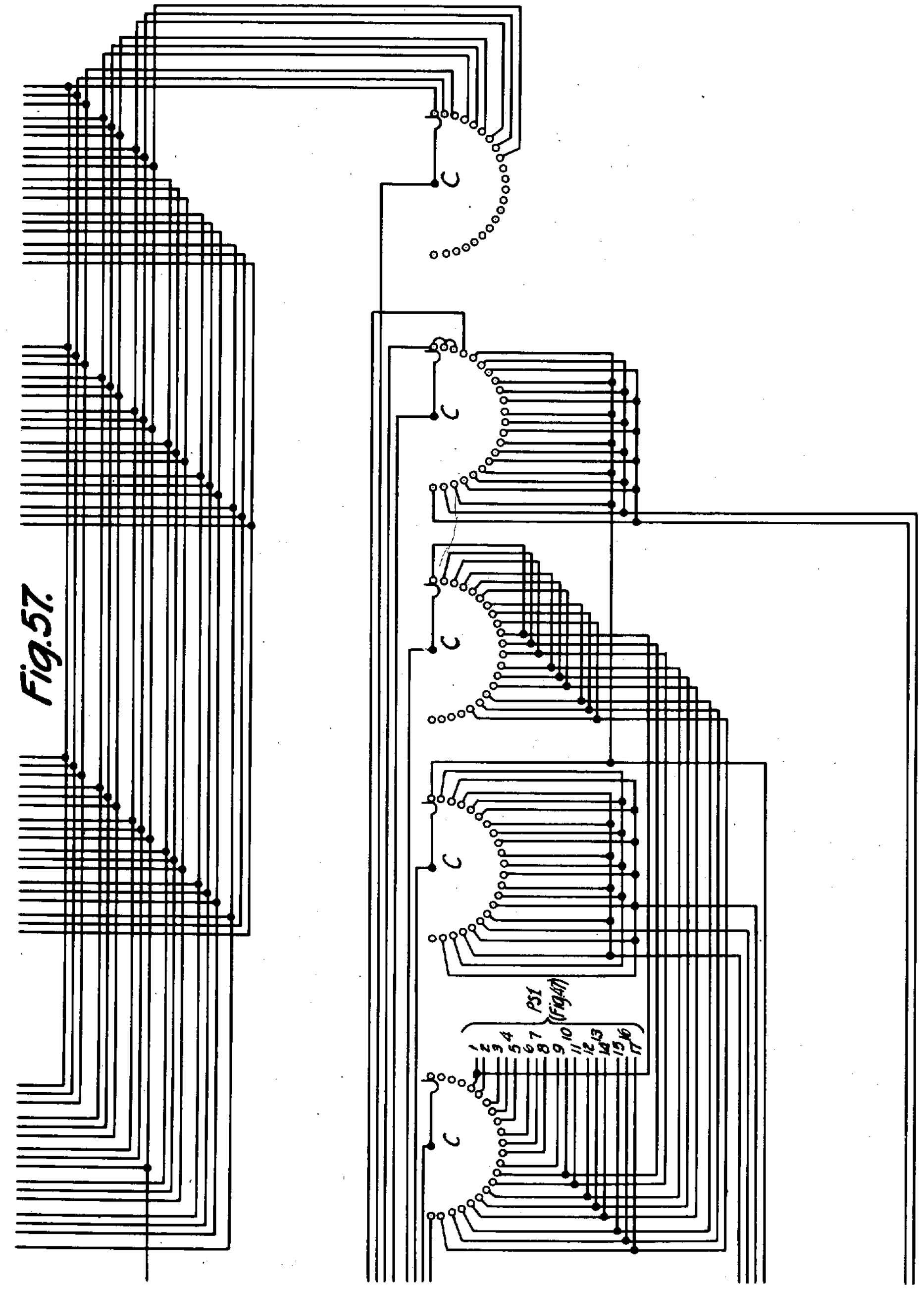

In the example being described, the first significant digital value is found on switch S3. Consequently, after character 7 has been printed in accordance with the value registered on switch S3, the calculator causes a comma to be printed. At the next step of switch P1, character 5, corresponding to the value registered on switch S4, is printed, followed in a similar way by a second character 5 and character 2. At this moment, the positions of the wipers of the remaining switches S7–S17 are scrutinized simultaneously, again by wiper P1A (Fig. 56). If the wipers of any of these switches are off-normal, the number registered by the accumulating switches has not yet been completely printed; a halt is made and a decimal point is printed, after which characters are printed in succession in accordance with the values registered on switches S7, S8, etc., until such time as the scrutiny of the wipers of the remaining switches indicates that none is off-normal, when the printing of digit characters ceases. In the example being described, the wipers of switches S7–S17 are all in their normal positions (VII, Fig. 72). Accordingly, the printing of digit characters ceases after character 2 has been printed.

The desired product having now been completely printed and duly punctuated, the relays and switches of the calculator return to their normal conditions, whereafter the calculator causes the continuation sign (. . .) to be printed, as an indication to the operator that a fresh problem may be submitted thereto for computation. The calculator also unlocks the keys at the operator's station. The printed record of the completed transaction reads: . . .12.8×590=7,552. . .

It is now supposed that the operator requires the product of a single invariable multiplicand 12.8 and successive multipliers 690, 0.01 and other numbers. It will be clear from the foregoing description that the operator can obtain the required products by keying the several problems separately thus, 12.8×590= and 12.8×0.01= and so on. The complete printed record of the transaction would then read as follows:

. . .12.8×590=7,552. . .12.8×0.01=
0.128. . .12.8× etc.

It will be understood that when it is required to multiply the same or constant factor which may, for example, be a percentage or an exchange rate in a monetary transaction, by a plurality of factors in succession, the above-described process is undesirably laborious and slow.

Means is, therefore, provided in the calculator, responsive to a particular operation sign separating two factors and implying that the problem is one involving repeated multiplication of a first or constant factor by a plurality of other factors in succession, which causes the calculator, after it has produced the product of said two factors, to retain the first factor and to send to the operator's station an indication that a new factor may be submitted for application to said retained factor.

To make use of this means, the operator takes the calculator into use and keys the first factor, 12.8 in the problem now being described, in precisely the same manner as in the previous example, and follows it by keying the particular operation sign

CM
×

(constant multiplicand) instead of the usual multiplication sign ×. The calculator registers and stores in the input circuit the digital values received and registers on switches P2 and P5 the position of the decimal point, precisely as before. When the signal

CM
× is received, the operated code receiving relays decode it and operate the constant multiplicand relay PG (Fig. 50), as well as the multiplication relay CPA (Fig. 17).

The operator, continuing the submission of the problem, keys the second factor 590, the first of a plurality of multipliers, and requests the product by keying the sign =, as before. The calculator causes printer P to print a record on the tape of all the characters keyed, followed by the requested product, all in the manner already described. Thereafter, the calculator, by reason of the operated condition of PG, causes the record of the digital values of the multiplicand 12.8 to be retained upon the aforementioned storage relays in the input circuit. By the same agency and in order that the position of the decimal point in the multiplicand may also be retained, the wipers of switch P2 are caused to take up positions corresponding to those in which the wipers of switch P5 are still standing, i. e. positions indicative, as described, of the number of digits in the integral portion of the multiplicand. With the above-mentioned exceptions, the relays and switches of the calculator return to their normal conditions, obliterating the aggregate which has been accumulated, whereupon the calculator causes printer P to print three commas, instead of three dots, as in the previously described example, as an indication to the operator that a third factor, i. e. the second of a plurality of multipliers, may now be submitted for application to the same multiplicand 12.8. At this stage the printed record reads: . . .12.8×590=7,552, , , The operator, continuing the submission of the problem, keys the second multiplier 0.01, followed by the sign =, whereupon the calculator computes the product, 0.128 and causes printer P to print the multiplier and product. The calculator retains once more the digital values of the multiplicand and the position of the decimal point therein, obliterates the aggregate accumulated, and once more causes the printer P to print three commas to indicate that yet another multiplier may be submitted. The printed record then reads:

. . .12.8×590=7,552, , ,0.01=0.128, , ,

When all the desired multipliers for application to the same multiplicand 12.8 have been submitted and the corresponding products computed and printed, the operator depresses the cancel key

CNL
/

(Fig. 3) whereupon the record of the multiplicand is obliterated and the calculator causes the printer P to print three dots, as an indication that an entirely fresh problem may be submitted.

DIVISION

To obtain the quotient in the usual manner in a division calculation, it is necessary in principle to determine how many times the divisor can be subtracted from the material part of the dividend, before the remainder becomes less than the divisor. A division operation performed by this process, repeated subtractions, is lengthy particularly if the extraction of many quotient digits is desired. As previously stated, the present invention contemplates direct division and employs a circuit similar to a Wheatstone bridge to provide a shortcut in obtaining quotients. With this arrangement the first two digits of the divisor B are compared in a bridge circuit with the first two digits of the material part of the dividend A, and an approximate value of the quotient digit is determined rapidly. The product of this digit and the divisor is subtracted in one operation, and there remains to be carried out only a check of the accuracy of the operation and a correction, if this proves necessary. The process is repeated for each quotient digit extracted and may be continued indefinitely.

The stages of a typical operation, 850÷219=3, with a remainder of 193, in a calculator are as follows:

The first factor, 850, is sent to the calculator, recorded on the storage relays and transferred to accumulating switches assigned by the distributor; the first two of the three switches assigned to make eight and five steps respectively; the storage relays are released, and the second factor 219 is sent and recorded on them. The control circuit, having indicated that the factors are dividend and a divisor, respectively, their first two digits 85 and 21 are compared and yield an approximate quotient 4, which is recorded on a step-by-step switch in the quotient circuit, and the multiplication table is set for multiplication by 4. The processes of multiplying 219 by 4 may be expressed thus:

$$\begin{array}{l} \underline{219} \times 4 \\ \overline{846} \\ \underline{003} \\ \overline{0876} \end{array}$$

The number 876 is therefore to be subtracted, if possible, from the dividend. The transfer operation involved is analogous to a multiplication operation in that the partial products are transferred in turn; and to a subtraction operation in that they are transferred in the complementary basis. In the present case, the transfer circuit causes the third S switch to take one step for subtraction correction as previously explained in connection with the description of the subtraction operation, and then causes the three switches to take 1, 5 and 3 steps, respectively.

It will be noted that 1, 5 and 3 are the 9's complement of the partial product 846 which causes the three switches to step to positions 9, 10 and 4, respectively, causing the first switch to carry over. Thus, the switches step into positions 10, 0, 4, respectively. Similarly, the 9's complement of the partial product 030, i. e. 969, are added causing the three switches to step up to positions 9, 7 and 3, respectively. This time, however, the first switch is not caused to make a carry-over operation. The Wheatstone bridge circuit does not always extract the correct quotient digit, comparing as it does only part of the dividend and divisor. If the approximate quotient proves to be too high, one of the carry-over impulses will be missing and the divisor is added once more to the S switches while deducting one unit from the quotient and the value of the new remainder is checked against it, as in the above example. Thus, by adding 219 to the three switches they now have made 9, 10 and 3 steps. After correction for carry-over, these switches read the number 004.

In the event that the approximate quotient is too low, the divisor is subtracted from the S switches instead, and a similar check is made. This event can be determined by comparing the remainder of the dividend with the divisor. If the first figure of the remainder is equal or more than the first figure of the divisor, the result of this comparison is used to cause a subtraction operation. In practice some 60 per cent of the quotient digits extracted in division operations are correctly indicated by the first operation of the bridge.

The transfer circuit and, in particularly, SCA (Fig. 38), causes the carry-over indication from the switch which accumulates digits of the highest ordinal value to be ignored. Although SCA is operated by the transfer circuits and a carry-over impulse is being generated, this impulse insofar as operating the switch recording digits of highest ordinal value is concerned, will have no effect.

Under certain conditions, SCA is not operated, which means that no carry-over impulse is being generated. This non-operation of SCA indicates that the result of the multiplication of the approximate quotient with the divisor is greater than the dividend. This, in turn, means that the approximate quotient is too large, for the following reasons:

The subtraction process of a number Y from another number X consists of adding to X, the complement $(A'-Y)$, of a fixed number A', such as 1,000.

It is obvious that the preliminary result $$X+(A'-Y)=(X-Y)+A'$$

is too large. It is greater by A than the required subtraction result $(X-Y)$. Therefore, the fixed number A' has to be subtracted from the preliminary result to give the accurate result.

We now assume:

$$X<Y$$

This means, in a division process, that the approximate quotient is too large. In this case, the result would be:

$$X+(A-Y)<A$$

Consequently, if A', for example, is 1,000, as in the example just mentioned above, there would be no carry-over in the highest ordinal. No operation would occur, i. e. of relay SCA. There is no carry-over impulse effecting operation of the compensatory subtraction of A' in obtaining the accurate subtraction result.

A more exact comparison between the result of approximate multiplication and the dividend is effected in operations hereinafter described.

The absence of the carry-over impulse or the non-operation of SCA or any relay associated with SCA, may be used to control corrective entries, i. e. to reduce the quotient by one and to add the divisor once more to the accumulating switches S concerned with these operations. The detailed operations involved are explained hereinafter.

For the particular example under consideration, this correction would mean that the last reading, 974, would be increased by 219 which would give 193 and thus, since SCA is now functioning, the final and correct result.

The fact that the first switch has now carried over indicates that the quotient 3 is correct. The quotient switch is scrutinized and the number 3 printed; the three accumulating switches are also scrutinized if desired and the remainder 193 is similarly recorded on paper tape. Alternatively, the remainder 193 may be retained in the calculator as part of a fresh dividend and another quotient digit extracted in a similar manner, a fourth accumulating switch being assigned to provide for the necessary additional digits in the dividend.

Other features relating to division are brought out in the detained description.

DETAILED DESCRIPTION

*Operator's unit*

A detailed description of the operator's unit OU and the access equipment will now be given so that the subsequent detailed description of the associated calculator or calculators may more readily be understood. Each operator's unit OU (Fig. 3) includes a key set KS having twenty keys 90 (Figs. 3 and 70) by which signals representing numerals and signs may be sent to the calculator to perform calculations and operations hereinafter described. Certain resulting signals representing records or results of computations are then sent from the calculator to the printer P to operate the latter to print the result on a paper strip or tape 100 (Fig. 66).

*Key set*

Figure 12:
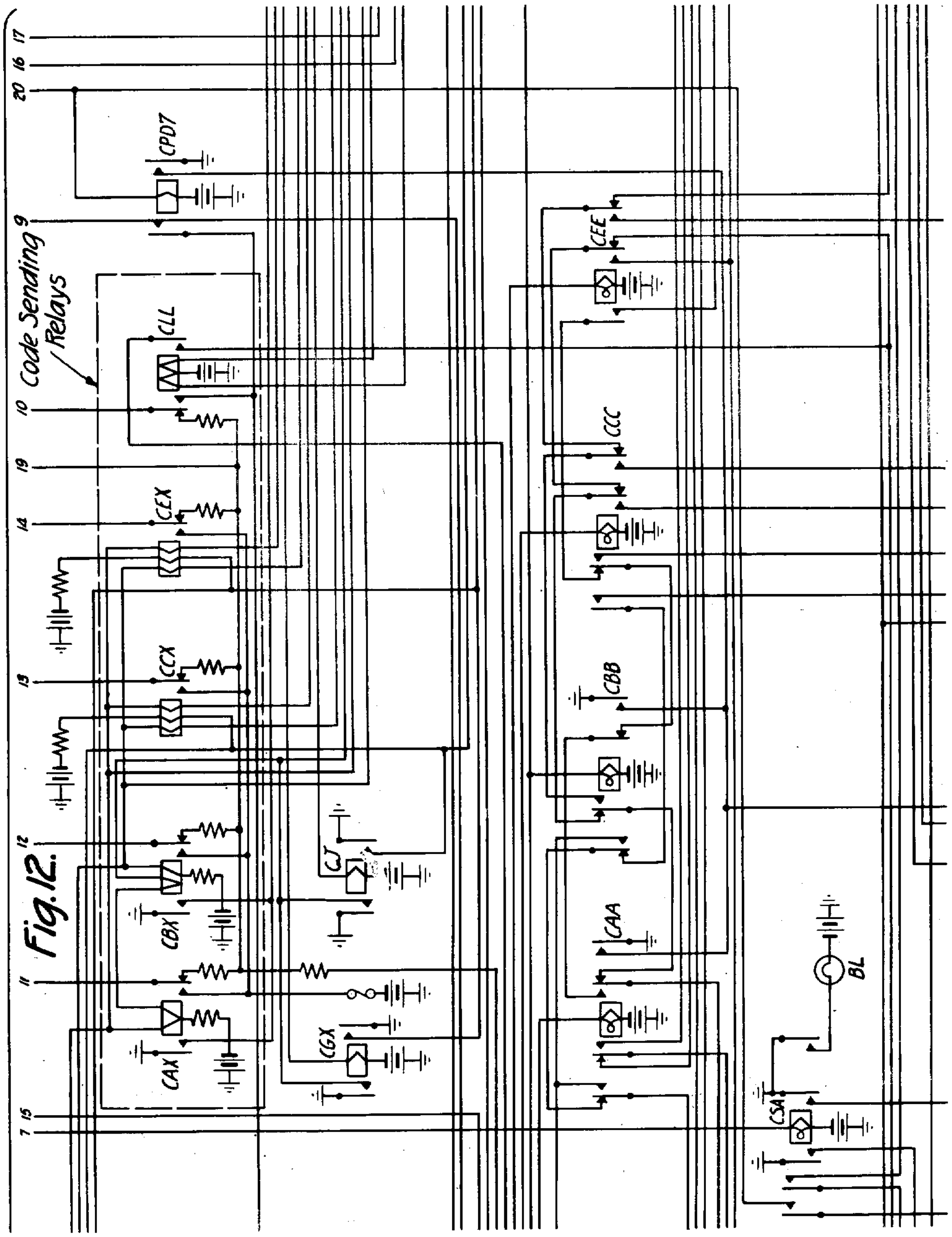

Each of the twenty keys is provided with a switch 93 having one or more contact springs and each contact spring is connected to one of the wires 1 to 6, inclusive (Fig. 3). The operation of each key causes the closing of its associated contact or contacts in the combinations shown in the table (Fig. 68), to send a signal in code by completing a circuit to ground. Thus, when the 0 key, designated in the first vertical column at the left of the table, is operated, it causes contact of wire 5 to close. When the 1 key is operated it closes the contacts of wires 1, 2, 4 and 5 and when the 4 key is operated it closes the contacts of wires 1, 2, 3 and 5 etc. After a calculator has been attached to one of the operator's units, in a manner hereinafter described, closing of these switches causes various signals in code to be transmitted to various code receiving relays CA, CB, CC, CG, CF (Fig. 10) of the calculator equipment. After these relays have operated and performed their function in the calculator certain signals are sent from the calculator by means of the code sending relays CAX, CBX, CCX, CEX and CLL (Fig. 12). The signals are sent over wires 11, 12, 13, 14 and 15 to magnets K1, K2, K3, K4 and K5, respectively, of printer P (Fig. 3) to operate them in groups as indicated in the table (Fig. 69) corresponding with the code signal being sent by the calculator to cause the printer P to print the result on the paper tape 100 (Fig. 66).

*Printer*

The magnets K1, K2, K3, K4 and K5 are type selecting magnets and only these and a printing magnet K6 are shown in Fig. 3. A more complete illustration, although diagrammatic, of these magnets and the mechanism operated thereby, is shown in Fig. 66, where the type selecting magnets K1–5 cause simple and compound movements of suitable levers and links to rotate a type-wheel or shuttle 101 through various angular distances from a normal position of rest to select any one of the types 102 in any one of three rows 103, 104 and 105, and shift the type-wheel axially to the row in which the desired type is located.

*Type-wheel*

The types are arranged on the type-wheel 101 as shown in Figs. 66 and 67 and the type-wheel is supported on a shaft 105 rotatably supported in fixed bearings 106. A spline 107 connects the type-wheel 101 with the shaft 106 so that the type-wheel may be rotated thereby and be shifted axially thereon to selectively position any one of the types 102 at the printing point.

*Printing hammer*

The printing is effected by a type hammer 108 which swings about a pivot 109 against the tape 100 interposed between the type-wheel and said printing hammer. A ribbon 110 is located in front of the tape 100 and is engaged by the hammer to effect the printing on the tape. The hammer is operable by magnet K6 which, when energized, actuates its armature 112, against the action of a spring 112*a*, about a fixed pivot 113. The free end of the armature 112 is connected by a link 114 to an arm 114*a* of the printing hammer to actuate the latter about its pivot 109 towards the type-wheel.

*Paper tape and feed*

The tape 100, upon which the printing is effected, is located close to the type-wheel 101 and extends axially thereof. It is conducted from a supply roll 115 and is guided by rollers 116, 117. The tape is further guided by rollers 118 and 119 by which it is also fed one letter-space distance after each printing operation. The tape feeding operation is effected by a pawl 120 cooperating with a ratchet wheel 121 secured to the roller 118. The pawl 120 is pivotally connected to arm 114*a* of the printing hammer and is pressed against the ratchet 121 by a spring 119*a*. With this arrangement, the printing hammer 108, as it operates towards the type-wheel 101, causes the pawl 120 to slide idly over the teeth of the ratchet 121. On its return stroke, however, the pawl operates the ratchet 121 thus causing the roller 118 to rotate in a counter-clockwise direction (Fig. 66) and feed the tape 100 a letter-space distance in cooperation with pressure roller 119.

The signals after they are sent out from the key set KS of the operator's unit in code, see table (Fig. 68), and have functioned in the calculator, are returned from the calculator to the operator's unit and cause the various magnets K1 to K5 to operate in the combinations indicated in the table (Fig. 69), to selectively position the type-wheel with respect to the printing point.

By an inspection of Fig. 67 it will be seen that the three characters 0, the period (.) and the comma (,) are in alignment axially of the type-wheel, or in other words, on a horizontal line Z which normally is in alignment with the printing point. The vertical row 102 of type also is normally in alignment with the printing point.

Consequently, the character 0 normally registers with the printing point and in order to print this character, it is not necessary to actuate the type wheel but merely to operate the printing hammer 108. Accordingly, the table (Fig. 69) indicates that only the printing magnet K6 operates to print the character 0. To select any other type in the row 102 it is necessary to rotate the type-wheel 101 an angular distance corresponding with distance of the type from the printing point.

*Type selecting*

The type selecting mechanism is operable by the magnets K1 to K5 and will now be described. It includes a variable operable lever 125 which normally occupies the position indicated diagrammatically by a full line (Fig. 66) from which position it may be actuated clockwise about a pivot 125*a* to any one of three positions 1, 2 and 3, respectively. It may also be actuated from its normal or 0 position in a counterclockwise direction to any one of four other positions 4, 5, 6 and 7, respectively. Said lever is suitably connected to a rack 126 to actuate the latter upwardly or downwardly from a neutral position (Fig. 66) to accordingly rotate a pinion 127 secured to the type-wheel shaft 105 to thus rotate the type-wheel 101 in opposite direction from a position of rest, indicated by a dotted line Z (Fig. 67). The type-wheel is movable through various angular distances corresponding to the linear distances through which the rack 126 is operable by the lever 125, to align any one of the horizontal rows of types with the printing point.

The variably movable lever 125 may be actuated to its position 1, 2 or 3 by the operation of either of the magnets K1 or K2 or by a combined operation of both magnets, respectively. For this purpose the magnet K1 is provided with an armature 130 having a fixed pivot 131 about which it may be operated. The armature 130 is normally held against a stop 132 by a return spring 133. The free end of the armature 130 is connected at 134*a* to an intermediate lever 134 to actuate the latter about a pivot 136. The lever 134 in turn is connected at 135 to one end of the variably movable lever 125 to operate the latter. A link 137 carries the lever 134 at the pivot 136 and the opposite end of said link is connected at 138 to an armature 140 of the magnet K2. The armature 140 is supported similarly to the armature 130, on a fixed pivot 141 and is held normally against a stop 142 by a return spring 143 but may be operated upwardly by the magnet K2.

From the foregoing, it will be understood that upon energization of magnet K1, its armature 130 operates about pivot 131 to actuate the lever 134 about its pivot 136. The lever 134, which operates as one of the first order about its pivot 135, thus actuates the lever 125 to its position 1 to rotate the type-wheel and thus carries the horizontal row of types 9, 6, 3 into alignment with the printing point. If the magnet K2 is operated alone it pulls up its armature 140 to actuate the lever 134, as one of the third order, about its pivotal connection 134*a*, through the medium of the link 137, thus to actuate the variably movable lever 134 to its position 2. If both magnets K1 and K2 are operated simultaneously, their armatures 130 and 140 produce a compound motion of the means including the lever 134 and the lever 125 to carry the latter to its position 3 in Fig. 66. Thus, it will be understood that, as the point of connection 135, between levers 125 and 134, moves to its positions 1, 2 and 3 the right end of lever 125 (Fig. 66) moves to positions 1, 2 and 3 and accordingly the corresponding horizontal row of types below the line Z (Fig. 67) may be aligned with the printing point through the medium of the rack 126.

To align any one of the horizontal rows of types located above the line Z, with the printing point, the magnet K5 is caused to function either alone or in combination with either or both of the magnets K1 and K2 as indicated in the table (Fig. 66). The magnet K5 when energized, swings its armature 150 about a fixed pivot 151. The free end of the armature 150 has pivotally connected thereto a link 154 connected to the lever 125 at 125*a*. Thus when the magnet K5 is operated alone, its armature 150 swings the lever 125 from its lowermost position, about its pivotal connection 135, to its position 7 (Fig. 66). Since this pivotal connection 135 may be moved from its normal to any one of three positions 1, 2 and 3 as previously described, in connection with the operations of magnets A and B, the lever 125 may be operated about the normal position of pivot 135 or about any one of its three operated positions to carry its right end to any one of four positions 4, 5, 6 and 7. The lever 125 accordingly operates the rack 126 and thereby imparts corresponding rotary motions to the type-wheel to align one of its four horizontal rows of types, above the position of rest Z, with the printing point. The lever 125, while being operated by the magnet K5, serves as one of the third order.

From the foregoing it will be understood that the vertical row 102 of types is normally in alignment with the printing point, and to select any one of the types in this row except the zero (0), it is merely necessary to rotate the type-wheel in either of two opposite directions from its home position, through an angular distance depending on the angular distance of the type from the printing point.

*Type-wheel shift*

To align any one of the rows 103 or 104 of types with the printing point, provision is made to shift the type-wheel 101 to align either the second row 103 of types or the third row 104 with the printing point. The type-wheel is then rotated, if necessary, through the proper angular distance to register the selected type at the printing point.

The shifting of the type-wheel is accomplished by either of the two magnets K3 and K4 (Figs. 3 and 66), which have armatures 160 and 161, respectively. These armatures are like the armatures 130 and 140 of magnets K1 and K2. When the magnet K3 is operated, it swings its armature 160 about a fixed pivot 161 to actuate a lever 165, as one of the first order, about a pivot 166 on a link 167. The lever 165 engages a bell-crank 168, through a suitable connection 169, to actuate it about a fixed pivot 170, to an intermediate position. The free end of the bell-crank 168 has a head 171*a* engaging in an annular groove 171 of a hub 172 on the type-wheel 101. This construction permits shifting the type-wheel axially on shaft 105 and thus aligns the second or intermediate vertical row 103 of types with the printing point. It also permits freedom of rotation of the type-wheel about the axis of shaft 105. In the event that the dot (.) of row 103 of types is to be printed, the printing magnet K6 is operated subsequent to the shifting of the type row 103 into alignment with the printing point. If any one of the other types in the row 103 is to be printed, either one of the magnets K1 and K2 or both may be operated with the magnet K5 to register the selected type at the printing point, and subsequently, the printing magnet K6 to print the selected type.

To print any one of the types in the third row 104, the type-wheel is shifted to carry said row of types into alignment with the printing point by the magnet K4 which, when energized, pulls up its armature 161 to actuate the lever 165 about pivotal connection 164 through the medium of link 167, while armature 160 of magnet K3 is in its home position. The lever 165 now serves as one of the third order and actuates the bell-crank 168 to its third position to accordingly shift the type-wheel and thereby align the row 104 of types with the printing point. If the magnets K1, K2 and K5 remain unoperated, the comma (,) is printed upon the actuation of the printing magnet K6. If another one of the types in row 104 is to be printed, it may be registered at the printing point by the operation of one or more of the magnets K1, K2 and K5 in accordance with the table (Fig. 69) to select the desired type in the row 104. It will be understood that for each type selecting operation the printing magnet K6 is also operated as indicated in said table.

*Bi-color ribbon shift*

The ribbon 110 is fed transversely of the paper tape 100 past the printing point from one spool to another (not shown). It has two fields, a black field 175 and a red field 176, so that all of the numerals from 0 to 9 and two of the signs (.) and (,) may be printed in black and all of the other signs may be printed in red (see table, Fig. 69). The black field 175 is normally in alignment with the printing point where it is held by a suitable guide 177 during the printing of all of the types on the line Z and those below it (Fig. 67). All of the types to be printed in red are located above the line Z and any one of them, when selected, may be printed in red through the field 176 of the ribbon.

It will be remembered that the magnet K5 enters into the selecting operation of any one of types above line Z and that during such selecting operations the armature 150 actuates the lever to any one of the positions 4, 5, 6 and 7 (Fig. 66). Accordingly suitable ribbon shifting means is provided which is operable by the magnet K5. This means includes a link 180 connected to the armature 150 and to a bell-crank 181 (Fig. 66). When the armature 150 is actuated the bell-crank 181 is operated about a pivot 182 to pull a link 183 rightwardly and thus shift the ribbon guide 177 to align the red field 176 thereof with the printing point. Spring 152 restores the armature to normal after printing and consequently restores the ribbon to normal with its black field in alignment with the printing point. It will be understood that the ribbon is restored to black printing after each red printing operation.

*Keys and lock*

The keys 90 (Fig. 70) are arranged in adjacent parallel rows, two keys of one row being shown in the drawings. Each key has a stem 191 which is guided for vertical movement in fixed plates 192, and each stem 191 has a wedge-shaped portion 191*a* rigid on the lower end thereof and suitably insulated therefrom, to close all of the contacts of the associated switch 193 and thus send the signal in code to the calculator in a manner hereinafter more clearly described.

The keys 90 are locked after a signal has been initiated by any one of them to prevent operation of another key until the result is printed by the printer P. To this end there is provided key locking means 195 (Fig. 70) which is herein illustrated as including a plurality of parallel locking bars 196 one for each row of keys. These bars 196 are guided by suitable means (not shown) and are secured to a transverse bar 197 having a lug 198 which is connected by a link 199 to an armature 200 of locking magnet K7.

Upon the depression of any one of the keys 90 the locking magnet K7 is energized, in a manner hereinafter described, to swing the armature 200 about a fixed pivot 201 away from a fixed stop 202 against the action of a return spring 203. The armature 200 pulls link 199 to move the locking bars 196 rightwardly (Fig. 70) to carry lugs 205 thereon under lugs 204 on the key stems of all of the unoperated keys to lock them in their normal positions. The operated key is also locked but in its depressed position by the associated locking lug 205 which moves over the lug 204 on the key stem 191 of the depressed key. The downward movement of each key may be limited by means including a suitable stop (not shown).

Thus it will be understood that by the above-described locking means 195 all of the unoperated keys 90 may be locked against operation and that the operated or depressed key is locked against return to normal while the code signal is being received by the calculator, while the resulting code signal is being sent from the calculator, and until the result is printed. As soon as the character corresponding to the operated key is printed by the printer P, the magnet K7 becomes deenergized, in a manner hereinafter described, to permit the armature 200 to return to normal under the influence of the return spring 203. The armature returns the locking bars 196 to normal to unlock all of the keys to permit the return of the operated key by its spring 206, and free all of the keys for future operation. Provision is also made to lock all of the keys in normal position as for example during the printing of the continuation sign (...) which follows the operation of the start key SKT or during the printing of the three commas (,,,).

The printer and the key set, including the key locking means, although somewhat different in structure, operate in principle, like those shown in application.

Description will now be given in detail of the various circuits.

ACCESS EQUIPMENT

*Seizing of 1st calculator*

Normally the operator's unit or stations OU1, OU2, OU3, OU4 etc. (Fig. 1) are disconnected electrically from the through calculators *Ca1*, *Ca2* and *Ca3*. Each calculator has associated therewith an access unit AU which is wired in multiple to two line selecting units *Li* of which there is one for each operator's unit OU.

The operator's units are small and occupy little space and are located in various rooms or offices R of a building B. The line selecting units L, the calculators *Ca* and the access units AU occupy comparatively more space and are accordingly located in less occupied space such as the cellar C of the building to provide an exchange *Ex* where the apparatus of the units Ca, AU and L may readily be inspected or repaired by an exchange attendant.

Most of the circuits are designated by numbers. This is for convenience in referring back to them when necessary. In most instances the circuit numbers indicate the sequential order of the circuits. This, however, does not hold true in all cases.

When a calculator Ca is to be used, a start key SKT (Fig. 3) is depressed which results in the operation of relay Lar (circuit 1).

*Circuit 1.*—Battery, high resistance winding of Lar (Fig. 5), relay Lbr (not actuated) wire 7, lamp L, not lighted (Fig. 3), switch S, wire 9, wire 8a, ground, thus operating Lar to establish circuit 2.

*Circuit 2.*—Battery, Str1, Lbr back, Lar front 2, ground. Relay Str1 (Fig. 5) operates to put test potential on all C arcs of the access markers AM of the 1st, 2nd and 3rd access circuits. Test potential includes battery (Fig. 5), resistance LY, Lar front 1, 1st AL wire 19 (Fig. 6) to arc AMC. Wires 19 of 2nd AL and 3rd AL are connected in multiple with wire 19 of 1st AL and consequently the test potential is put on the arcs AMC of the access circuits associated with the 2nd and 3rd calculators, respectively, as well as the 1st calculator. Str1 at the same time establishes circuit 3.

*Circuit 3.*—Battery, CZ back 1 (Fig. 11), AC wire 18 (Fig. 7), relay Ar1 (Fig. 6), Ar8 back (Fig. 8), jack BJ, 1st AL wire 22 (Fig. 5), Str1 front 1, ground.

It is assumed that all of the calculators are available and that parallel operation will be introduced for mutual checking. The access unit which is first to become connected to, or in other words be seized by, the calling line is referred to as the 1st access unit. The other two access units will be referred to for convenience as 2nd and 3rd access units. It should be understood, however, that any one of the three access units may be the first to be seized.

Figure 1:
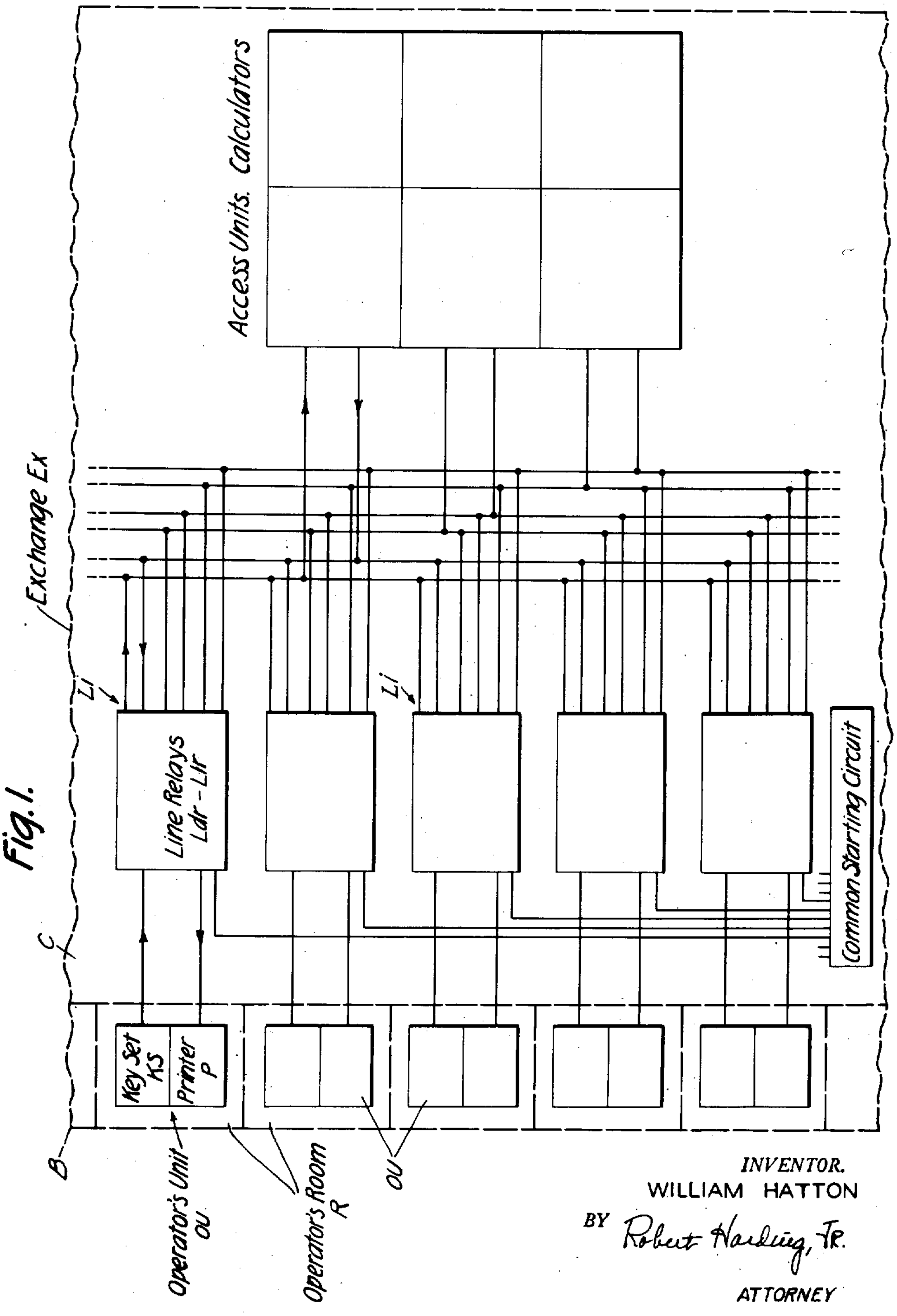
Fig. 1 is a schematic block diagram illustrating a plurality of operators' stations and an exchange associated therewith.
Figure 1A:
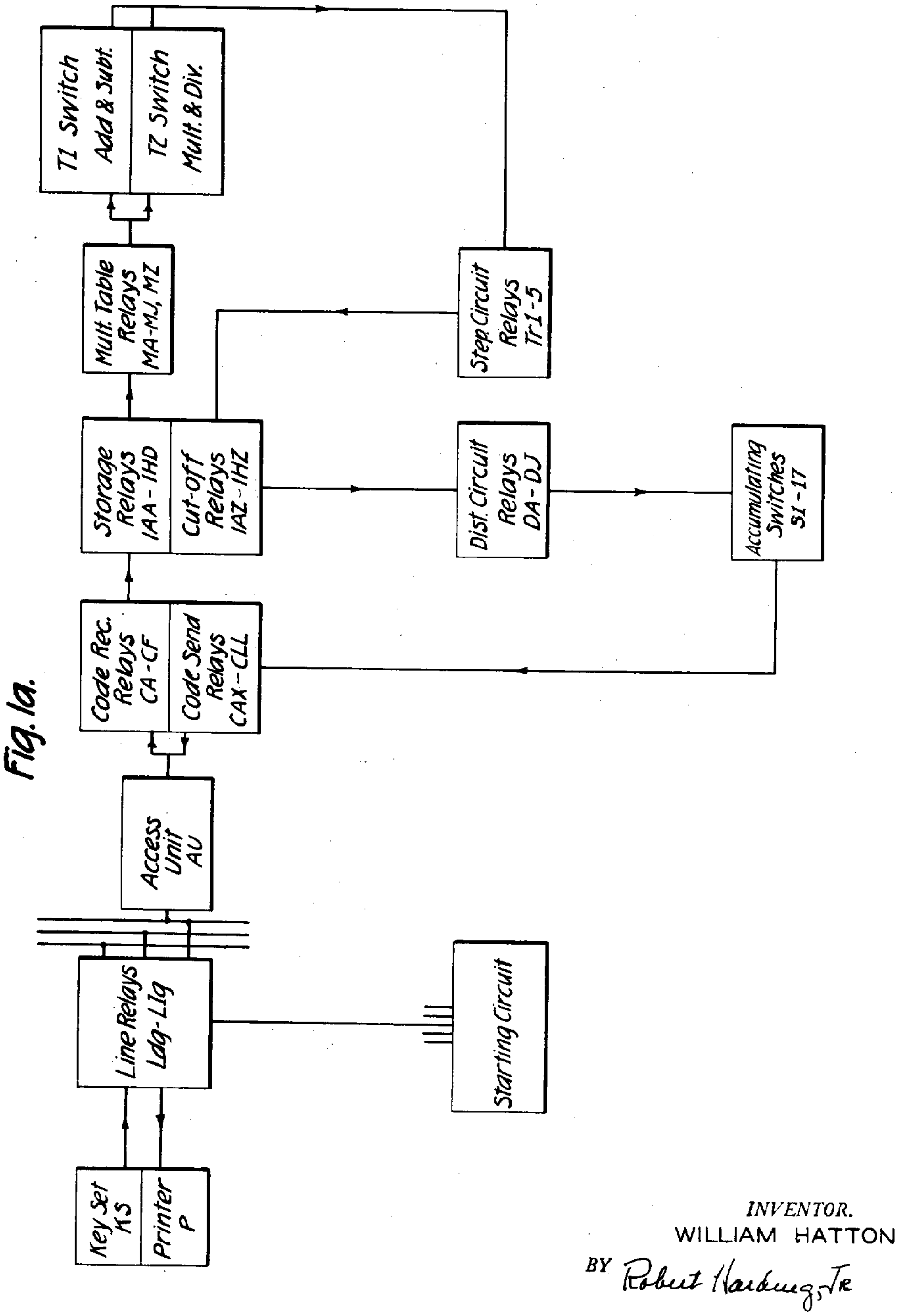
Fig. 1a is a schematic block diagram illustrating a single operator's unit connected with a single calculator. It also indicates various operations performed.

At the same time that Str1 established circuit 3 it causes two more similar circuits to be established, over Str1 front 2 and front 3, which extend into two access units associated with calculators Ca2 and Ca3, respectively (Fig. 1). Each of these access units is in construction like the one shown in Figs. 6 to 9, associated with calculator Ca1. Consequently, when Ar1 becomes energized, Ar1' (Fig. 6') also becomes energized over wire 18' extending to the 2nd calculator.

Relay Str1 causes the actuation of relays Ar1 in all access circuits of the free calculators or in other words those which are not employed at the moment. It will be assumed that calculators Ca1 and Ca2 are free. Energization of Ar1 (Fig. 6) in the 1st access circuit establishes circuit 4.

*Circuit 4.*—Battery, coil of switch AM (Fig. 7), interrupter contact AM I, Ar18 back, Ar17 back, Ar1 front 2, ground.

At the same time Ar1' (Fig. 6a) establishes a circuit similar to circuit A4' in the 2nd access unit and a second similar circuit in the 3rd access unit.

Figure 6:
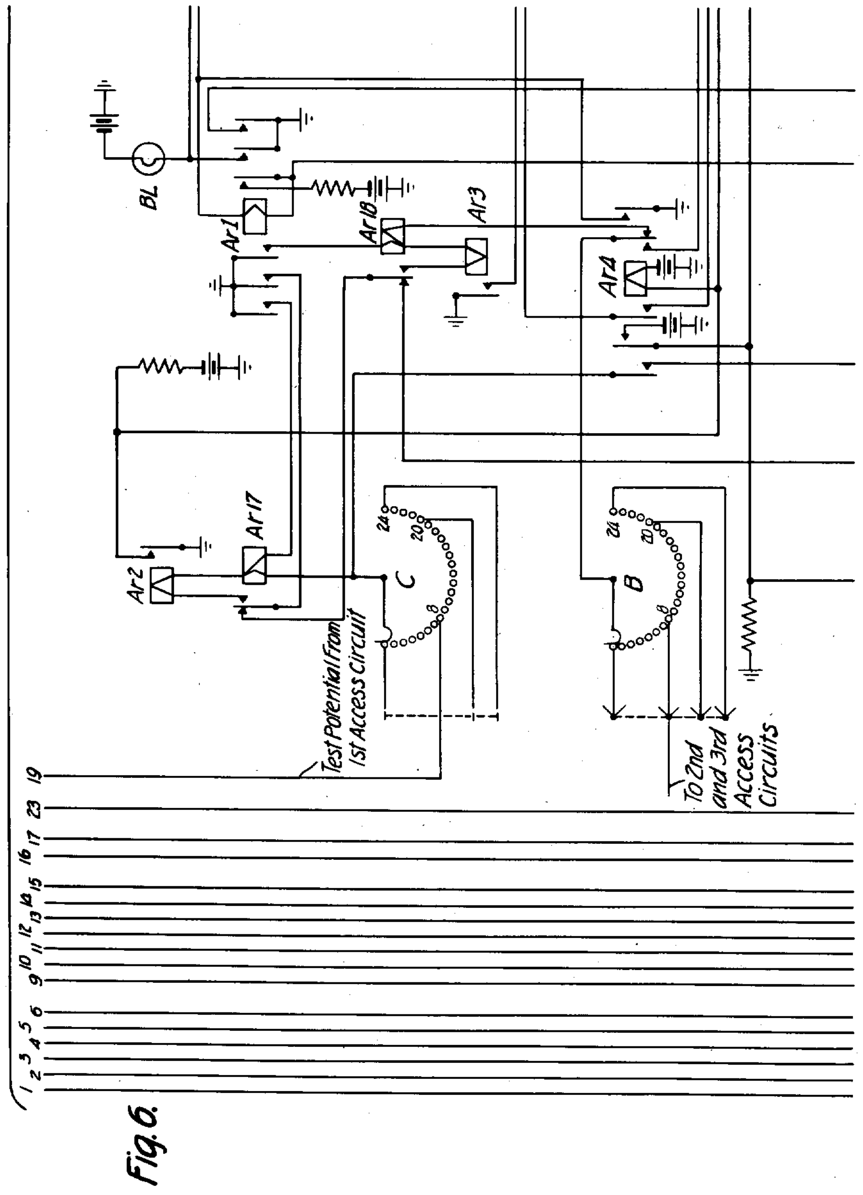
Figure 6A:
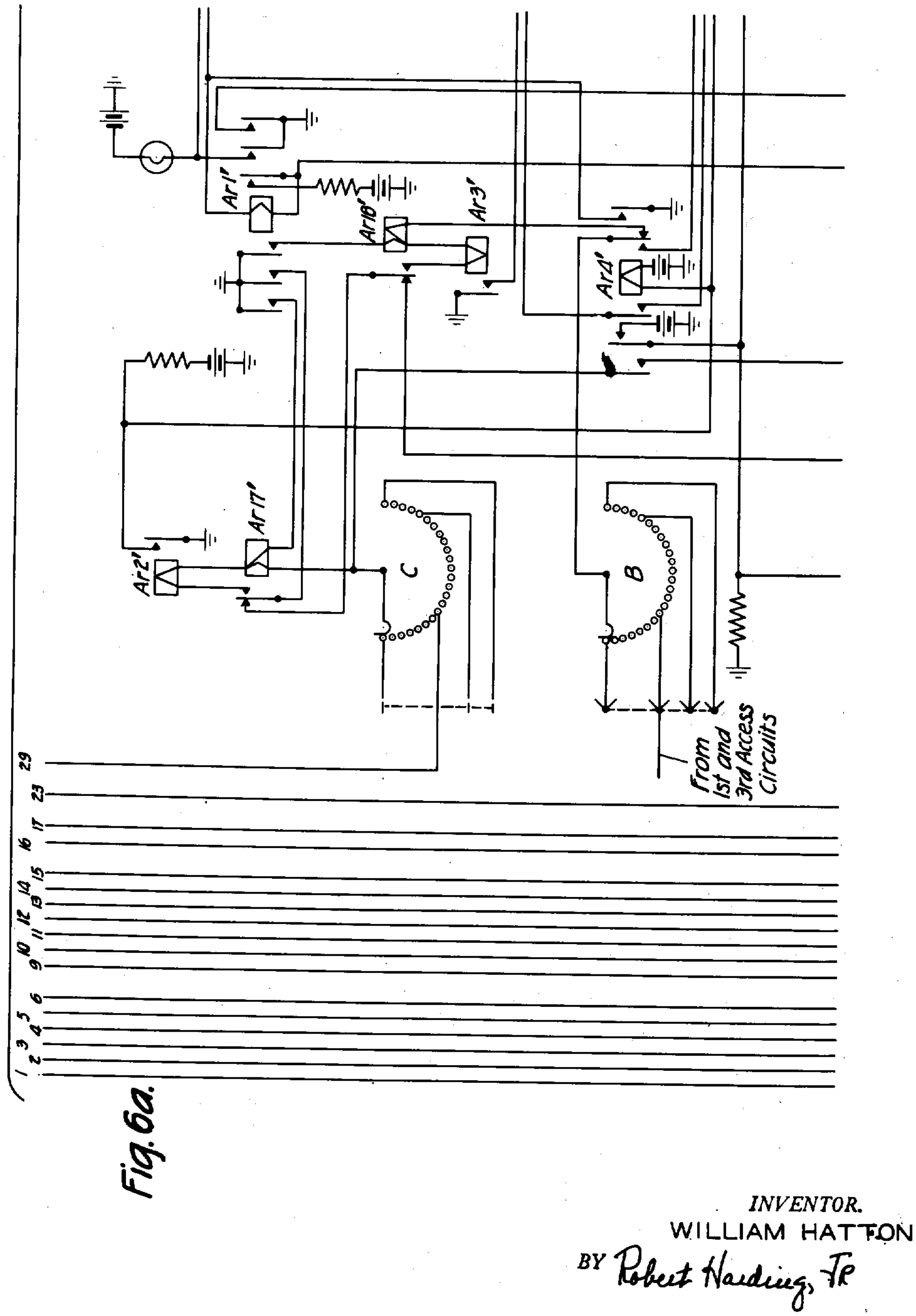

Thus the switches AM in all free calculators start operating to rotate their wipers each switch causing its wipers including AMC and AMC' to hunt for the calling test potential, wires 19 (Figs. 6 and 6a). It is assumed that the wiper AMC, of the 1st access circuit is the first to reach the calling line, wire 19. Consequently, Ar17 is energized to establish the test potential circuit 5.

*Circuit 5.*—Battery, LY (Fig. 5), Lar front 1, Lcr back 1, 1st AL wire 19 (Fig. 6), wiper AMC (Fig. 6), Ar17, Ar1 1, ground.

Circuit 4 is opened at Ar17 back to stop the rotation of switch or marker AM to render it busy. The switches AM in the other free access circuit, however, continue to operate since their wipers C have not yet reached the calling line 19. At the same time contact Ar17 1 changes over to establish circuit 6.

*Circuit 6.*—Same as circuit 5 to relay Ar17, then low resistance relay Ar2, change over contact of A17, Ar1 front 2, ground.

Relay Ar2 is a marginal relay and it functions to guard against double test by causing the 1st access unit to become disconnected from the calling line so that the associated calculator Ca1 cannot be seized by another operator's unit which may send a call.

As soon as the brush C of marker AM stops on the calling wire 19 (Fig. 6), suitable connecting relays in the line circuit are operated. Each operator's unit has associated therewith three lines in multiple, each line extending to one of the access units and each line has a set of three such connecting relays. The connecting relays associated with the 1st access unit are designated Ldr, Ler, and Lfr (Fig. 5), those associated with the 2nd unit circuit are designated Lgr, Lhr, and Lir (Fig. 3) and those of the 3rd access unit are designated Ljr, Lkr, and Llr. Relays Ldr, Ler, and Lfr of the 1st line, when operated as hereinafter described, connect line wires 1 to 18 with calculator Ca1. Similarly the set of relays Lgr, Lhr, Lir and Ljr, Lkr, Llr connect their associated wires with calculators Ca2 or Ca3, respectively, if the 2nd and 3rd access circuits are successful in testing.

The operation of connecting relays Ldr, Ler and Lfr is effected as a result of closing Ar2 front in circuit 6 and the resultant energization of Ar4 (circuit 7).

*Circuit 7.*—Battery, relay Ar4 (Fig. 6), Ar2 front, ground. Thus Ar4 operates to establish circuit 8.

*Circuit 8.*—Battery, Ar4 front 2 (Fig. 6), wiper A of marker AM, now off normal, 1st AL wire 23 (Fig. 5), relays Ldr, Ler and Lfr, each to ground.

Thus all of the contacts of relays Ldr, Ler and Lfr are closed to partially establish circuits over wires 1–6 and 9 extending from the code sender KS (Fig. 1) to the calculator Ca1, and over wires 10–17 extending from calculator Ca1 to the printer P. Relay Ler also partially closes a circuit over wire 8 to a traffic meter SM (Fig. 5).

*Seizing of 2nd calculator for checking*

Relay Ar4 upon operation (circuit 7) also connects calling potential for a second calculator (circuit 9) in preparation for checking.

Figure 7:
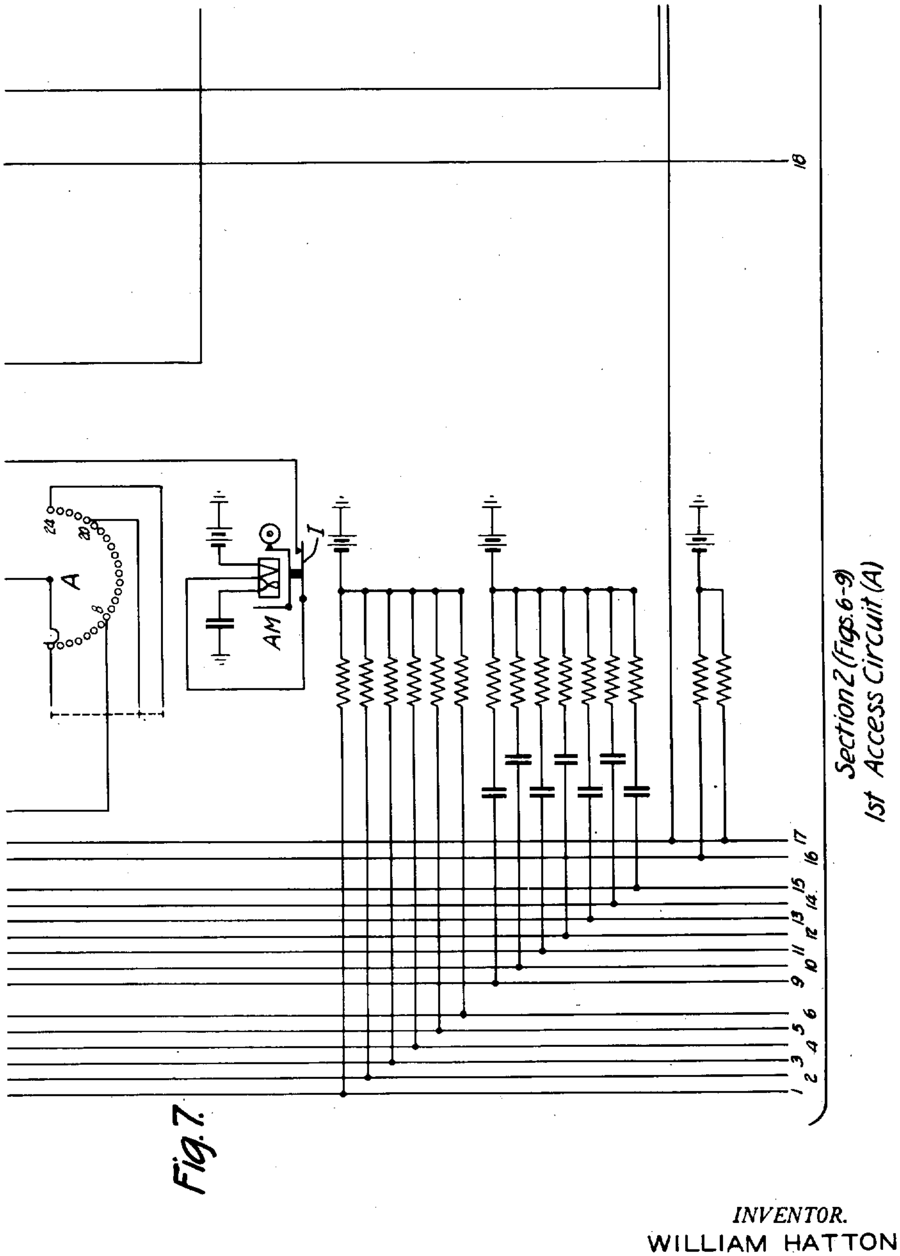

*Circuit 9.*—Battery, resistance AY14 (Fig. 8), Ar6 back, Ar4 front 4 (Fig. 6), AMB off normal, multiple connections to arc B' (Fig. 5a) of switch AM' of 2nd access unit, then to wiper B', as soon as the latter reaches the multiple connection extending from the arc contact engaged by the brush B in Fig. 7, then Ar4' back, Ar18', Ar1' front 3, ground.

It will be remembered that the terminals of arcs C of switches AM in the three access circuits are multipled (Figs. 4 and 5). Consequently, since the starting circuit (circuit 1) is still active due to relay Lar the selecting markers AM of the other two access circuits continue to rotate after the marker AM of the 1st access unit stops and until one of them is stopped by the relay Ar18 of its associated access unit, the relay Ar18 of each access circuit being connected to wiper B of its switch AM. The multiple connections of the arcs C are indicated in Figs. 6 and 6*a*.

The switch AM of the 1st access circuit was made busy by breaking opening circuit 5 at Ar17 back. When Ar18' of 2nd access unit operates (circuit 9) it makes the calling potential of the 2nd access unit busy by energizing low resistance relay Ar3 of Fig. 6*a* (circuit 10).

*Circuit 10.*—Same as circuit 9 to relay A18' (Fig. 6*a*), relay AR3', AR3' front, AR17' back, AR1 front 2, ground.

Figure 7A:
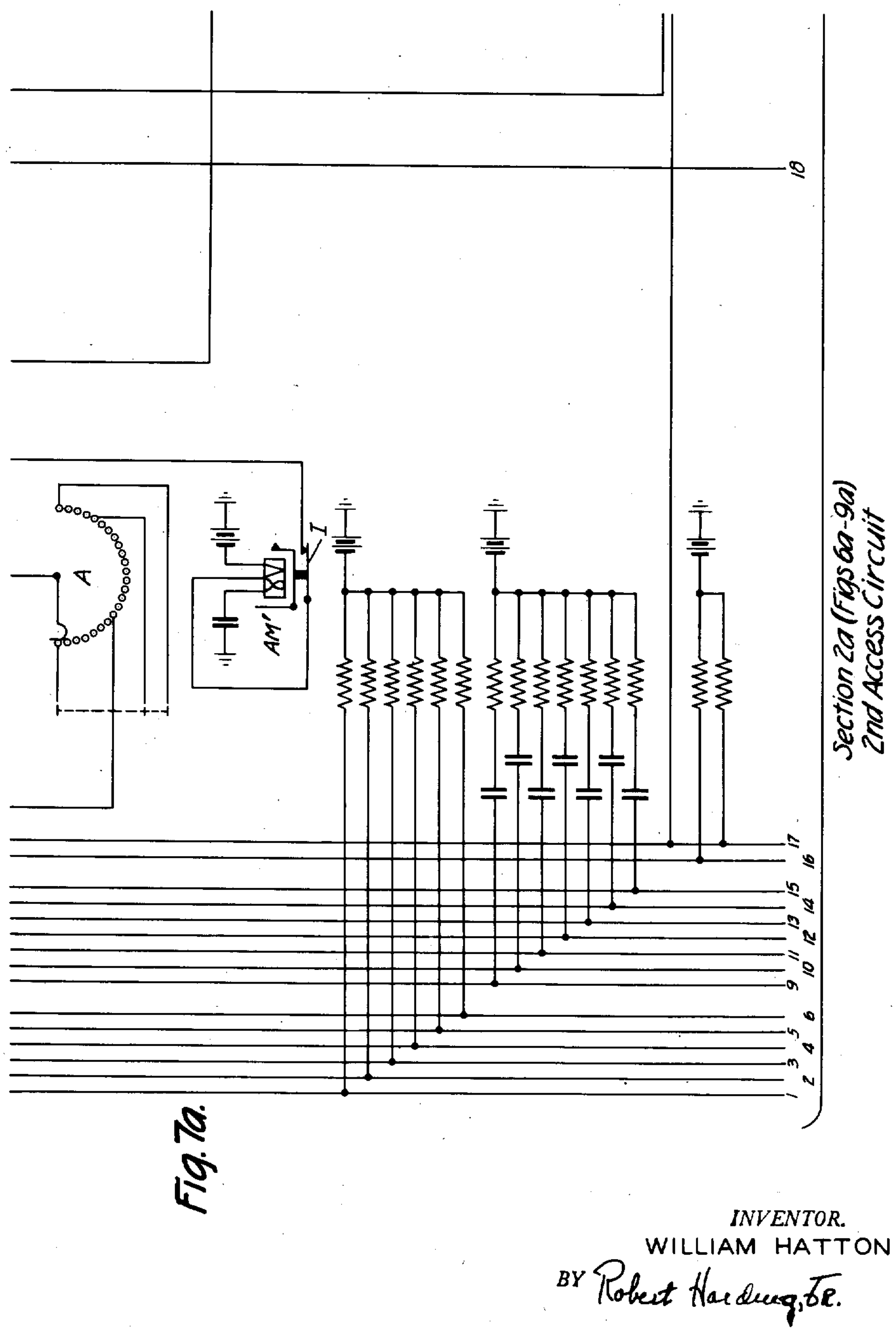

Thus the switch AM' (Fig. 7*a*) is made busy by breaking the operating circuit of AM' (Fig. 7*a*) at Ar18 back When relay Ar3' (Fig. 6*a*) operates it causes the operation of its helping relay Ar5' (circuit 11).

*Circuit 11.*—Battery, Ar5' (Fig. 8*a*), Ar3' front (Fig. 6*a*), ground.

Relay Ar5' connects battery to brush A' of switch AM' and thereby operates the connecting relays, of the 2nd access unit (circuit 12).

*Circuit 12.*—Battery (Fig. 8*a*), Ar5' front 1, brush A' (Fig. 7*a*), wire 23 2nd AL (Fig. 4), relays Lgr, Lhr, and Lir, each to ground.

It will be remembered that the similar circuit (circuit 8) for operating the connecting relays Ldr, Ler and Lfr of the 1st access unit, starts at battery attached to Ar4 front 2 (Fig. 6). Circuit 12, however, starts at battery attached to Ar5' front 1. The wires which extend from the calling station continue to both calculators Ca1 and Ca2 in parallel.

Relay Ar5' (Fig. 8*a*) in 2nd access circuit which became energized in circuit 11 also effects energization of relays A7' and A9' (circuit 13').

*Circuit 13'.*—Battery, Ar7' (Fig. 8*a*), Ar9', Ar5' front 2, Ar1' front 5, ground.

*Circuit 13.*—Battery, Ar7, 1st AL wire 18 (Fig. 5), Lfr front 1, Lir front 1 (Fig. 4), 2nd AL wire 18 (Fig. 8*a*), Ar9', Ar5', front 2, Ar1' front 5, ground.

Ar7 pulls up Ar7 front 3 to effect energization of Ar9 (circuit 14).

*Circuit 14.*—Battery, Ar7 (Fig. 8), Ar9, Ar7 front 3, Ar1 front 5, ground.

Relays Ar7' and Ar7 of both access units are in parallel over wires 18 as soon as both connecting relays, Lfr of the first set in the line circuit, and Lir of the second set operate; relays Ar7 and Ar9 (Fig. 8) energize, therefore, simultaneously with Ar7' and Ar9' of the 2nd access circuit. Relays Ar7, Ar7' ground the AC wire 7 and AC' wire 7 over similar circuits to engage calculators CA1 and CA2 simultaneously (circuits 15 and 15').

*Circuit 15.*—Battery, CSA (Fig. 12) of calculator Ca1, AC wire 7 (Fig. 9), Ar7 front 5 (Fig. 8), ground.

Relay CSA effects various operations, hereinafter described to connect calculator Ca1 with the calling operator's unit. A similar operation (circuit 15') is effected in the Ca2 calculator and the 2nd access unit.

*Circuit 15'.*—Battery to a relay (not shown) in calculator Ca2 which is like CSA of calculator Ca1, AC' wire 7 (Fig. 9*a*), Ar7' front 5 (Fig. 8*a*), ground.

*Release of 3rd access unit*

When Ar7 operates it also closes Ar7 front 4 (circuit 16) and thus effects the release of the AM selector switch in the 3rd access circuit.

*Circuit 16.*—Battery, Lbr (Fig. 5) to operate the latter, Ler front 6, 1st AL wire 7 (Fig. 8), Ar7 front 4, Ar14 back 1 (Fig. 9), Ar13 back, ground.

Relay Lbr opens, at Lbr back, the common starting circuit (circuit 2), to de-energize Str1. This results in the opening of Str fronts 3, 4 and 5 and the stopping of the selector switch AM of the 3rd access circuit. Lbr also establishes circuit 17 to light the lamp L (Fig. 3) to indicate to the operator that at least one calculator has been seized or attached.

*Circuit 17.*—Battery, Lbr front 2, Lcr back 2, low resistance coil of Lar, Lbr, wire 7, lamp L (Fig. 3) manually operated switch S, ground.

The lamp L, it will be remembered, does not light in circuit A1 but now lights due to the fact that the high resistance of Lar has been short circuited.

When the relay Str1 is de-energized, as above mentioned, the ground is removed from Str1 front 2 and 3 thus removing it from relay Ar1 of the 1st and 2nd access circuits. This ground is replaced, however, by a holding ground on Ar4 front 5 (circuit 18) in the 1st access unit and by the holding ground on Ar5' front 3 (circuit 18) in the 2nd access unit. In the 3rd access unit, however, the relay Ar1 is completely de-energized. This results in de-energization of Ar18 in the 3rd access unit with a result that the operating circuit for the magnet of switch AM in this access unit is opened to stop the operation of said switch.

*Circuit 18.*—Same as circuit 3 to Ar1 then to Ar4 front 5, ground.

*Circuit 18'.*—Similar to circuit 3 to Ar1' then to Ar5' front 3, ground.

It should be understood that the reason for the ground being applied through Ar5' front 3 in the 2nd access circuit is that relay Ar5' is on, in other words energized, and Ar4' is off or unenergized.

It will be understood that the connecting of the seized calculators is the same. Consequently, a description of the connecting of only one of the calculators is given below.

CONNECTING OF SEIZED CALCULATORS

Relay CSA (Fig. 12) which connects the calculator to the calling operator's unit (circuit 15) causes the operation of relays CSB and CSB*a* (circuits 19 and 20).

*Circuit 19.*—Battery, CSB (Fig. 13), CZ back 2 (Fig. 11), CSA front 3 (Fig. 12), ground.

*Circuit 20.*—Battery, CSB*a* (Fig. 16), CZ back 2, CSA front 3, ground.

Energization of relay CSB causes operation of relay IX (circuit 21) to provide locking grounds for the thirty-two input storage relays IAA to IHD (Figs. 18 to 23) in the following manner:

*Circuit 21.*—Battery, relay IX (Fig. 22) IC wire 13 (Fig. 11), CSB front 5 (Fig. 13), CT wire 5 (Fig. 25), TLL back 2 (Fig. 27), ground.

Relay IX in turn operates IZ (circuit 22).

*Circuit 22.*—Battery, IZ (Fig. 20), IC wire 10 (Fig. 11), CY back, IC wire 12 (Fig. 22), IX front 1, ground.

Relay IX furnishes locking ground, to the cut-off or stopping relays IAZ to IHZ, over its front contact 3.

Relay IZ, which is operated by IX furnishes locking battery to all of the storage relays IAA to IHD.

Energization of CBS*a* (Fig. 16) establishes circuit 23.

*Circuit 23.*—Battery, relay SA (Fig. 39), SC wire 1 (Fig. 14), CSB*a* front 1, ground.

Relays SBA, SBB and SBB*a* operate (circuits 24, 25 and 26, respectively) to prepare locking circuits for the carry-over relays.

Relay SA operates SBA (circuit 24).

*Circuit 24.*—Battery, SBA (Fig. 39), SJ back 2, SA front 2, ground.

Relay SBA effects energization of SBB (circuit 25).

*Circuit 25.*—Battery, SBB (Fig. 39), SH back 2, SJ back 1, SBA front 4, ground.

Figure 38:
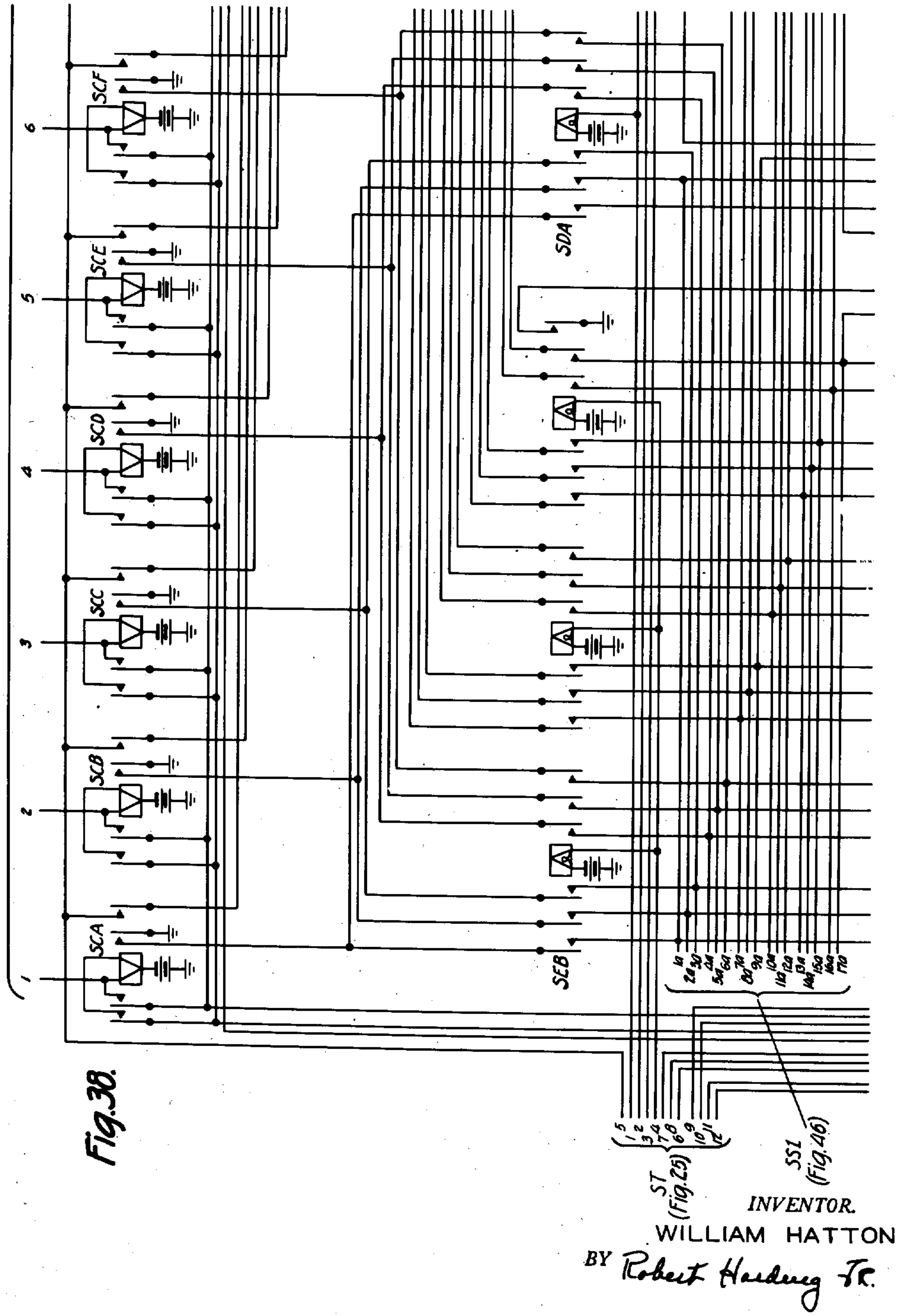
Figure 40:
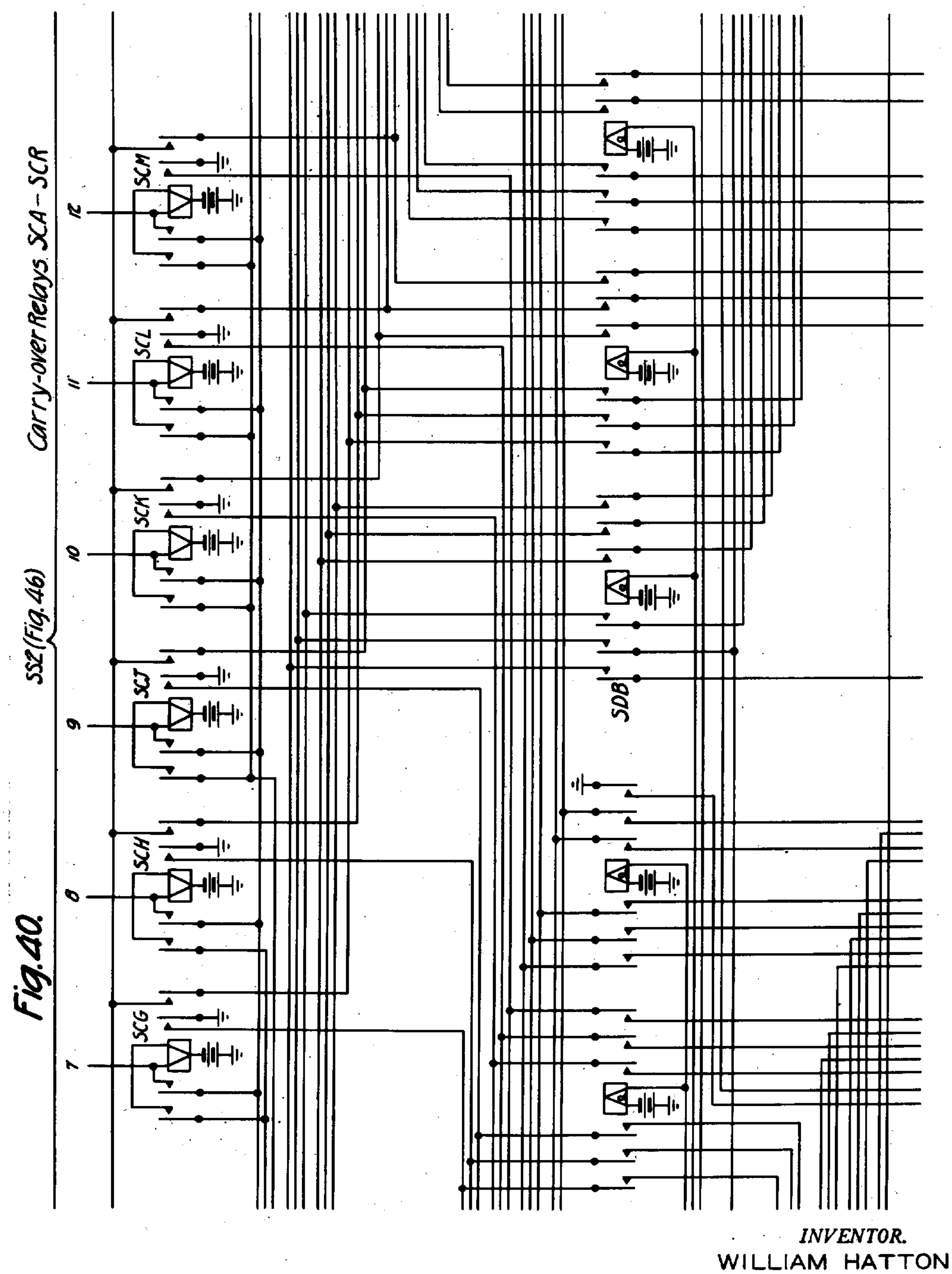
Figure 41:
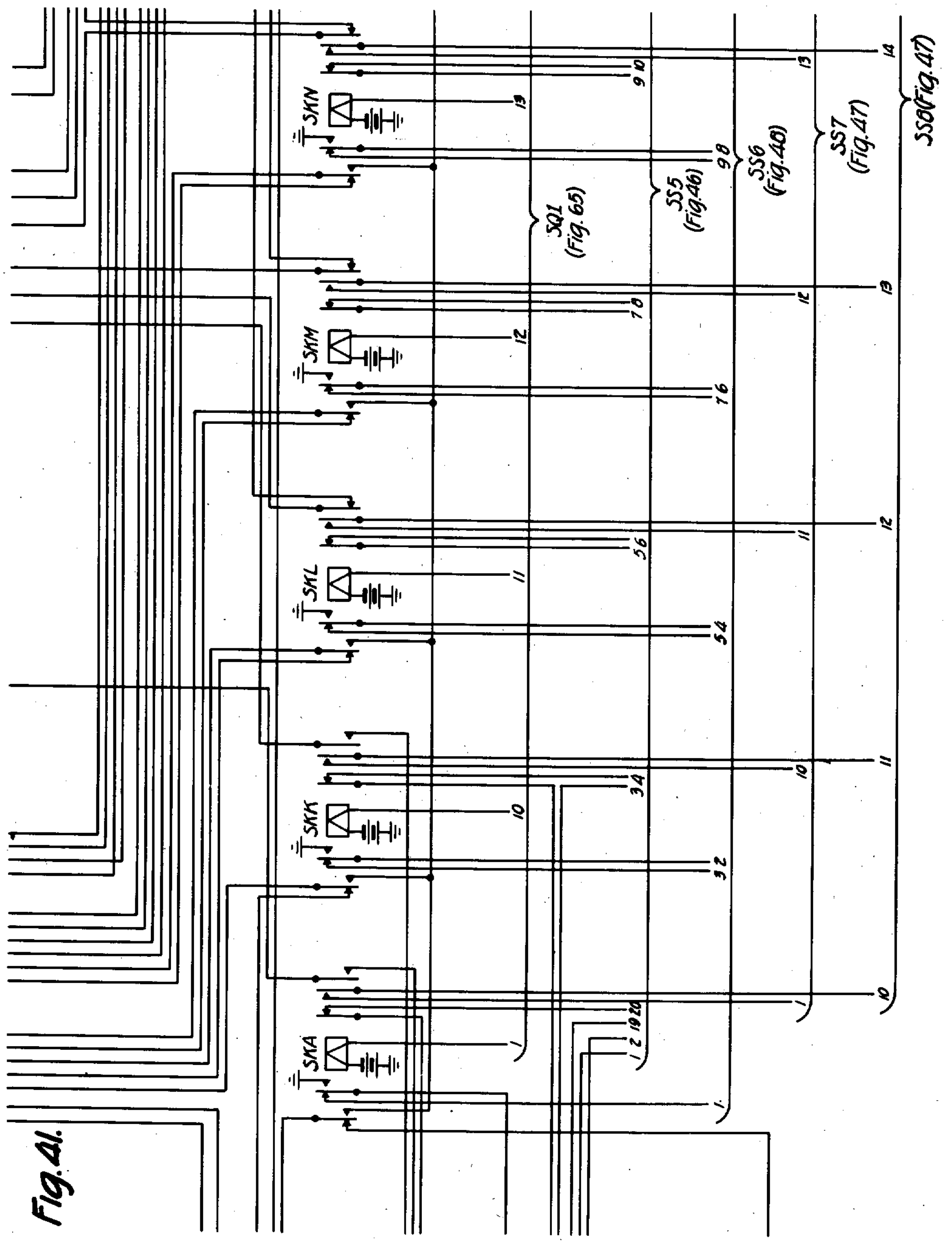
Figure 42:
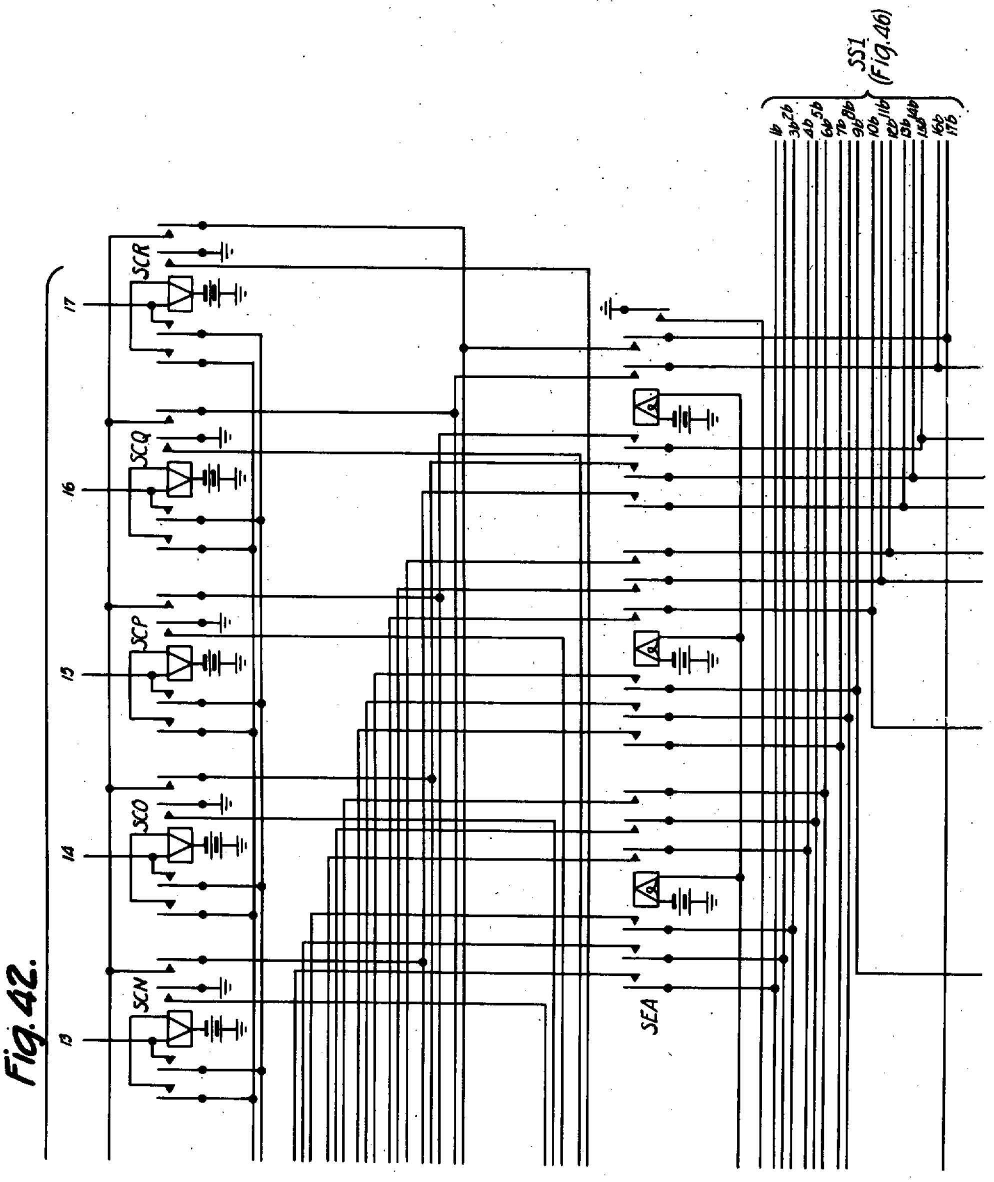
Figure 43:
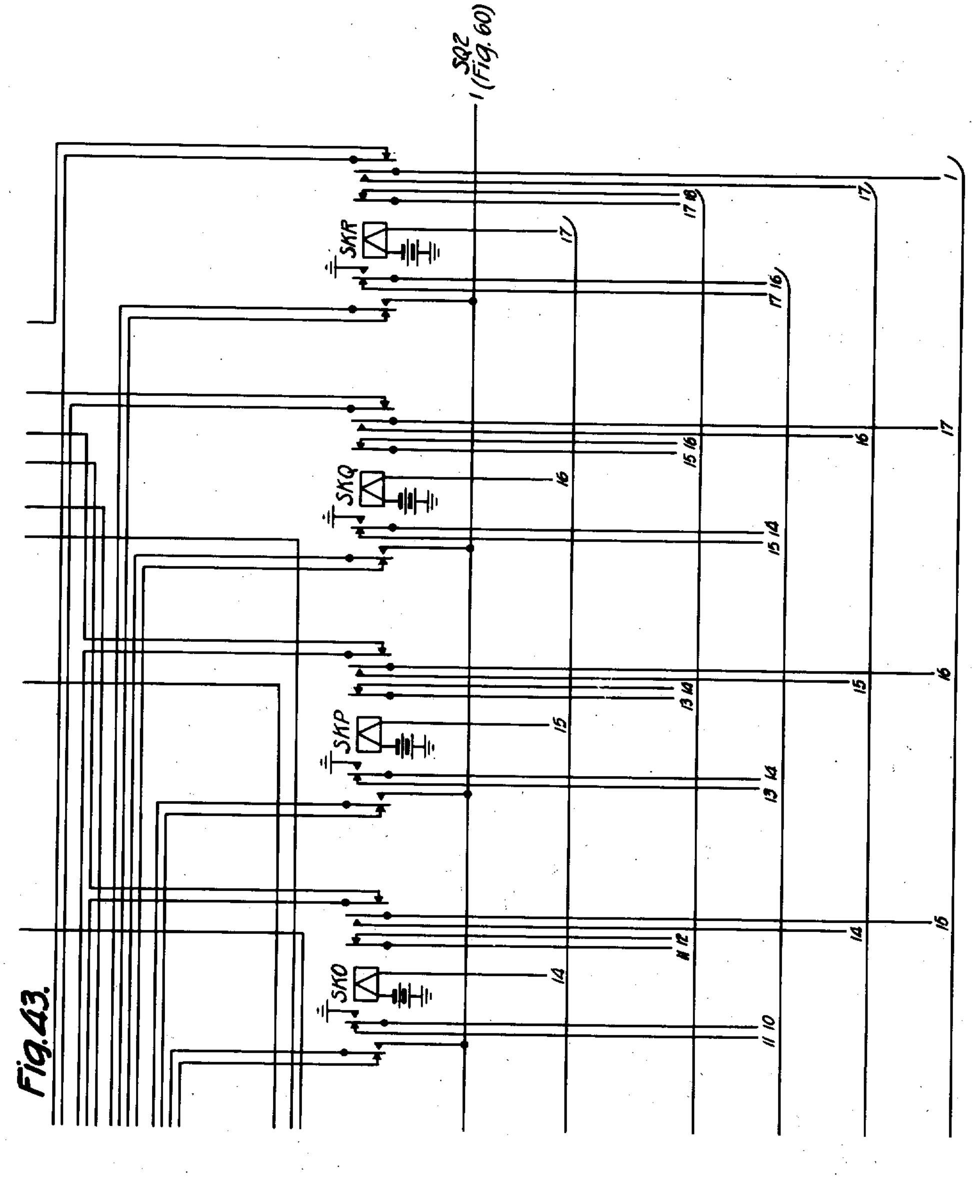
Figure 44:
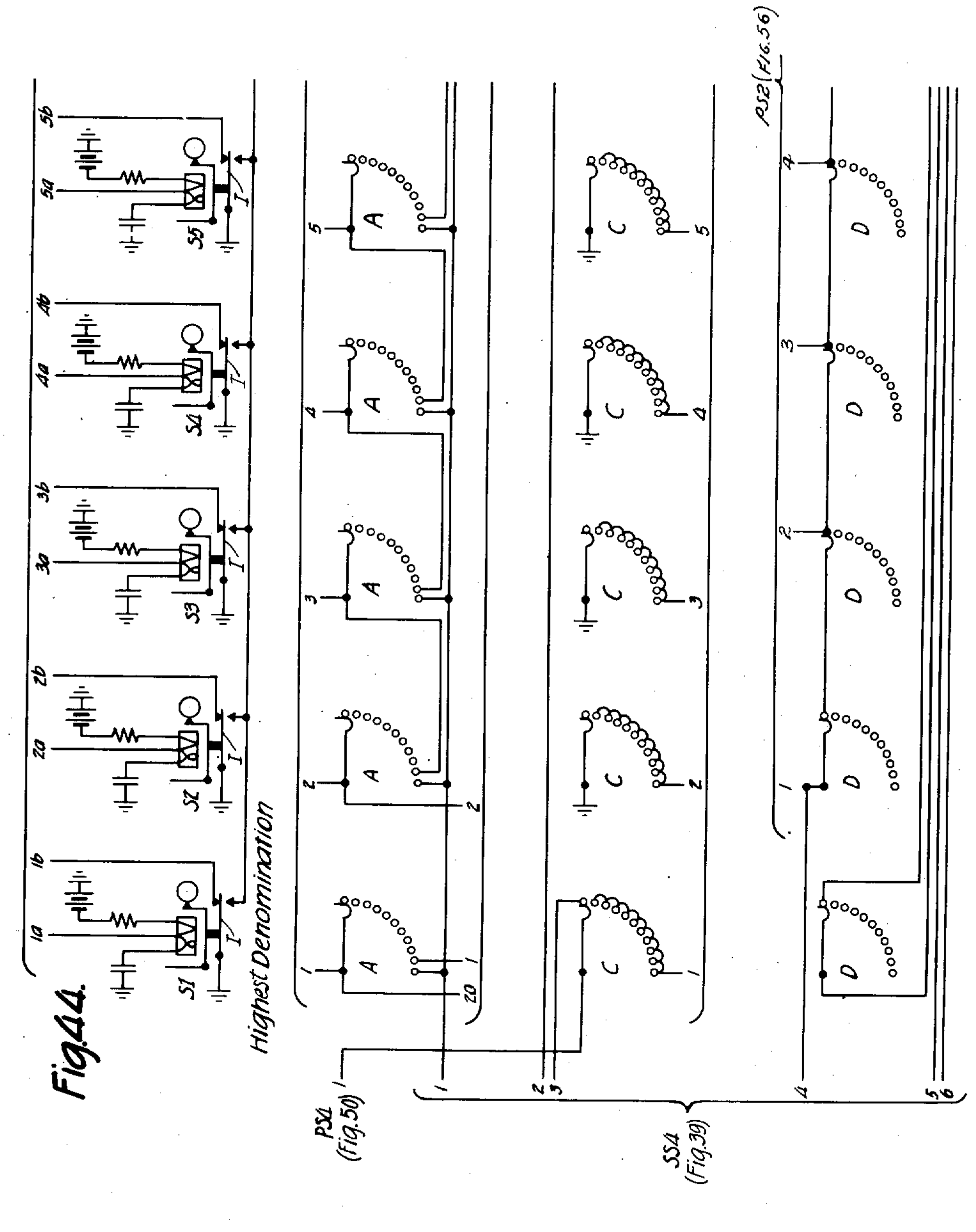

SBB furnishes locking ground over its front contact 2 to seventeen carry-over relays SCA to SCR (Figs. 38, 40 and 42).

*Circuit 26.*—Battery, SBB*a* (Fig. 39), SBB front 4, ground.

As soon as CSB*a* (Fig. 16) operates, it establishes circuit 27 to operate relay CKA. It also establishes circuit 28 to operate CSC. It further establishes circuit 29 to operate relays PA, PA*a* and PXA.

*Circuit 27.*—Battery, relay CKA (Fig. 16), CKB back, CSB*a*, front 2, AC wire 17 (Fig. 9), 1st AL wire 17 (Fig. 5), L*fr* front 2, K6 back, ground.

*Circuit 28.*—Battery, CSC (Fig. 11), CSB*a* front 3 (Fig. 16), PC wire 14 (Fig. 50), PB back 1 (Fig. 54), ground.

*Circuit 29.*—Battery, to each of relays PA (Fig. 52), PA*a*, and PXA (Fig. 54), PC wire 11 (Fig. 16), CSB*a* front 4, ground.

Relays PA, PA*a* and PXA operate (circuit 29) to provide homing circuits for the markers P1–P5 (Fig. 56) and provide locking circuits.

CLEAR OR CONTINUATION SIGNAL OR SIGN (...)

*Printing of 1st dot*

The decimal point P circuit (Figs. 50 to 57) now proceeds to send code signals to the printer to effect the printing of the clear sign (...) to indicate to the operator that the seized calculator or calculators are now connected with the operator's unit and are ready to receive a problem.

Relay CKA through its front contact 3 established circuit 30 to operate relay PP.

*Circuit 30.*—Battery, relay PP (Fig. 53), PC wire 23 (Fig. 16), CKA front 3 (Fig. 16), PC wire 10 (Fig. 50), normal terminal arc C of switch P4 (Fig. 57), brush P4C, PVA back 2, PKB back 1, PA front 4, ground.

Relay PP energizes CCX over circuit 31 and relay PFA over circuit 32.

*Circuit 31.*—Battery, CCX winding 2 (Fig. 12), CMB back 1 (Fig. 17), PC wire 6 (Fig. 50), PG back 1, PB back 2 (Fig. 54), PP front 4 (Fig. 53), ground.

*Circuit 32.*—Battery, PFA (Fig. 54), PXA front 2, PRB back 1 (Fig. 53), PXE back 3 (Fig. 55), PVA back 2, PJA back 2 (Fig. 51), PL back 2 (Fig. 53), PP front 5, ground.

Relay PFA locks circuit 32*a*.

Figure 54:
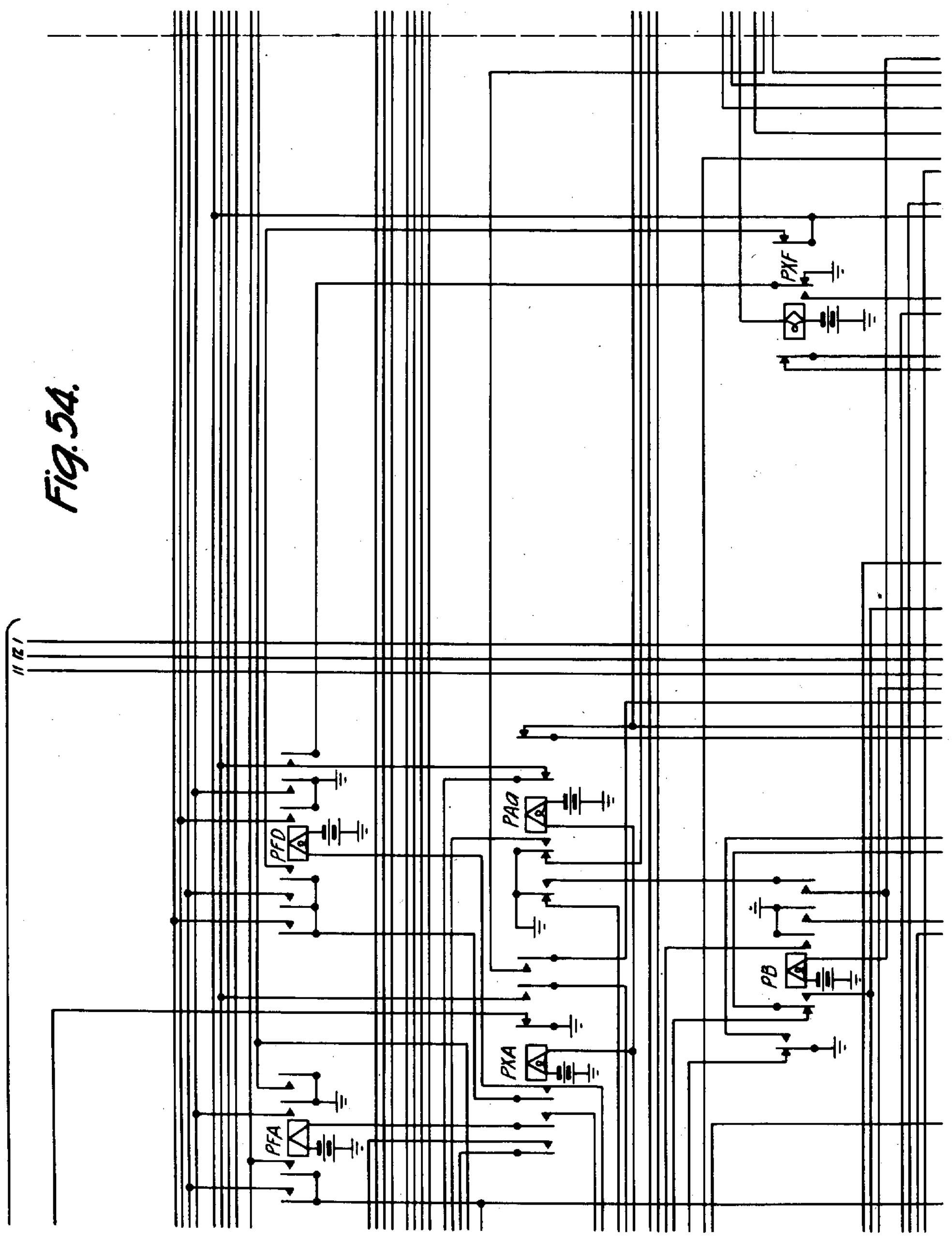
Figure 55:
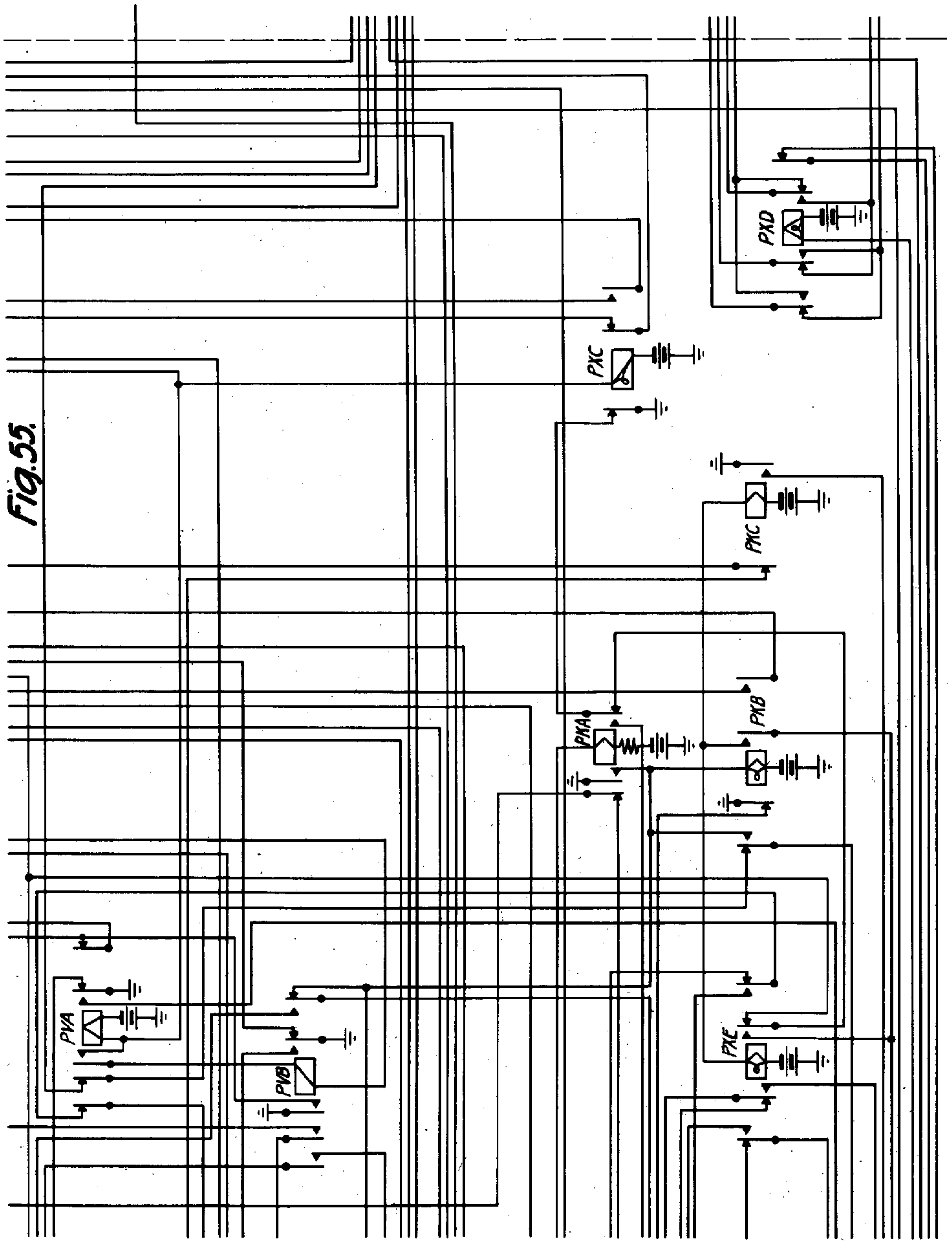

*Circuit 32a.*—Battery, PFA (Fig. 54), PXA front 2, PKA back 1 (Fig. 55), PFA front 1 (Fig. 54); P4I closed, ground; PFA front 2, P1I closed (Fig. 56), ground.

Relay PFA energizes markers or switch magnets P1 and P4 over circuits 33 and 34, respectively.

*Circuit 33.*—Battery, coil of P1 (Fig. 56), PFA front 4 (Fig. 54), ground.

*Circuit 34.*—Battery, coil of P4, PFA front 3, ground.

The operation of CCX (Fig. 12) causes the operation of magnet K3 of the printer Figs. 3 and 66, to select the point character (.), (circuit 35) and to operate CLL (circuit 36) and thus effect the printing (circuit 37).

*Circuit 35.*—Battery, CCX front, now closed (Fig. 12), AC wire 13 (Fig. 7), 1st AL wire 13 (Fig. 5), L*fr* front 6, wire 13, magnet K3 (Fig. 3), ground.

Operation of magnet K3 shifts the type-wheel 101 (Fig. 66), as previously described in connection with the printer, to register the point character (.) at the printing point and establishes circuit 36.

*Circuit 36.*—Battery, CLL (Fig. 12), CKA front 2 now closed (Fig. 16), AC wire 16 (Fig. 9), 1st AL wire 16 (Fig. 5), L*fr* front 3, wire 16 (Fig. 4), K3 front (Fig. 3), K2 back, K5 back, ground.

Relay CLL through its front 1 establishes circuit 37.

*Circuit 37.*—Battery (Fig. 10), CLL front 1, AC wire 10 (Fig. 9), 1st AL wire 10 (Fig. 5), L*er* front 3 wire 10, printing magnet K6, ground.

Thus the printing magnet K6 actuates the hammer 108 (Fig. 66), in a manner previously described, to print the selected character (.). Magnet K6, during its printing operation, opens circuit 27 by its back contact and therefore relay CKA (Fig. 16) releases to open circuits 32 and 36 at CKA front 3 and 2, respectively.

As a result of opening CKA front 3, PP (Fig. 53) releases. Relay PP (Fig. 53), in releasing, removes the operating grounds from CCX (Fig. 12) by opening PP front 4. Consequently, the selecting magnet K3 releases, which became energized through the closing of CCX front.

Upon opening of CKA front 2 (Fig. 16), CLL (Fig. 12), releases to open circuit 37 at CLL front 1 to release the printing magnet K6 (Fig. 3). When this release occurs, K6 back closes and CKA (Fig. 16) operates again to re-establish circuit 30 through PP and circuit 36 through CLL to re-establish the circuits controlled thereby. It will be remembered that upon the return stroke of the printing hammer 108 the paper tape 100 is fed one letter-space distance.

It should be understood that the switches P1 and P4 as well as all the selector switches used in the present invention are of the type in which their wipers are unaffected when the switch magnet attracts its armature, but are advanced one step each time the armature is released, or in other words, returns to its normal position. Consequently, since the armatures associated with coils of switches P1 and P4 (Fig. 56) have been attracted and subsequently released, all of the wipers of switches P1 and P4 have advanced one step and the wiper P4C now engages arc contact 1.

*Printing of 2nd and 3rd dots*

Upon re-closing of K6 back, the magnets K3 and K6 (Fig. 3) are operated again (circuits 35 and 37) to effect the printing of the second dot (.). This takes place, however, while the wiper P4C is on contact 1.

The actuation of the magnet K6 to print the second dot again opens K6 front to de-energize CKA (Fig. 16) and thus opens the same circuits opened after printing of the first dot preparatory to printing the third dot which is accomplished in the same manner as the printing of the first and second dots.

While the printing of the second dot is being effected the wiper P4C is moved to contact 2 of arc of P4 and while the printing of the third dot is being effected the wiper P4C advances to the terminal 3. At this time the operating (circuit 30) of PP (Fig. 53) is removed on arc P4C to stop further sending of signals. Switches P1 and P4 now both stand in position 3. As the wiper P4C reaches contact 3 it effects energization of relay PB (circuit 38).

*Circuit 38.*—Battery, PB (Fig. 54), contact 3 in arc C of P4, brush C, PVA back 2 (Fig. 55), PKB back 1, PA front 4 (Fig. 52), ground.

Relay PB upon operating in circuit 38 pulls up its back contact 1 to remove the ground from CSC (Fig. 11) thus releasing the latter. It also effects energization of CSD (circuit 39) when CSC back contact closes due to the release of CSC.

*Circuit 39.*—Battery, CSD (Fig. 10), CSC back (Fig. 11), CSB front 1 (Fig. 13), ground.

At this stage relays CKA (Fig. 16), CSA (Fig. 12), CSB (Fig. 13), CSB*a* (Fig. 16), IX (Fig. 22), IZ (Fig. 20), P*a* (Fig. 52), PA*a*, PXA (Fig. 54), SA, SBA, SBB (Fig. 39) are operated and the wipers of switches P1 and P4 (Fig. 57) are off normal and standing in their 3rd positions.

*Key locking magnet K7 effective during clear sign operation*

Relay CKA while being energized (circuit 27) also causes energization of relay CPD8 (circuit 40) with a result that K7 is operated (circuit 41).

*Circuit 40.*—Battery, CPD8 (Fig. 10), CKA front 1, CF front 1, CPD6 back (Fig. 11), CSD front 1, ground.

*Circuit 41.*—Battery, CPD8 front 6, AC wire 9 (Fig. 9), 1st AL wire 9 (Fig. 5), L*er* front 4, wire 9 (Fig. 4), magnet K7 (Fig. 3), ground.

The magnet K7 operates the locking means 195 (Fig. 70) previously described to prevent operation of all of the keys 190.

Figure 10:
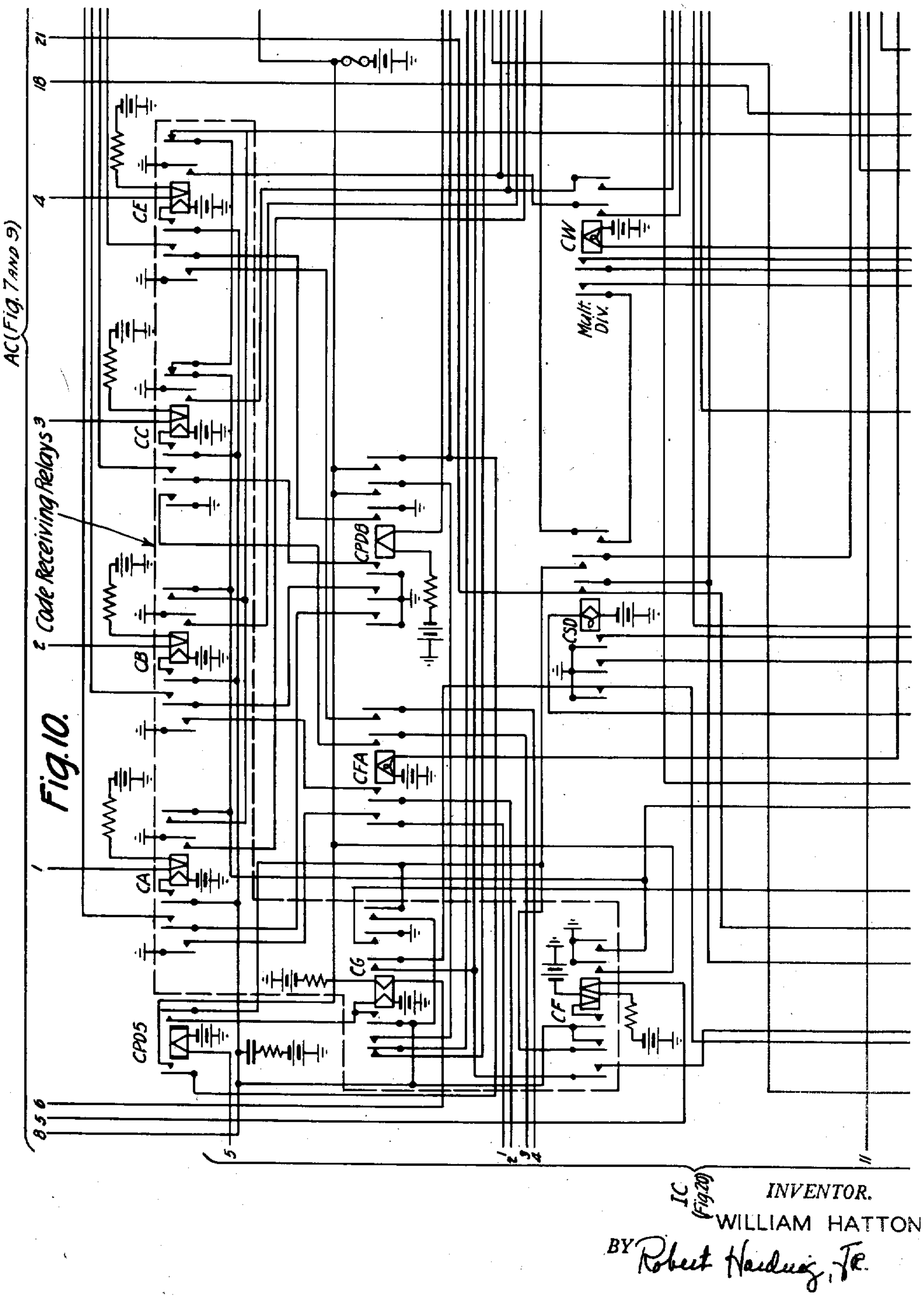
Figure 11:
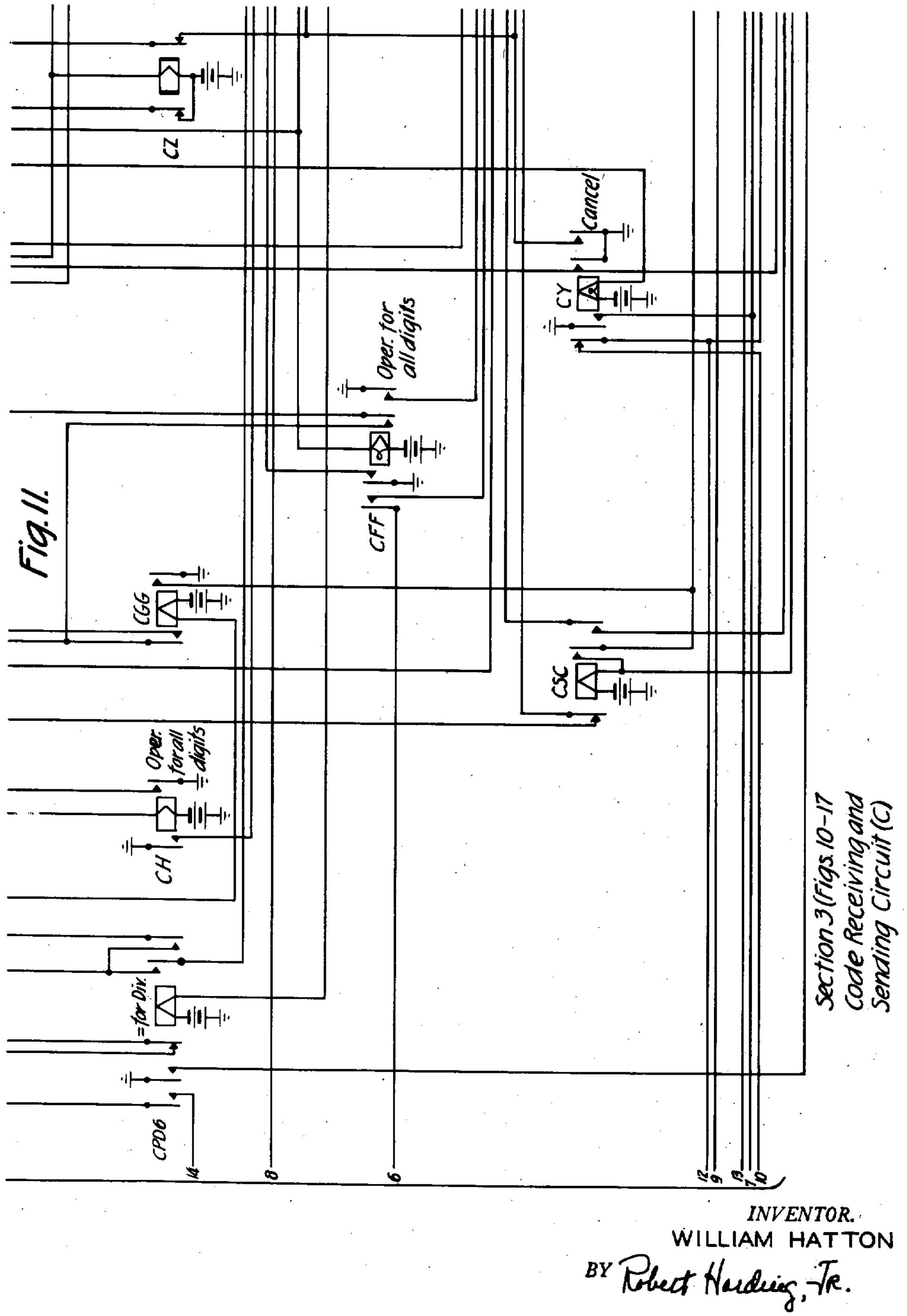

During the printing of the second and third dot (.) the magnet K6 opens its back contact same as during the printing of the first dot (.), described in the paragraph succeeding description of circuit 37, to de-energize CKA (Fig. 16) which results in opening of CKA back thus opening the circuit 40 including CPD8 (Fig. 10). As a result of de-energization of relay CPD8, its front contact 6 opens, thus removing battery from AC line 9 to thus release the key locking magnet K7 (Fig. 3). The key locking means 195 (Fig. 70) is then restored to normal by spring 203 to unlock all of the keys 90.

It should be understood that, although the locking magnet releases after the printing of each dot (.) of the clear sign, the printing of three dots in succession is so rapid that there is practically no unlocking of the keys until after the last dot has been printed.

Two calculators are now attached to the calling operator's unit but before proceeding with the description of the submission of a problem, a description of the control of the in and out sending of signals involved in a calculation will be given.

*Control of in and out sending of signals*

Figure 9:
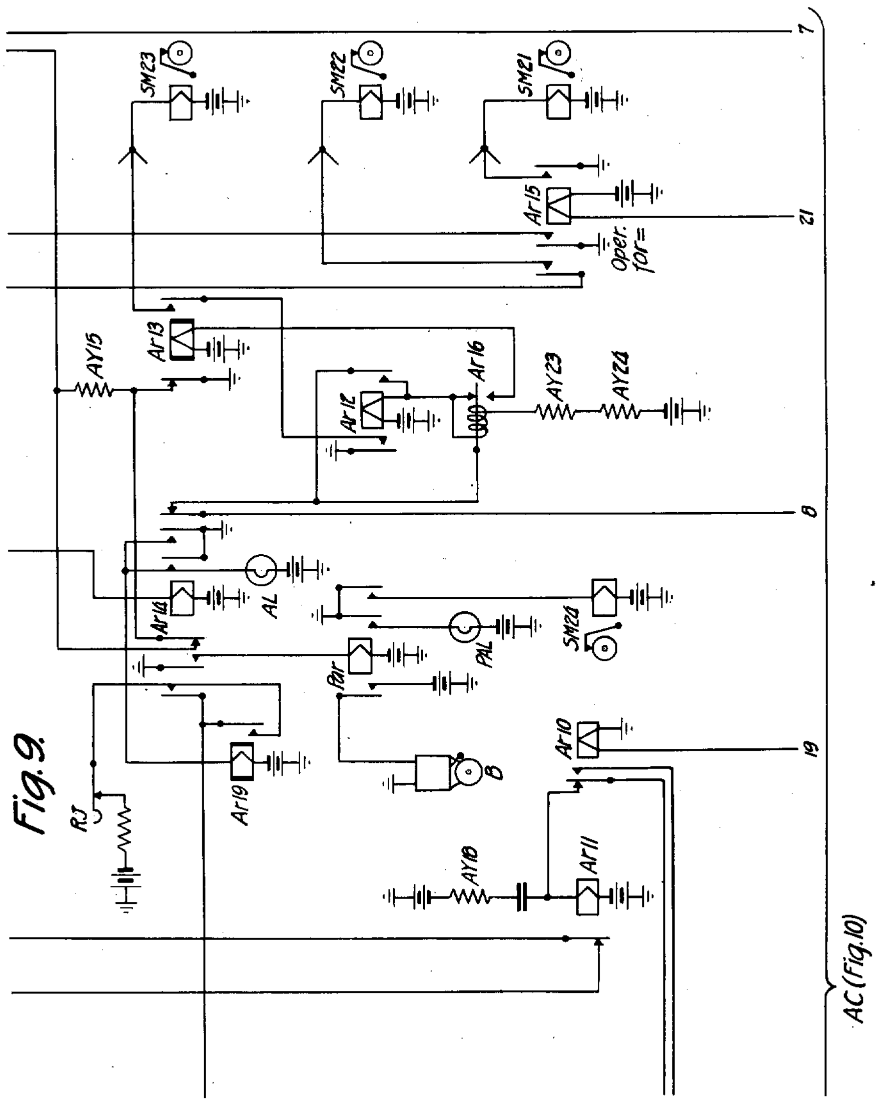
Figure 9A:
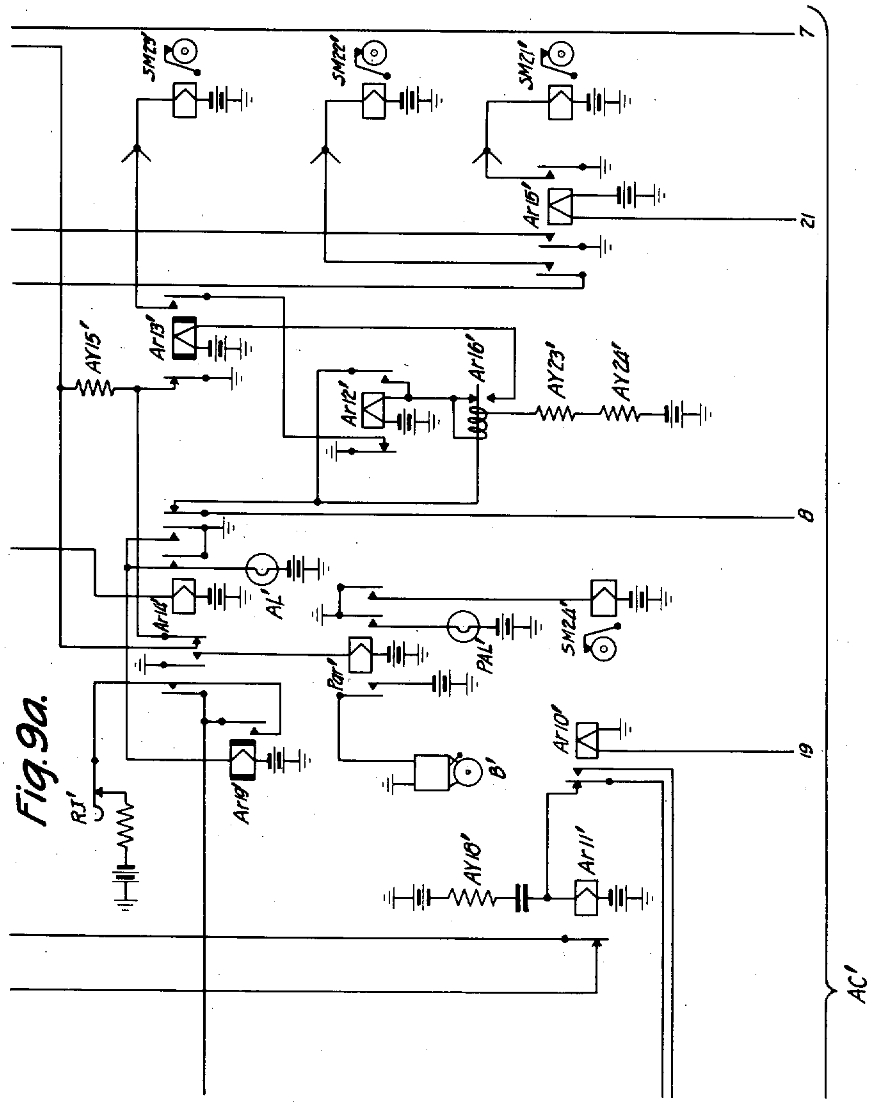

The problem is sent from the operator's unit, as hereinafter described, in code over wires 1 to 5 and the code is received by relays CA, CB, CC, CE and CF, respectively (Fig. 10). The code is reproduced over wires 11 to 15 to actuate magnets K1 to K5 (Fig. 3) to operate type-wheel 101 (Fig. 66) to selectively position the types at the printing point. The operating battery for the magnets K1 to K5 in the printer is connected over front contacts of relays CAX, CBX, CCX, CEX and CGX (Fig. 12). The wires 11 to 14 are commoned via back contacts of the four relays CAX to CEX and over resistances and AC wire 19 to a relay A*r*10 (Fig. 9).

The wires 19 of the three code sending circuits are also connected in multiple, see wires 19 of 1st, 2nd and 3rd AL (Figs. 4 and 5). Accordingly, as long as there is no difference in the operation of the relays CAX to CEX in the paired calculators or, in other words, when the codes are identical, the front contacts of identical relays in both circuits close and consequently, the A*r*10 and the A*r*10′ relays cannot operate since there is no battery connected to either one.

If, due to some error, there is a difference in operation in the code sending relays as for example the relay CAX is not operated in Fig. 12 (1st calculator) and the similar relay operates in the 2nd calculator, then the relay A*r*10 is energized over CAX back (circuit 42).

*Circuit 42.*—Battery, relay in 2nd calculator similar to CAX (Fig. 12) in 1st calculator, 2nd AL wire 11 (Fig. 4), L*hr* front 1, L*er* front 1 (Fig. 5), 1st AC wire 11 (Fig. 12), CAX back 1, AC wire 19 (Fig. 9), A*r*10, ground. In so operating, A*r*10 connects ground to wire 17 (circuit 43), via A*r*10 front, thus blocking both calculators.

*Circuit 43.*—Ground, A*r*1 front 6 (Fig. 6), A*r*10, front 1, AC wire 17 (Fig. 12), CSB*a* front 2 (Fig. 16), CKB back, CKA, battery.

It will be seen (Fig. 12) that the back contact of the printing controlling relay CLL is connected to wire 19, the same as the back contacts of the relays CAX to CEX, and that its front contact is also connected to battery. Thus it will be understood that there will be a similar operation to block the calculators in case the relays CLL, of the attached calculators do not operate at the same time.

The signals representing the figures of the solution are in turn, sent out from the calculator by the same four relays CAX to CEX over the wires 11 to 14 in both calculators and, therefore, there is no difference in the method of checking the problem when it is sent to the calculator and the solution when it is sent from the calculator. It may happen, however, that one calculator is slightly quicker than the other, the figure of a solution being earlier available in one than the other. In this case A*r*10 operates and introduces a blocking for the time required by the slower calculator to produce its solution. The momentary operation of A*r*10 does not yet mean incorrect solution and does not cause an alarm, hereinafter described, to be sounded. This difference in speed of the calculators is less than one second, except in the case of division when the time difference in the solution of the two quotients may be of somewhat longer duration. If the time difference between the two codes persists and A*r*10 front remains closed, the alarm is given to notify an attendant in the exchange E*x* of the paired calculators which differ in the solution.

Each circuit is provided with an alarm lamp which lights individually when relay A*r*14 of the same circuit operates (circuit 44).

*Circuit 44.*—Battery, lamp AL (Fig. 9), A*r*14 front 3, ground.

Relay A*r*14 also causes energization of relay P*ar* (circuit 45) to operate a common alarm lamp PAL located outside of the shielding or casing in which the access unit is contained. At the same time an alarm bell is connected to ring (circuit 46) and a service meter SM24 is operated (circuit 47).

*Circuit 45.*—Battery, *Par* (Fig. 9), *Ar14*, front 2, ground.

*Circuit 46.*—Battery, *Par* front 1, bell B (Fig. 9), ground.

*Circuit 47.*—Battery, coil of SM24, *Par* front 3, (Fig. 9), ground.

The service meter SM24 records the number of such alarms.

Relay *Ar14*, upon energizing, opens its back 1 and at the same time introduces resistance AY15 (Fig. 9) in the holding circuit, including AL wire 7, of relay *Lbr* (Fig. 5) with a result that *Lcr* operates (circuit 48).

*Circuit 48.*—Battery, *Lbr*, *Lcr* (Fig. 5), *Lbr* front 1, *Lar* front 2, ground.

Relay *Lcr*, in operating, opens the test potential circuit 5 at *Lcr* back 1 which controls the line connections. The access circuit, however, holds itself locally via RJ jack (Fig. 9), *Ar14* front 1 and *Ar4* front 1 (Fig. 6).

*Flashing of lamp*

Relay *Lcr* also effects energization of a common permanent glow PG circuit (Fig. 5) including three slow acting relays *Pgr1*, to *Pgr3* and four other relays *Pgr4* to *Pgr7*. Each of the relays *Pgr4*, *Pgr5* and *Pgr6* has six front contacts associated therewith and the relay has two front contacts at the right thereof which are like the contacts of the relays *Pgr4* to *Pgr6*. The total number of these contacts is twenty, there being one contact for each station line, it being assumed that there are twenty operators' stations or units.

When relay *Lcr* energizes, it causes the establishment of circuits 49, 50, 51 and 52.

*Circuit 49.*—Battery, *Pgr1* (Fig. 5), *Pgr3* back, *Lcr* front 1, ground.

*Circuit 50.*—Battery, *Pgr2* (Fig. 5), *Pgr1* front 1, ground.

*Circuit 51.*—Battery, *Pgr3* (Fig. 5), *Pgr2* front 2, ground.

*Circuit 52.*—Battery, *Pgr4* (Fig. 5), *Pgr2* front 1, ground.

Relay *Pgr4*, in energizing, establishes three similar circuits 53, 54 and 55.

*Circuit 53.*—Battery, *Pgr5* (Fig. 5), *Pgr4* front 1, ground.

*Circuit 54.*—Battery, *Pgr6* (Fig. 5), *Pgr4* front 2, ground.

*Circuit 55.*—Battery, *Pgr7* (Fig. 5), *Pgr4* front 3, ground.

From the foregoing it will be understood that *Pgr1* operates *Pgr2* and the latter operates *Pgr3* which releases *Pgr1* and effects the release of *Pgr2* and then *Pgr4* and finally *Pgr4* front opens again. In this manner there is produced a series of impulses which impulses are transferred by *Pgr2* to *Pgr4* to flash the exchange lamp PGL repeatedly by making and breaking circuit 56.

*Circuit 56.*—Battery, lamp PGL, *Pgr4* front 6.

As the successive impulses are received by the relay *Pgr4*, the latter causes the line contacts of relays *Pgr4*, *Pgr5*, *Pgr6* and *Pgr7* to open and close repeatedly. Consequently, *Pgr6* front 2 of the active line causes the lamp L at the operator's station (Fig. 3) to flash repeatedly (circuit 56).

*Circuit 56.*—Battery, *Lbr* front 2 (Fig. 5), *Pgr6* front 2, right winding of *Lar*, right winding of *Lbr*, wire 7, lamp L (Fig. 3), switch S (now closed), wire 9, wire 8*a*, ground.

It should be understood that when *Lcr* energizes it also opens the lamp circuit 7 at *Lcr* back 3 but as soon as *Pgr6* front 2 closes the lamp circuit is caused to repeatedly close and open, as described in circuit 56. Consequently, the lamp L is caused to flash, similarly to the lamp PGL as an indication to the operator that the calculators do not check and that an alarm is being given in the exchange. The alarm in the exchange brings to the attention of the exchange attendant that the paired calculators are not checking, and the flickering lamp PGL directs his attention to the calculator which does not check.

It should be understood that the battery connected to *Lbr* front 2 in addition to lighting the lamp L holds *Lar* while the lamp circuit is closed at *Lcr* back 2, as in circuit 17, or while it is closed at *Pgr6* front 2 as in circuit 56.

Upon receiving the flash signal of lamp L, the operator may release momentarily and call again for another calculator.

When *Ar14* energizes, it also effects energization of *Ar19* (circuits 57 and 58).

*Circuit 57.*—Battery, *Ar19*, *Ar14* front 3 (Fig. 9), ground.

*Circuit 58.*—Battery, jack RJ (Fig. 9), *Ar14* front 1, *Ar4* front 1 (Fig. 6), *Ar17*, *Ar1* front 1, ground.

While *Ar19* is energizing it also connects battery via its front contact to relay *Ar17*.

The relay *Ar19* is of the slow release type and is required to cover the time in which the line circuit can take over the holding of connection after a short alarm is given and which then stops automatically upon release of *Ar19*. This may be the case during division if, for example, one of the arrangements of a Wheatstone bridge, hereinafter described, is out of adjustment or due to some other reason the quotient is produced much earlier in one circuit than in the other. *Ar10* (Fig. 9) operates for an interval of sufficient length to operate *Ar14* and to cause the alarm to function. When the quotient is produced by the slower calculator as well, *Ar10* releases, *Ar11* operates and *Ar14* releases equally. The short circuit on AY15 is put back again and *Lcr* releases reconnecting the original calling test potential. The relay *Ar19* has to cover the releasing time of *Lcr* and is, therefore, of the slow releasing type.

*Suppression of calculator blocking by jack RJ*

Jack RJ (Fig. 9) is provided to suppress the blocking of the calculators in case an alarm is given. There is one of these jacks associated with each calculator and they are used when one calculator is suspected of producing a faulty calculation and blocking of an alarm is only required when the calculator is functioning as number 1. In a case of this kind the jacks RJ of all of the other calculators are plugged and consequently, their calculators do not function to block. If an alarm occurs, *Lcr* in the line circuit operates as previously described and by removing the holding potential it causes the release of *Ar2* and *Ar4* (Fig. 6) and thereby the release of the whole connection. The line circuit remains busy and causes the flashing of the lamp L in order to invite the operator to release.

*Service meters*

Relay *Ar15* operates (Fig. 9), in a manner hereinafter described, each time the equal sign is received. *Ar15* front 3 energizes a service meter SM (Fig. 5) belonging to the calling line, in order to give approximate value of the calculating traffic originated by the subscribers. SM21 (Fig. 9) energizes over *Ar15* front 3 and is a service meter common for all three circuits and keeps a record of the whole traffic. SM22 energizes over Ar15 front 2 and Ar5 front 5 and is a common service meter which records under the same conditions as SM21 the number of checked calculations. A meter SM23 records the number of false calls described below.

*False calls*

If, after a calculator is engaged, the operator fails to use it within a predetermined period of time or fails to complete the problem, the delay causes the calculator to release or disconnect itself. To this end, suitable means is provided including relay Ar12 (Fig. 9) which operates over AC wire 8 from the code-receiving circuit as soon as this is seized. Ar12 operates via the back contact of the thermic relay Ar16, but once operated, it locks itself to the wire 8. Ar12 energizes Ar16, which makes contact in about 30 seconds' time.

Each time the operator sends a figure or an operation sign, the ground on wire 8 of AR is disconnected for a moment, which is sufficient to release Ar12. When the equal sign is received, the ground is removed in the calculator, so that Ar16 cannot operate during calculations (which could last longer than 30 seconds in case of division).

If Ar16 succeeds in closing its front contact, Ar13 energizes. The holding circuit of Lbr (Fig. 5) is opened so that Lcr can operate. The test potential which controls the connection is removed, the calculator releases, whereas the line circuit remains engaged and the lamp of the station flashes, as described in connection with the alarm. The service meter SM23 (Fig. 9) records the number of such false call cases.

*Restrictions on the pairing*

Figure 8:
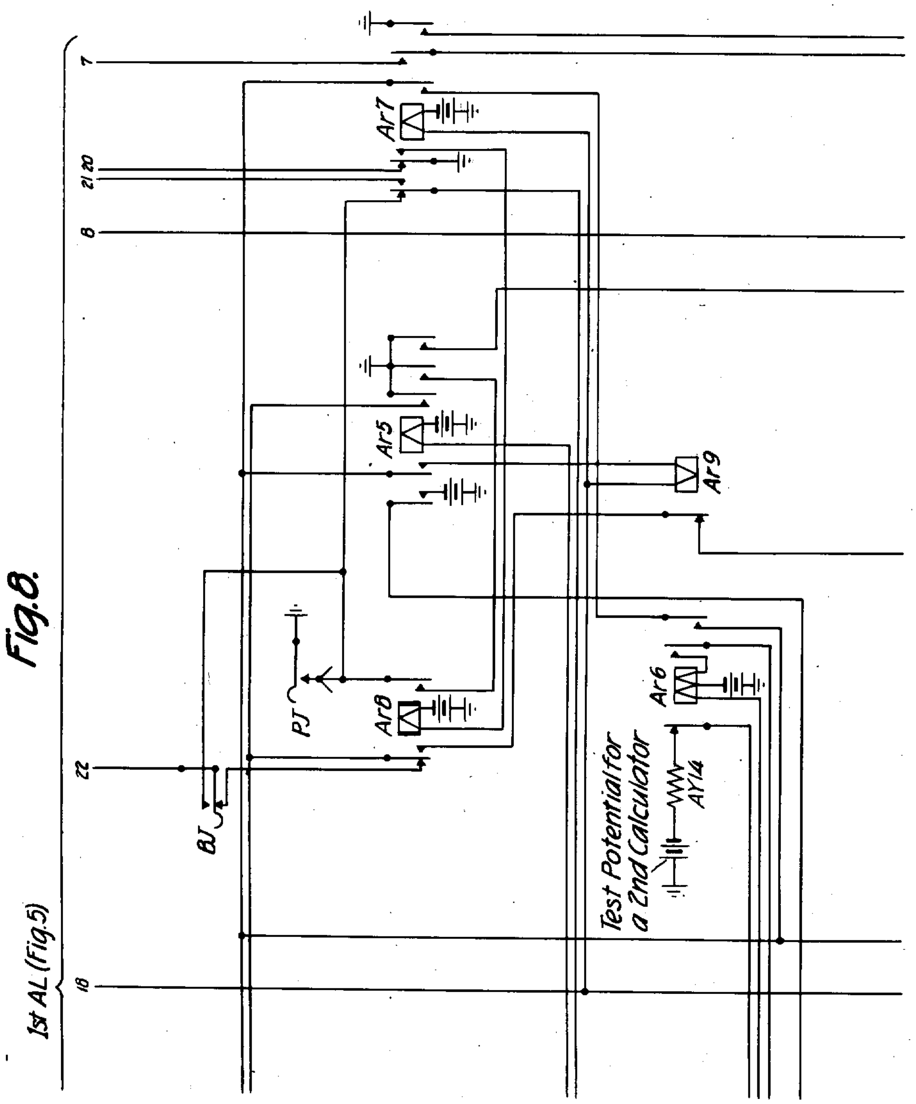
Figure 8A:
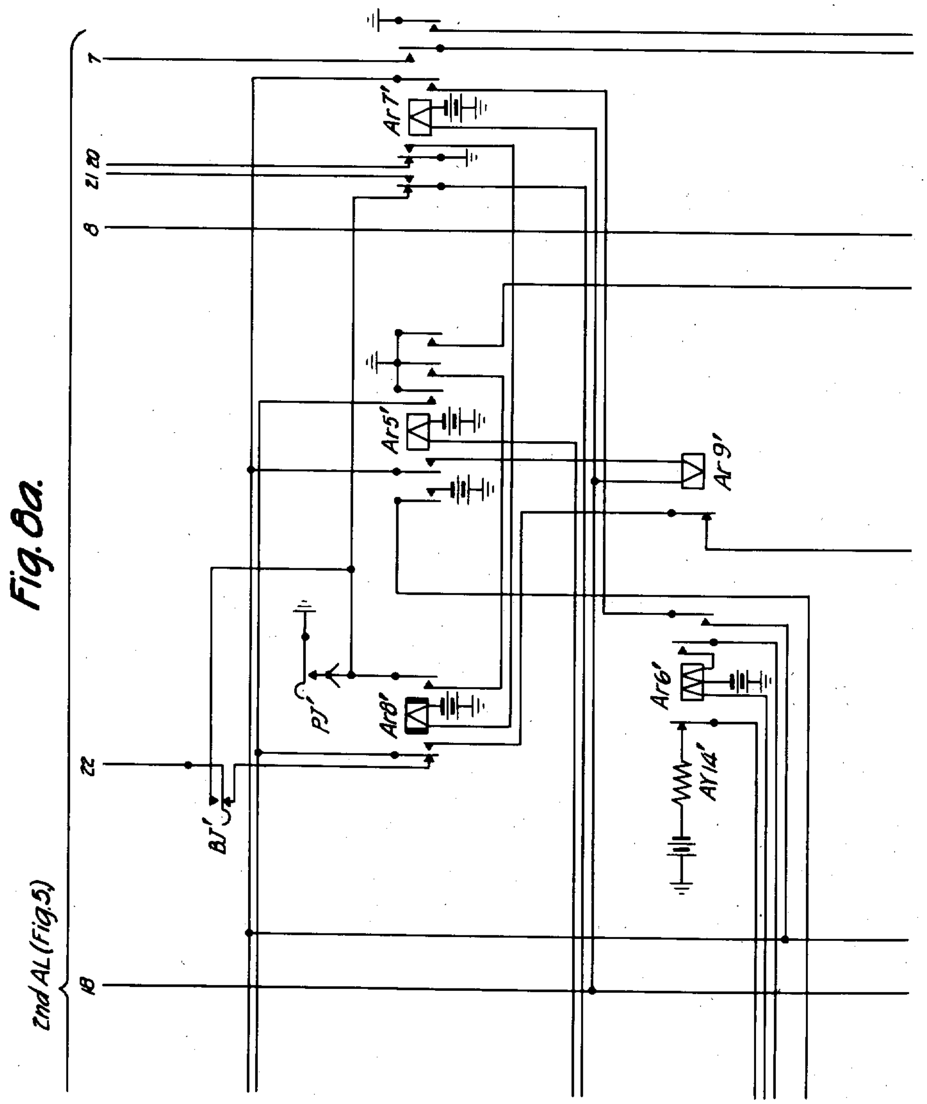

The pairing of calculations may be suppressed completely by the blocking-up of the common jack PJ (Fig. 8). In this case, the operation changes in such a way that when Ar4 is energized in the circuit I, Ar6 (Fig. 8) is operated as well by the ground over jack PJ. Ar6 opens the calling test potential of a second calculator and energizes relays Ar9 and Ar7. The calculator I in this case will work alone.

In case two calculators are already paired as a result of a first call and a second call arrives, relay Ar6 in the third calculator which answers the call will operate via front of Ar4 (Fig. 6), back of Ar7 (Fig. 8) in the third calculator and fronts of Ar8 and Ar5 in the second calculator of the pair.

If a third call is made while all three calculators are engaged, two in pair and one singly, relay Str2 (Fig. 5) in the common starting circuit finds no operating ground because all three relays Ar7 (Fig. 8) are energized. Due to the fact that Str2 remains unenergized, Str3 can operate and puts ground on the wire 21 of 1st AL. This ground passes over the fronts of Ar7 and Ar4 in the 1st calculator and energizes Ar6. (In the circuit II, Ar4 is operated and in the circuit III Ar6 is already operated.) Ar6 in the circuit I removes the holding of circuit II, which releases, and as soon as it is again in the home position attaches itself to the third call. The first call continues to operate with the first calculator alone.

The pairing is suppressed automatically if any one of the three busy jacks BJ (Fig. 8) is plugged in, that is, only two circuits are available. The front of the busy jack pushed up connects ground to the same common point as the common jack PJ.

*Manual suppression of pairing of calculators*

To suppress at will the pairing of the calculators, there is provided a jack PJ (Fig. 8) which is normally open but which may be plugged at will to close it. This establishes circuit 59.

*Circuit 59.*—Battery, left coil of Ar6 (Fig. 8), Ar4 front 3 (Fig. 6), Ar7 back 1 (Fig. 8), jack PJ, ground.

When Ar6 operates, it opens its back contact thus removing the calling potential, battery AY14, for the second calculator, from the brush B of switch AM.

Operation of relay Ar6 locks it to ground over Ar2 front over circuit 60.

*Circuit 60.*—Battery, right-hand winding of Ar6 (Fig. 8), Ar6 front 1, Ar2 front, ground.

Circuit 60 causes the operation of relays Ar7 and Ar9 in series (circuit 61).

*Circuit 61.*—Battery, Ar7, Ar9, Ar6 front 2, Ar1 front 5, (Fig. 6) ground.

Thus operation of Ar7 front 4 closes to establish circuit 62.

*Circuit 62.*—Same as circuit 16.

In the following description it is assumed that two calculators, Ca1 and Ca2, are paired, and attached to one of the operator's sets, for the purpose of checking.

The operation of the circuits of the calculating equipment in the computing and recording of the transaction described will now be described in detail.

After one or more calculators have been attached through the medium of the access equipment above described, and are ready to receive a problem for computation, which is indicated by the lighting of the lamp and the printing of the continuation sign, three dots (...), a single relay SZA (Fig. 39) is energized in each of the attached calculators (circuit 62*a*).

*Circuit 62a.*—Battery, SZA (Fig. 39), SA front 3, right, SS4 wire 5 (Fig. 44), wiper S17D in position N (neutral), SS6 wire 17 (Fig. 43), SKR back 2, SS6 wire 16 (Fig. 48), wiper S16D in N, SS6 wire 15 (Fig. 43), SKQ back 2, SS6 wire 14, wiper S15D in N (Fig. 48), SS6 wire 13, SKP back 2 (Fig. 43), wire 12, wiper S14D in N (Fig. 48), wire 11, SKO back 2, (Fig. 43), wire 10, wiper S13D in N (Fig. 48), wire 9, SKN back 2, (Fig. 41), wire 8, wiper S12D in N (Fig. 48), wire 7, SKM back 2, (Fig. 41), wire 6, wiper S11D in N (Fig. 46), wire 5, SKL back 2 (Fig. 41), wire 4, wiper S10D in N (Fig. 48), wire 3, SKK back 2, wire 2 (Fig. 41), wiper S1D in N (Fig. 44), wire 1 (Fig. 46), SKA back 2 (Fig. 41), SLA back 2 (Fig. 39), SS4 wire 6 (Fig. 44), S9D in N (Fig. 46), S8D, S7D, S6D, S5D, S4D (Fig. 44), S3D, S2D, S1D, all in N position, SS4 wire 4 (Fig. 39), SLA back 1, SS4 wire 3 (Fig. 44), S1C in N, PS4 wire 1 (Fig. 50), PE back 2, ground.

*First factor, 1,280, submitted, stored and printed on tape*

The codes for the various characters, see table (Fig. 68), are sent from the key set KS to the code receiving relays CA, CB, CC, CE, CF and CG (Fig. 10) to operate them. The table shows that the contact 6, connected to relay CF, is closed by any one of the keys representing the digits 0 to 9 and the characters (,) and (.), and that the contact 5 connected to relay CG is closed each time any one of the keys representing signs such as (—), (×), etc. is operated. The contact or contacts associated with each key of the key set KS are arranged in such a way that CF and CG energize last to insure that all the contacts required for the code are grounded before the last one becomes grounded.

*Key 1 operated*

When key 1 (Fig. 3) is depressed by the operator, CA (circuit 63) locks (circuit 64) and CB, CE and CF operate over similar circuits and lock.

*Circuit 63.*—Battery, right-hand winding of CA (Fig. 10), AC wire 1 (Fig. 10), 1st AL wire 1 (Fig. 5), *Ldr* front 6, wire 1 (Fig. 3), key 1 depressed (Fig. 3), ground.

The circuits for relays CB, CE and CF are similar to that of CA and can readily be traced from batteries over wires 2, 3 and 4, respectively.

*Circuit 64.*—Battery, left hand winding of CA, (Fig. 10) CA front 2; battery, CB, CB front 2; battery, CE, CE front 2; battery, CF, CF front 2; CSD front 5, CKA front 4, ground. CAA, CBB, CEE and CFF operate over fronts 4 of CA, CB, CE and CF respectively (circuits 65, 66, 67 and 68).

*Circuit 65.*—Battery, CAA (Fig. 12), CA front 4 (Fig. 10), ground.

*Circuit 66.*—Battery, CBB (Fig. 12), CB front 4 (Fig. 10), ground.

*Circuit 67.*—Battery, CEE (Fig. 14), CE front 4 (Fig. 10), ground.

*Circuit 68.*—Battery, CFF (Fig. 11), CB front 5 (Fig. 10), CF front 5, ground.

*Circuit 69.*—Same as circuit 40 to operate CPD8 (Fig. 10).

*Key lock magnet K7 operated*

When relay CPD8 energizes (circuit 69) it causes the operation of the locking magnet K7 (Fig. 3) (circuit 70) to lock all of the keys against actuation.

*Circuit 70.*—Same as circuit 41 to energize K7.

The magnet K7 operates the key locking means 195 again as in the case of printing the dots, but this time to lock the operated one of the keys 190 and also prevent the operation of any of the other keys while the machine is functioning until the character, in this instance 1, is printed on the paper tape.

The other contacts of relay CPD8 are used for the purpose of reproducing the code for printing purposes. In the present instance, digit 1, relays CA, CB and CE are energized. Consequently, by the closing of CPD8 fronts 1, 2 and 4, circuits 71, 72 and 73 are established.

*Circuit 71.*—Battery, CAX (Fig. 12), CA front 3 (Fig. 10), CPD 8 front 1, ground.

*Circuit 72.*—Battery, CBX (Fig. 12), CB front 3 (Fig. 10), CPD8 front 2, ground.

*Circuit 73.*—Battery, CEX coil 2 (Fig. 12), CE front 2 (Fig. 10), CPD8 front 4, ground.

Energizing of relays CAX, CBX, and CEX causes battery to be connected over lines 11, 12 and 14 to actuate magnets K1, K2 and K4, (Fig. 3) according to the table (Fig. 69), over circuits 74, 75 and 76, respectively, to select the type 1 of the type-wheel.

*Selecting and printing of character 1*

*Circuit 74.*—Battery, CAX front 2 (Fig. 12), AC wire 11 (Fig. 9), 1st AL wire 11 (Fig. 5), *Ler* front 2, wire 11, K1 (Fig. 3), ground.

*Circuit 75.*—Battery, CBX front 2 (Fig. 12), AC wire 12 (Fig. 9), 1st AL wire 12 (Fig. 5), *Ler* front 1, wire 12, K2 (Fig. 3), ground.

*Circuit 76.*—Battery, CEX front, AC wire 14 (Fig. 9), 1st AL wire 14 (Fig. 5), *Lfr* front 5, wire 14 (Fig. 3), K4, ground.

Operation of magnets K1 and K2 over circuits above described effect rotation of the type-wheel and magnet K4 effects axial shifting thereof to register the character 1 at the printing point and it is then printed by magnet K6, which is again energized (circuit 37).

When printing magnet K6 operates, it again opens its back contact and thus releases CKA (Fig. 16) over wire 17, removes locking ground CKA front 4 from all of the relays CA, CB, CE and CF and releases CPD8 (Fig. 10) at CKA front 1.

If at the completion of the printing of the character 1 the operator has already removed his finger from the key CA, CB and CF release and CKA operates again when the printing magnet K6 restores again and closes its back contact, thus re-establishing circuit 27 preparatory to the sending of the next code from the operator's unit. Should the operator be slow to remove his finger from the depressed key with the result that the key is still depressed at the time of closing of K6 back, the relays CA, CB and CF remain operated and relay CKB becomes energized (circuit 77) to open its back contact and thereby prevent the operation of CKA via the back contact of the printing magnet K6 as long as the key is kept in its operated position.

*Circuit 77.*—Battery, CKB (Fig. 16), PC wire 30 (Fig. 50), PXA front 5, PC wire 29 (Fig. 16), CKA back 2, CF front 1, CPD6 back, CSD front 1, ground.

*Digit value 1 stored*

CFA operates (circuit 78), followed by IAA (circuit 79), IAB (circuit 80) and IAD (circuit 81) the latter three relays to store the digital value 1.

*Circuit 78.*—Battery, CFA (Fig. 10), CPC back 2 (Fig. 15), CB front 5 (Fig. 10), CF front 5, ground.

*Circuit 79.*—Battery, IAA (Fig. 19) brush I1C in N, IC wire 1 (Fig. 10), CFA front 1 (Fig. 10), CA front 1, ground.

*Circuit 80.*—Battery, IAB (Fig. 19), brush I1D in N, IC wire 2 (Fig. 10), CFA front 2 (Fig. 10), CB front 4, ground.

*Circuit 81.*—Battery, IAD (Fig. 18), brush I1F in N, IC wire 4 (Fig. 10), CFA front 4 (Fig. 10), CE front 1, ground.

Figure 20:
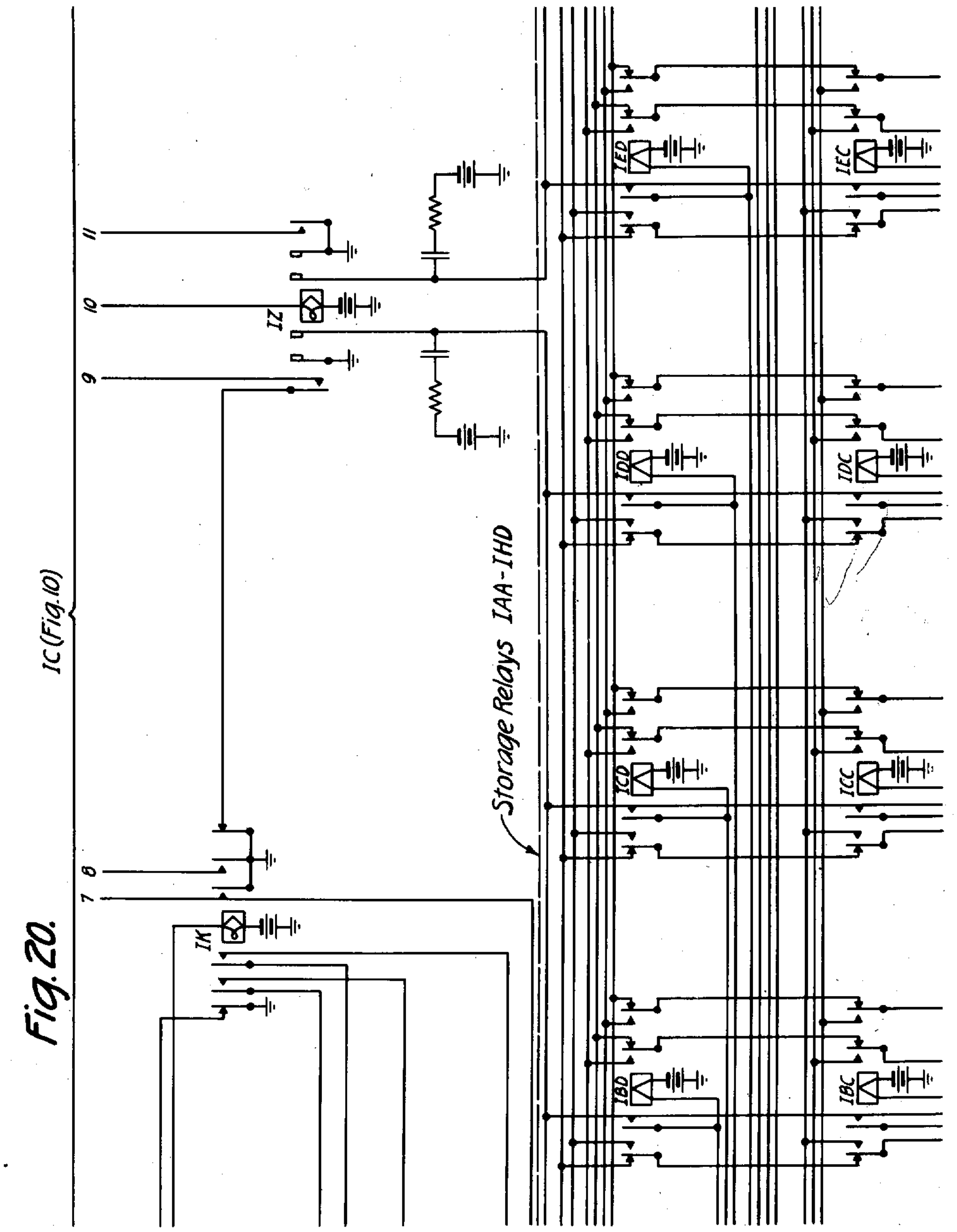

IAA, IAB and IAD lock in obvious circuits to IZ front 2 (Fig. 20). IJ (Fig. 18) operates (circuit 82) and locks (circuit 83).

*Circuit 82.*—Battery, IJ (Fig. 18), IC wire 6, CFF front 1 (Fig. 11), CQB back 2, ground.

*Circuit 83.*—Battery, IJ (Fig. 18), IJ front 2, I1 interrupter contact closed, ground, IJ front 3, I2 interrupter contact closed, ground.

Thus the value 1 is now stored on the relays IAA, IAB and IAD of the first vertical set of relays in the input circuit illustrated in section 4 of the drawings.

Switch magnets I1 and I2 (Fig. 18) operate in obvious circuits to IJ front 1, and IJ front 4, respectively, and open their interrupter contacts I1 and I2.

PFB operates (circuit 84) over CFF front 2 and locks (circuits 85 and 86).

*Circuit 84.*—Battery, PFB (Fig. 52), PXA front 1 (Fig. 54), PC wire 5 (Fig. 17), CQB back 1, CPB back 2 (Fig. 15), CK back 1 (Fig. 13), CV back 1, CFF front 2 (CFF closed in circuit 68), ground.

*Circuit 85.*—Battery, PFB (Fig. 52), PXA front 1 (Fig. 54), PFB front 2 (closed in circuit 31), interrupter contact of P2 (Fig. 56), ground.

*Circuit 86.*—Same as circuit 85 to PAA front 2, then PFB front 1, PCE back 1, interrupter contact P5 (Fig. 56), ground.

When PFB energizes, it causes magnets of switches P2 and P5 (Fig. 56) to operate in obvious circuits including PFB front 4, and PFB front 3, respectively, and thus open the interrupter contacts P2 1 and P5 1.

Relay CFF (circuit 68) causes DY to operate (circuit 87) and lock (circuit 88).

*Circuit 87.*—Battery, DY (Fig. 36), DC wire 1 (Fig. 13), CQD back 1 (Fig. 15), CPB back 1, CV back 2 (Fig. 13), CFF front 2, (Fig. 11) ground.

*Circuit 88.*—Battery, DY (Fig. 36), DY front 2, D1 interrupter contact 1, closed, ground.

Magnet of switch D1 (Fig. 36) operates in an obvious circuit to DY front 1 and opens its interrupter contact 1.

In case the operator holds the key down the relay CKB operates again as in circuit 77 to prevent operation of relay CKA via the back contact of K7.

It is to be noted that although locking circuits of CA, CB, CE and CF are already open at CKA these relays remain operated until key 1 restores. IJ releases (circuit 82), open at CFF front 1; and circuit 83, open at I1I and I2I, followed by magnets of switches I1 and I2. PFB releases (circuit 84, open at CFF2, and circuit 85, open at P2 1 and P5 1), followed by magnets of switches P2 and P5. DY releases (circuit 87, open at CFF3, and circuit 88, open at D1I), followed by D1. The wipers of these five switches I1, I2, P2, P5 and D1, leave their normal positions and advance to positions 1.

CKA operates again (circuit 27, reclosed at K6 back and CKB back).

*Key (,) operated and comma printed*

The calculator is now ready to receive the next character which is the comma (,). The comma key (,) is then depressed by the operator. This causes relays CE and CF to operate (circuits 89 and 90) and lock (circuits 91 and 92) followed by (circuit 41).

*Circuit 89.*—Battery, right coil of CE (Fig. 10), AC wire 4, L*dr* front 3 (Fig. 5), wire 4, front 1 of key (,) depressed (Fig. 3), ground.

*Circuit 90.*—Battery, right coil of CF (Fig. 10), Ac wire 5, L*dr* front 2, wire 5, front 2 of key (,), ground.

*Circuit 91.*—Battery, left coil of CE (Fig. 10), CE front 3, CF front 2, CSD front 5, CKA front 5 (Fig. 16), ground.

*Circuit 92.*—Battery, left coil of CF (Fig. 10), CF fronts 3 and 2 and then like circuit 40 from CF front 2.

*Circuit 93.*—Battery, CPD8 (Fig. 10), CKA front 1, CPD6 back, CSD front 4, ground.

CEX (Fig. 12) operates in an obvious circuit over CE front 2 to CPD6 front 4. Selector magnet K4 operates (circuit 94) and selects the comma character on the type-wheel.

*Circuit 94.*—Ground, K4 (Fig. 3), 1st AL wire 14, CEX front (Fig. 12), battery.

Locking magnet K7 operates (circuit 41) and locks the key-set. When the type wheel is again stationary, CLL operates (circuit 36) followed by printing magnet K6 (circuit 37) whereupon a comma (,) is printed.

CKA (Fig. 16) releases and CKB operates (circuit 95).

*Circuit 95.*—Same as circuit 77.

CPD8 (Fig. 10), K7 and K4 (Fig. 3) release. K7 unlocks the key set, and comma (,) key restores as soon as the pressure of operator thereon is removed. K4 restores the type-wheel. CLL releases, followed by K6, as before. CG releases (circuit 89, open at key (,), and circuit 91, open at CKA front 5), followed by CGG and CKB (circuit 95, open at CC3). CKA operates again (circuit 27, reclosed at K6 back and CKB1).

*Key "2" operated*

Key "2" is the next to be depressed. When this occurs, operations take place similar to those which followed the depression of key "1." CB, CE and CF operate over wires 2, 4 and 5 (circuit 96 and similar circuits) and lock (circuit 97).

*Circuit 96.*—Battery, CB right coil (Fig. 10, AC wire 2, L*dr* front 5 (Fig. 5), wire 2, key "2" depressed (Fig. 3), ground.

*Circuit 97.*—Battery, CB (Fig. 10), CB front 3, battery, CE, CE front 3; battery, CF, CF front 3; CSD front 5, CKA front 3, ground.

CBB, CEE, CFF, CFA and CPD8 operate again, as previously described in circuits 65 to 68 and 69 in connection with the depression key "1," followed by IBB and IBD (circuit 98 and a similar circuit), of the second vertical row of input relays, which relays are now to store the digital value 2.

*Circuit 98.*—Battery, IBB (Fig. 21), I1D position 1 (Fig. 19), wiper D, IC wire 2, CFA front 2 (Fig. 10), CB front 1, ground.

IBB and IBD lock in obvious circuits to IZ front 1, IJ, PFB and DY operate, followed by switch magnets I1, I2, P2, P5 and D1, all as before. Selector magnets K2 and K4 operate (circuit 76) and a similar circuit, and select character 2. Locking magnet K7 operates (circuit 70) and locks the key set once more.

*Character 2 printed*

CLL and K6 operate again and this time the character "2" is printed. CKA releases and CKB operates. CPD8, K7, K2, K4, CLL and K6 release and thereafter key "2" restores as soon as the operator's finger pressure is removed. CB, CE, CF, CBB, CEE, CFF, CFA, and CKB release. IJ, PFB and DY release, followed by magnets I1, I2, P2, P5 and D1, and the wipers of these switches advance to positions 2. CKA re-operates.

*Key 8 operated printed and stored*

When key 8 is depressed by the operator, operations similar to those following the depression of key "2" take place. Code receiving relays CB and CF operate momentarily (circuits similar to circuit 96). Storage relay ICB of the third row operates (circuit 99) and locks to IZ1 front, storing the digital value 8.

*Circuit 99.*—Battery, ICB (Fig. 21), I1D wiper in position 2 (Fig. 19), IC wire 2, CFA front 2 (Fig. 10), CB front 1, ground.

Type selector magnet K2 operates to select character 8, which is then printed. Magnets I1, I2, P2, P5, and D1 operate and release again and the wipers of these switches advance to positions 3. The key set is locked again during type selecting and printing, and after it is freed again key 8 restores.

*Key 0 operated*

When key 0 is depressed by the operator, similar operations take place, except that the control of the printing operation is carried out in a slightly different manner. Only one code receiving relay CF operates momentarily. Since none of the relays CA, CB, CC and CE is operated, no storage relay of set IDA–IDD in the fourth row (Figs. 20 and 21) operates. Consequently, this set of relays stores the digital value 0. Similarly, no selector magnet operates and the type-wheel accordingly remains in its normal position with the character 0 at the printing point. CFF operates to CF front 5 (circuit 100) and CL operates (circuit 101).

*Circuit 100.*—Battery, CFF (Fig. 11), CE back 5 (Fig. 10), CC back 5, CF front 5, ground.

*Circuit 101.*—Battery, CL (Fig. 15), CBA back 2 (Fig. 14), CAA back 2 (Fig. 12), CFF front 3 (Fig. 11), CSD front 3 (Fig. 10), ground.

CLL operates again as in circuit 102 to CL front 1 and causes actuation of K6 (circuit 37) to print the character "0." CFF releases, as before, followed by CL and CLL.

*Circuit 102.*—Battery, CLL left winding (Fig. 12), CKA front 2 (Fig. 15), CL front 3 (Fig. 15), ground.

Magnets I1, I2, P2, P5 and D1 operate and release again and the wipers of these switches advance to positions 4. The keys are locked again by magnet K7 during printing, and after they are unlocked again key 0 restores immediately provided the finger pressure has been removed.

At this stage, relays IAA, IAB and IAD of the first row, IBB, IBD of the second row, and ICB of the third row are operated and none of the relays in the fourth row is operated. Thus the first four rows of relays are now storing the digital values 1280; relays CKA, CSA, CSB, CSD, IX, IZ, PA, PB, SA, SBA and SBB are in their operated positions; the wipers of switches P1 and P4 are standing in their positions 3 and those of switches D1 (Fig. 58), I1, I2 (Fig. 18), P2 and P5 (Fig. 56) in positions 4.

*Sign + submitted and printed*

The next step in the problem is to submit the sign representing the kind of computation to be performed; in the present instance the + sign. This is done by depressing the + key (Fig. 3) which closes key contacts connected to wires 2 and 6 extending to relays CB and CG to operate the latter (circuit 103 and similar circuit 104) and lock (circuit 105).

*Circuit 103.*—Battery CB right winding (Fig. 10), AC wire 2 (Fig. 9), 1st AL wire 2 (Fig. 5), key + depressed (Fig. 3), ground.

*Circuit 104.*—Similar to circuit 103 but through CG, line 6 to key +, ground.

*Circuit 105.*—Battery, CB left winding (Fig. 10), CB front 3; battery, CG, CG front 2, CF front 2, CG front 5, CSD front 5, CKA front 5, ground.

CBB (Fig. 12) and CGG (Fig. 11) operate (circuits 106 and 107), followed by CPD8 (circuit 108), CU (circuit 109) and K7 (circuit 41) which latter locks the keys, as before.

*Circuit 106.*—Battery, CBB (Fig. 12), CB front 4, (Fig. 10) ground.

*Circuit 107.*—Battery, CGG (Fig. 11), CG front 4, (Fig. 10) ground.

*Circuit 108.*—Battery, CPD8 (Fig. 10), CKA front 1 (Fig. 16), CG front 3 (Fig. 10), CSD front 1, ground.

*Circuit 109.*—Battery, CU (Fig. 15), CQC back 2 (Fig. 17), CEE back 3, (Fig. 12) CCC back 4, CBB front 2, CAA back 3, CGG front 1, CSD front 3, ground.

CU locks (circuit 110) to CSD front 2.

*Circuit 110.*—Battery, CU (Fig. 15), CU front 5, CSD front 2 (Fig. 10), ground.

Operation of relay CU causes the transfer, in a manner hereinafter described, of the digits stored in the input relays to the markers S.

Relay CPD7 operates over CU front 5 (circuit 110*a*) and holds K7 (circuit 111).

*Circuit 110a.*—Battery, CPD7 (Fig. 12), CSA front 1, CU front 4 (Fig. 15), ground.

*Circuit 111.*—Battery, CPD7 front 1 (Fig. 12), then the same as circuit 41 from AC wire 9.

*Selecting and printing of + sign*

Selector magnet K2 operates (circuit 75), together with K5 (circuit 112) and selects the character + on the type-wheel.

*Circuit 112.*—Battery, CPD8 front 5 (Fig. 10), CG front 1, AC wire 15 (Fig. 7), 1st AL wire 15 (Fig. 5), L*fr* front 4, wire 15 (Fig. 4), K5 (Fig. 3), ground.

CLL operates (circuit 36) followed by printing magnet K6 (circuit 37), whereupon the character + is printed. CKA releases and CKB operates again (circuit 94). CB, CG, K1, K2, K5, CLL and K6 release.

It is to be noted that at this stage K7 is held (CJ and the addition relay CU being operated) and the key-set remains locked after the completion of printing, in order that the storage relays IAA–IHD (Figs. 18–23) may be cleared of their record before the submission of further digits, constituting a second factor, is permitted.

As a consequence of the operation of the addition relay CU, CX and PX operate (circuits 113 and 114) and CX locks (circuit 115), followed by PCB (circuit 116), DE (circuit 117), MA (circuit 118) and TA (circuit 119).

*Circuit 113.*—Battery, CX (Fig. 13), CU front 3 (Fig. 15), ground.

*Circuit 114.*—Battery, PX (Fig. 53), PC wire 25 (Fig. 17), CX front 1 (Fig. 13), ground.

*Circuit 115.*—Battery, CX (Fig. 13), CX front 4, SC wire 2 (Fig. 39), SA front 1, ground.

*Circuit 116.*—Battery, PCB (Fig. 50), P2A wiper off-normal (Fig. 56), PX2 front (Fig. 53), ground.

*Circuit 117.*—Battery, relay set DE (Fig. 32), D1B in position 4 (Fig. 36), wipers B, DY, DX back, DC wire 2 (Fig. 13), CU front 2 (Fig. 15), ground.

*Circuit 118.*—Battery, relay set MA (Fig. 58), MC wire 1 (Fig. 14), CX front 3 (Fig. 13), ground.

*Circuit 119.*—Battery, TA (Fig. 26), CT wire 3 (Fig. 25), COC back 3 (Fig. 13), CU front 1 (Fig. 15), CX front 5 (Fig. 13), ground.

When TA energizes, it establishes circuit 120 through TH.

*Circuit 120.*—Battery, TH (Fig. 27), TA front 4, ground.

P2 (Fig. 56) operates (circuit 121), opens its interrupter contact P2I, releases and re-operates (circuit 122, reclosed at D1I); this inter-action continues and the wipers advance to their normal positions, whereupon PCB becomes de-energized to release circuit 116, open at P2A.

*Circuit 121.*—Battery, P2 (Fig. 56), PCB front 3 (Fig. 50), P2I closed, ground.

DE set locks and DX operates (circuit 122).

*Circuit 122.*—Battery, DE (Fig. 32), DE front 18, counting from top, DX (Fig. 36), DT1 wire 6 (Fig. 24), TH front 2 (Fig. 27), TM front 5, S*t* wire 11 (Fig. 38), SH back 1 (Fig. 39), S*t* wire 12 (Fig. 25), TMM back 2, TLL back 1, ground.

DZ operates (circuit 123) and locks (circuit 124).

*Circuit 123.*—Battery, DZ (Fig. 36), wiper D1A off-normal, DC wire 3 (Fig. 13), CQD back 4 (Fig. 15), CBS back 3 (Fig. 13), ground.

*Circuit 124.*—Battery, DZ (Fig. 36), D1A wiper off-normal, DZ front 1, ground.

D1 (Fig. 36) operates (circuit 125), as a result of DZ energizing, and opens its own circuit at D1I. The wipers return to their normal positions, whereupon DZ releases (circuits 123 and 124, open at D1A).

*Circuit 125.*—Battery, D1 (Fig. 36), DZ front 2, D1I, closed ground.

IK operates (circuit 126) and locks (circuit 127).

*Circuit 126.*—Battery, IK (Fig. 20), IJ back 5 (Fig. 18), wipers B off-normal of I1 and I2, IC wire 7 (Fig. 11), CSB back (Fig. 13), ground.

*Circuit 127.*—Battery, IK (Fig. 20), IJ back 5, wiper of I1B off-normal, I2B wiper off-normal, IK front 4, ground.

I1 and I2 (Fig. 18) operate (circuit 128 and a similar circuit) and open their own circuits at I1I and I2I, respectively; the wipers return to their normal positions, whereupon the circuits are opened at I1A and I2A.

*Circuit 128.*—Battery, wiper of I1 (Fig. 18), I1A, off-normal, IK front 2, I1I closed, ground.

IK releases circuits 126 and 127, open at I1B and I2B. During the return to normal of these four switches, CPD7 is prevented from releasing (circuit 129).

*Circuit 129.*—Battery, CPD7 (Fig. 12), CSA front 1; IC wire 8 (Fig. 11), IK front 5 (Fig. 20), ground; DC wire 5, DZ front 4 (Fig. 36), ground; DC wire 4, DZ front 3 (Fig. 36), ground.

*Transfer of factor 1,280 to accumulating switches*

Figure 21:
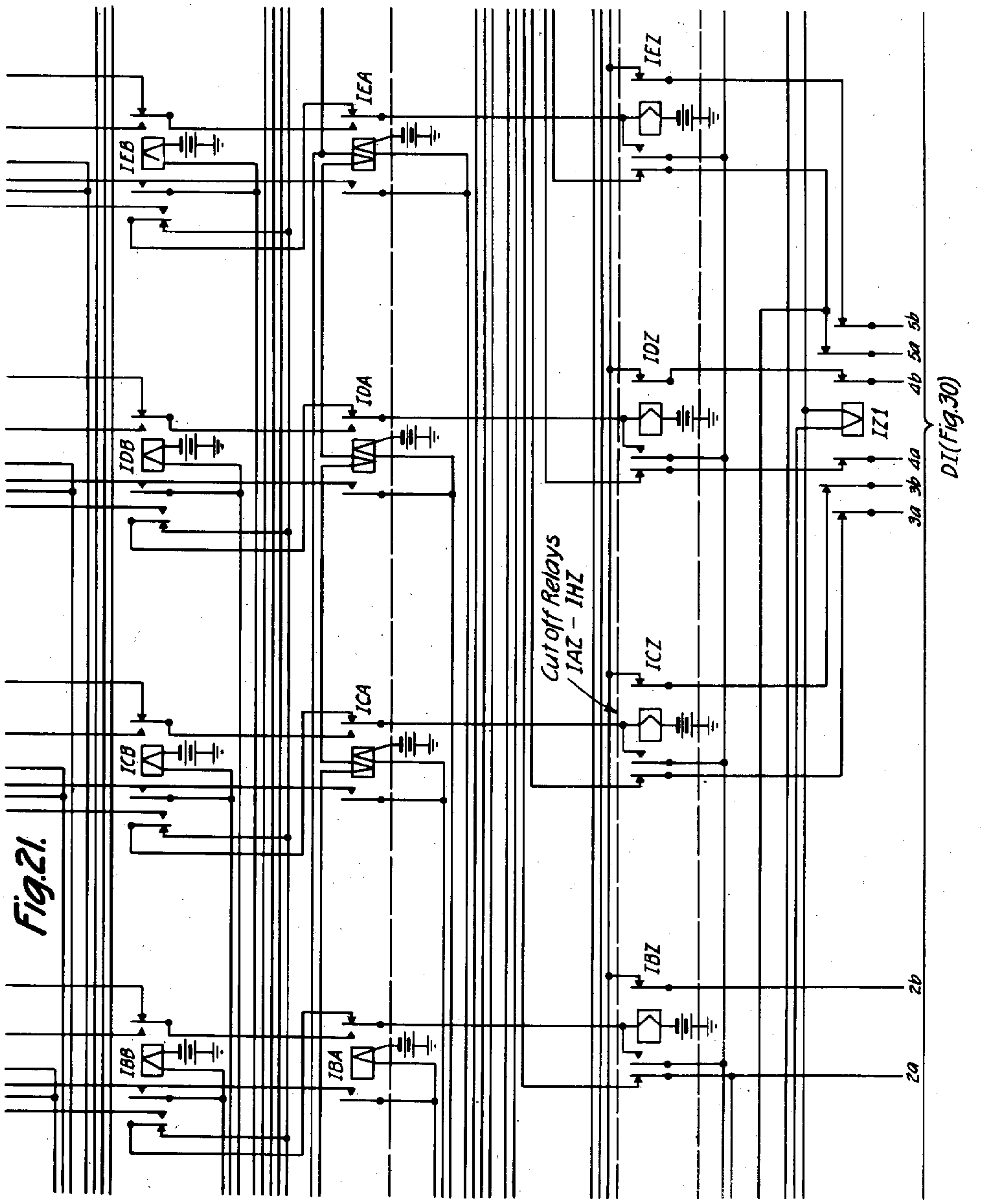
Figure 22:
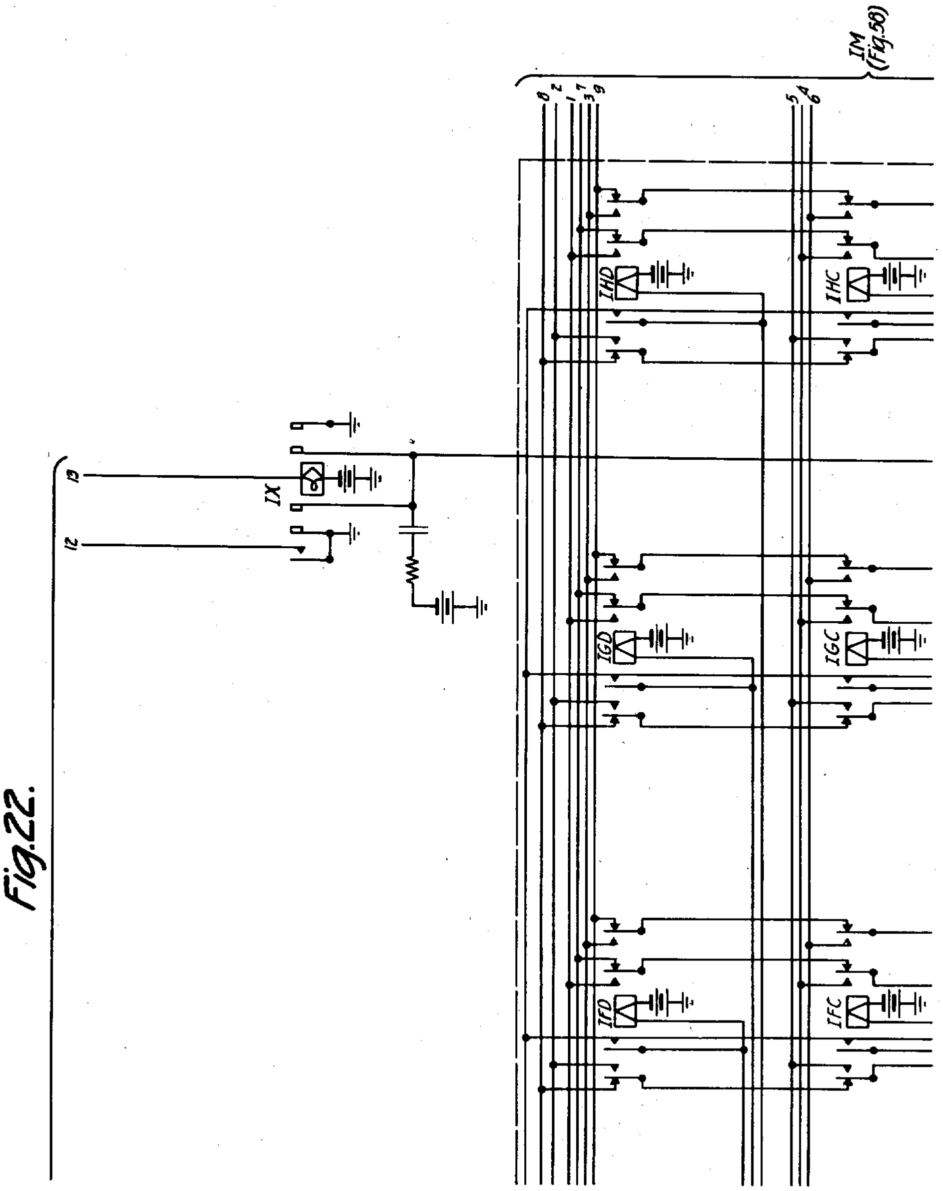
Figure 46:
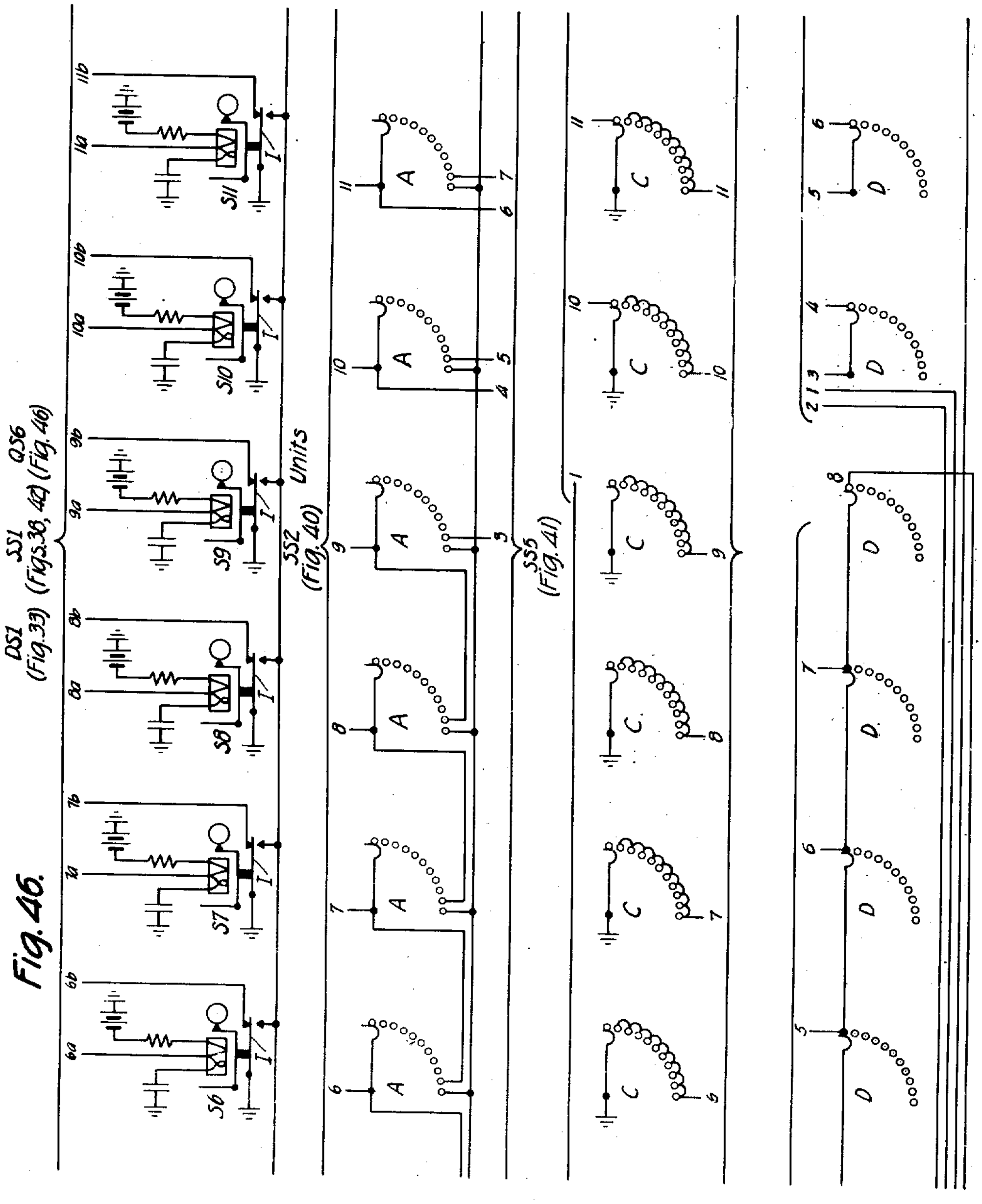

As a consequence of the operation of TA (Fig. 26), circuit 119, the process of transferring the digital values 1, 2, 8 and 0 stored in the 1st, 2nd, 3rd and 4th row of the storage relay of the input circuit to the accumulating switches S6, S7 and S8, Fig. 46 begins, the switches being of thousands, hundreds and tens denominational positions. Cut-off relays IDZ, IEZ, IFZ, IGZ and IHZ (Figs. 21 and 23) operate (circuit 130 and similar circuits) and lock in obvious circuits to IX2 front (Fig. 22).

*Circuit 130.*—Battery, IDZ (Fig. 21), IDA back 2, IDB back 1, IM wire 0 (Fig. 23), MZ back 1 (Fig. 58), MT2 wire 0 (Fig. 59), T1B wiper in N position (Fig. 28), TA front 2, ground.

The cut-off relays IAZ, IBZ and ICZ associated with the 1st, 2nd and 3rd set of input relays do not operate in circuit 130 because the back contacts 1 of IAA, IBB and ICC are open. TA (circuit 119) causes impulse generating relays TJ1 to TJ5, to operate (circuit 131) and lock (circuit 132).

*Circuit 131.*—Battery, TJ1 to TJ5 (Fig. 24), TA front 3 (Fig. 26), ST wire 9 (Fig. 38), SBB front 1 (Fig. 39), ST wire 10 (Fig. 25), brush of T1A in N (Fig. 29), TJ (Fig. 28), TK back, ground.

Relay set TJ1 to TJ5 operates circuit 131 and locks circuits 132 and 133.

*Circuit 132.*—Battery, TJ1 to TJ5 (Fig. 24), TJ5 front 3; T1 back 1 (Fig. 29), T2 back, ground.

Figure 19:
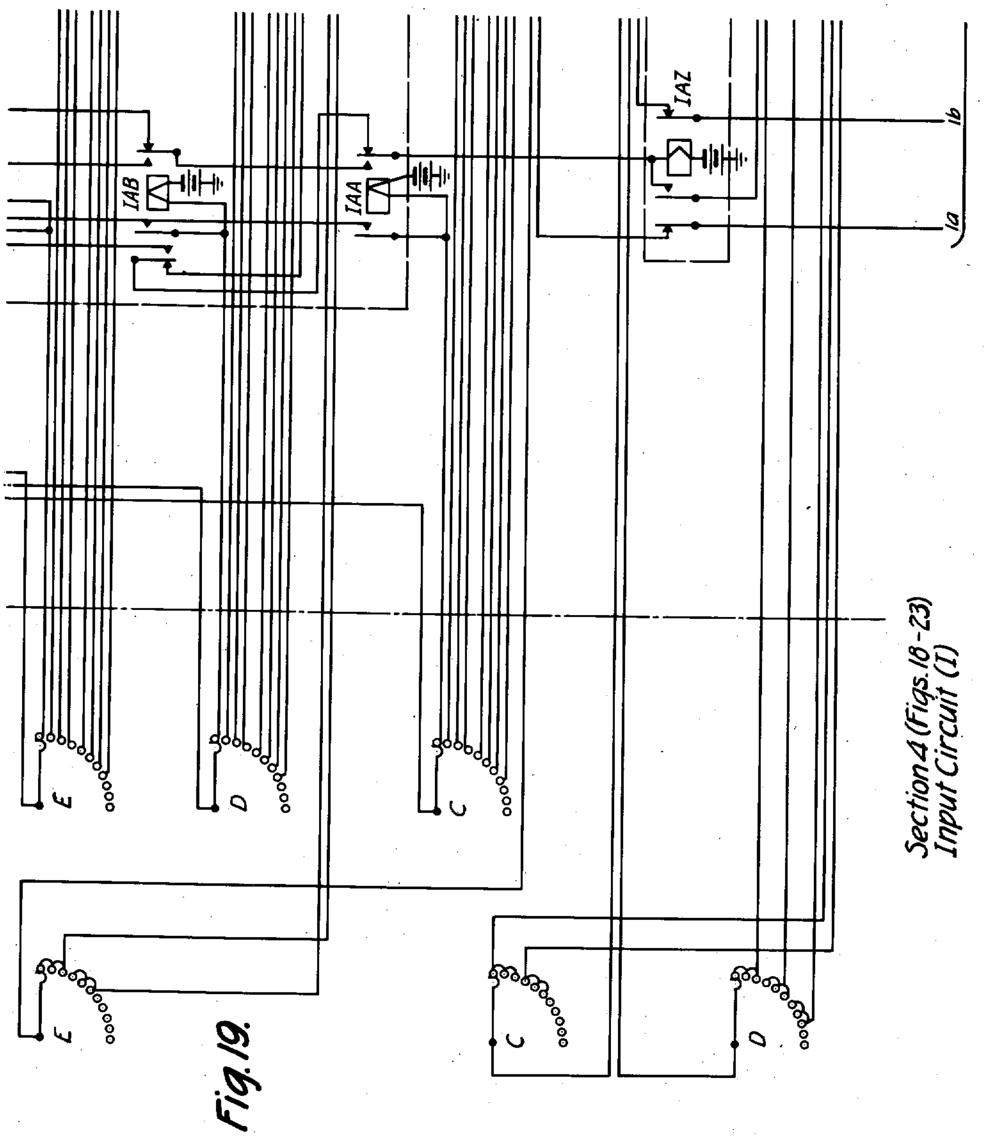

*Circuit 133.*—Same as circuit 132 to TJ5 front 3 (Fig. 24), then IT wire 11, IAZ back 3 (Fig. 19); DI wire 1b (Fig. 30), DE front 2 (Fig. 32), (DE energized in circuit 117), DKC back 2 (Fig. 33), DS1 wire 6b (Fig. 46), S6 back 1, ground.

Two circuits similar to circuit 133 operate over IBZ back 2 to S71 and over ICZ back 2 to S81, respectively.

It should be understood that although all of the contacts of the relay set DE are closed at this time, only the contacts 2, 3 and 5 are in closed circuits (circuit 133 and similar circuits).

Relays TK and TH operate (circuits 134 and 135).

*Circuit 134.*—Battery, TK (Fig. 28), TJ5 front 2, ground.

*Circuit 135.*—Battery, TH (Fig. 27), TA front 4, ground.

Magnets of accumulating switches S6, S7 and S8 operate (circuit 136 and similar circuits), together with transfer switch magnet TJ1 (circuit 137).

*Circuit 136.*—Battery, S6 (Fig. 46), DS1 wire 6a (Fig. 33), DKC back 1, DE front 1 (Fig. 32), DI wire 1a (Fig. 30) (Fig. 19), IAZ back 1 (Fig. 19), IT wire 1 (Fig. 24), TJ1 front 4, ground.

*Circuit 137.*—Battery, T1 (Fig. 29), TH front 3 (Fig. 27), TJ5 front 4 (Fig. 24), ground.

When the four magnets of switches S6, S7, S8 and T1, respectively, have all operated their interrupter contacts S6I, S7I, S8I and T1I, relay set TJ1 to TJ5 releases (circuit 131, open at TK back and circuit 71, open at T1 back I, etc.), but TK holds (circuit 138).

Figure 48:
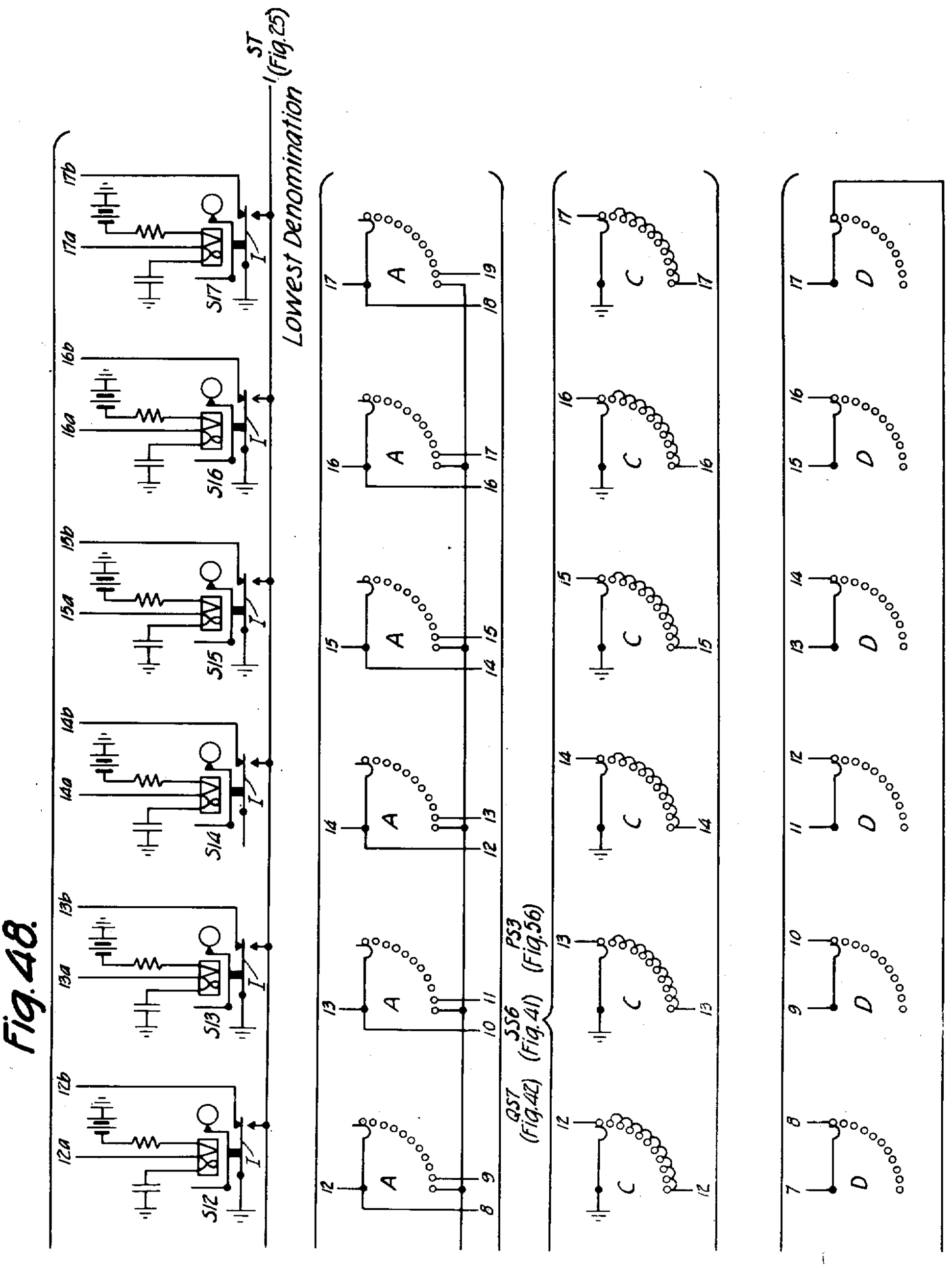

*Circuit 138.*—Battery, TK (Fig. 28), T2 front I, ground; ST' wire 1 (Fig. 48); S6I front (Fig. 46), ground; S7 front I, ground; S8 front I, ground.

Magnets S6, S7 and S8 release (circuit 136), open at TJ1 front 4, etc.) together with T1 (circuit 137 open at TJ5 front 4). When the four magnets S6, S7, S8 and T1 have all restored their interrupter contacts, TK releases (circuit 138, open at T1I, etc.). The wipers of switches S6, S7 and S8 and T1 are now standing in position 1. IAZ operates (circuit 139) and locks (circuit 140) to IX front 3.

*Circuit 139.*—Battery, IAZ (Fig. 19), IAA front 2, IAB front 3, IAC back 3, IAD front 3, IM wire 1 (Fig. 58), MZ back 2, MA front 18 (MA relay set operated in circuit 118), MT2 wire 1 (Fig. 28), T1B wiper in position 1, TA front 2, ground.

*Circuit 140.*—Battery, IAZ (Fig. 19), IAZ front 1, IX front 3 (Fig. 22), ground.

TH (Fig. 27) holds in an obvious circuit to T1D wiper off-normal. TJ1–TJ5 operate a second time (circuit 141) and lock (circuit 142) except that the branch including S6I back is open at IAZ front 3, followed by TK (to TJ2 front).

*Circuit 141.*—Battery, TJ1 to TJ5 (Fig. 24), TCB front 2 (Fig. 26), T1A off-normal, TK1 back, ground, (TK released after circuit 138).

S7 and S8 operate (circuit 136 and a similar circuit), together with T1 (circuit 137). When the magnets of these three switches (S7, S8 and T1) have all operated their interrupter contacts, TJ1 to TJ5 release and TK holds (circuit 138) except that the branch including S6 front I is open. S7, S8 and T1 release, followed by TK. The wipers of these switches (S7, S8 and T1) are now standing in positions 2 and those of switch S6 have remained in position 1.

IBZ operates (circuit 142) and locks in an obvious circuit to IX2 front.

*Circuit 142.*—Battery, IBZ (Fig. 21), IBA back 2, IBB front 1, IBC back 1, IBD front 1, IM wire 2 (Fig. 58), MZ back 3, MA17 front (Fig. 58), MT2 wire 2 (Fig. 28), T1B wiper in position 2, TA front 2 (Fig. 26), ground.

Relay set TJ1 to TJ5 operates a third time (circuit 141) and locks (circuit 132) except that the branches including S6 back I and S7 back I are both open, followed by TK, as before. S8 operates (circuit 136) together with T1 (circuit 137). When both magnets have operated their interrupter contacts, TJ1 to TJ5 release but TK holds (circuit 138) except that the branches including S6 front I and S7 front I are both open. Switches S8 and T1 release, followed by TK and the wipers of these switches are now standing in positions 3. TJ1 to TJ5, TK, S8 and T1 operate and release in succession five more times in precisely the same manner and the wipers of switches S8 and T1 are then standing in position 8. ICZ operates (circuit 143) and locks in an obvious circuit to IX2 front (Fig. 22).

*Circuit 143.*—Battery, ICZ (Fig. 21), ICA back 2, ICB front 1, ICC back 1, ICD back 1, IM wire 8 (Fig. 58), MZ back 9, MA10 front, MT2 wire 8 (Fig. 28), T1B wiper in position 8, TA front 2 (Fig. 26), ground.

Relay set TJ1 to TJ5 operates a ninth time (circuit 141) and locks (circuit 144), followed by TK and T1, as before.

*Circuit 144.*—Battery, TJ1 to TJ5 (Fig. 24), TJ5 front 3, T1 back I (Fig. 29), T2 back I, ground.

When T1 operates its interrupter contacts, TJ1 to TJ5 release but TK holds in an obvious circuit to T1 front I. T1 releases, followed by TK. The wipers of switch T1 are now standing in positions 9. TL operates (circuit 145) and locks (circuit 146), followed by SDA and SDB (circuit 147).

*Circuit 145.*—Battery, TL (Fig. 25), T1A wiper in position 9 (Fig. 29), TJ (Fig. 28), TK back, ground.

*Circuit 146.*—Battery, TL (Fig. 25), TL front 6, T1 back I (Fig. 29), T2 back I, ground.

*Circuit 147.*—Battery, SDA (Fig. 38), battery SDB (Fig. 40), SDA, ST1 wires 1 and 2, TL fronts 1 and 2 (Fig. 25), ground.

SH (Fig. 39) operates (circuit 148) and locks (circuit 149).

*Circuit 148* (Figs. 38 and 40).—Battery, SH (Fig. 39), SDA front 18.

*Circuit 149.*—Battery, SH (Fig. 39), SH front 2, SJ back 1, SBA front 4, ground.

Upon the energization of SH (circuit 148) it releases SBB (energized in circuit 25, open at SH back 2). TK (Fig. 28) and TLL (Figs. 15 and 16) operate (circuits 150 and 151) as a result of TL operating, followed by T1 (circuit 152).

*Circuit 150.*—Battery, TK (Fig. 28), TL front 4 (Fig. 25), ground.

*Circuit 151.*—Battery, TLL (Fig. 27), TL front 3 (Fig. 25), ground.

*Circuit 152.*—Battery, T1 (Fig. 29), TH front 3 (Fig. 27), TLL front 2, ground.

TL releases (circuit 145, open at TK back, and circuit 146, open at T1I) and TK holds, as before, to T1 front I.

TLL1 causes operation of CSC (Fig. 11) (circuit 153) which locks (circuit 154) to CJ front 2 (Fig. 12), front, CAA front 4 and CBB front 3.

*Circuit 153.*—Battery, CSC (Fig. 11), CT wire 2 (Fig. 25), TH front 1 (Fig. 27), TLL front 1, ground.

*Circuit 154.*—Battery CSC (Fig. 11), CSC front 1, CGG front 2, ground; CAA front 4 (Fig. 12), ground; CBB front 3, ground.

When TLL operates it releases IX (Fig. 22) (circuit 21, open at TLL back 2), followed by IZ (Fig. 20) (circuit 22). Consequently, the eight relays IAZ–IHZ (Fig. 27) for which IX furnishes lock ground, as previously described, release IX front 3. The operated storage relays IAA, IAB and IAD of the first row, IBB and IBD of the second row and ICB of the third row release locking circuits open at IZ front 2. CSD releases (circuit 39, open at CSC back), followed by CU (locking circuit 110, open at CSD front 2, TA (circuit 119, open at CU front 1), DE and DX (circuit 122, open at CU front 2), CPD7 (circuit 110*a*, open at CU front 4), K7 (circuit 111, open at CPD7 front 1), and CKB (circuit 77, open at CSD4). CKA (Fig. 16) operates again (circuit 27, reclosed at CKB back). K7 unlocks the key set, key + restores as soon as the pressure is removed and CA, CB, CG, CAA, CBB, CGG and CKB release. CKA operates again (circuit 27, reclosed at CKB back). In the meantime, TLL (circuit 151) releases (open at TL front 3), together with SDA and SDB (circuit 147, open at TL front 1), and followed by T1 (circuit 152, open at TLL front 2) and TK. The wipers of switch T1 are now standing in positions 10. IX operates again (circuit 21, reclosed at TLL back 2), followed by IZ (circuit 22), as before. CSC releases (circuit 153, open at TLL front 1; and locking circuit open at CAA front 4 and CBB front 3. CSD operates again (circuit 39). TM operates (circuit 155 and locks circuit 156), followed by SEA and SEB (circuit 157).

*Circuit 155.*—Battery, TM (Fig. 25), T1A wiper in position 10 (Fig. 29), TK back, ground.

*Circuit 156.*—Battery, TM (Fig. 25), TM front 5, T1 back I (Fig. 29), T2 back I, ground.

*Circuit 157.*—Battery, SEB (Fig. 38), SEA, (Fig. 42) ST1 wires 3 and 4 (Fig. 25), TM fronts 1 and 2, ground.

SJ (Fig. 39) operates (circuit 157), and locks (circuit 158) in an obvious circuit to SBA1 front.

*Circuit 158.*—Battery, SJ (Fig. 39), SEB front 18 (Fig. 38), ground.

*Circuit 159.*—Battery, SJ, (Fig. 39) SJ front 1, SBA front 4, ground.

SBA holds (circuit 159).

*Circuit 160.*—Battery, SBA (Fig. 39), SEA front 18 (Fig. 42), ground.

SH releases (circuit 149, open at SJ back 1). TK and TMM operate (circuits 161 and 162, respectively) followed by T1 (circuit 163).

*Circuit 161.*—Battery, TK (Fig. 28), TM front 3, ground.

*Circuit 162.*—Battery, TMM (Fig. 27), TM front 4, (Fig. 25) ground.

*Circuit 163.*—Battery, T1 (Fig. 29), TH front 3 (Fig. 27), TMM front 3, ground.

TM releases (circuit 154, open at TK back, and circuit 156, open at T1I) and TK holds, as before, to T1I front. TMM releases, together with SEA and SEB (circuit 157, open at TM2 back I), and followed by SBA (circuit 160, open at SEA front 18, and circuit 24, open at SJ1), T1 (circuit 163, open at TMM front 3) and TK (circuit 161). The wipers of switch T1 are again standing in their normal position and TH accordingly releases (open at T1D).

SJ releases (open at SEB18 and SBA front 4). SBA operates again (circuit 24, reclosed at SJ back 2), followed by SBB (circuit 25).

At this stage, relays CKA, CSA, CSB, CSD, CX, IX, IZ, MA, PA, PB, PX, SA, SBA AND SBB are operated; all storage relays are released; the wipers of switches P1, P4 and P5 are standing in positions 3, 3 and 4, respectively; and those of switches S6, S7 and S8 in positions 1, 2 and 8, respectively. The wipers of all other accumulating switches being still in their normal positions, the aggregate registered is thus 000,001,280.00000000.

It will be observed that during the process of transfer TJ1 to TJ5 operated and released nine times, thus creating 9 impulses. The wipers of switch T1 advanced by one step at each impulse.

The wipers of switch S6 advanced by one step at the first impulse but were thereafter unaffected, the impulsing circuit having been cut by the operation of IAZ over contacts depending on the setting of the storage relays to store the digital value 1. Similarly, the wipers of switch S7 advanced by two steps and then the impulsing circuit was cut by the operation of IBZ, whereas the wipers of switch S8 advanced by eight steps before the impulsing circuit was cut by the operation of ICZ. The impulsing circuits of switches S9–S13, the remainder of the eight switches brought into circuit by the operation of DE, were cut before impulsing started by the operation of the five relays IDZ–IHZ because the corresponding five storage sets IDA–IDH were all storing the digital values 0. After the nine steps made under the control of TJ1 to TJ5, T1 made two further steps, under the control of TL and TM respectively, and so completed its cycle. During these steps, carry-over correction and compensation would have been effected had the transfer process given rise to carry-over; this was clearly not the case in the example described, since no accumulating switch had received more than nine impulses. These operations will be described later.

*Second factor 59 submitted, printed and stored*

When key 5 (Fig. 3) is depressed by the operator, it closes contacts connected to wires 2, 3 and 5 to operate code receiving relays CB, CC and CF (Fig. 10); selector magnets K2 and K3 (Figs. 3 and 66) operate to select character 5; printing magnet K6 (Figs. 3 and 66) operates to print it; locking magnet K7 operates to lock the keys during printing; storage relays IAB (Fig. 19) and IAC (Fig. 18) operate (circuit 80 and a similar circuit) and lock to store the digital value 5; and the wipers of switches D1, I1 and I2 advance to positions 1; the above-mentioned relays and magnets release again, together with relays CBB, CCC, CFF, CFA, CH, IJ, DY, CLL and CKB, which have also operated momentarily, CKA releases and operates again; all in a manner similar to that described in connection with the receiving, printing and storing of the value of the first digit 1 of the first factor submitted.

It is to be noted, however, that this time PFB does not operate (circuit 84, open at CX back 1) and the wipers of switches P2 and P5 accordingly do not advance, the signal + having indicated a kind of problem in the computation of which these switches serve no useful purpose. The wipers of the switch P5 will be returned to their normal positions in due course, as explained hereinafter.

Similarly, when key 9 (Fig. 3) is depressed by the operator, contacts of wires 1 and 5 are closed to operate relays CA and CF (Fig. 10); K1 (Figs. 3 and 66) operates to select character 9; K6 operates to print this character; K7 operates to lock the key set during printing; IBA operates (circuit 164) and locks to store the digital value 9; the wipers of D1, I1 and I2 advance to position 2; and other relays operate and release again as before.

*Circuit 164.*—Battery, IBA (Fig. 21), I1C wiper in position 1 (Fig. 19), IC wire 1 (Fig. 10), CFA front 1, CA front 1, ground.

At this stage, relays IAB, IAC and IBA are operated and are storing the digital values 59; relays CSA, CSB, CSD, CKA, CX, IX, IZ, MA, PA, PB, PX, SA, SBA AND SBB are also operated; the wipers of D1, I1, I2, P1, P4 and P5 are standing in their positions 2, 2, 2, 3, 3 and 4 respectively; and the wipers of switches S6, S7 and S8 in positions 1, 2 and 8, respectively.

*Use of cancel key*

Should the operator discover after keying the factor 59 that one or both digits are incorrect, the record of the whole factor stored in the calculator can be obliterated, without affecting the accumulated aggregate, by operating the cancel key

CNL
/ and a fresh factor can be submitted afterwards. The operation is as follows:

When key

CNL
/

(Fig. 3) is depressed it closes contacts connected to wires 6 to operate relay CG, and CG (Fig. 10) operates, together with CGG; magnet K5 operates to select character / and shift the red field 117 of the ribbon to the printing point; magnet K6 operates to print the selected character; the magnet releases again, together with keys CH and CLL which have operated momentarily; magnet K7 operates to lock the keys; CKA releases; CKB operates; all in a manner similar to that described in connection with the receiving and printing of the sign +. In the meantime, the cancel relay CY operates, circuit 165 and holds CSB (Fig. 13) in an obvious circuit to CY front 3.

*Circuit 165.*—Battery CY (Fig. 11), CEE back 1 (Fig. 12), CCC back 2, CBB back 1, CAA front 3, CGG front 1 (Fig. 11), CSD front 3 (Fig. 10), ground.

IX (Fig. 22) releases (circuit 21, open at CY front 3 which holds CSB), followed by IZ (Fig. 20) and all operated storage relays release also (locking circuits open at IZ front 1). DZ operates (circuit 166) and locks in an obvious circuit to DZ front 1.

*Circuit 166.*—Battery, DZ (Fig. 36) D1A wiper off-normal, DC wire 3 (Fig. 13), CQD back 4 (Fig. 15), CY front 2, ground.

IK operates (circuit 167) and locks in an obvious circuit to IK front 3.

Figure 18:
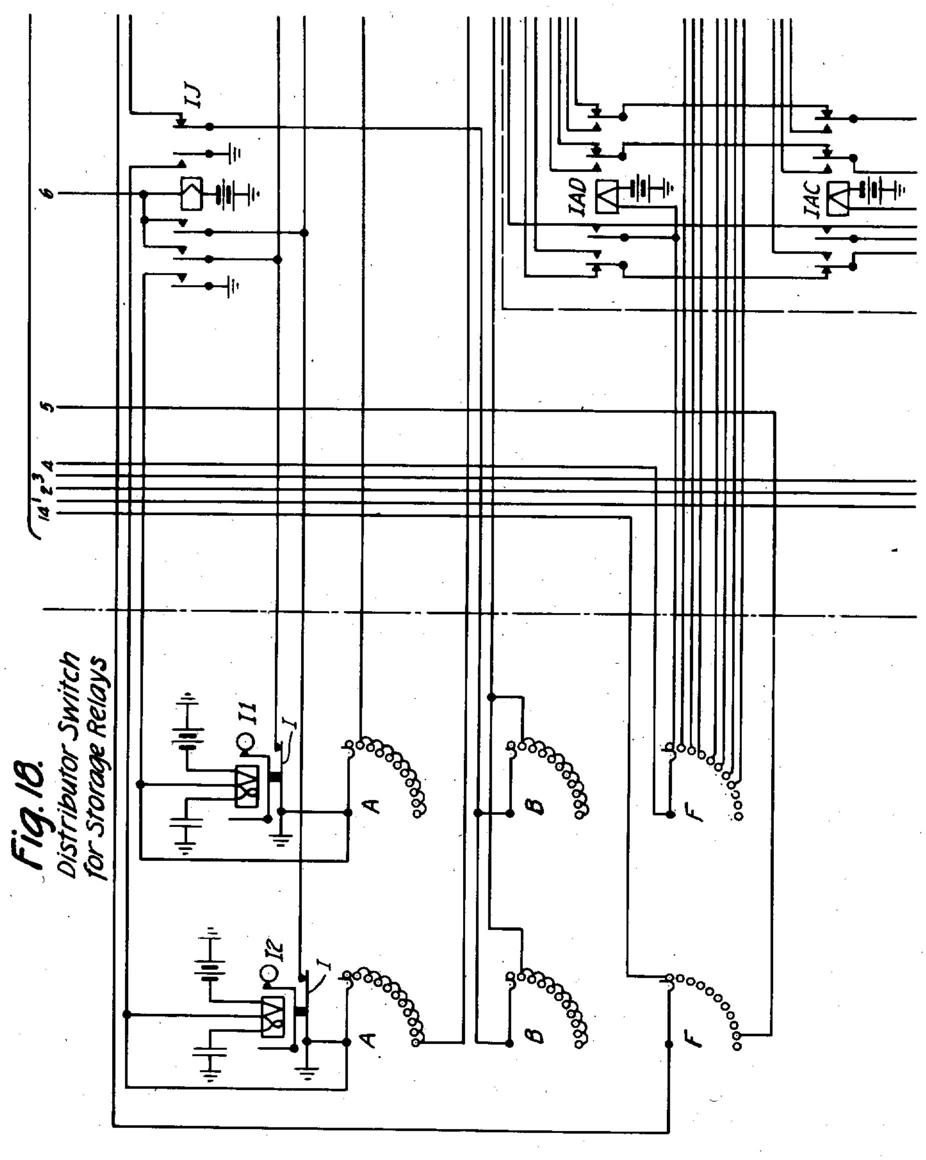

*Circuit 167.*—Battery, IK (Fig. 20) IJ back 1 (Fig. 18); I1B wiper off-normal; I2B wiper off-normal; IC wire 7 (Fig. 11), CY front 1, ground.

CPD7 operates (circuit 168).

*Circuit 168.*—Battery, CPD7 (Fig. 12), CSA front 1; DC wire 5 (Fig. 36), DZ front 4, ground; IC wire 8 (Fig. 20), IK front 5, ground.

K7 continues to hold (circuit 111) after CH has released. D1 operates (circuit 125) and the wipers return to their normal positions, as previously described. I1 and I2 operate (circuit 128 and a similar circuit) and the wipers return to their normal positions similarly. DZ (Fig. 36), IK (Fig. 20) and CPD 7 (Fig. 12) release. K7 (Fig. 3) releases (circuit 41, open at CPD8 front 6; circuit 111, open at CPD7 front 1) and the cancel key restores as soon as the pressure is removed. CG, CAA and CGG release, followed by CY (circuit 165, open at CAA front 3 and CGG front 1). IX re-operates (circuit 21, re-closed at CY front 3 to CSB) followed by IZ (circuit 22 re-closed at CY back). CKB (Fig. 16) releases and CKA re-operates.

It will be observed that, as a result of keying the cancel sign, the record of the factor keyed immediately before has been deleted and the wipers of switches D1, I1 and I2 have returned to their normal positions. The situation in the calculator is, in fact, indistinguishable from the situation before the factor 59 was keyed. A new factor may accordingly be submitted.

It is supposed that the new factor submitted is again 59. The digital values are stored by the operation of IAB, IAC and IBA and the wipers of switches D1, I1 and I2 advance to positions 2, precisely as previously described.

*Sub-total sign submitted and printed*

When the sub-total key

SUB

⊨

(Fig. 3) is depressed by the operator, the contacts connected to wires 1, 4 and 6 are closed to operate relays CA, CE and CG (Fig. 10) and lock, followed by CAA, CEE and CGG; magnets K1, K4 and K5 operate to select the sub-total character and the red field of the ribbon; magnet K6 operates to print the character; these magnets K1, K4, K5 and K6 release again, together with CH and CLL which have operated momentarily; magnet K7 operates to lock the key set; CKA releases; CKB operates; all in a manner similar to that described in connection with the receiving and printing of the sign +.

In the meantime, sub-total relay CMA operates (circuit 169) and locks (circuit 170).

*Circuit 169.*—Battery, CMA (Fig. 16), CEE front 1 (Fig. 12) CCC back 2, CBB back 3, CAA front 3, CGG front 1, CSD front 3, ground.

*Circuit 170.*—Battery, CMA, (Fig. 16) Ry 13, CMA front 2, Ry (Fig. 17); CMB, CSA front 4, ground; PC wire 13 (Fig. 50), PB front 3 (Fig. 54), ground.

CRA operates (circuit 171) and locks in an obvious circuit to CSB front 3.

*Circuit 171.*—Battery, CRA (Fig. 13), CX front 2, CMA front 1 (Fig. 16), ground.

SA holds (circuit 172) independently of CSB6.

*Circuit 172.*—Battery, SA (Fig. 39), SC wire 1 (Fig. 13), CMA front 3 (Fig. 16), ground.

CU operates (circuit 173) and locks in an obvious circuit to CSD front 2.

*Circuit 173.*—Battery, CU (Fig. 15), CRA front 5 (Fig. 13), CSD front 2 (Fig. 10), ground.

CPD7 operates (circuits 110*a* and 174).

*Circuit 174.*—Battery, CPD7 (Fig. 12), CSA front 1 (Fig. 15), CRA front 1, ground.

K7 continues to hold (circuit 111) after CPD8 has released.

It is to be noted that the keys remain locked after the completion of printing in order that the storage relays IAA–IHD (Figs. 18–23) may be cleared once again of their record before the submission of further digits is permitted.

As a consequence of the operation of CU, relay set DG operates (circuit 175), together with TA (circuit 119, re-closed at CU front 1).

*Circuit 175.*—Battery, relay set DG (Fig. 34), D1B wiper in position 2 (Fig. 36), Dy, DX back, DC wire 2 (Fig. 13), CU front 2, ground.

DG set locks and DX operates (circuit 176).

*Circuit 176.*—Battery, DG (Fig. 34), DG front 18, DX, (Fig. 36) then same as circuit 122 from DX.

DZ operates (circuit 123) and locks (circuit 124). D1 operates (circuit 125) and the wipers of this switch return to their normal positions, whereupon DZ releases, as previously described. IK operates (circuit 126) and locks (circuit 127). I1 and I2 operate (circuit 128 and a similar circuit) and the wipers of these switches return to their normal positions, whereupon IK releases, as previously described.

*Factor 59 added to aggregate*

As a consequence of the operation of TA (circuit 119), the process of transferring the digital values stored in the input circuit to the accumulating switches begins once more. ICZ, IDZ, IEZ, IFZ, IGZ and IHZ operate (circuit 130 and similar circuits) and lock in obvious circuits to IX front 3. TJ1 to TJ5 operate (circuit 70) and lock (circuit 177).

*Circuit 177.*—Battery, TJ1 to TJ5 (Fig. 24), TJ5 front 3; T1I back (Fig. 29), T2I back, ground; wire IT11 (Fig. 24), IAZ back 3 (Fig. 19), D1 wire 16 (Fig. 30), DG front 2 (Fig. 34), DKD back 2 (Fig. 35), DS1 wire 8*b* (Fig. 46), S8I back, ground; and a similar branch over IBZ back 2 to S9I back.

TK (Fig. 28) operates in an obvious circuit to TJ5 front 2 and TH (Fig. 27) in an obvious circuit to TA front 4. Magnets of switches S8 and S9 operate (circuit 178 and a similar circuit), together with magnet T1 (circuit 137).

*Circuit 178.*—Battery, S9 (Fig. 46), DS1 wire 9*a* (Fig. 35), DKD back 3, DG front 3, DI wire 2*a* (Fig. 21), IBZ back 1, It wire 2 (Fig. 24), TJ1 front 3, ground.

When the three magnets of switches S8, S9 and T1 have all operated their interrupter contacts, TJ1 to TJ5 release but TK holds (circuit 179).

Figure 28:
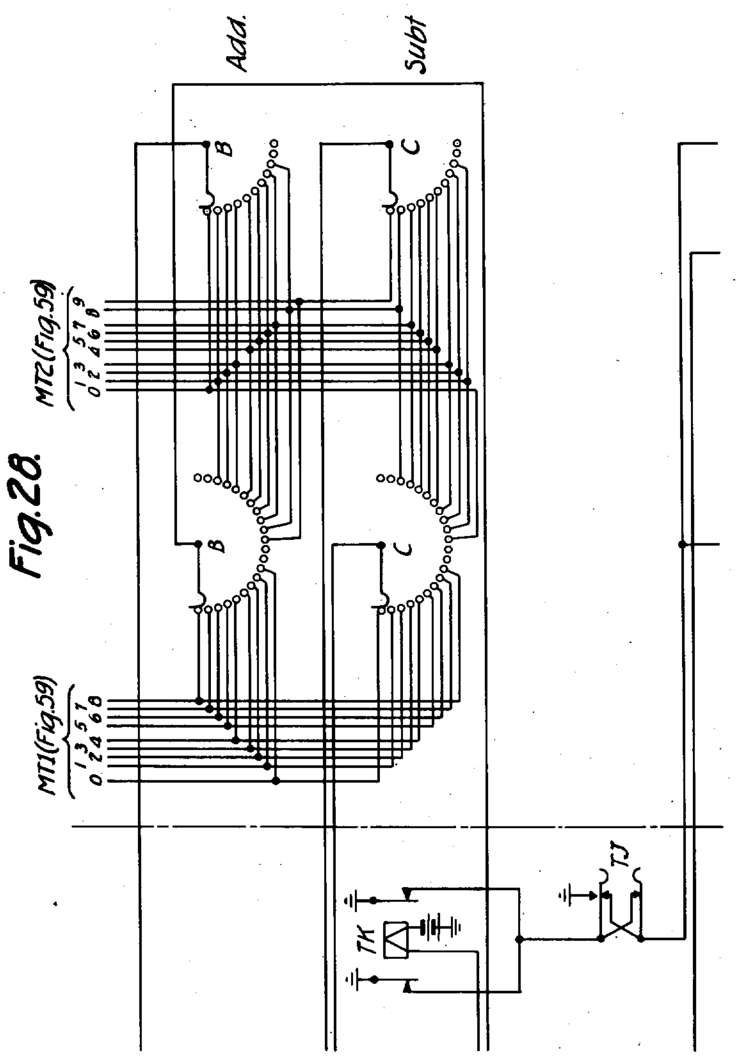
Figure 29:
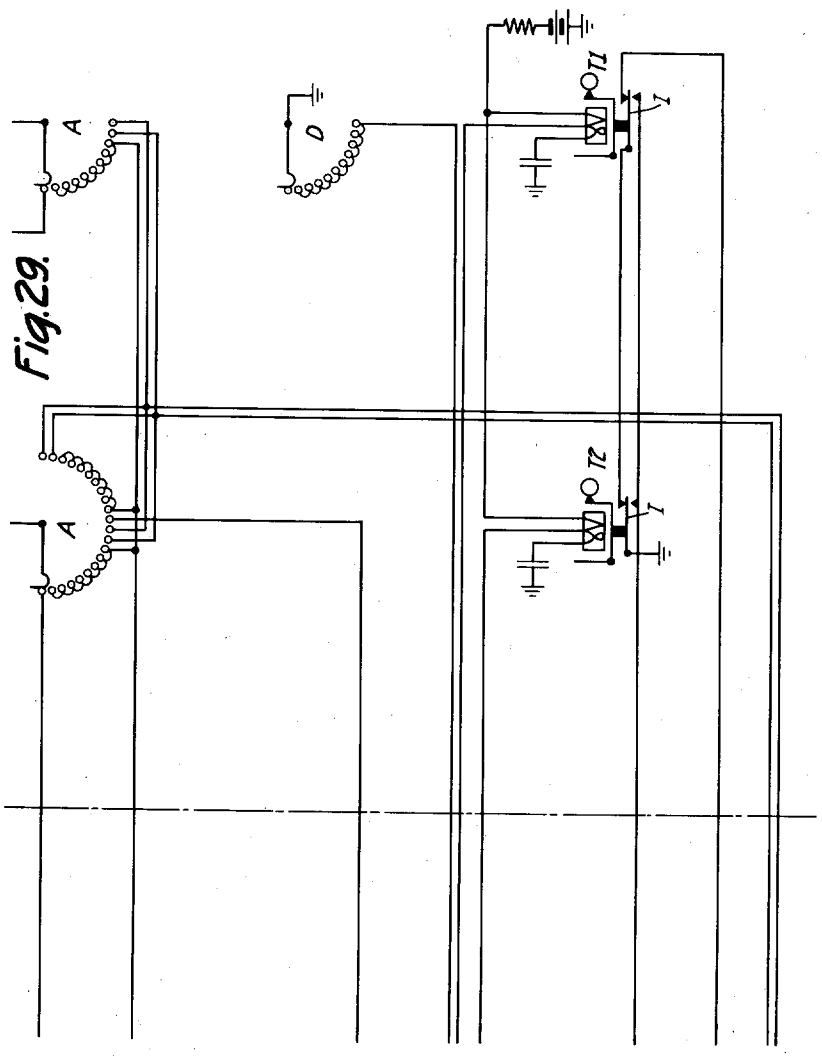

*Circuit 179.*—Battery, TK (Fig. 28); TJ5 front 1 (Fig. 24), ground T2I back, T1I front, ground; ST' wire 1 (Fig. 48), S8I front (Fig. 46), ground; S9I front, ground.

S8, S9 and T1 release, followed by TK. TH holds to T1D off-normal, independently of TA front 4. TJ1 to TJ5, TK, S8, S9 and T1 operate and release in succession four more times in precisely the same manner. The wipers of switches S9 and T1 are now standing in positions 5, whereas those of switch S8, having made five steps from position 8, are standing in positions 2 of their second cycle.

In the meantime, when the wipers of switch S8 are standing in positions 10 of their first cycle, SCH operates (circuit 180) and locks in obvious circuits to SBA front 2 (Fig. 39) and SBB front 3, over SCH fronts 1 and 2, respectively, to record the fact that a carry-over is required from this switch to switch S7.

*Circuit 180.*—Battery, SCH (Fig. 40), SS2 wire 8 (Fig. 46), S8A in position 10, SS4 wire 1 (Fig. 39), SBB front 3, ground.

When the wipers of switch T1 reach position 5, IAZ operates (circuit 181) and locks in an obvious circuit to IX front 3, opening one of the locking circuits of TJ1 to TJ5 relay set (circuit 177, at IAZ back 2) and the energizing circuit of S8 (similar to circuit 178, at IAZ back 1).

*Circuit 181.*—Battery, IAZ (Fig. 19), IAA back 2, IAB front 1, IAC front 1, IM wire 5 (Fig. 58), MZ back 6, MA front 13, MT2 wire 5 (Fig. 28), T1B in position 5, TA front 2, ground.

TJ1 to TJ5, TK, S9 and T1 operate and release in succession four more times in the same manner, except that the locking circuit of TJ1 to TJ5 is modified as described above and the holding circuit of TK (circuit 179) does not include S8I front. The wipers of switches S9 and T1 are now standing in positions 9, whereas those of switch S8 have remained in positions 2.

It is to be noted that the wipers of switches S6 and S7 have not been affected by the transfer operation now completed and are still standing in positions 1 and 2, respectively. The aggregate registered at this stage is thus 000,001,229.00000000.

*Carry-over correction*

TL operates (circuit 145) followed by SDA and SDB (circuit 147), TK, TLL and T1 (circuits 150, 151 and 152, respectively). SH operates (circuit 148) to SDA front 18, locks (circuit 149), and SBB releases, TL locks (circuit 182), S7 operates (circuit 183) and TK holds (circuit 184).

*Circuit 182.*—Battery, TL (Fig. 25), TL front 6; T1I back (Fig. 29), T2I back, ground; ST wire 5 (Fig. 38), SCH front 4 (Fig. 40), SDB front 8, SS1 wire 7b (Fig. 38), S7I back (Fig. 46), ground.

*Circuit 183.*—Battery, S7 (Fig. 46), SS1 wire 7a (Fig. 39), SDA front 8 (Fig. 38), SCH front 3 (Fig. 40), ground.

*Circuit 184.*—Battery, TK (Fig. 28), T1I front (Fig. 29), ground; ST' wire 1 (Fig. 48), S7I front (Fig. 46), ground.

CSC operates (circuit 153) and locks in an obvious circuit to CPD7 front 2 and CBB front 3. IX releases, followed by IZ, the seven cut-off relays IAZ and ICZ–IHZ, the operated storage relays IAB, IAC and IBA, and relays CSD, CU, TA, DG, DX and CKB. CKA operates again (circuit 27, re-closed at CKB front). When switches T1 and S7 have both operated their interrupter contacts, TL releases, followed by SKA, SDB, TLL, T1, S7 and TK. IX operates again (circuit 21, re-closed at TLL back 2), followed by IZ. The wipers of switch T1 are now standing in positions 10; those of S7, having made one step from positions 2, are standing in positions 3; and the carry-over correction has been completed. The aggregate registered at this stage is thus 000,001,329.00000000.

*Compensation*

TM operates (circuit 155) followed by SEA (Fig. 42) and SEB (Fig. 38), TK, TMM and T1 (circuit 163). SJ operates to SEB front 18 and locks to SBA front 4. SBA holds to SEA front 18, but SH releases. TM locks (circuit 185), S8 operates (circuit 186) and TK holds (circuit 187).

*Circuit 185.*—Battery, TM (Fig. 25), TM front 6, T1I back (Fig. 29), T2I back, ground; ST wire 5 (Fig. 38), SCH front 4 (Fig. 40), SEA front 8 (Fig. 42), SS1 wire 8b (Fig. 46), S8I back, ground.

*Circuit 186.*—Battery, S8 (Fig. 46), SS1 wire 8a (Fig. 38), SEB front 8, SCH front 3 (Fig. 40), ground.

*Circuit 187.*—Battery, TK (Fig. 28), T1I front (Fig. 39), ground; ST' wire 1 (Fig. 48), S8I front (Fig. 46), ground.

CRB operates (circuit 188) and locks (circuit 188a) to CSB front 4.

*Circuit 188.*—Battery, CRB (Fig. 13), CRA front 4, CT wire 6 (Fig. 25), TMM front 2 (Fig. 27), ground.

*Circuit 188a.*—Battery, CRB front 2 (Fig. 13), CSB front 4, ground.

When switches T1 and S8 have both operated their interrupter contacts, TM releases, followed by SEA, SEB, TMM, T1, S8, SBA, SCH, SJ, TH and TK. SBA re-operates (circuit 24, re-closed at SJ back 1), followed by SBB (circuit 25). PCA operates (circuit 189).

*Circuit 189.*—Battery, PCA (Fig. 52), PXD back 4 (Fig. 55), PE back 3 (Fig. 50), PL back 3 (Fig. 53), P1A wiper in position 3 (Fig. 56), PC wire 4 (Fig. 17), CRA front 6 (Fig. 13), CRB front 3, CT wire 7 (Fig. 25), TMM back 1 (Fig. 27), ground.

The wipers of switch T1 are now again standing in their normal positions; those of S8, having made one step from positions 2, are standing in positions 3; and compensation has been completed.

At this stage, relays CB, CBB, CE, CEE, CG, CGG, CJ, CKA, CMA, CRA, CRB, CSA, CSB, CSC, CX, IX, IZ, MA, PA, PXA, PB, PCA, PX, SA, SDA and SBB are operated; all storage relays are released; magnet K7 is operated and the key set is locked; the wipers of switches P1, P4 and P5 are standing in positions 3, 3 and 4, respectively; and those of switches S6, S7, S8 and S9 in positions 1, 3, 3 and 9, respectively. The aggregate registered is thus 000,001,339.00000000.

*Subtotal 1,339 printed*

As a consequence of the operation of PCA, PD operates (circuit 190) and locks in an obvious circuit over PE front 4 to PAA front 2.

*Circuit 190.*—Battery, PD (Fig. 52), PCA front 3, PXA front 1 (Fig. 54), ground.

PFA operates (circuit 191) and locks (circuit 32a).

*Circuit 191.*—Battery, PFA (Fig. 54), PXA front 2, PKA back (Fig. 55), PA front 2 (Fig. 52), PCA front 4, P1I closed (Fig. 56), ground.

Magnets of switches P1 and P4 (Fig. 56) operate in obvious circuits to PFA front 4 and PFA front 3, respectively. When both magnets have operated their interrupter contacts, PFA releases, followed by P1 and P4. The wipers of these switches are now standing in positions 4. PCA holds (circuit 192) although its operating circuit is now open (circuit 189, open at P1A).

*Circuit 192.*—Battery, PCA (Fig. 52), PXD back 4 (Fig. 55), PE back 3 (Fig. 50), PL back 3 (Fig. 53), P1A wiper in position 4 (Fig. 56), PS2 wire 1 (Fig. 44), S2D wiper in N position, SS4 wire 4 (Fig. 39), SLA back 1, SS4 wire 3 (Fig. 44), S1C, PS4 wire 1 (Fig. 50), PE back 1, ground.

PFA re-operates (circuit 191) and locks (circuit 32a). P1 and P4 re-operate, PFA releases and P1 and P4 release, as described hereabove. The wipers of these switches are now standing in position 5, where PCA continues to hold (circuit 193).

*Circuit 193.*—Same as circuit 192 to PL back 3; then P1A in position 5, PS2 wire 2 (Fig. 44), S3D wiper in position N, S2D wiper in position N; then as circuit 192.

The wipers of switches P1 and P4 advance to positions 6, where PCA still continues to hold (circuit 194).

*Circuit 194.*—Same as circuit 192 to PL back 3 (Fig. 53); then P1A wiper in position 6 (Fig. 56), PS2 wire 3 (Fig. 44), SD4 wiper in position N, S3D wiper in position N, S2D wiper in position N; then as circuit 192.

The wipers advance to positions 7 and 8 in turn and PCA holds in similar circuits. The wipers advance to position 9 where PCA releases.

It is to be noted that the conditions of wipers S2D, S3D . . . S5D have thus been scrutinized in turn while the wipers of switch P1 advanced. Wiper S6D being off-normal, i. e. registering a significant digital value, the advance of wipers of switch P1 (and switch P4) halts at positions 9 and printing of the number registered by the accumulating switches begins, as will now be explained.

*Printing of number registered*

PE operates (circuit 195), followed by PP (circuit 196) and CSC holds (circuit 197).

*Circuit 195.*—Battery, PE (Fig. 50), PD front 3

(Fig. 52), PCA back 1, PAa front 2 (Fig. 54), ground.

*Circuit 196.*—Battery PP (Fig. 53), PC wire 23 (Fig. 17), CKA front 4 (Fig. 16), PC wire 10 (Fig. 50), PE front 1, ground.

*Circuit 197.*—Battery, CSC (Fig. 11), CSBa front 3 (Fig. 16), PC wire 14 (Fig. 50), PD front 1 (Fig. 52), ground.

PFA operates (circuit 191) and locks (circuit 32a), followed by P1 and P4, as before. PMA operates (circuit 198) and locks (circuit 199).

*Circuit 198.*—Battery PMA (Fig. 50), PMB back 2 (Fig. 52), PKB front 3 (Fig. 55), PB front 2 (Fig. 54), PP front 4 (Fig. 53), ground.

*Circuit 199.*—Battery PMA (Fig. 50), PMA front 2, PMB (Fig. 52), PVA back 4 (Fig. 55), PB front 4 (Fig. 54), ground.

CAX, CBX and CEX operate (circuit 200). CGX operates (circuit 200) and causes the operation of CAX, CBX (circuit 200a) and CEX (circuit 200b).

*Circuit 200.*—Battery, CGX (Fig. 12), QC wire 1 (Fig. 65), QV back 3 (Fig. 63), QS1 wire 1 (Fig. 49), S6B wiper in position 1, PS1 wire 6 (Fig. 57), P1C wiper in position 9 (Fig. 57), PRB back 2 (Fig. 53), PXE back 1, (Fig. 55), PW back 1 (Fig. 53), PP front 1, PJA back 3 (Fig. 51), PL front 1 (Fig. 53), ground.

*Circuit 200a.*—Battery, CAX (Fig. 12), CBX, CGX front 1, ground.

*Circuit 200b.*—Battery, CEX (Fig. 12), CGX front 2, ground.

Operation of CAX, CBX and CEX cause the operation of K1, K2 and K4 (circuit 201 and similar circuits) to select character 1 of the printer.

*Circuit 201.*—Ground, K1 (Fig. 3), wire 11, AC wire 11 (Fig. 12) CAX front 2, battery.

QX (Fig. 61) operates in a circuit including CAX front 1 and CBX front 1 (Fig. 12) over wire 11 of group QC followed by other relays in the quotient circuit, but these relays have no useful function at this stage. CLL operates (circuit 36), followed by K6 (circuit 37) and character 1 is printed. CKA releases, followed by PP (circuit 196, open at CKA front 4), PFA (circuit 32, open at PP front 5; circuit 32a, open at P1I and P4I) P1 and P4. The wipers of switches P1 and P4 are now standing in positions 10. PMB operates (circuit 199, short-circuit removed at PP front 5), followed by PJA (circuit 202).

*Circuit 202.*—Battery, PJA (Fig. 51), PJC back 2 (Fig. 50), PMB front 1 (Fig. 52), P2C wiper in N position (Fig. 57), P4C wiper in position 10, PVA back 2 (Fig. 55), PKB back 1, PA front 4 (Fig. 52), ground.

CGX releases (circuit 200, open at PP front 1) followed by CAX, CBX, CEX, K1, K2, K4, QX, CLL and K6. CKA re-operates (circuit 27, reclosed at K6I), followed by PP (circuit 196, reclosed at CKA front 4). PJB operates (circuit 203) and locks (circuit 204), followed by CGX (Fig. 12) (circuit 200) and CEX (circuit 205).

*Circuit 203.*—Battery, PJB (Fig. 50), PJA front 2 (Fig. 51) PL back 2 (Fig. 53), PP front 5, ground.

*Circuit 204.*—Battery, PJB (Fig. 50), PJB front 2, PJC, PMB front 1 (Fig. 52), P2C wiper in N position, P4C wiper in position 10, PVA back 2 (Fig. 55), PKB back 1 (Fig. 55), PA front 4 (Fig. 52), ground.

*Circuit 205.*—Battery, CEX (Fig. 12), CGX front 2, ground.

K4 operates (circuit 76) and selects the comma (,) of the type-wheel. CLL operates (circuit 36), followed by magnet K6 (circuit 37) and the comma (,) is printed. CKA releases, followed by PP. PJC operates (circuit 204, short-circuit removed at PP front 5). PJA releases (circuit 202, open at PJC back 2) and CEX releases (circuit 205, open at CGX front 2), followed by magnet K4 (circuit 76, open at CEX front), CLL and K6. CKA and PP operate once more. PFA operates again and locks, followed by P1 and P4, as before. CAX and CEX operate (circuit 206 followed, as before, by QX).

*Circuit 206.*—Battery, CAX (Fig. 12), CEX, QC wire 3 (Fig. 65), QV back 5 (Fig. 63) QS1 wire 3 (Fig. 49), S7B wiper in position 3 (Fig. 47), PS1 wire 7 (Fig. 57), P1C wiper in position 10, PRB back 2 (Fig. 53), PXE back 1 (Fig. 55), PW back 1 (Fig. 53), PP front 1, PJA back 3 (Fig. 51), PL back 1 (Fig. 53), ground.

K1 and K4 operate (circuit 201 and a similar circuit) and select character 3 of the type-wheel. CLL operates, followed by K6, and character 3 is printed. CKA, PP, PFA, P1, P4, CAX, CEX, QX, K1, K4, CLL and K6 release. The wipers of switches P1 and P4 are now standing in positions 11. PJB and PJC release (circuit 204, open at P4C). CKA, PP, CAX and CEX operate again (circuit 207), a second character 3 is selected and printed in precisely the same manner, and the wipers of switches P1 and P4 advance to positions 12.

*Circuit 207.*—Same as circuit 206 to QS1 wire 3; then S8B in position 3 (Fig. 47), PS1 wire 8 (Fig. 57), P1C position 11; then same as circuit 132 from PRB back 2.

CKA, PP, PFA, P1 and P4 operate again. CAX operates (circuit 208) followed, as before, by QX.

*Circuit 208.*—Battery, CAX (Fig. 12), QC wire 9 (Fig. 65), QVB back 4 (Fig. 63), QS1 wire 9 (Fig. 49), S9B wiper in position 9, PS1 wire 9 (Fig. 57), P1C wiper in position 12 (Fig. 56); then same as circuit 206 from PRB back 2.

K1 operates (circuit 201) and selects character 9. CLL operates, followed by K6, and character 9 is printed. CKA, PP, PFA, P1, P4, CAX, QX, K1, C11 and K6 release. The wipers of switches P1 and P4 are now standing in positions 13. PKA operates (circuit 209), followed by PL (circuit 210), which locks (circuit 211).

*Circuit 209.*—Battery, PKA (Fig. 55), PRB back 3 (Fig.53), PXA back 5 (Fig. 54), P1B wiper in position 13 (Fig. 56), PX front 3 (Fig. 53), ground.

*Circuit 210.*—Battery, PL (Fig. 53), PNB back 1, PKA front 2 (Fig. 55), PXC back 1, ground.

*Circuit 211.*—Battery, PL (Fig. 53), PNB back 1, PL front 3, PA front 3 (Fig. 52), ground.

PKB (Fig. 55) operates (circuit 211a) and locks (circuit 211b).

*Circuit 211a.*—Battery, PKB (Fig. 55), PKA front 1, ground.

*Circuit 211b.*—Battery, PKB (Fig. 55) front 1, PA front 4 (Fig. 52), ground.

CKA (Fig. 16) re-operates as before but PP (Fig. 53) does not re-operate this time, its circuit 196 having been opened by PE (Fig. 50), which releases in the meantime, in a manner to be explained. PCA operates (circuit 212), followed by PD (circuit 213), PXG (circuit 214 and locks 215) and CZ (circuit 216).

*Circuit 212.*—PCA (Fig. 52), PXD back 4 (Fig. 55), PE back 3 (Fig. 50), PL back 3 (Fig. 53), P1A wiper in position 12, PS3 wire 3 (Fig. 46), S10D wiper in N position, SS wire 4 (Fig. 41), SKL back 2, SS wire 5 (Fig. 47), S11D wiper in position N, SKM back 2 (Fig. 41), S12D wiper in position N, SKN back 2, S13D wiper in position N, SKO back 2 (Fig. 43), S14D wiper in position N, SKP back 2, S15D wiper in position N, SKQ back 2, S16D wiper in position N, SKR back 2, S17D wiper in position N, SS4 wire 5 (Fig. 39), SA front 3, SP wire 1 (Fig. 50), PXA back 1 (Fig. 54).

PCA operates (circuit 212) followed by PD (circuit 213), PXG (circuit 214 and locks circuit 215) and CZ (circuit 216).

*Circuit 213.*—Battery, PD (Fig. 52), PCA front 3, PA*a* front 2 (Fig. 54), ground.

*Circuit 214.*—Battery, PXG (Fig. 50), PCA front 1 (Fig. 52), PE front 2 (Fig. 50), ground.

*Circuit 215.*—Battery, PXG (Fig. 50), PXG front 2, PE front 2, ground.

*Circuit 216.*—Battery, CZ (Fig. 11), PC wire 15, (Fig. 50), PE front 3, PCA front 1 (Fig. 52), PXG front 2 (Fig. 50), PD front 4 (Fig. 52), ground.

*Circuits partially restored to normal*

As a consequence of the operation of CZ, PFA operates (circuit 191) and locks (circuit 32*a*). P1 and P4 operate to PFA front 3 and PFA front 4, as before. When P1 and P4 have both opened their interrupter contacts, PFA releases, followed by P1 and P4. The wipers of switches P1 and P4 are now standing in positions 14. In the meantime CSB releases (circuit 20, open at CZ back 2) and CZ holds (circuit 217) independently of PE front 4.

*Circuit 217.*—Battery, CZ (Fig. 11) CSB*a* back 1 (Fig. 16), PC wire 1, PCA front 2 (Fig. 52), ground.

PE releases (circuit 195, open at PCA back 1), followed by PCA (circuit 212, open at PE front 2), and PP (circuit 196, open at PE front 1).

PKC operates (circuit 218).

*Circuit 218.*—Battery, PKC (Fig. 55), PKB front 3, PRA back 1 (Fig. 51), PE back 1 (Fig. 50), ground.

PA releases (circuit 29, open at CSB*a* front 4), followed by PB (open at PA front 4), PD (open at PXA front 1), PMA and PMB (circuit 199, open at PB front 3). CKA releases (circuit 27, open at CSB*a* front 2), together with IX (circuit 21, open at CSB front 5) IZ (circuit 22, open at IX front 1) and CRB (circuit 188*a*, open at CSB front 4). PKA releases (circuit 209, open at P1B), followed by PL (circuit 210, open at PKA front 1; circuit 211, open at PA front 1), PKB (circuits 211*a* and 211*b*, open at PKA front 1 and PA front 4), PKC (circuit 218, open at PKB front 1) and QX. CMB operates (circuit 170, short-circuit removed at PB front 3) and locks (circuit 219), short-circuiting CMA, which releases, followed by CRA.

*Circuit 219.*—Battery, CMB front 2 (Fig. 17), Ry, CMB, CSA front 4 (Fig. 12), ground.

SA holds (circuit 220).

*Circuit 220.*—Battery, SA (Fig. 39), SC wire 1 (Fig. 13), CMB front 3 (Fig. 17), ground.

PCD operates (circuit 221), followed by magnet P4 (circuit 222).

*Circuit 221.*—Battery, PCD (Fig. 50), P4A wiper off-normal (Fig. 56), PA*a* back 2 (Fig. 54), ground.

*Circuit 222.*—Battery, P4 (Fig. 56), PCD front 2 (Fig. 50), P4I closed (Fig. 56), ground.

P4 opens its interrupter contacts, releases, recloses them and re-operates; its wipers accordingly return to their normal positions, whereupon PCD releases (circuit 221, open at PA*a* back 2). PCE operates (circuit 223) and locks (circuit 224).

*Circuit 223.*—Battery, PCE (Fig. 52), P5A wiper off-normal (Fig. 56), PG back 2 (Fig. 50), PA*a* back 1 (Fig. 54), ground.

*Circuit 224.*—Like circuit 223 to PA5 wiper off-normal, then PCE front 3, ground.

Magnet of switch P5 operates (circuit 225) and CPD7 holds (circuit 226).

*Circuit 225.*—Battery, P5 (Fig. 56) PCE front 4 (Fig. 52), P5I closed (Fig. 56), ground.

*Circuit 226.*—Battery, CPD7 (Fig. 12), CSA front 1, PC wire 28, PCE front 2 (Fig. 52), ground.

P5 releases, re-operates similarly and its wipers advance to their normal positions, whereupon PCE releases (circuit 223, open at P5A), followed by CPD7 (circuit 100, open at CRA front 1; circuit 148, open at PCE front 2) and K7 (circuit 111, open at CPD7 front 1). The key set is unlocked and, provided the pressure of the operator has been removed, the sub-total ST restores; CB, CBB, CE, CEE, CG, CGG and CSC release. PCA re-operates (circuit 227), followed by magnet P1 (circuit 228).

*Circuit 227.*—Battery, PCA (Fig. 52), PXD back 4 (Fig. 55), PE back 3 (Fig. 50), PL back 3 (Fig. 53), P1A wiper in position 13, PS3 wire 5 (Fig. 48), S11D wiper in N position, SS6 wire 6 (Fig. 41), SKM back 2, then same as circuit 212 from SKM back 2.

*Circuit 228.*—Battery, P1 (Fig. 56), PA back 2 (Fig. 52), PCA front 4, P1I closed (Fig. 56), ground.

P1 opens its own circuit at P1I and releases, advancing its wipers to positions 15, where PCA holds (circuit 229).

*Circuit 229.*—Same as circuit 227 to PL back 3 (Fig. 53); then P1A wiper in position 15, SS4 wire 9, S12D wiper in position N (Fig. 48); then as circuit 212 from SKN back 2.

P1 operates and releases again in turn and advances its wipers to positions 16, 17, 18, 19, 20 and 21 in succession, PCA holding continuously (circuits similar to circuit 229, and then circuit 230).

*Circuit 230.*—Battery, PCA (Fig. 52), PXD back 4 (Fig. 55), PE back 3 (Fig. 50), PL back 3 (Fig. 53), P1A wiper in position 21, ground.

The wipers advance to their normal positions and PCA releases. During the return to normal of the wipers of switches P1, P4 and P5, CZ holds (circuits 217 and 231).

*Circuit 231.*—Battery, CZ (Fig. 11), CSB back 1 (Fig. 13), PC wire 1, PCD front 1 (Fig. 50), and PCE front 1 (Fig. 52), ground.

When all these wipers are in their normal positions, CZ releases.

At this stage, relays CMB, CSA, CX, MA, PX, SA, SBA and SBB alone remain operated; the wipers of all switches are in their normal positions except those of switches S6, S7, S8 and S9, which are standing in positions 1, 3, 3 and 9, respectively; and the aggregate the accumulating switches are registering, viz. 000,001,339.00000000, is thus retained for further computations.

*Three commas (, , ,) or clear sign printed*

As a consequence of the release of CZ, CSB re-operates (circuit 19, reclosed at CZ back 1), followed by IX (circuit 21), IZ (circuit 8) and PA, PA*a* and PXA (circuit 29), and the calculator causes the three characters to be printed on the tape as an indication that a further factor may be submitted for addition to, or subtraction from, the aggregate registered therein. These three characters are commas (,,,) instead of dots (...), and indicate to the operator that the aggregate has been retained in the calculator and that another factor may be submitted. These operations are similar to those of the clear sign (...) which occurred the moment the calculator was taken into use, and which have been fully described, except that since CMB is operated, CCX operates (circuit 232), followed by K4 to select the character",".

*Circuit 232.*—Battery, CCX (Fig. 12), CMB front 1 (Fig. 17), PC wire 6 (Fig. 50), PG back 1, PB back 2 (Fig. 54), PP front 4 (Fig. 53), ground.

The wipers of switches P1 and P4 advance, as described, to positions 3, where PB operates (circuit 38) and locks, followed by CSD (circuit 39). CMB releases (circuit 142, CMB short-circuited over CP2 wire 3 and PB1 front, Fig. 54). CKA operates (circuit 6, reclosed at K6I).

At this state, relays CKA, CSA, CSB, CSD, CX, IX, IZ, MA, PA, PB, PX, SA, SBA and SBB are operated; the wipers of switches P1 and P4 are standing in position 3; and the wipers of switches S6, S7, S8 and S9 in positions 1, 3, 3 and 9, respectively. The situation in the calculator is thus identical with the situation after the accumulation of the first factor submitted, except that the aggregate registered is now 1,339 and that the wipers of switch P5 which, as stated, serve no useful purpose in the kind of computation involved, are now standing in their normal positions.

*Plus sign (+) submitted in error and printed*

It is supposed that the operator, continuing the submission of the problem and intending to key the minus sign (—), keys in error the sign (+).

It is to be noted that at this stage no new factor has yet been submitted, so that none of the storage relays in the input circuit is operated and the wipers of the distributor switch D1 are accordingly standing in their normal positions.

The signal + is received in the calculator in the manner previously described and causes the character + to be printed on the tape 100 and CU to operate (circuit 109) and lock, precisely as before. TA operates (circuit 119), together with DJ (circuit 233) and DX (circuit 234) and once more initiates a transfer operation.

*Circuit 233.*—Battery, DJ (Fig. 34), D1B wiper in position N (Fig. 36), Dy, DX back, DC wire 2 (Fig. 13), CU front 2 (Fig. 15), ground.

*Circuit 234.*—Battery, DJ (Fig. 34), DJ front 18, DX (Fig. 36), then same as from PX in circuit 122.

Since the operation sign last received was also the sign +, this operation is of the same type as that which resulted in the accumulation of the factors 1,280 and 59, namely, an addition operation. TJ1–TJ5 set operates and releases nine times, TL once and TM once, causing the wipers of switch T1 to make a complete cycle, as before. This time, however, since none of the storage relays is operated, all eight relays IAZ . . . IHZ operate (circuit 130 and similar circuits) at the beginning of the transfer operation, so that none of the impulses from TJ1–TJ5 set reach the accumulating switches. The need for "carry-over correction" and "compensation" accordingly does not arise and the impulses from T1 and TM advance the wipers of switch T1 only. CU, IAZ–IHZ, TA, DE and DX then release and the situation in the calculator is precisely the same as it was before the erroneously keyed + was received.

*Minus sign (—) submitted and printed*

It is supposed that the operator, perceived the error, and proceeds to correct it by keying the sign —. CC and CG operate in the now familiar manner, followed by CCC over CC front 4 and CGG over CG front 4. COA operates (circuit 235) and locks to CSD front 2, followed by COB (circuit 236) which also locks (circuit 237), CPD7 (circuit 238) TA (circuit 239), DJ (circuit 240) and DX (circuit 241).

*Circuit 235.*—Battery, COA (Fig. 13), CCC front 3 (Fig. 12), CBB back 2 (Fig. 12), CAA back 3, CGG front 1 (Fig. 11), CSD front 3 (Fig. 10), ground.

*Circuit 236.*—Battery, COB (Fig. 13), COC back 1, COA front 4, ground.

*Circuit 237.*—Battery, COB (Fig. 13), Cyc, COB front 1, COC, CSB front 1, ground.

*Circuit 238.*—Battery, CPD7 (Fig. 12), CSA front 1, COA front 1 (Fig. 13), ground.

*Circuit 239.*—Battery, TA (Fig. 26), CT wire 3 (Fig. 13), COC back 2, COA front 6, CX front 5, ground.

*Circuit 240.*—Battery, DJ (Fig. 34), D1B wiper in position N, Dy, DX back 1 (Fig. 36), DC wire 2 (Fig. 13), COA front 2, ground.

*Circuit 241.*—Same as circuit 234.

The calculator causes sign — to be printed on the tape. TA initiates once more a transfer process which, since the operation sign last received was the sign +, is similar to that just described. The wipers of switch T1 make another cycle but no impulses reach the accumulating switches, since none of the storage relays is operated. When CSD releases, COA releases (circuit 235, open at CSD front 3; locking circuit open at CSD front 2), followed by CPD7 (circuit 238, open at COA front 1), TA (circuit 239, open at COA front 6), DJ and DX (circuit 241). COC operates (circuit 237, short-circuit open at COA front 4). CC, CCC, CG and CGG release as usual when K7 releases and the minus (—) key has been released.

At this stage, the situation in the calculator is precisely the same as it was before the sign — was received, except that the subtraction relays COB and COC now stand operated to ensure that the next factor submitted will be duly subtracted.

*Third factor 935.1 submitted, printed and stored*

It is assumed that the operator, continuing the submission of the problem, keys in succession the digits 9, 3 and 5, the decimal point sign (.) and the digit 1. Except at the moment the decimal point signal is received, the operations in the calculator are similar to those which followed the keying of the digits of previous factors and will not be described in detail herein.

When key 9 is depressed by the operator, the calculator causes character 9 to be printed on the tape, the storage relay IAA operates, see tables (Fig. 77), and locks, and the wipers of switches D1, I1 and I2 advance to positions 1.

It is to be noted that the magnets of switches P2 and P5 are not energized this time, since the circuit of PFB which controls them is open (circuit 84, open at CS back 1).

Similarly, when key 3 is depressed, character 3 is printed, storage relays IBA and IBD operate, and the wipers of switches D1, I1 and I2 advance to positions 2; when key 5 is depressed, character 5 is printed, relays ICB and ICC operate, and the wipers advance to positions 3.

When the decimal point key (.) is depressed, CC and CF operate, see Fig. 68, in the above described manner, followed by CCC and CH.

Magnets of switches DI, I1 and I2 are not operated for the sign (.).

Decimal point relay CV operates (circuit 242) and locks (circuit 243).

*Circuit 242.*—Battery, CV (Fig. 13), CCC front 1 (Fig. 12), CBB back 1, CAA back 1, CH front 2 (Fig. 11), ground.

*Circuit 243.*—Battery, CV (Fig. 13), CV front 2, IC wire 9 (Fig. 22), IZ front 1 (Fig. 20), IK back 2, ground.

A dot is printed and CC, CCC, CF and CH release.

When key 1 is depressed, character 1 is printed, IDA, IDB and IDD operate, and the wipers of switches I1 and I2 advance to positions 4.

It is to be noted that magnet of switch DI is not energized this time, since the circuit of DY which controls it is now open (circuit 87, open at CV back 2). The wipers of switch DI accordingly remain standing in positions 3 to indicate that there are three digits before the decimal point in the third factor submitted, whereas the wipers of switches I1 and I2, now standing in positions 4, indicate that this factor contains four digits in all.

At this stage, relays IAA, IBA, IBD, ICB, ICC, IDA, IDB and IDD, see table (Fig. 77), stand operated and are storing the digital values 9351; relays CKA, COB, COC, CSA, CSB, CSD, CX, IX, IZ, MA, PA, PB, PX, SA, SBA and SBB also stand operated; the wipers of switches DI, PI and P4 are standing in positions 3, those of switches I1 and I2 in positions 4, and those of switches S6, S7, S8 and S9 in positions 1, 3, 3 and 9, respectively.

*Equals sign (=) submitted and printed*

When key = is depressed by the operator, CE and CG operate, see table (Fig. 68), and lock, followed by CEE, CGG and key lock magnet K7. The calculator causes character = to be printed on the tape. CKB operates and CKA releases. In the meantime CRA operates (circuit 244) and locks to CSB4 front.

*Circuit 244.*—Battery, CRA (Fig. 13), CX front 2, CEE front 1, CCC back 1, CBB back 2, CAA back 3, CGG front 1, CSD front 3, ground.

CU operates (circuit 173) and locks to CSD2 front, together with CPD7 (circuits 110*a* and 174) and magnet K7 holds (circuit 111).

It is to be noted that the keys remain locked after the completion of printing in order that the record stored in the storage relays may not be interfered with by further keying. COC holds (circuit 245) and COB releases (circuit 237, COB short-circuited at CU front 6), DF (Fig. 32) and TB (Fig. 26) operate.

*Circuit 245.*—Battery CU front 6 (Fig. 15), COC front 1 (Fig. 13), COC, CSB front 1, ground.

*Circuit 246.*—Battery DF (Fig. 32), DIB wiper in position 3, D*y*, DX1 back (Fig. 36), DC wire 2 (Fig. 13), CU front 2 (Fig. 15), ground.

*Circuit 247.*—Battery, TB (Fig. 26), CT wire 4 (Fig. 13), COC front 3, CU front 1 (Fig. 15), CX front 5 (Fig. 13), ground.

DF locks and DX operates (circuit 248).

*Circuit 248.*—Battery DF (Fig. 32), DF front 8, DX (Fig. 36) then same as from DX in circuit 122.

DZ operates (circuit 123), locks (circuit 124), magnet of switch DI operates (circuit 125) and the wipers of this switch return to their normal positions, whereupon DZ releases, as already described. Similarly, IK operates (circuit 126), locks (circuit 127), I1 and I2 operate (circuit 128 and a similar circuit) and the wipers of these switches return to their normal positions, whereupon IK releases. The six relays DLA . . . DLF operate (circuit 249).

*Circuit 249.*—Battery, TB front 6 (Fig. 26), DT1 wire 5 (Fig. 37), DLA (Fig. 31), DLB, DLC, DLD (Fig. 33), DLE, DLF, DF front 15 (Fig. 32), ground.

*Subtraction correction*

As a consequence of the operation of TB, the process of transferring the digital values stored in the input circuit to the accumulating switches begins, this time on a complementary addition basis since the factor they represent is to be subtracted from the aggregate. It is necessary first to advance the wipers of switch S10 by one step for subtraction correction. TF operates (circuit 250), followed by S10 (circuit 251) and TK (circuit 252).

*Circuit 250.*—Battery TF (Fig. 25), TCB back 2 (Fig. 26), TB front 4, ST wire 9 (Fig. 38), SBB front 1 (Fig. 39), ST wire 10 (Fig. 25), T1A wiper in position N (Fig. 29), TK back (Fig. 28), ground.

*Circuit 251.*—Battery, S10 (Fig. 46), DS1 wire 10*a* (Fig. 33), DF front 7 (Fig. 32), DI wire 4*a* (Fig. 21), IZ1 back 3, IDZ back 1, IT wire 4 (Fig. 24), TJ1 front 1, ground.

*Circuit 252.*—Battery, TK (Fig. 28), ST′ wire 1 (Fig. 48), S10 front I Fig. 46), ground.

TH (Fig. 27) operates (circuit 253).

*Circuit 253.*—Battery, TH (Fig. 27), TB front 5 (Fig. 26), ground.

IAZ operates (circuit 254) and locks to IX front 3.

*Circuit 254.*—Battery, IAZ (Fig. 19), IAA front 2, IAB front 3, IAC back 2 (Fig. 18), IAD back 2, IM wire 7 (Fig. 58), MZ back 8, MA front 11, MT2 wire 7 (Fig. 28), T1C wiper in position 2, TB front 3 (Fig. 26), ground.

SF operates (circuit 255) and locks to SBA4 front.

*Circuit 255.*—Battery, SF (Fig. 39), ST wire 6 (Fig. 25), TN back 1 (Fig. 27), TB front 1 (Fig. 26), ground.

TGA (Fig. 27) operates (circuit 256) and locks (circuit 257).

*Circuit 256.*—Battery, TGA (Fig. 27), TF front 2 (Fig. 25), ground.

*Circuit 257.*—Battery, TGA (Fig. 27), TGA front 3, TCB (Fig. 26), TB front 2, TLL back 3 (Fig. 27), ground.

The four relays, IEA–IHA operate (circuit 258) and lock (circuit 259 and similar circuits).

*Circuit 258.*—Ground, IHA (Fig. 23), IGA, IFA, IEA (Fig. 21), I2C wiper in position 4 (Fig. 19), IT wire 12 (Fig. 24), TF front 1 (Fig. 25), QV back 1 (Fig. 63), battery.

*Circuit 259.*—Battery, IHA, IHA front 1, IZ front 2 (Fig. 20), ground.

The four relays IEZ–IHZ operate (circuit 260 and similar circuits) and lock over IEZ front 1 to IX front 2.

*Circuit 260.*—Battery, IEZ (Fig. 21), IEA front 2, IEB back 2, IEC back 3 (Fig. 20), IED back 3, IM wire 9 (Fig. 58), MZ back 10, MA front 9, MT2 wire 9 (Fig. 28), T1C wiper in position N, TB front 3 (Fig. 26), ground.

In the meantime, TF releases (circuit 250, open at TK back), followed by S10 (circuit 251), and TK (circuit 252, open at S10I). TGB operates (circuit 257, short-circuit removed at TF front 2). The wipers of the switch S10, having made one step from their normal positions, are now standing in positions 1 and subtraction correction has been completed.

*Factor 935.1 subtracted from aggregate*

As a consequence of the operation of TGB, TJ1–TJ5 set operates (circuit 261) and locks (circuit 262).

*Circuit 261.*—Battery, TJ1–TJ5 (Fig. 24), TCB front 2 (Fig. 26), TB front 4, ST wire 9 (Fig. 38), SBB front 1 (Fig. 39), ST wire 10 (Fig. 25), T1A wiper in position N (Fig. 29), TK back (Fig. 28), ground.

*Circuit 262.*—Battery, TJ1–TJ5 (Fig. 24), TJ5 front 3; T1I back (Fig. 29), T2I back, ground; DT2 wire 10 (Fig. 31), DLA front 2, DS1 wire 16 (Fig. 46), S1 back I (Fig. 44), ground, and 5 similar branches over S2 back I–S6 back I; IT wire 11 (Fig. 23), IBZ back 2 (Fig. 21), DI wire 2*b* (Fig. 30), DF front 4 (Fig. 32), DKD back 2 (Fig. 35), DS1 wire 8*b* (Fig. 46), S8 back I, ground, and 2 similar branches over S9 back I and S10 back I.

TK (Fig. 28) operates to TJ5 front 2, together with magnet of switch T1 (circuit 137, reclosed at TJ5 front 4). The six magnets of switches S1–S6 operate (circuit 263 and similar circuits), together with the three magnets of switches S8–S10 (circuit 264 and similar circuits).

*Circuit 263.*—Battery, S1 (Fig. 44), DS1 wire 1*a* (Fig. 31), DLA front 1, DT2 wire 1, TJ3 front 1 (Fig. 24), ground.

*Circuit 264.*—Battery, S8 (Fig. 46), DS1 wire 8*a* (Fig. 33), DKD back 1 (Fig. 35), DF front 3 (Fig. 32), DI wire 2*a* (Fig. 21), IBZ back 1, IT wire 2 (Fig. 24), TJ1 front) 3 (Fig. 28), ground.

When the ten magnets have all operated their interrupter contacts, TJ1–TJ5 set releases but TK holds (circuit 265).

*Circuit 265.*—Battery, TK (Fig. 28); T1 front I (Fig. 29), T2 back I, ground; ST' wire 1 (Fig. 48), S1 front I (Fig. 44), ground; and 8 similar branches over S2 front I, etc.

Magnets of switches T1, S1–S6 and S8–S10 release, followed by TK, whereupon TJ1–TJ5 set re-operates and the sequence of operations just described is repeated. TH holds to T1D off-normal. TJ1–TJ5 set operates and releases nine times, together with magnets of switch T1 and the six magnets of switches S1–S6. Magnets of switches S8, S9 and S10 operate and release in turn, also under the control of TJ1–TJ5, until their several circuits are opened by the cut-off relays IBZ, ICZ and IDZ, respectively, as will be explained. The circuits of the magnet of switch S7 and the four magnets of switches S11–S14 have already been opened by IAZ and IEZ–IHZ, respectively. When TJ1–TJ5 set has released for the fourth time and the wipers of switch T1 have made four steps, ICZ operates (circuit 266) and locks to IX2 front, opening the energizing circuit of the magnet of switch S9.

*Circuit 266.*—Battery, ICZ (Fig. 21), ICA back 1, ICB front 1, ICC front 1 (Fig. 20), IM wire 5 (Fig. 58), MZ back 6, MA front 13, MT2 wire 5 (Fig. 28), T1C wiper in position 4, TB front 3 (Fig. 26), ground.

The wipers of switch S9, having made four steps (the complement of 5 to the base 9) from positions 9, are standing in positions 2 of their second cycle. In the meantime, when the wipers are standing in positions 10 of their first cycle, SCJ operates (circuit 267) and locks to SBA2 front and SBB2 front, to record the fact that carry-over is required from switch S9 to switch S8.

*Circuit 267.*—Battery, SCJ (Fig. 40), SS2 wire 9 (Fig. 46), S9A wiper in position 10, SS4 wire 1 (Fig. 39), SBB front 2, ground.

When TJ1–TJ5 set has released for the sixth time and the wipers of switch T1 have made six steps, IBZ operates (circuit 268) and locks, opening the energizing circuit of the magnet of switch S8.

*Circuit 268.*—Battery, IBZ (Fig. 21), IBA front 2, IBB back 2, IBC back 3 (Fig. 20), IBD front 4, IM wire 3 (Fig. 58), MZ back 3, MA front 15, MT2 wire 3 (Fig. 28), T1C wiper in position 6, TB front 3 (Fig. 26), ground.

The wipers of switch S8, having made six steps (the complement of 3 to the base 9), from positions 3, are standing in positions 9. Although they have not yet completed their cycle, they will do so during carry-over correction when they will make an additional step to register the carry-over from switch S9. SCH accordingly operates (circuit 269) and locks to record the fact that carry-over is required from switch S8 to switch S7.

*Circuit 269.*—Battery, SCH (Fig. 40), SS2 wire 8 (Fig. 46), S8A wiper in position 9, S9A wiper in position 10, SS4 wire 1 (Fig. 39), SBB front 2, ground.

When TJ has released for the eighth time and the wipers of switch T1 have made eight steps, IDZ operates (circuit 270) and locks, opening the energizing circuit of the magnet of switch S10.

*Circuit 270.*—Battery, IDZ (Fig. 21), IDA front 2, IDB front 3, IDC back 2 (Fig. 20), IDD front 3, IM wire 1 (Fig. 58), MZ back 2, MA front 17, MT2 wire 1 (Fig. 28), T1C wiper in position 8, TB front 3 (Fig. 26), ground.

The wipers of switch S10, having made eight steps (the complement of 1 to base 9) from positions 1, are standing in positions 9. When TJ1–TJ5 set releases for the ninth and last time, the wipers of the six switches T1 and S1–S5 are standing in positions 9, whereas the wipers of switch S6, having made nine steps from positions 1, are standing in positions 10. SCF operates (271) and locks, to record the fact that carry-over is required from switch S6 to switch S5. Although the wipers of switch S5 have not yet completed their cycle, they will do so during the carry-over correction. SCE accordingly operates (circuit 272) and locks, to record the fact that carry-over is required from switch S5 to S4. By the same token, SCD, SCC, SCB and SCA operate (circuit 273 and similar circuits) and lock.

*Circuit 271.*—Battery, SCF (Fig. 38), SS2 wire 6 (Fig. 38), S6A wiper in position 10 (Fig. 46), SS4 wire 1 (Fig. 39), SBB front 2, ground.

*Circuit 272.*—Battery, SCE (Fig. 38), SS2 wire 5 (Fig. 38), S5A wiper in position 9 (Fig. 44), S6A wiper in position 10, SS4 wire 1 (Fig. 39), SBB front 2, ground.

*Circuit 273.*—Battery, SCA (Fig. 38), SS2 wire 1 (Fig. 38), S1A wiper in position 9 (Fig. 44), SL1, SS5 wire 1 (Fig. 39), SL back 1 (Fig. 39), SS5 wire 2 (Fig. 44), S2A wiper in position 9, S3A wiper in position 9, S4A wiper in position 9, S5A wiper in position 9, S6A wiper in position 10, SS4 wire 1, SBB front 2, ground.

The transfer operation is now complete. The wipers of switches S1–S5, S6, S8, S9 and S10 are standing in positions 9, 10, 9, 2 and 9, respectively, whereas those of switch S7 and of the seven switches S11–S17 have not been affected and are still standing in positions 3 and normal positions, respectively. The aggregate registered at this stage is thus 999,99t,392.90000000, where t represents the number 10. The wipers of switches S1–S5, S7 and S8 require to make one additional step for the carry-over correction and those of switches S1–S6, S8 and S9 one additional step for compensation for their 11-step cycles.

*Carry-over correction*

TL operates (circuit 145) followed by SDA and SDB (circuit 147), TK, TL (circuit 150) and TLL (circuit 151). SH operates to SDA front 18 (circuit 148) and locks (circuit 149) and SBB releases. TL locks (circuit 274), the seven magnets S1–S5, S7 and S8 operate (circuit 275 and similar circuits) and TK holds (circuit 276).

Figure 25:
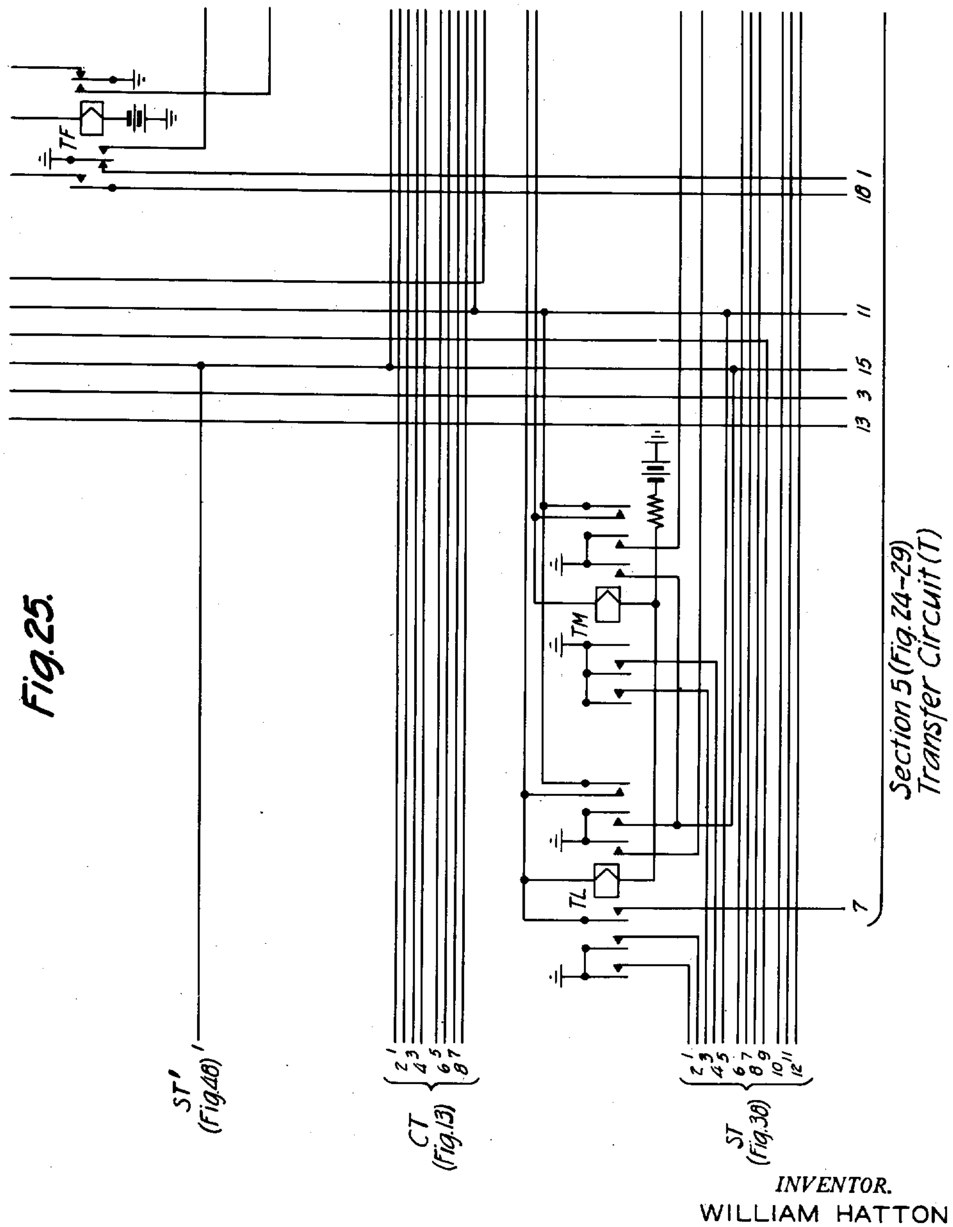
Figure 26:
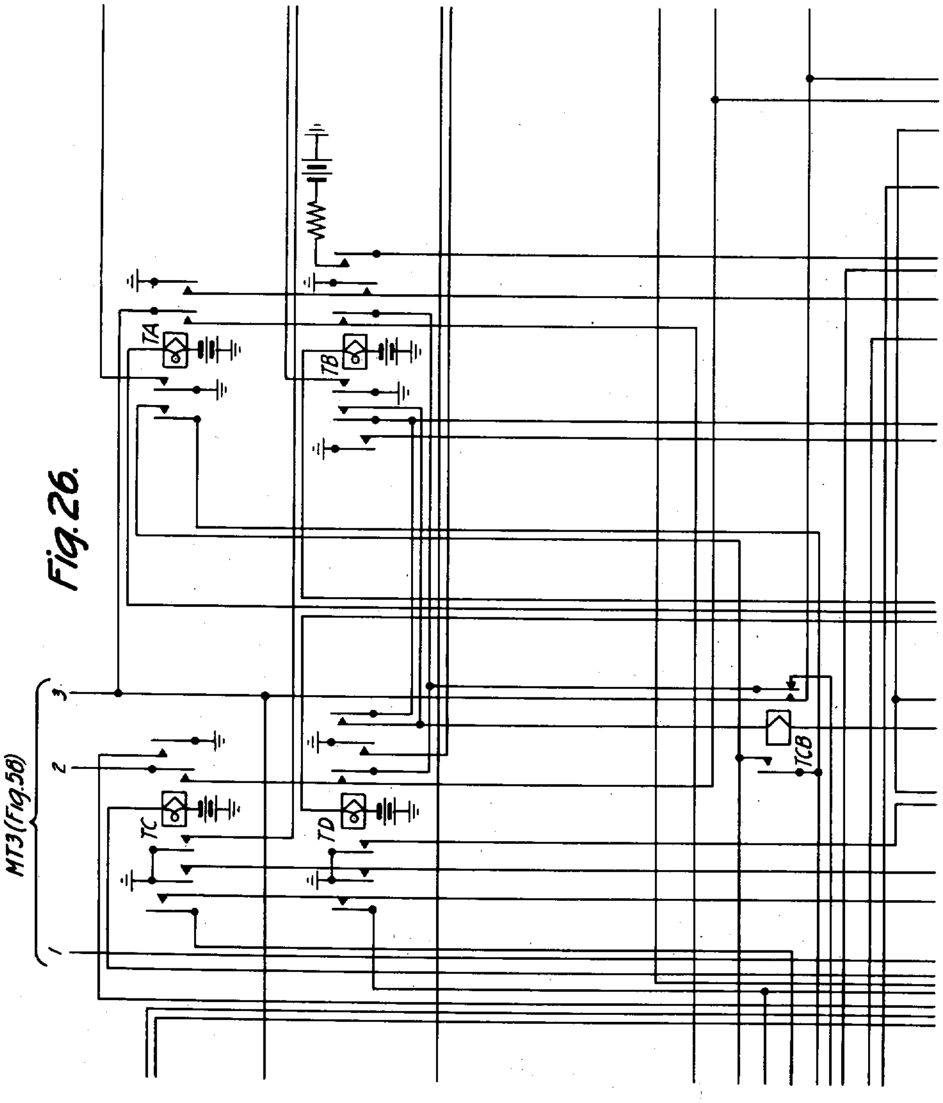
Figure 27:
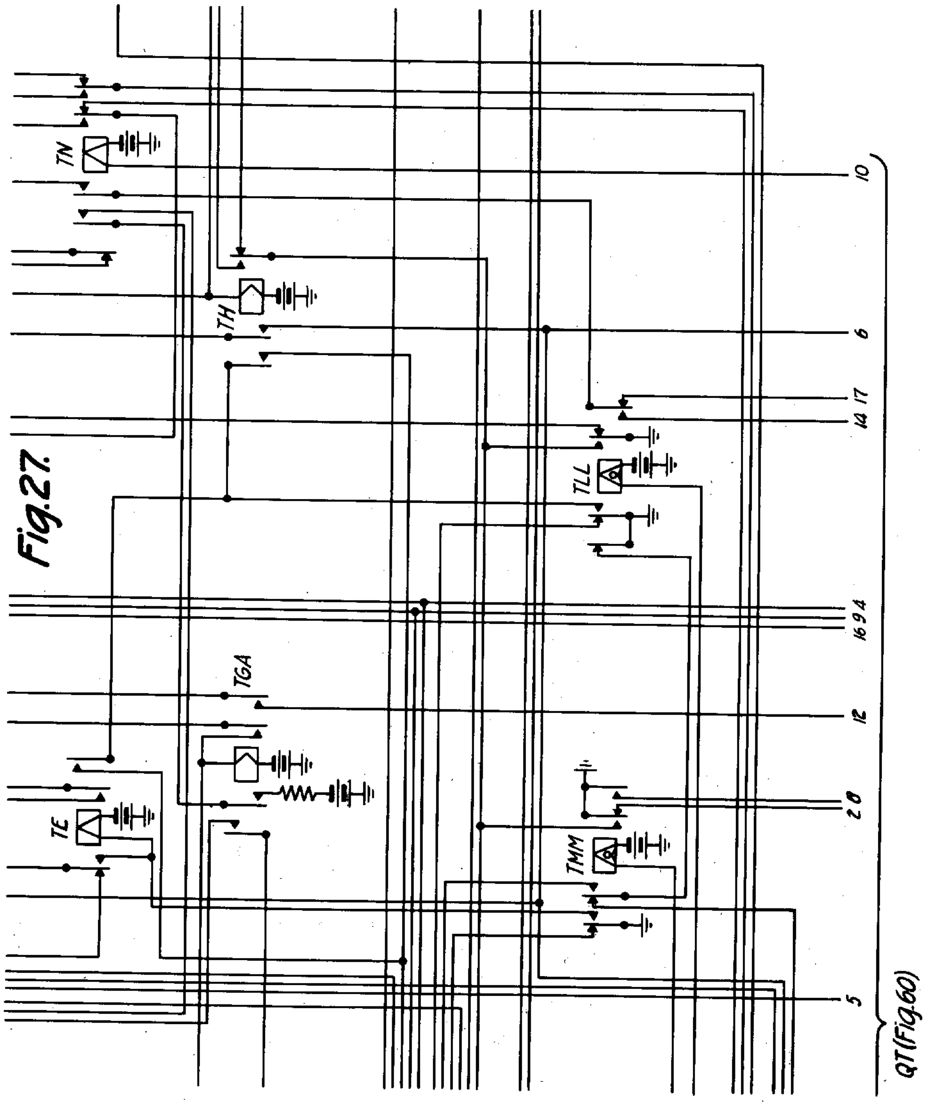

*Circuit 274.*—Battery, TL (Fig. 25); TL front 6, T1 back I (Fig. 29), T2 back I, ground; ST' wire 1 (Fig. 48), S1 back I (Fig. 44), ground; and six similar branches over S2 back I–S5 back I, S7 back I and S8 back I, respectively.

*Circuit 275.*—Battery, S1 (Fig. 44), SS1 wire 1a (Fig. 38), SDA front 2, SCB front 3, ground.

*Circuit 276.*—Battery, TK (Fig. 28); T1 back I (Fig. 29), T2 back I, ground; ST wire 5 (Fig. 38), SCA front 4, SEA front 1 (Fig. 42), SS1 wire 1a (Fig. 44), S1 front I, ground; and six similar branches over S2 front I, etc.

CSC operates (circuit 153) and locks (circuit 154). IX releases, followed by IZ, the eight relays IAZ–IHZ and the operated storage relays IAA, IBA, IBD, ICB, ICC, IDA, IDB and IDD. TGA and TGB release (circuit 257, open at TLL back 1). CSD releases, followed by CKB, CU, TB, DF, DX, the six relays DLA–DLF (circuit 249, open at TB front 6 and DF front 15), COC (circuit 245, open at CU front 6) and CV (circuit 242, open at CH front 2; circuit 243, open at IZ front 1). CKA operates again (circuit 27, re-closed at CSBa front 2). When the eight switches have all operated their interrupter contacts, TL releases, followed by SDA, SDB, TLL, T1, the seven magnets S1–S5, S7 and S8, and TK. IX operates again, followed by IZ. In the meantime, SG operates (circuit 277) and locks (circuit 278).

*Circuit 277.*—Battery, SG (Fig. 39), SF front 3, SLA back 1, SKA back 1 (Fig. 41), SDA front 1 (Fig. 38), SCA front 3, ground.

*Circuit 278.*—Battery, SG (Fig. 39), SG front 1, SF front 2, ground.

It is to be noted that SG operates only if SCA is operated, which can occur only if the number transferred to the accumulating switches (i. e. the complement of the subtrahend) is greater than the aggregate previously registered, that is, if the actual value of the subtrahend is less than the minuend. In the contrary case, since the calculator is not capable of computing negative quantities, the computation will be treated as impossible and the circuits of the calculator will restore to normal as explained hereinafter.

The wipers of switches S1–S5, S7 and S8 have now made one additional step and are standing in positions 10, 4 and 10, respectively; and the carry-over correction has been completed. The aggregate registered at this stage is thus ttt,ttt,4t2.90000000, where t represents the number 10, as before.

*Compensation*

TM operates (circuit 155), followed by SEA and SEB (circuit 157), TK and TMM (circuits 161 and 162), and T1 (circuit 163). SJ operates (circuit 158) to SEB front 18 and locks (circuit 159). SG holds (circuit 279), SBA holds to SEA front 18, but SH releases.

Figure 39:
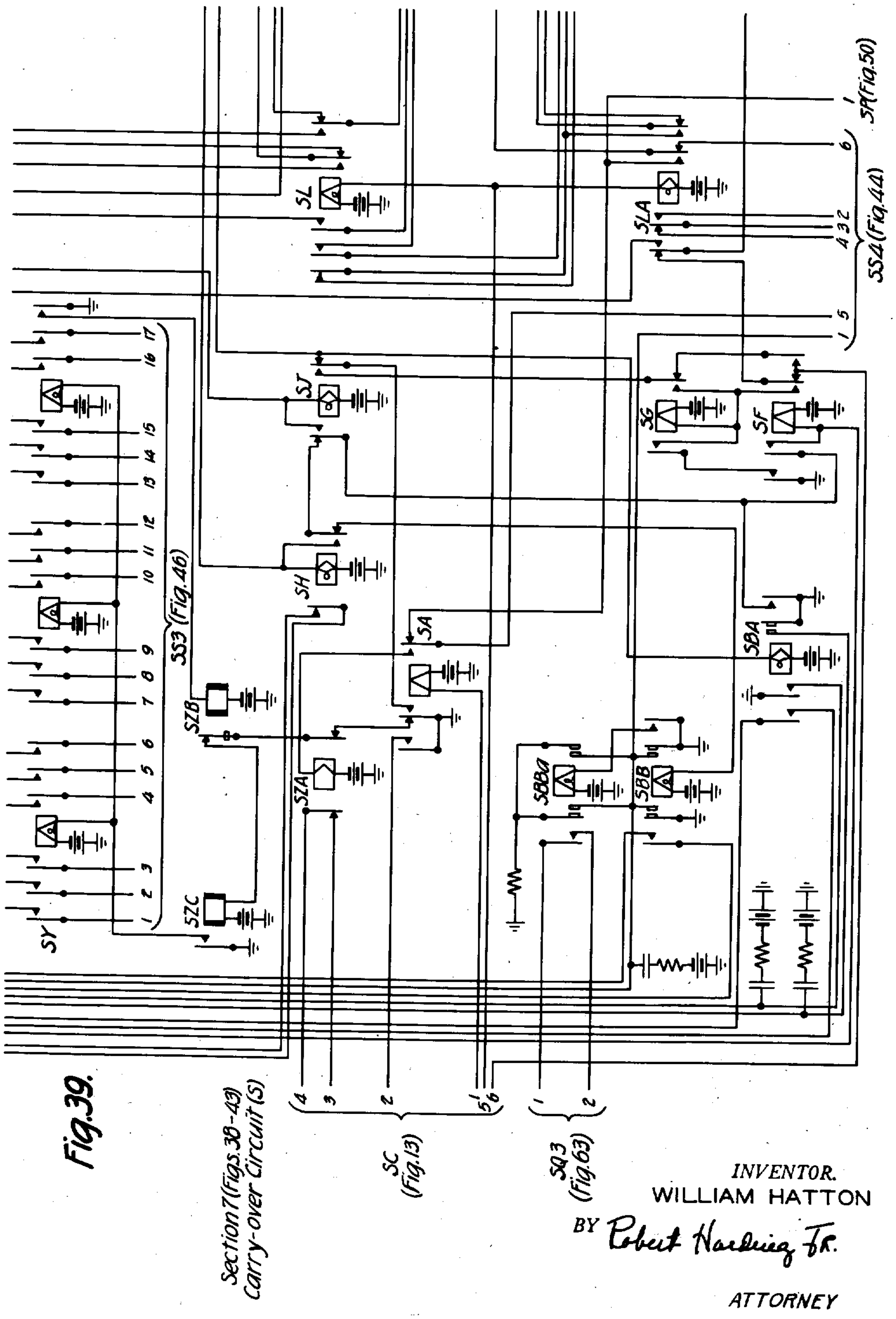

*Circuit 279.*—Battery SG (Fig. 39, SG front 2, SJ front 1, SA front 2, ground.

TM locks (circuit 280), the eight magnets S1–S6, S8 and S9 operate (circuit 281 and similar circuits) and TK holds (circuit 282).

*Circuit 280.*—Battery, TM (Fig. 25), TM front 6; T1 back I (Fig. 29), T2 back I, ground; ST wire 5 (Fig. 38), SEBI front 1, SCA front 4, SEA front 1 (Fig. 42), SS1 wire 1b (Fig. 44), S1 back 1, ground; and seven similar branches over S2I–S6I (Fig. 44) S8I (Fig. 46) and S9I, respectively.

*Circuit 281.*—Battery, S1 (Fig. 44), SS1 wire 1a (Fig. 38), SEB front 1, SCA front 3, ground.

*Circuit 282.*—Battery, TK (Fig. 28), T1 front I (Fig. 29), T2 back I, ground; ST wire 1 (Fig. 48), S1 front 1 (Fig. 44), ground; and seven similar branches over S2 front I, etc.

CRB (Fig. 13) operates (circuit 188) and locks (circuit 188a). When the nine switches have all operated their interrupter contacts, TM releases, followed by SEA, SEB, TMM, T1, the eight magnets of switches S1–S6, S8 and E9, SBA, the five relays SCA–SCF, SCH, SCJ, SF, SJ, SG, TH and TK. SBA (Fig. 39) re-operates (circuit 24) followed by SBB (circuit 25). PCA (Fig. 52) operates (circuit 189).

The wipers of switch T1 are now again standing in their normal positions; those of switches S1–S6, S8 and S9 have made one additional step and are standing in positions 0, 0 and 3, respectively; and the compensation has been completed.

At this stage, relays CA, CAA, CE, CEE, CG, CCC, CJ, CKA, CRA, CRB, CSA, CSB, CSC, CX, IX, IZ, MA, PA, PB, PCA, PX, SA, SBA and SBB stand operated; all storage relays stand released; magnet K7 stands operated and consequently, the key set is locked; the wipers of switches P1 and P4 are standing in positions 3; those of switches S7, S9 and S10 are standing in positions 4, 3 and 9, respectively; and those of the remaining accumulating switches are standing in their normal positions. The aggregate registered is thus 000,000,403.90000000 or 403.9 the solution of the problem.

*Solution 403.9 printed*

As a consequence of the operation of PCA, the condition of the wipers of switches S1, S2, etc. is scrutinized in turn to determine which is the first switch registering a significant digital value. This operation is similar to that which occurred before the printing of the sub-total began and will now be explained. PD operates (circuit 190) and locks, together with PFA (circuit 191), which also locks (circuit 32a), and followed by magnets of switches P1 and P4. PFA releases, followed by P1 and P4. The wipers of switches P1 and P4, are now standing in positions 4, where PCA holds (circuit 192). PFA, P1 and P4 operate and release again similarly six more times, and the wipers of switches P1 and P4 advance to positions 10. In positions 5–9 inclusive, PCA continues to hold (circuits 193, 194 and similar circuits), but in positions 10 it releases, wiper S7D being off-normal, i. e. registering a significant digital value. Printing of the number registered by the accumulating switches now begins. This operation is similar to that of printing the sub-total, which has already been described, except that since there are but three digits to be printed before the decimal point, no punctuation commas are necessary and the decimal point character is to be printed in its appropriate position, as will now be explained. PE operates (circuit 195), followed by PP (circuit 196) and CSC holds (circuit 197). PFA, P1 and P operate as before. PMA operates (circuit 198) and locks (circuit 199). CJ operates (circuit 283) followed by CAX and CBX (circuit 284) and CCX (circuit 285).

*Circuit 283.*—Battery, CJ (Fig. 12), QC wire 4 (Fig. 65), QVA back (Fig. 63), QS1 wire 4 (Fig. 49), S7B (Fig. 47), PS1 wire 7 (Fig. 57), P1 C wiper in position, PRB back 3 (Fig. 53), PXE back 1 (Fig. 55), PW back 1, PP front 1, PJA back 3 (Fig. 51), PL back 1 (Fig. 53), ground.

*Circuit 284.*—Battery, CAX (Fig. 12), CBX, CJ front 1, ground.

*Circuit 285.*—Battery, CCX (Fig. 12), CJ front 2, ground.

Magnets K1, K2 and K3 operate (circuit 201 and similar circuits) and select character 4; QX (Fig. 61) also operates but at present has no useful function. CLL operates (circuit 36), followed by K6 (circuit 37), and character 4 is printed. CKA, PP, PFA, P1 and P4 release. The wipers of switches P1 and P4 are now standing in positions 11. PBM operates (circuit 199); but PJA does not operate this time, its circuit 202, being open at P4C so that no comma is printed. CJ releases (circuit 283, open at PP front 1). CAX, CBX and CCX release (circuits 284 and 285, open at CJ fronts 1 and 2) followed by K1, K2, K3, QX, CCL and K6. CKA, PP, PFA, P1 and P4 re-operate. The condition of the wipers of switch S8 is next scrutinized, CLL operates (circuit 286) followed by K6 and, since no selector magnet is operated, character 0 is printed.

Figure 53:
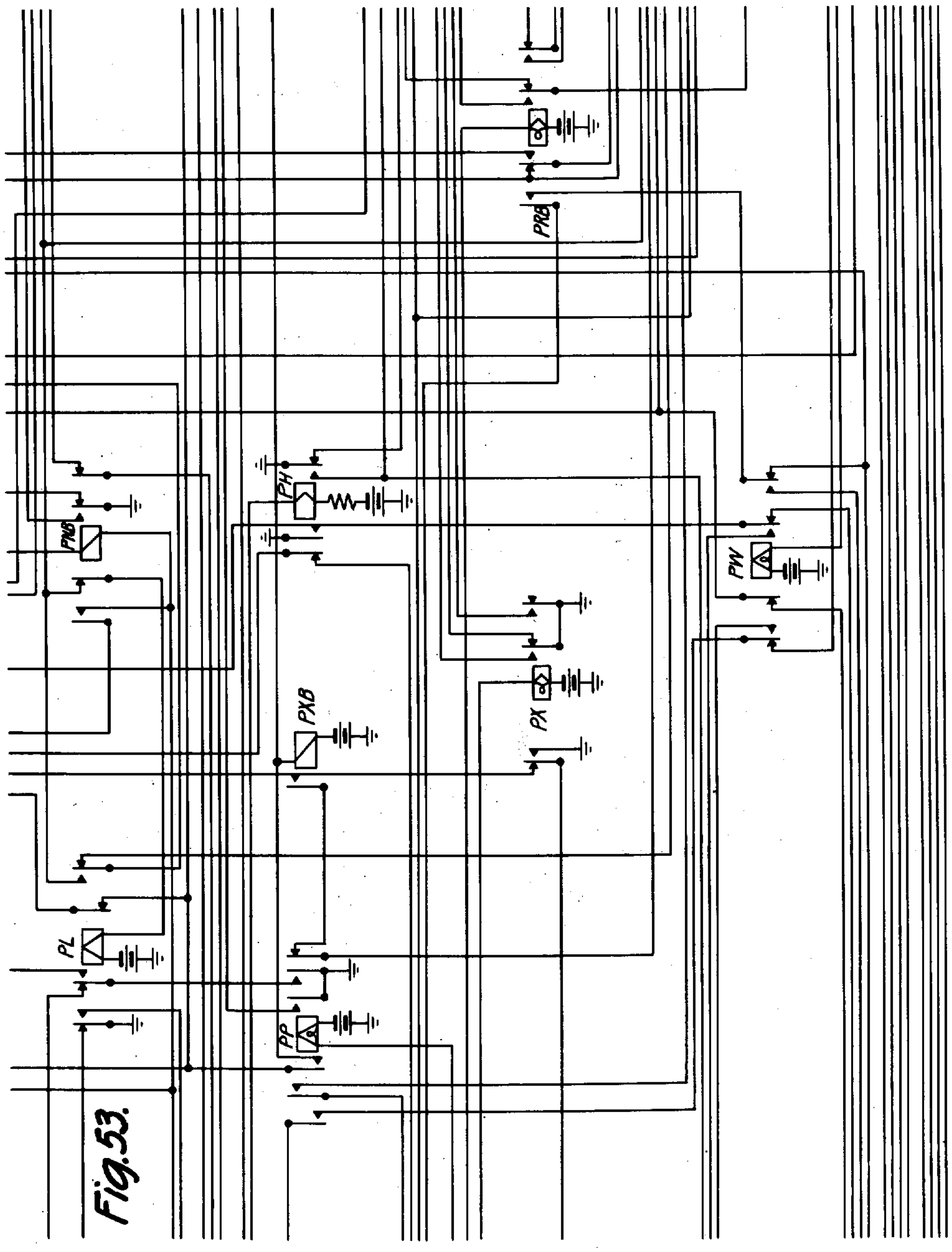

*Circuit 286.*—Battery, CLL (Fig. 12), QC wire 0 (Fig. 65), QX back 2 (Fig. 61), QX back 2, SQ1 wire 0 (Fig. 49), S8B wiper in N position (Fig. 47), PS1 wire 8 (Fig. 57), P1C wiper in position 11, PBR back 2 Fig. 53), PXE back 1 (Fig. 55), PW back 1 (Fig. 53), PP front 1, PJA back 3 (Fig. 51), PL back 1 (Fig. 53), ground.

CKA, PP, PFA, P1, P4, CLL and K6 release. The wipers of switches P1 and P4 are now standing in positions 12, where the condition of the wipers of switch S9 is scrutinized and character 3 is printed in a similar manner. The wipers of switches P1 and P4 advance to positions 13. PKA operates (circuit 209), followed by PL (circuit 210) which locks (circuit 211), PKB (circuit 211*a*) which also locks (circuit 211*b*), and QX. CKA and PP re-operate, but not PFA (circuit 32, open at PL). PNA operates (circuit 287) and locks (circuit 288).

*Circuit 287.*—Battery, PNA (Fig. 52), PMB front 2, PL front 2 (Fig. 53), PP front 5, ground.

*Circuit 288.*—Battery, PNA (Fig. 52), PNA front 2, PNB (Fig. 53), PMA front 1 (Fig. 50), ground.

CCX operates (circuit 289), followed by K3 (circuit 35) and the decimal point (.) is selected.

*Circuit 289*—Battery, CCX (Fig. 12), PC wire 17 (Fig. 50), PNA front 2 (Fig. 52), PNB back 2 (Fig. 53), ground.

CLL and K6 operate and the decimal point (.) is printed. CKA and PP release, PNB operates (circuit 204, short-circuit removed at PP front 5) and PL releases (circuit 211, open at PNB back 1). CCX, K3 CLL and K6 release. With the wipers of switches P1 and P4 still standing in positions 13, the condition of the wipers of switch S10 is scrutinized, character 9 is printed, and the wipers of switches P1 and P4 advance to positions 14, PKA releases (circuit 209, open at P1B) and CKA re-operates, as before, but PP does not re-operate this time, its circuit 196 having been opened at PE front 1, PE having released in the meantime, in a manner to be explained. PCA operates (circuit 290), followed by CZ (circuit 216).

*Circuit 290.*—Battery, PCA (Fig. 52), PXD back 4 (Fig. 55), PE back 3 (Fig. 50), PL back 3 (Fig. 53), P1A wiper in position 14, PS3 wire 7 (Fig. 48), S12D wiper in N position, SS6 wire 8 (Fig. 41), SKN back 2, SS6 wire 9 (Fig. 48), then same as circuit 212 from SKN back 2.

*Circuits restored to normal*

As a consequence of the operation of PCA, PFA operates (circuit 191), followed by magnets P1 and P4. PFA, P1 and P4 release again and the wipers of switches P1 and P4 are now standing in positions 15. In the meantime, CSB releases and CZ holds (circuits 217 and 291) independently of PE front 4.

*Circuit 291.*—Battery, CZ (Fig. 11), CSB*a* back 1 (Fig. 16), SCC wire 4 (Fig. 39), SZA back 2, SC wire 3 (Fig. 13), CMB back 2 (Fig. 17), ground.

PE and PCA release, and PKC operates (circuit 218). PA releases, followed by PB, PD, PMA, PMB, PNA (circuit 288, open at PMA front 1), CKA, IX, IZ, CBR, PKB( circuit 211*b*, open at PA front 4), QX and PKC (circuit 218, open at PKB front 1). PCD operates (circuit 221), followed by P4 (circuit 222), and the wipers of Switch P4 return to their normal positions, whereupon PCD releases. SA releases (circuit 23, open at CSB front 6), followed by CX and PX (circuits 113 and 114), MA (circuit 118, open at CX front 3), CRA (circuit 244, open at CX front 2), CPD7 (circuit 174, open at CRA front 1) and K7. The key set is freed and, provided the finger pressure has been removed, key = restores; CE, CEE, CG, CGG and CSC release. SZC operates (circuit 292), followed by SY (circuit 293) and SZB (circuit 294).

*Circuit 292.*—Battery, SZC (Fig. 39), SZB back 1, SZA back 1, SA back 1, ground.

*Circuit 293.*—Battery, SY (Fig. 39), SZC front 1, ground.

*Circuit 294.*—Battery, SZB (Fig. 39), SY front 18, ground .

SZC releases again (circuit 292, open at SZB back 1), followed by SY and SZB. SZC is slow to release and SZB is slow to operate. SZC accordingly operates and releases, in turn, slowly. Each time SZC operates, relay set SY operates to SZC front 1, followed by the magnets of all accumulating switches whose wipers are off-normal, namely S7, S9 and S10 (circuit 295 and similar circuits).

*Circuit 295.*—Battery, S7 (Fig. 46), SS1 wire 7*a* (Fig. 38), SY front 7 (Fig. 39), SS3 wire 7 (Fig. 46), S7C wiper off-normal, ground.

In this manner all of the S switches which are off-normal such as switches S7, S9 and S10 are returned to their normal positions by the repeated operation of circuit 293. The several energizing circuits of the switch magnets are opened at S7C, S9C and S10C, respectively, as these switches move into their normal positions. The wipers of these switches are all standing in their normal positions, PCA operates (circuit 296), together with SZA (circuit 62*a*), reclosed at S7D, S9D and S10D in N, and followed by magnet of switch P1 (circuit 228).

*Circuit 296.*—Battery, PCA (Fig. 52), PXD back 4 (Fig. 55), PE back 3 (Fig. 50), PL back 3 (Fig. 53), P1A wiper in position 15, PS3 wire 9 (Fig. 48), SS6 wire 9 (Fig. 41), SKN back 2, SS6 wire 8, S12D wiper in position N (Fig. 48), SS6 wire 7, SKM back 2 (Fig. 41), SS6 wire 6, wire 5, S11D wiper in position (Fig. 46) N, SKL back 2 (Fig. 41), wire 4, S10D wiper in position N (Fig. 46), wire 3, SKK back 2 (Fig. 41), wire 2, S1D wiper in position N (Fig. 44), wire 1, SKA back 2 (Fig. 41), SLA (Fig. 39), SL back 2, SP wire 1, SS4 wire 6, S9D (Fig. 46), S8D, S7D, S6D, S5D, S4D, S3D, S2D, S1D all wipers in position N, SS4, wire 4, SLA back 1 (Fig. 39), SS4 wire 3, S1C, PS4 wire 1 (Fig. 50), PE back 1, ground.

P1 opens its own circuit at P11 and releases, advancing its wipers to positions 16 where PCA holds (circuit 297).

*Circuit 297.*—Battery PCA, (Fig. 52), PE back 3 (Fig. 50), PL back 3 (Fig. 53), P1A wiper in position 16 (Fig. 56), PS3 wire 11 (Fig. 48), SS6 wire 11 (Fig. 41), SKO back 2 (Fig. 43), wire 10, S13, wire 9, then as in circuit 296.

P1 operates and releases again in turn and advances its wipers to positions 17, 18, 19, 20 and 21, in succession, PCA holding continuously (circuits similar to 297, then circuit 230). The wipers advance to their normal positions and PCA releases. During the return to normal of the wipers of switches P1, P4, S7, S9 and S10, CZ holds (circuits 217, 298 and 291).

*Circuit 298.*—Battery, CZ (Fig. 11), CSB*a* back 1 (Fig. 16), PC wire 1, (Fig. 50), PCD front 1, ground.

When the wipers of these switches are again standing in their normal positions CZ releases.

At this stage relays CSA (Fig. 12), SBA (Fig. 39), SBB and SZA alone remain operated and the wipers of all switches are standing in their normal positions.

*Continuation sign, three dots (...) printed*

As a consequence of the release of CZ, CSB (Fig. 13) re-operates (circuit 19, reclosed at CZ back 2), followed by IX, IZ, SA, CKA, CSC, PA and PP, in precisely the same manner as when the calculator was originally taken into use. The calculator causes three dots to be printed and the situation is now identical with the situation immediately before the submission of the problem of which the computation has now been fully described. The operator may accordingly submit a fresh problem.

*Wholly-fractional factors*

It has now been shown that a factor containing a decimal point (e. g. 931.1) may be submitted to the calculator, that an integral factor (e. g. 59) may be submitted without a specific indication of the position of the decimal point, and that the calculator determines the denominational values of the digits in both cases.

It may happen, of course, that a factor submitted to the calculator is wholly fractional. Should the operator start to submit such a factor by keying digit 0, and follow this by the decimal point sign, it will be clear from the foregoing description that the wipers of switch D1, counting the number of digits before the decimal point, will advance to positions 1 to record that there is one such digit, although of no significance, and distributing relay DH (Fig. 34) will operate, over D1 B in position 1, in order that the value 0 of the units digit, stored by the non-operation of the four relays IAA–IAD, may be duly transferred to the units switch S9. The value of the digit next following the decimal point, and stored on relays IBA–IBD, will accordingly be transferred to switch S10. If, on the other hand, the operator omits the digit 0 and starts by keying the decimal point sign, the wipers of switch D1 will not advance at all and distributing relays DJ (Fig. 31) will operate (over D1B in N). The value of the digit stored on the four relays IAA–IAD, that is, the digit next following the decimal point, will then be transferred to switch S10, and the same result will be attained. It is, therefore, immaterial whether a wholly fractional factor is submitted with or without a digit 0 before the decimal point sign, provided, of course, the total number of digits contained in the factor does not exceed the permissible maximum.

*Factors of eight and more than eight digits*

Although, in the example described herein in detail, factors containing a small number of digits have been used, it is to be understood that in a problem involving addition and subtraction computations, since eight sets of four storage relays each, viz; IAA–IAD, IBA–IBD, etc. (Figs. 18–23), are provided, any factor having eight digits or fewer may be used and that an eight-digit factor may be integral or partially or wholly fractional; for, if it is integral, the eight accumulating switches S2–S9 inclusive (Figs. 44 and 46), are capable of accumulating its digital values whereas, if it is wholly fractional the values of the digits are transferred to the eight switches S10–S17 inclusive (Figs. 46 and 48).

Should the operator key, in error, a factor of more than eight digits, the wipers of switch I2 which advances by one step after each digit has been received in the calculator, as explained herein, will arrive in positions 9. CPD5 then operates (circuit 299), causing the circuits to restore to normal, after which the calculator causes three dots to be printed, as an indication that the problem may be again submitted.

*Circuit 299.*—Battery CPD5, IC wire 5 (Fig. 18), I2F in position 9, IK back 1, ground.

*Wholly fractional solution*

It has been shown that the calculator causes the printing of a number representing the solution of a problem or a sub-total, causes the decimal point character to be inserted in the appropriate position if the number is fractional, e. g. 403.9, and causes no specific indication of the position of the decimal point to be printed if the number is integral, e. g. 1,339.

It may happen that the solution to a problem, or a subtotal, is wholly fractional, i. e. that the wipers of all nine switches S1–S9 at least, are standing in their normal positions. In this case, when the printing of this number is about to begin, the wipers of switches P1 and P4 advance under the control of PCA, as explained above in connection with the printing of the solution 403.9, until they reach positions corresponding to an accumulating switch whose wipers are off-normal. When the wipers reach positions 13, PCA releases, PX front 3 (Fig. 53) being open. PKA operates (circuit 209), followed by PL (circuits 210 and 211) and PE operates (circuit 195), followed by PP (circuit 196), and PMA (circuits 198 and 199). CLL (Fig. 12) operates (circuit 300), followed by magnet K6, and character 0 is printed.

*Circuit 300.*—Battery, CLL (Fig. 12), PC wire 18 (Fig. 50), PMB back 1 (Fig. 52), PL front 2 (Fig. 53), PP front 5, ground.

CKA, PP, CLL, and K6 release and PMB operates (circuit 199). CKA and PP re-operate, followed by PNA (circuit 287, closed at PMB front 2, PL front 2 and PP front 5; and circuit 288). CBX operates (circuit 205), followed by K3, CLL and K6, and the decimal point is printed. Thereafter, the operation is the same as in the example already described, characters being printed in accordance with the positions of the wipers of switches S10, S11, etc., even if they are in their normal positions, until PCA operates again, whereupon printing ceases and the circuits restore partially or completely to normal, as in the previous examples.

It has thus been shown that, in the event of a solution being wholly fractional, the significant digits, are printed duly preceded by a decimal point, and the whole is preceded by character 0, as in the conventional presentation of a fractional quantity.

*Zero solution*

It may also happen that, after a subtraction computation, the solution of a problem is zero, i. e. that the wipers of all accumulating switches are standing in their normal positions. In this case, character 0 is printed, with the wipers of switches P1 and P4 standing in positions 13, and PE, PKB and PMB operate, all in the manner described in the previous paragraph. PCA then operates (circuit 300) printing ceases, and the circuits restore to normal as in the previous examples. Thus, the solution is presented by the character 0 alone.

*Circuit 301.*—Battery, PCA (Fig. 52), PXD back 4 (Fig. 55), PE back 3 (Fig. 50), PL back 3 (Fig. 53), P1A wiper in position 12 (Fig. 56), PS3 wire 3, S10D wipers in position N (Fig. 46), SS6 wire 4 (Fig. 41), SKL back 2, SS6 wire 5 (Fig. 48), S11D wiper in position N (Fig. 46), wire 6 SKM back 2 (Fig. 4), wire 7, S12D wiper in position N, (Fig. 48), wire 8, SKN back 2 (Fig. 4), wire 9, S13D wiper in position N, wire 10, SKO back 2 (Fig. 43), wire 11, S14D wiper in position (Fig. 48) N, wire 12, SKP back 2 (Fig. 43), wire 13, S15D wiper in position (Fig. 48) N, wire 14, SKQ back 2 (Fig. 43), wire 15, S16D wiper in position N, wire 16, SKR back 2, S17B wiper in position (Fig. 48) N, SS4 wire 5 (Fig. 39), SA front 3 (Fig. 39), SP wire 1 (Fig. 50), PE front 1 (Fig. 50), ground.

*Continue computations*

It has been shown that, after a factor, e. g. 1,280 or 59, has been received in the calculator and duly accumulated or cancelled, the circuits are in a condition to receive a further factor. It will be understood that this operation can be continued indefinitely and that any number of factors may be submitted in succession and added to or subtracted from the aggregate, provided only that the resulting aggregate does not exceed the permitted maximum number of digits nor become negative, in either of which cases the circuits immediately restore to normal, as will now be explained.

*Capacity of calculators exceeded*

Since switch S9 is assigned to digits of units denominational value, and the eight switches S1–S8 inclusive to digits of higher denominational value, it follows that numbers having nine digits before the decimal point can be accommodated, i. e. numbers not exceeding the value 999,999,999.

Should the aggregate after an addition computation exceed this value, relay SCA will have operated during the transfer process, when the wipers of switch S1 reached or passed positions 9, to record that a carry-over is required from switch SE to a switch not provided. When now SDA operates during carry-over correction, which immediately follows this transfer process, CZ operates (circuit 302) and causes the circuits to restore to normal, after which the calculator causes three dots to be printed, as an indication that its capacity has been exceeded and that the submission of the problem is to be recommenced.

*Circuit 302.*—Battery, CZ (Fig. 11), SC wire 6 (Fig. 39), SF back 2, SLA back 1, SKA back 1, (Fig. 41), SDA front 1 (Fig. 38), SCA front 3, ground.

*Negative aggregate*

Should the aggregate after a subtraction computation become negative, SCA will fail to operate during the transfer operation, as previously explained in connection with the carry-over correction following the transfer of the complement of factor 935.1. SG will accordingly fail to operate when SDA operates during the carry-over correction. When now SJ operates during compensation, CZ operates (circuit 303) and causes the circuits to restore to normal, as before.

*Circuit 303.*—Battery, CZ (Fig. 11), SC wire 6, SF front 4 (Fig. 39), SG back 2, SJ front 2, SA front 2, ground.

It has also been shown that the operator, when submitting a factor having more than three digits before the decimal point, e. g. factor 1,280, may insert a comma sign between digits thereof in the appropriate position or positions, i. e. if there are four digits preceding the decimal point, after the first digit; if five, after the second; if six, after the third, if seven, after the first and fourth, etc., or in all cases, after the millions and thousands digits, and that the calculator causes a comma or commas to be printed in the corresponding position or positions of the record of the factor printed on the tape, so that this factor shall be presented in accordance with the conventional presentation of such quantities.

It will be observed, from the description of the operations in the calculator consequent to the operator keying the sign (,) during the submission of the factor 1,280, that relays CE, CEX, GGG, CLL, CKB and magnets K4, K6 and K7 operated and released again while relay CKA released and operated again, i. e. that the general situation in the calculator was unaffected. It is thus immaterial to the operation of the calculator whether or not the operator keys the sign (,) to punctuate a factor submitted thereto. If the sign is not keyed, however, no comma will appear in the factor printed on the tape.

It has also been shown that the calculator, during the printing of the solution of a computation, or a sub-total, causes a comma to be printed between the first and second digits if four digits are present in the integral part thereof, e. g. subtotal 1,339, whereas it causes no comma to be printed if there are less than four digits to be printed in the integral part, e. g. solution 403.9.

It will be observed, by comparing the operation of printing the solution 403.9 with the operation of printing the sub-total 1,339, that in both cases PMB operates upon completion of the printing of the first digit. In the latter case, wiper P4C (Fig. 56), now standing in position 10, is connected to wiper P2C, standing in its normal position, and PJA operates (circuit 202), as a result of which a comma is printed and PJA releases again, as described. In the former case, on the other hand, when PMB operates wiper P4C is standing in position 11, where it is not extended to wiper P2C standing in its normal position, so that PJA does not operate and no comma is printed. In both cases, wiper P4C, advancing step-by-step as each digit character is printed, is not extended again to wiper P2C until the former reaches position 13, but at this moment PJA cannot reoperate because PKB operates and opens its circuit, so that no further comma is printed.

It will be noted that in these two examples wiper P4C arrives in position 11 after the hundreds digit has been printed, in position 12 after the tens digit, and in position 13 after the units digit. It is to be understood that this is always the case in accordance with the construction of the calculator, irrespective of the number of digits there may be in the solution or sub-total to be printed; and also that, when numbers of more than four digits are being printed, wiper P4C arrives in positions 5, 6, 7, 8, 9 and 10 after the hundred-millions, ten millions, millions, hundred-thousands, ten-thousands and thousands digits, respectively, have been printed. The conditions which must be fulfilled for the operation of PJA (Fig. 51) and the printing of a comma, during the printing of the digits of a solution or sub-total, are thus that (*a*) PMB shall be operated; (*b*) wiper P4C shall be standing in position 7 or position 10, if wiper P2C is in position N; and (*c*) PKB shall not be operated. Condition (*a*) is fulfilled only when one digit at least has been printed. Condition (*b*) is fulfilled only after the millions and thousands digits (if any) has been printed. It is to be noted that, in a computation involving addition and subtraction operations, the wipers of switch P2 return to and remain in their normal positions, as has been explained. Condition (*c*) is fulfilled only until the units digit has been printed. It follows that a comma is printed after the millions and thousands digits and after no other digits. It is to be understood that, in a calculator of greater capacity than that described, a comma would equally be printed after the thousand-millions or billions, etc., digits if these were present.

It has thus been shown that, although at any time the aggregate registered by the accumulating switches consists of a number of 17 digits, the calculator, at the time this aggregate is to be recorded on the tape, causes only those digits which are significant to be printed, except in the case of a wholly fractional number, when the decimal point is preceded by digit 0, and causes that part of the number which is integral to be punctuated by commas after the millions and thousands digits, that is, the calculator in all cases causes the number to be printed in accordance with the conventional presentation of such quantities.

It will be evident that, if in the country in which the calculator is used, the conventional presentation of numbers is different from that which has been described hereabove, suitable modifications can readily be made. For example, a comma may be used instead of a decimal point or dots to indicate the end of the integral portion and/or the beginning of the fractional portion of a number. Similarly a dot may be used instead of a comma to punctuate the integral portion of a number. The level, with reference to the line of type, at which the decimal point or dot of the continuation sign is printed, may of course be selected at will. By providing the printer with means to advance the paper tape without printing a character, i. e. to "print a space," punctuation of the integral portion of a number may be affected by causing the "thousands" and "hundreds" digits, etc., to be separated in the printed record thereof by the space occupied by one printed digit.

These modifications may also be used in connection with multiplication and also division hereinafter described.

It will also be observed, by comparing the result of keying the sign = with that of keying the sign Sub (sub-total) that in both cases the last factor received in the calculator is transferred to accumulating switches, the record of this factor on the storage relays is deleted, a number is printed in accordance with the aggregate registered, the circuits prepare to receive a fresh factor, and an indication is given to the operator that fresh factor may be submitted. In the former case, the record of the accumulated aggregate is deleted, whereas in the latter case it is retained, so that further factors may be added to or subtracted from it. Thus, the extraction of a sub-total in no way interferes with the result of the previous computations; and it is to be understood that, in a problem involving a succession of computations, a sub-total can be extracted at any stage and will be printed on the tape in the manner described.

If after the completion of a problem the attached calculator or calculators are no longer required, the operator may detach them from the unit OU by depressing the stop key KST' thus opening the circuits previously established by the start key KST as described beginning with circuit 1.

A fresh problem may be submitted after the machine has restored to normal which is indicated by the printing of the three dots (. . . ), or after it has become detached from the operator's unit.

*Multiplication, detail description*

The solution of a problem 12.5×59 will now be considered, it being assumed that the calculators were detached at present.

*Multiplicand 12.5 submitted, stored and printed*

The start key KST is again operated and one or more calculators become attached as described in circuits 1–62*a* in conection with addition and subtraction.

*Key 1 operated*

The 1 key (Fig. 3) is operated followed by circuits 63–77.

*Digit value 1 stored*

This operation is the same as for addition (circuits 78–88). CKA (Fig. 16) operates again, circuit recloses at K6 back 1 (Fig. 3) and CKB back, as soon as K6 releases.

*Key 2 operated*

When key 2 is depressed by the operator, operations similar to those which followed the depression of key 1 take place. CB, CE and CF operate (circuit 339 and similar circuits) and lock (circuit 340).

*Circuit 339.*—Battery, CB (Fig. 10), AC wire 2, key 2, depressed (Fig. 3), ground.

*Circuit 340.*—Battery, CB (Fig. 10), CB front 3; battery, CE, CE front 3; battery, CF, CF front 3; CSD front 5, CKA front 5, ground.

CBB, CEE, CFF, CFA and CPD8 operate again, as already described in connection with the depression of key 1, followed by IBB and IBD (circuit 341 and a similar circuit), which latter are then storing the digital value 2.

*Circuit 341.*—Battery, IBB (Fig. 21), I1D wiper in position (Fig. 19) 1, IC wire 2, CFA front 2 (Fig. 10), CB front 1, ground.

IBB and IBD lock in obvious circuits to IZ front 1. IJ, PFB and DY operate, followed by magnets I1, I2, P2, P5 and D1, all as before. Selector magnets K2 and K4 operate (circuit 75 and a similar circuit) and together select character 2 (Fig. 3). Locking magnet K7 operates (circuit 41) and locks the key set once more. CLL and magnet K6 operate again and this time character 2 is printed. CKA releases and CKB operates. CH, K7, K2, K4, CLL and K6 release and thereafter key 2 restores as soon as the pressure thereon is removed. CB, CE, CF, CBB, CEE, CFF, CFA and CKB release. IJ, PFB and DY release, followed by magnets I1, I2, P2, P5 and D1, and the wipers of switches I1, I2, P2, P5 and D1 advance to positions 2. CKA re-operates.

*Decimal point key operated*

When the decimal point (.) key is depressed by the operator, CB and CG operate (circuits similar to circuit 339) and lock, followed by CBB, CGG (in an obvious circuit to CG front 4), CB (circuit 342), which locks (circuit 343), and CH (circuit 344).

*Circuit 342.*—Battery, CV (Fig. 13), CEE3 back, CCC3 back, CBB front 3, CAA back 3, CGG front 1, CSD front 1, ground.

*Circuit 343.*—Battery, CV, CV front 2, CPB back 5, IC wire 3, IX front 3 (Fig. 22), ground.

*Circuit 344.*—Battery, CPD8 (Fig. 11), CKA front 1, CF, CG front 1, CPD back 1, CSD front 1, ground.

CV operated records the receipt of the decimal point sign, the effect of which will be described. Selector magnet K3 operates (circuit 35) and selects the dot (decimal point) character on the type-wheel (Figs. 66 and 67). Locking magnet K7 operates (41) and locks the key set. When the type-wheel is again stationary, CLL operates (circuit 36), followed by printing magnet K6 (circuit 37), whereupon a dot (decimal point) is printed. CKA releases and CKB operates (circuit 345).

*Circuit 345.*—Battery, CKB (Fig. 16), CKA back 1, CG front 3, CSD front 4, ground.

CH, K7 and K3 release. K7 frees the key set and decimal point (.) key restores as soon as the pressure thereon is removed by the operator; K3 restores the type-wheel. CLL releases, followed by K6. CB and CG release, followed by CBB, CGG and CKB. CKA operates again.

*Key 8 operated*

When key 8 is depressed by the operator, operations similar to those which followed the depression of keys 1 and 2 take place, except that by reason of the operated condition of CV, the wipers of switches D1, P2 and P5 do not advance, as will be explained. Code receiving relay CA operates momentarily (circuit 96). Storage relay ICB operates (circuit 346) and locks to IZ front 1, storing the digital value 8.

*Circuit 346.*—Battery, ICB (Fig. 21), I1D in 2, IC wire 2, CFA front 2 (Fig. 12), CB front 3, ground.

Selector magnet K2 operates to select character 8, which is then printed. It is to be noted that PFB does not operate this time (circuit 84, open at CV back 1), nor DY (circuit 87, open at CV back 2), so that magnets P2, P5 and D1 remain de-energized. Magnets of switches I1 and I2, however, operate and release again and the wipers of these switches advance to positions 3. The key set is locked again during selection and printing, and after it is freed again key 8 restores, as soon as the pressure thereon is removed.

At this stage, relays IAA, IAB, IAD, IBB, IBD and ICB are operated and are storing the digital values 1, 2 and 8; relays CKA, CSA, CSB, CSD, CV, IX, IZ, PA, PB, SA, SAB and SBB are also operated; the wipers of switches I1, I2, P1 and P4 are standing in their positions 3 and those of switches P2, P5 and D1 in positions 2.

*Sign × submitted and printed*

When key × is depressed by the operator, CA, CC and CG operate (347 and similar circuits) and lock.

*Circuit 347.*—Battery, CA (Fig. 10), AC wire 2, key × depressed (Fig. 3), ground.

CH operates (circuit 344), followed by locking magnet K7 which locks the key set. Selector magnets K1, K3 and K5 operate (circuit 74 and similar circuits) and together select the character × of the type-wheel (Figs. 66 and 67). CLL operates (circuit 36), followed by printing magnet K6 (circuit 37) whereupon the character × is printed. CKA releases and CKB operates (circuit 77). CH, K1, K3, K5, CLL and K6 release.

In the meantime, by reason of the operation of CA, CC and CG, CAA, CCC and CGG operate in obvious circuits to CA front 4, etc., followed by CPA (circuit 348).

*Circuit 348.*—Battery, CPA (Fig. 17), CPC back 1, CCC front 3, CBB front 3, CAA back 3, CGG front 1, CSD front 1, ground.

CPB (Fig. 15) operates in an obvious circuit to CPA front 2 and locks (circuit 349).

*Circuit 349.*—Battery, CPB, CPC, CPB front 2, CSB front 2, ground.

CV releases (circuit 343, open at CPB back 5). DZ operates (circuit 350) and locks (circuit 351).

*Circuit 350.*—Battery, DZ (Fig. 36), D1A off-normal, DC wire 3 (Fig. 13), CQD back 3 (Fig. 5), CPA front 1, ground.

*Circuit 351.*—Battery, DZ, D1A off-normal, DZ front 1, ground.

Magnet D1 operates (circuit 352), opens its own circuit at D1I, releases and re-operates; the wipers return to their normal position N, whereupon DZ releases (circuit 350 and circuit 351, open at D1A).

*Circuit 352.*—Battery, D1 (Fig. 36), DZ front 2, D1I closed, ground.

IK operates (circuit 353) and locks (circuit 354).

*Circuit 353.*—Battery, IK (Fig. 20), I1B and I2B off-normal, IC wire 7, CPA front 2 (Fig. 17), ground.

*Circuit 354.*—Battery, IK, I1B and I2B off-normal, IK4 front, ground.

Magnets I1 and I2 operate (circuit 355 and a similar circuit) and open their own circuits at I1I and I2I, respectively; the wipers return to their normal positions N, whereupon the magnet circuits are opened at I1A and I2A.

*Circuit 355.*—Battery, I1 (Fig. 18), I1A off-normal, IK2 front 2, I1I closed, ground.

IK releases (circuits 353 and 354, open at I1B and I2B). During the return to normal of the wipers of these three switches, CPD7 (Fig. 12) operates (circuit 356) and K7 holds (circuit 357), independently of CPD8 front 6.

*Circuit 356.*—Battery, CPD7 (Fig. 12), CSA1 front 1, DC wire 5 (Fig. 36), DZ front 4, ground; IC wire 8, IK front 4 (Fig. 20), ground.

*Circuit 357.*—Ground, K7 (Fig. 3), AC wire 9 (Fig. 13), CPD7 front 1 (Fig. 2), battery.

With CPD8 and CPD7 both released, K7 releases and key × restores as soon as the pressure thereon is removed. CA, CC and CG release, followed by CAA, CCC, CGG, CPA (circuit 348, open at CBB front 3, etc.) and CKB. CKA operates again reclosed at K6 back and CKB back. CPC operates (circuit 349), the short-circuit on it having been removed at CPA front 2. CW (Fig. 10) operates in an obvious circuit to CPC front 5; and IZ holds (circuit 358), independently of IXI.

*Circuit 358.*—Battery, IZ (Fig. 20), IC wire 10, CPC front 3 (Fig. 15), ground.

At this stage, relays IAA, IAB, IAD, IBB, IBD and ICB are operated and are still storing the digital values 1, 2, 8 of the multiplicand; relays CKA, CPB, CPC, CSA, CSB, CSD, CW, IX, IZ, PA, PB, SA, SBA and SBB are also operated; the wipers of switches P1 and P4 are standing in their positions 3; those of switches P2 and P5 are in positions 2, registering that there are two digits in the integral portion of the multiplicand; and the circuit is set for multiplication and is awaiting a digit of the multiplier.

*First digit 5 of multiplier submitted and printed; partial products accumulated*

When key 5 is depressed by the operator, CB, CC and CF operate (circuit 359 and similar circuits) and lock.

*Circuit 359.*—Battery, CB (Fig. 10), AC wire 2, key 5 depressed (Fig. 3), ground.

CBB, CCC (Fig. 10) and CFF (Fig. 11) operate in obvious circuits to CB front 4, etc., together with CPD8. Locking magnet K7 operates over CPD8 front 6 and locks the key set. Selector magnets K2 and K3 (Fig. 66) operate (circuit 75 and a similar circuit) and together select character 5 on the type-wheel 101. CLL operates as previously described following description of circuit 75, followed by printing magnet K6 whereupon character 5 is printed. CKA releases and CKB operates (circuit 77). CPD8, K2, K3, CLL and K6 release. It is to be noted that, since CFA does not operate (circuit 78, open at CPC back 2), the digital value 5 is not passed on to storage relays, in the input circuit, which are still storing the digital values of the multiplicand, as previously explained.

In the meantime, by reason of the operation of CB and CC, CPA and CCA operate (circuit 360 and a similar circuit), followed by ME (circuit 361) which sets the multiplication table circuit (Figs. 58 and 59) for multiplication by the value 5.

*Circuit 360.*—Battery, CBA (Fig. 14), CW front 1, CB front 4, ground.

*Circuit 361.*—Battery, relay set ME (Fig. 59), MC wire 5 (Fig. 14), CCA1 front 1 (Fig. 14), CBA front 2, CAA back 2, CFF front 3, CSD front 3, ground.

IJ operates (circuit 82) and locks (circuit 83), followed by magnets I1 and I2. PFC operates (circuit 362) and locks (circuit 363), followed by magnet P2 (to PFC front 1).

*Circuit 362.*—Battery, PFC (Fig. 50), PC wire 3 (Fig. 17), CPB front 5 (Fig. 2), CX back 1, CV back 1, CFF front 4, ground.

*Circuit 363.*—Battery, PFC, PFC front 2, P2I closed, ground.

CN operates (circuit 364), followed by TC (circuit 365), DA (circuit 366), MZ (circuit 367) and magnet D1 (circuit 368).

*Circuit 364.*—Battery, CN (Fig. 13), CW front 4, CF front 3, CSD front 6, CBB front 2, ground.

*Circuit 365.*—Battery, TC (Fig. 26), CT wire 1 (Fig. 13), CN front 5 (Fig. 13), CPB front 1 (Fig. 15), ground.

*Circuit 366.*—Battery, relay set DA (Fig. 30), D1D in N (Fig. 37), DT1 wire 3 (Fig. 24), TC front 1 (Fig. 26), ST wire 11 (Fig. 38), SH back 1 (Fig. 39), ST wire 12 (Fig. 25), TMM back 2, TLL back 1, ground.

*Circuit 367.*—Battery, relay set MZ (Fig. 58), MT3 wire 1 (Fig. 26), TE back 1 (Fig. 27), TC front 2, ground.

*Circuit 368*—Battery, D1 (Fig. 36), DM wire 3 (Fig. 58), MZ front 11, DM wire 2 (Fig. 36), DZ back 1, ground.

K7 holds (circuit 369) independently of CPD8 front 6.

*Circuit 369.*—Ground, K7 (Fig. 3), AC wire 9 (Fig. 9), CPC front 4 (Fig. 15), CN front 4 (Fig. 13), ground.

It is to be noted that CN operates at this stage only if CBB or CAA is operated, i. e. if the value of the multiplier digit is significant and partial products are to be accumulated. The operation of the circuits in the contrary case, when the value of the multiplier digit is 0, will also be described herein. IAZ and the five relays IDZ–IHZ operate (circuits 370, 371 and similar circuits) and lock (to IX front 2).

*Circuit 370.*—Battery, IAZ (Fig. 19), IAA front 2, IAB front 2, IAC back 1, IAD front 2, IM wire 1 (Fig. 58), MZ front 2, MT1 wire 0, T2C in N (Fig. 29), TC front 3, ground.

*Circuit 371.*—Battery, IDZ (Fig. 21), IDA back 1, IDB back 1, IM wire 0 (Fig. 58), MZ front 1, MT1 wire 0; then as circuit 370.

TJ1–TJ5 operate (circuit 372) and lock (circuit 373).

*Circuit 372.*—Battery, TJ1–TJ5 (Fig. 24), MT3 wire 3 (Fig. 58), MZ front 12, MT3 wire 2 (Fig. 26), TC front 4, T2A in N, TK back 2, ground.

Figure 23:
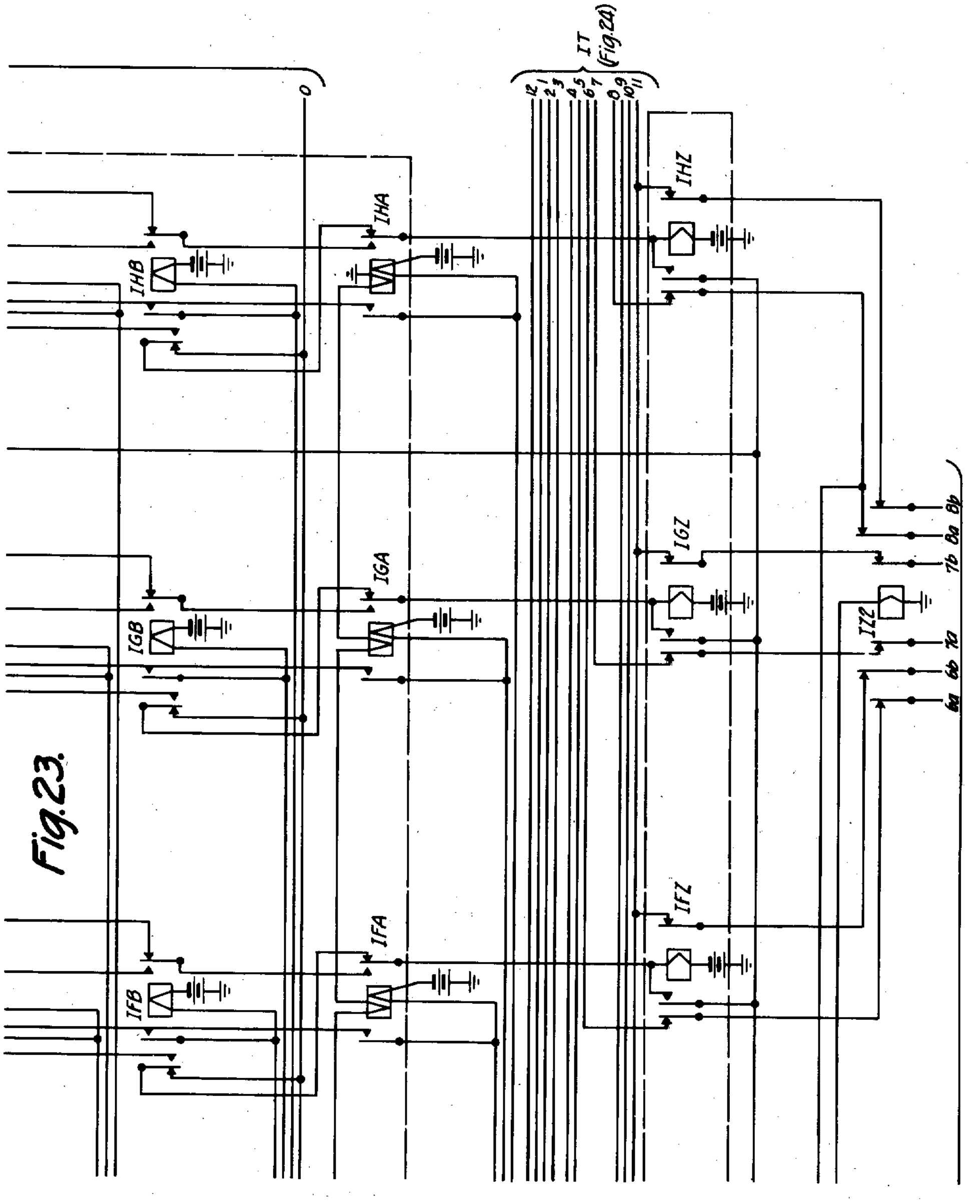

*Circuit 373.*—Battery, TJ1–TJ5, TJ5 front 1; T2I back (Fig. 29), T1I back, ground; IT wire 11 (Fig. 23); IBZ back 2 (Fig. 21), DI wire 2b (Fig. 30), DA front 4, DKA back 4, DS1 wire 3b (Fig. 46), S3I back, ground; and a similar branch including ICZ back 3 and S4I back.

TK (Fig. 28) operates in an obvious circuit to TJ5 front 2. Accumulating switch magnets S3 and S4 operate (circuit 374 and a similar circuit), together with transfer switch magnet T2 (circuit 375).

*Circuit 374.*—Battery, S4 (Fig. 44), DS1 wire 4a (Fig. 33), DKB back 1, DAB front 5, DI1 wire 3a (Fig. 21), ICZ back 1 (Fig. 9), IT wire 3 (Fig. 24), TJ1 front 2, ground.

*Circuit 375.*—Battery, T2 (Fig. 29), TH back 1, TJ5 front 3, ground.

When the three magnets have all operated their interrupter contacts, TJ1–5 release (circuit 372) open at TK back 2; (circuit 373, open at T2I, S3I and S4I), but TK holds (circuit 376).

*Circuit 376.*—Battery, TK (Fig. 28), T1I front,

T1I back, ground; ST' wire 1 (Fig. 48); S4I front (Fig. 46), ground; S3I front, ground.

Magnets S3 and S4 release (circuit 374, open at TJ1 front 2, etc.) together with magnet T2 (circuit 375, open at TJ5 front 3). When the three magnets have all restored their interrupter contacts I, TK releases (circuit 376, open at T1I, etc.). The wipers of switches S3, S4 and T2 are now standing in positions 1. IBZ operates (circuit 377) and locks (to IX2 front).

*Circuit 377.*—Battery, IBZ (Fig. 21), IBA back 1, IBB front 1, IBC back 1, IBD front 1, IM wire 2 (Fig. 58), MZ front 3, ME front 8, MT1 wire 1 (Fig. 28), T2C in 1, TC front 3 (Fig. 26), ground.

TJ1–5 operate a second time (circuit 378) and lock (circuit 373) except that the branch including IBZ back 3 is now open, followed by TK (to TJ5 front 2).

*Circuit 378.*—Battery, TJ1–5 (Fig. 24), T2A off-normal, TK back, ground.

Magnet S4 operates (circuit 374), together with magnet T2 (circuit 375), but not S3 (open at IBZ back 1). When both magnets have operated their interrupter contacts I, TJ1–5 release, but TK holds (circuit 376, except that the branch including S3 front I remains open). S4 and T2 release, followed by TK. The wipers of switches S4 and T2 are now standing in positions 2, but those of switch S3 have remained in positions 1. TJ1–5, TK and magnets S4 and T2 operate and release in succession two more times in precisely the same manner and the wipers of switches S4 and T2 are now standing in positions 4. ICZ operates (circuit 379) and locks (to IX front 2).

*Circuit 379.*—Battery, ICZ (Fig. 21), ICA back 1, ICB front 1, ICC back 1, ICD back 1, IM wire 8 (Fig. 58), MZ front 9, ME front 2, MT1 wire 4 (Fig. 28), T2C in 4, TC front 3 (Fig. 26), ground.

TJI–5 operate a fifth time (circuit 378) and lock (circuit 373, except that the branches including IBZ back 2 and ICZ back 2 are now both open), followed by TK and magnet T2, as before, but not S4 (circuit 374, open at ICZ back 1). When magnet T2 has operated its interrupter contacts, relay set TJ1–5 releases but TK holds (circuit 376, except that the branches including S3I front and S4I front both remain open). Magnet T2 releases, followed by TK. The wipers of switch T2 are now standing in positions 5, but those of switch S4 have remained in positions 4. Relay set TJ1–5, TK and magnet T2 operate and release in succession four more times, in precisely the same manner, and the wipers of switch T2 are now standing in positions 9. TL operates (circuit 380) and locks (circuit 381), followed by SDA and SDB (circuits 382 and 382*a*).

*Circuit 380.*—Battery, TL (Fig. 25), T2A in 9, TK back, ground.

*Circuit 381.*—Battery, TL, TL front 6, T1I back (Fig. 29), T2I back, ground.

*Circuit 382.*—Battery, SDA (Fig. 38), ST wire 1 (Fig. 25), TL front 1, ground.

*Circuit 382a.*—Battery, SDB (Fig. 38), ST wire 2 (Fig. 25), TL front 2, ground.

SH (Fig. 39) operates in an obvious circuit to SDA front 18 and locks (circuit 383).

*Circuit 383.*—Battery, SH, SH front 1, SJ back 1, SBA front 3, ground.

SBB releases (circuit 25, open at SH back 2). TK (Fig. 28) and TLL (Fig. 27) operate in obvious circuits to TL front 5 and TL front 4, respectively, followed by magnet T2 (circuit 384).

*Circuit 384.*—Battery, T2 (Fig. 29), TH2 back, TLL front 2, ground.

TL releases (circuit 380, open at TK back; and circuit 381, open at T2I back), but TK holds, as before, to T2I front. IX releases (circuit 21, open at TLL back 2), followed by the eight relays IAZ–IHZ (open at IX2 front 2, Fig. 22). TLL releases (open at TL front 4), together with SDA (circuit 382, open at TL front 1), and followed by magnet T2 (circuit 384, open at TLL front 2), and TK. The wipers of switch T2 are now standing in positions 10. IX operates again (circuit 21, reclosed at TLL back 2). TM operates (circuit 385) and locks (circuit 286) followed by SEA and SEB (circuits 387 and 387*a*).

*Circuit 385.*—Battery, TM (Fig. 25), T2A in 10, TK back, ground.

*Circuit 386.*—Battery, TM, TM front 6, T1I back (Fig. 29), T2I back, ground.

*Circuit 287.*—Battery, relay set SEA (Fig. 42), ST1 wire 3 (Fig. 25), TM front 1, ground.

*Circuit 287a.*—Battery, relay set SEB (Fig. 42), ST wire 4 (Fig. 25), TM front 2, ground.

SJ (Fig. 39) operates and locks in obvious circuits to SEB front 18 and SBA front 4, respectively. SBA (Fig. 39) holds in an obvious circuit to SEA front 18, but SH releases (circuit 383, open at SJ back 1). TK (Fig. 28) and TMM (Fig. 27) operate in obvious circuits to TL front 5 and TM front 5, respectively, followed by magnet T2 (circuit 388).

*Circuit 388.*—Battery, T2 (Fig. 29), TH back 1, TMM front 3, ground.

DA releases (circuit 366, open at TMM back 2. TE (Fig. 27) operates and locks in obvious circuits to TMM front 1 and TC front 2, respectively. MZ releases (circuit 367, open at TE back 1), followed by magnet D1 (circuit 368, open at MZ front 11) and the wipers of switch D1 are now standing in positions 1. TM releases (circuit 385, open at TK back; and circuit 386, open at T1I back), but TK holds, as before, to T2I front. TMM releases, together with SEA (circuit 287, open at TM front 1), and followed by SBA (open at SEA front 18; and circuit 24, open at SJ front 1), SJ (open at SEB front 18 and SBA front 4), magnet T2 (circuit 388, open at TMM front 3) and TK. SBA (Fig. 39) operates again (circuit 24, reclosed at SJ back 2), followed by SBB (circuit 25).

The wipers of switch T2 are now standing in positions 11 and have completed the first half of their cycle of twenty-two steps. During this half-cycle, the higher partial products 0, 1, 4 of the digital values stored and the value 5 have been duly accumulated by switches S3 and S4. It will have been observed that during the process of accumulation TJ1–5 operated and released nine times, thus creating nine impulses. The wipers of switch T2 advanced by one step at each impulse, whereas the wipers of switch S3 advanced by one step at the first impulse but were thereafter unaffected, the impulsing circuit having been cut by the operation of IBZ over contacts depending on the setting of the storage relays to store the digital value 1 and the setting of the multiplication table for multiplication by the value 5. Similarly, the wipers of switch S4 advanced by four steps and then the impulsing circuit was cut by the operation of ICZ. The impulsing circuits of switch S2 and the five switches S5–S9, the remainder of the eight switches brought into circuit by the operation of DA, were cut before impulsing started by the operation of IAZ and the five relays IDZ–IHZ, because the higher partial products of the corresponding digits stored and the value 5 were all 0. After the nine steps made under the control of TJ1–5, the wipers of switch T2 made two further steps under the control of TL and TM, respectively, and so completed their half-cycle. During these two steps, carry-over correction and compensation would have been effected had the accumulation process given rise to carry-over; this was clearly not the case in the example described, since no accumulating switch had received more than nine impulses. These operations will be described later.

Thus, at this stage (II, Fig. 72), since the wipers of all accumulating switches other than S3 and S4 are still in their normal positions, the aggregate registered by the sixteen switches S2–S17 is 0140000000000000.

During the second half of their cycle, the wipers of switch T2 also make nine steps under the control of TJ, while the lower partial products of the digits stored and the value 5 are accumulated, and then two further steps under the control of TL and TM, respectively, while carry-over correction and compensation are affected, if necessary. The operation of this part of the process is similar to that which has already been described and is therefore not repeated in detail.

As a consequence of the release of TMM and magnet T2, respectively, DB operates (circuit 389), together with the seven relays IBZ–IHZ (circuits 390, 391 and 392 and similar circuits), and the latter circuits lock to IX2 front.

*Circuit 389.*—Battery, relay set DB (Fig. 30), D1D in 1, DT1 wire 3 (Fig. 24), TC front 1 (Fig. 26), ST wire 11 (Fig. 38), SH front 1 (Fig. 39), ST wire 12 (Fig. 25), TMM back 2, TLL back 1, ground.

*Circuit 390.*—Battery, IBZ (Fig. 21), IBA back 1, IBB back 1, IM wire 0 (Fig. 58), MZ back 1, MT2 wire 0 (Fig. 28), T2C in 11, TC front 3, ground.

*Circuit 391.*—Battery, ICZ (Fig. 21), ICA back 1, ICB front 1, ICC back 1, ICD back 1, IM wire 9 (Fig. 58), MZ back 9, ME front 10, MT2 wire 0; then as circuit 390.

*Circuit 392.*—Battery, IDZ (Fig. 21), IDA back 1, IDB back 1, IM wire 0 (Fig. 28), then as circuit 390.

TJ1–5 operate (circuit 393) and lock (circuit 394), followed by TK, S3 (circuit 395) and magnet T2 (circuit 375).

*Circuit 393.*—Battery, TJ1–5 (Fig. 24), TGB back, T2A in 12, TK back, ground.

*Circuit 394.*—Battery, TJ5, TJ5 front 3; T1I back (Fig. 29), T2I back, ground; IT wire 11 (Fig. 23), IAZ back 2, DI wire 1b (Fig. 30), DB front 2, DKA back 4, DS1 wire 3b (Fig. 44), S3I back, ground.

*Circuit 395.*—Battery, S3 (Fig. 44), DS1 wire 3b (Fig. 33), DK back 4, DB front 1, DI wire 1b (Fig. 21), IAZ back 1, IT wire 11 (Fig. 24), TJ5 front 3, ground.

TJ releases, but TK holds (circuit 396).

*Circuit 396.*—Battery, TK (Fig. 28), T1I front, T2I back, ground; St wire 5 (Fig. 38), S3 front I, ground.

S3 and magnet T2 release, followed by TK. The wipers of switch S3 are now standing in positions 2 and those of switch T2 in positions 12. TJ, TK, and magnets S3 and T2 operate and release in succession four more times, in the same manner, and the wipers of switches S3 and T2 are now standing in positions 6 and 16, respectively. IAZ operates (circuit 397) and locks.

*Circuit 397.*—Battery, IAZ (Fig. 19), IAA front 2, IAB front 3, IAC back 2, IAD front 3, IM wire 1 (Fig. 58), MZ back 2, MD front 11, MT2 wire 5 (Fig. 28), T2C in position 16 (Fig. 26), TC front 3, ground.

TJ operates a sixth time (circuit 378) and locks (circuit 394, except that the branch including IAZ back 2 is open), followed by TK and magnet T2, as before, but not S3 (circuit 395, open at IAZ back 1). TJ releases but TK holds (circuit 396, except that the branch including S3 front I is open). Magnet T2 releases, followed by TK. The wipers of switch T2 are now standing in positions 17, but those of switch S3 have remained in positions 6. TJ, TK and magnet T2 operate and release in succession three more times, in the same manner, and the wipers of switch T2 are now standing in positions 20. TL operates (circuit 398) and locks (circuit 381), followed by SDA and SDB (circuit 382), SH, TK, TLL and magnet T2 (circuit 384).

*Circuit 398.*—Battery, TL (Fig. 26), T2A in 20, TK back, ground.

SBB, IX and the eight relays IAZ–IHZ release. TL, SDA, SDB, TLL, magnet T2 and TK release. The wipers of switch T2 are now standing in positions 21. IX operates again (circuit 21, reclosed at TLL back 2).

In the meantime, CSC operates (circuit 399) and locks (circuit 400).

*Circuit 399.*—Battery, CSC (Fig. 11), CT wire 2 (Fig. 25), TE front 2, TLL front 2, ground.

*Circuit 400.*—Battery, CSC, CSC front 1, CBB front 3, ground.

CSD releases (circuit 39, open at CSC back), followed by CKB (circuit 77, open at CSD front 1), ME (circuit 361, open at CSD front 3), CN (circuit 364, open at CSD front 6), K7 (circuit 369, open at CN front 4), TC (circuit 365, open at CN front 5), DB (circuit 389, open at TC front 1), and TE (open at TC2). CKA operates again (circuit 27, re-closed at CKB1 back). K7 frees the key set and key 5 restores as soon as the pressure thereon is removed. CB, CC and CF release, followed by CBA (circuit 360, open at CB front 4), CBB, CCA, CCC, CFF and CSC (circuit 400, open at CBB front 5). CSD operates again (circuit 39). PFC releases (circuit 362, open at CFF front 4; and circuit 363, open at P2I), followed by magnet P2. The wipers of switch P2 are now standing in positions 3. IJ releases (circuit 82, open at CFF front 1; and circuit 83, open at I1I and I2I), followed by magnets I1 and I2. The wipers of switches I1 and I2 are now standing in positions 1.

As a consequence of the release of TK, TM operates (circuit 401) and locks (circuit 386), followed by SEA and SEB (circuit 387), TK, TMM, magnet T2 (circuit 388), and TE.

*Circuit 401.*—Battery, TM (Fig. 26), T2A in 21, TK back, ground.

SJ operates and locks, and SH releases. TM, TMM, SEA, SEB, SBA, SJ, magnet T2, TE and TK release. SBA operates again (circuit 24), followed by SBB (circuit 25).

The wipers of switch T2 have now completed their cycle and are again standing in their normal positions. During the second half-cycle, the lower partial products 5, 0, 0 have been duly accumulated by switches S3, S4 and S5, respectively. It will be understood that during this process the wipers of switch S3 advanced five steps from their positions 1, whereas the wipers of the seven switches S4–S10, the remainder of the eight switches brought into circuit by the operation of DB, were unaffected. Carry-over S4I back, ground; and two similar branches including IBZ back 2 and S5I back, ICZ back 2 and S6I back, respectively.

*Circuit 414.*—Battery, S4 (Fig. 44), DS1 wire 4*a* (Fig. 33), DKB back 1, DC front 1, DI wire 1*a* (Fig. 21), IAZ back 1, IT wire 1 (Fig. 24), TJ1 front 4, ground.

TJ1–5 set, magnets S4, S5, S6 and T2, and TK release. TJ1–5 (circuit 378), TK and magnets S4, S5, S6 and T2 operate and release in succession once more and the wipers of switches S4, S5 and S6 are now standing in positions 7, 9 and 2, respectively, and those of switch T2 in positions 13. ICZ operates (circuit 415) and locks, opening the stepping circuit of magnet S6 and the locking circuit of TJ to S6I back.

*Circuit 415.*—Battery, ICZ (Fig. 10), ICA back 1, ICB front 1, ICC back 1, ICD back 1, IM wire 8 (Fig. 58), MZ back 9, MJ front 9, MT2 wire 2 (Fig. 28), T2C in 13, TC front 3, ground.

TJ1–5 set operates and releases once more and the wipers of switches S4, S5 and T2 (but not S6) advance by one more step and are now standing in positions 8, 10 and 14, respectively. It will be observed that the wipers of switch S5 have now passed their ninth positions. SCE accordingly operates (circuit 416) and locks to SBB front 2 and SBA front 2, to record that carry-over is required from switch S5 to switch S4.

*Circuit 416.*—Battery, SCE (Fig. 38), SS2 wire 5 (Fig. 46), S5C in 10, ground.

TJ1–5 set operates and releases once more and the wipers of switches S4, S5 and T2 are now standing in positions 9, N and 15, respectively. Although the wipers of switch S4 have not yet passed their ninth positions they will do so during carry-over correction when the carry-over from switch S5 is registered by them. SCD accordingly operates (circuit 417) and locks similarly to SBB, to record that carry-over is required from switch S4 to switch S3.

*Circuit 417.*—Battery, SCD (Fig. 38), SS2 wire 4 (Fig. 46), S4C in 9, ground.

It is to be noted that had SCE not already been operated, SCD would have operated in any case when wiper S4C reached position 10, in a circuit similar to circuit 416. TJ1–5 set operates and releases four more times in the same manner and the wipers of switches S4 and S5 are now standing in positions 2 and 4, respectively (of their second cycles), and those of switch T2 in positions 19. IBZ operates (circuit 418) and locks, opening the stepping circuit of magnet S5 and the locking circuit of TJ1–5 to S5I back.

*Circuit 418.*—Battery, IBZ (Fig. 21), IBA back 1, IBB front 1, IBC back 1, IBD front 1, IM wire 2 (Fig. 58), MZ back 3, MJ10 front, MT2 wire 8 (Fig. 28), T2C in 19, TC front 3, ground.

TJ1–5 set operates and releases once more and the wipers of switches S4 and T2 (but not S5) advance by one more step and are now standing in positions 3 and 20, respectively.

It will be understood that the wipers of switch T2 have now made nine steps in their second half-cycle, under the control of TJ1–5, accompanied during all nine steps by the wipers of switch S4, during eight steps by those of switch S5 and during two steps only by those of switch S6, in accordance with the lower partial products 9, 8, 2 of the digital values stored and the value 9.

The wipers of switches S4, S5 and S6 are now standing in positions 3, 4 and 2, respectively, as stated. With the wipers of switch S3 still standing in positions 6 and those of all other accumulating switches in their normal positions, the aggregate registered (V, Fig. 72), is 0634200000000000. Since the wipers of switches S4 and S5 have passed their ninth positions, carry-over correction must now be effected and these wipers must themselves be caused to make one additional step to compensate for their eleven-step cycles.

*Carry-over correction*

TL operates (circuit 398) and locks (circuit 419), followed by TK, SDA and SDB (circuits 382 and 382*a*), which latter provide two additional holding circuits for TL (circuits 420 and 421).

*Circuit 419.*—Battery, TL (Fig. 29), TL front 2, T1I back (Fig. 25), T2I back, ground.

*Circuit 420.*—Battery, TL, TL front 6, ST wire 5 (Fig. 38); SCE front 4, SDB front 5 (Fig. 38), SS1 wire 4*b* (Fig. 46), S4I back, ground; SCD front 4, SDB front 4 (Fig. 38), SS1 wire 3*b*, S3I back, ground.

SH operates and locks, together with magnets S3 and S4 (circuit 421 and a similar circuit).

*Circuit 421.*—Battery, S3 (Fig. 46), SS1 wire 3*a* (Fig. 38), SDA front 4, SCD front 3, ground.

TLL operates, followed by magnet T2 (circuit 384). SBB, IX and the seven relays IBZ–IHZ release. TL, SDA, SDB, TLL, magnets S3, S4 and T2, and TK release. IX operates again (21, re-closed at TLL back 1). The wipers of switch T2 are now standing in positions 21, those of switches S3 and S4 in positions 7 and 4, respectively, carry-over correction has also been effected, and the aggregate registered at this stage (VI, Fig. 72) is 0744200000000000.

In the meantime, CSC operates (circuit 399) and locks to CAA front 4, and CSD releases, followed by SKB, MJ (406, open at CSD front 3), CN (circuit 407, open at CSD front 6), K7, TC, DC (circuit 412, open at TC front 1) and TE. CKA operates again (circuit 27, re-closed at CKB back). K7 frees the key-set and key 9 restores as soon as the pressure thereon is removed. CA and CF release, followed by CAA, CFF and CSC. CSD operates again (circuit 39). PFC releases, followed by magnet P2, and the wipers of switch P2 are now standing in positions 4. IJ releases, followed by magnets I1 and I2, and the wipers of switches I1 and I2 are now standing in positions 2.

*Compensation*

As a consequence of the release of TK, TM operates (circuit 401) and locks (circuit 422), followed by TK, SEA and SEB (circuits 387 and 387*a*), which latter provide two additional holding circuits for TM (circuit 423).

*Circuit 422.*—Battery, TM (Fig. 25), TM front 5, T1I back (Fig. 29), T2I back, ground.

*Circuit 423.*—Battery, TM, TM front, ST wire 5 (Fig. 38); SCE front 4, SEA front 5 (Fig. 40), SS1 wire 5*b* (Fig. 46), S5I back, ground; SCD front 4, SEA front 4, SS1 wire 4*b*, S4I back, ground.

Magnets S4 and S5 operate (424 and a similar circuit).

*Circuit 424.*—Battery, S4 (Fig. 44), SS1 wire 4*a* (Fig. 38), SEB front 4, SCD front 3, ground.

TMM operates, followed by magnet T2 (circuit 388) and TE. SJ operates and locks, and SH releases. TM, SEA, SEB, SBA, TMM, and SJ release, followed by SCD and SCE (open at SBA front 2). Magnets S4, S5 and T2, TE and TK release. SBA operates again (circuit 24, re-closed at SJ back 2), followed by SBB (circuit 10).

The wipers of switch T2 are now again standing in their normal positions, those of switches correction once more did not arise, because none of the wipers of the accumulating switches have passed their ninth positions.

At this stage, the same relays are operated as at the stage immediately preceding the submission of the first digit of the multiplier; and the wipers of switches P1, P4 and P5 are still standing in positions 3, 3 and 2, respectively. The wipers of switches D1, I1, I2 and P2, however, have advanced in the interim to positions 1, 1, 1, and 3, respectively, and those of switches S3, S4 to positions 6 and 4, respectively. The aggregate registered (III, Fig. 72) is thus 0640000000000000.

*Second digit 9 of multiplier submitted and printed: partial products accumulated.*

When key 9 is depressed by the operator, operations ensue which are similar to those resulting from the depression of key 5. The partial products of the digital values stored and the value 9 are accumulated during another cycle of the wipers of switch T2, the higher partial products during the first half-cycle, with MZ (Fig. 58) operated, and the lower partial products during the second half-cycle, with MZ unoperated, in the manner already described, except that the multiplication-table circuit is set for multiplication by the value 9, by the operation of MJ instead of ME. CA and CF operate (circuits 402 and 403) and lock, followed by CAA (circuit 65), CFF (circuit 66), CH (circuit 404) and magnet K7 (circuit 41), which latter locks the key set.

*Circuit 402.*—Battery, CA (Fig. 10), AC wire 1, key 9, ground.

*Circuit 403.*—Battery, CF (Fig. 10), AC wire 5, key 9, ground.

*Circuit 404.*—Battery, CH (Fig. 11), CF front 5, ground.

Selector magnet K1 operates (circuit 404) to select character 9 (Fig. 1), followed by CLL (circuit 36) and magnet K6 (circuit 37), whereupon character 9 is printed.

*Circuit 405.*—Ground, K1 (Fig. 3) 1st AL wire 11 (Fig. 5), AC wire 11 (Fig. 10), CA front 1 (Fig. 12), battery.

CKA, CH, K1, CLL and K6 release and CKB operates (circuit 77).

In the meantime, MJ operates (circuit 406), together with IJ (circuits 82 and 83), magnets I1 and I2, PFC (circuits 362 and 363, magnet P2 and CN (circuit 406), which latter holds K7 (circuit 369) independently of CPD8 front 6.

*Circuit 406.*—Battery, MJ (Fig. 59), MC wire 9 (Fig. 14), CEA back 3, CCA back 3, CBA back 1, CAA front 2, CFF front 3, CSD front 3, ground.

*Circuit 407.*—Battery, CN (Fig. 13), CW front 1 (Fig. 11), CSD front 6, CAA front 1, CH front 2 (Fig. 11), ground.

TC operates (circuit 365), followed by DB (circuit 389, closed at TC front 1), MZ (circuit 367) and magnet D1 (circuit 368). IAZ and the five relays IDZ–IHZ operate (circuits 370, 371 and similar circuits) and lock. TJ1–TJ5 operate (circuit 371) and lock (circuit 408), followed by TK, magnets S4 and S5 (circuit 409 and a similar circuit) and magnet T2 (circuit 375).

*Circuit 408.*—Battery, TJ1–TJ5 (Fig. 24), TJ front 3; T2I back (Fig. 29), T1I back, ground; IT wire 11 (Fig. 23), IBZ back 3 (Fig. 21), DI wire 2*b* (Fig. 30), DB front 4, DKB back 2, DS1 wire 4*b* (Fig. 46), S4I back, ground; ICZ back 3 (Fig. 21), D1 wire 3*b* (Fig. 30), DB front 6, DKB back 4, DS1 wire 5*b*, S5I back, ground.

*Circuit 409.*—Battery, S5 (Fig. 46), DS1 wire 5*a* (Fig. 31), DK back 3, DB3 front, D1 wire 3*a* (Fig. 21), ICZ back 1, IT wire 3 (Fig. 24), IT1, TJ6 front 2, ground.

TJ1–TJ5 release, followed by magnets S4, S5 and T2, and TK. The wipers of switches S4 and S5 are now standing in positions 5 and 1, respectively, and those of switch T2 in positions 1. IBZ operates (circuit 410) and locks opening the stepping circuit of magnet S4 and the locking circuit of TJ1–TJ5 set to S4I back.

*Circuit 410.*—Battery, IBZ (Fig. 21), IBA back 1 IBB front 1, IBC back 1, IBD front 1, IM wire 2 (Fig. 58), MZ front 3, MJ front 8, MT1 wire 1 (Fig. 28), T2C in 1, TC front 3, ground.

TJ1–TJ5 set operates and releases six more times, and the wipers of switches S5 and T2 (but not S4) advance by six more steps and are now standing in positions 7. ICZ operates (circuit 411) and locks, opening the stepping circuit of magnet S5 and the locking circuit of TJ1–TJ5 set to S5I back.

*Circuit 411.*—Battery, ICZ (Fig. 21), ICA back 1, ICB front 1, ICC back 1, ICD back 1, IM wire 8 (Fig. 58), MZ front 9, MJ front 2, MT1 wire 7 (Fig. 28),T2C in 7, TC front 3, ground.

TJ1–TJ5 set operates and releases two more times, and the wipers of switch T2 (but not S5) advance by two more steps and are now standing in positions 9. TL operates (circuit 380) and locks (circuit 381), followed by SDA and SDB (circuit 382), SH, TK, TLL and magnet T2 (circuit 384). SBB, IX and the eight relays IAZ–IHZ release. TL, SDA, SDB, TLL, magnet T2 and TK release, and IX operates again. The wipers of switch T2 are now standing in positions 10. TM operates (circuit 385) and locks (circuit 386), followed by SEA and SEB (circuits 387 and 387*a*), TK, TMM, magnet T2 (circuit 388), and TE and the latter locks. SJ operates and locks, and SH releases. Relay set DB releases (circuit 389, open at TMM back 2). MZ releases, followed by magnet D1, and the wipers of switch D1 are now standing in positions 2. TM, SEA, SEB, TMM, SBA, SJ, magnet T2 and TK release. SBA operates again (circuit 24), followed by SBB (circuit 25).

The wipers of switch T2 are now standing in positions 11 and have completed a half-cycle, during which the higher partial products 0, 1, 7 of the digital values stored and the value 9 have been duly accumulated by switches S4 and S5, whose wipers are now standing in positions 5 and 7, respectively. With the wipers of switch S3 still standing in positions 6 and those of all other accumulating switches in their normal positions, the aggregate registered (IV, Fig. 72) is 0657000000000000. It will be noted that the need for carry-over correction has not yet arisen.

As a consequence of the release of TMM and T2, DC operates (circuit 412), together with the five relays IDZ–IHZ (circuit 392 and similar circuits) and the latter lock.

*Circuit 412.*—Battery, DC (Fig. 30), D1D in 2 (Fig. 37), DT1 wire 3 (Fig. 24), TC front 1 (Fig. 26), ST wire 11 (Fig. 38), SH back 1 (Fig. 39), ST wire 12 (Fig. 25), TMM back 2 (Fig. 27), TLL back 1, ground.

TJ1–5 set operates (circuit 393) and locks (circuit 413), followed by TK, magnets S4, S5 and S6 (circuit 414 and similar circuits) and magnet T2 (circuit 375).

*Circuit 413.*—Battery, TJ1–5 (Fig. 24), TJ5 front 3; T2I back (Fig. 29), T2I back, ground; IT wire 11 (Fig. 23) IAZ back 2, DI wire 1*b* (Fig. 30), DC front 2, DKB back 2, DS wire 4*b* (Fig. 46), S4 and S5 in positions 5, and compensation has been effected. With the wipers of switches S3 and S6 still standing in positions 7 and 2, respectively, the aggregate registered (VII, Fig. 72) is 0755200000000000.

The same relays are operated as at the stage immediately preceding the submission of the first digit of the multiplier; and the wipers of switches P1, P4 and P5 are still standing in positions 3, 3 and 2, respectively. The wipers of switches D1, I1, I2 and P2, however, have now advanced to positions 2, 2, 2 and 4, respectively.

*Third digit 0 of multiplier submitted and printed*

When key 0 is depressed by the operator, the operations which ensue are simpler than those which resulted from the depression of key 5 and key 9, since no partial-products are to be accumulated. It is necessary only to cause the character 0 to be printed on the tape, and to advance the wipers of switches D1, I1, I2 and P2 to record that a third digit, although of insignificant value, has been received. CF operates (circuit 425) and locks, followed by CFF (circuit 68), CH and magnet K7 (circuit 41), which latter locks the key set.

*Circuit 425.*—Battery, CF (Fig. 10), AC wire 5 (Fig. 7), 1st AL wire 5 (Fig. 5), key 0 depressed (Fig. 3), ground.

No type selector magnet of printer P is caused to operate, because the character 0 normally registers with the printing point, as previously explained. CL operates (circuit 426), instead of CN, because the digit received is of insignificant value.

*Circuit 426.*—Battery, CL (Fig. 15), CBA back 2, CAA back 2, CFF front 3, CSD front 3, ground.

CLL operates circuit 427 to CL front 1, followed by magnet K6 (circuit 18), whereupon character 0 is printed.

*Circuit 427.*—Battery, CLL (Fig. 12), CKA front 2 (Fig. 16), CL front 3, ground.

CKA, CH and K7 release, and CKB operates (circuit 77).

In the meantime, DY operates (circuits 428 and 88), followed by magnet D1.

*Circuit 428.*—Battery, DY (Fig. 36), DC wire 1 (Fig. 13) CQD back 1, CPB back 1, CL front 2, CFF front 2, ground.

IJ operates (circuits 82 and 83), followed by magnets I1 and I2. PFC operates (circuits 362 and 363), followed by magnet P2.

K7 frees the key set, and key 0 restores as soon as the pressure thereon is removed. CF releases, followed by CFF, CKB, CL, CLL, K6, DY, IJ, PFC and magnets D1, I1, I2 and P2.

The wipers of switches D1, I1, I2 and P2 are now standing in positions 3, 3, 3 and 5, respectively. CKA operates again (circuit 27, re-closed at CKB back and K61).

At this stage, the relays operated are again the same as before the digit 0 was submitted; the wipers of switches P1, P4 and P5 are still standing in positions 3, 3 and 2, respectively; and the aggregate registered has not been changed and is still 0755200000000000.

*Sign = submitted and printed*

When key (=) is depressed by the operator, CE and CG operate (circuit 429 and similar circuits) and lock.

*Circuit 429.*—Battery, CE (Fig. 2), AC wire 4 (Fig. 9), 1st AL wire 4 (Fig. 5) key = depressed (Fig. 11), ground.

CPD8 operates (circuit 40), followed by magnet K7 (circuit 41), which locks the key set. Selector magnets K4 and K5 operates (circuit 76 and similar circuits) and together select the character = of the type wheel. CLL operates (circuit 36), followed by magnet K6 (circuit 37), to print the character =. CKA, CPD8, K4, K5, CLL and K6 release, and CKB operates (circuit 77).

In the meantime, by reason of the operation of CE and CG, CEE, CEA (circuit 430) and CGG operate, followed by CRB (circuit 431), which locks to CSB front 3.

*Circuit 430.*—Battery, CEA (Fig. 14), CW front 3, CE front 4, ground.

*Circuit 431.*—Battery, CRB (Fig. 13), CPC front 3, CEE front 2, CCC back 2, CBB back 2, CAA back 3, CFF front 3, CSD front 3, ground.

CPD7 operates (circuit 432), PCA operates (circuit 433) and K7 holds (circuit 357).

*Circuit 432.*—Battery, CPD7 (Fig. 12), CSA front 1, CRB front 1, ground.

*Circuit 433.*—Battery, PCA (Fig. 52), PXD back 4, PE back 3, PL back 3, P1A in 3, PC wire 4 (Fig. 17), CRB front 2 (Fig. 13), CT wire 7 (Fig. 25), TMM back 1, ground.

At this stage, relays CE, CEA, CEE, CG, CGG, CPD7, CKB, CPB, CPC, CRB, CSA, CSB, CSD, CW, IAA, IAB, IAD, IBB, IBD, ICB, IX, IZ, PA, PB, PCA, SA, SBA and SBB are operated; magnet K7 is operated and has locked the key set; the wipers of switches D1, I1, I2, P1 and P4 are standing in positions 3 and those of switch P5 in positions 2. The wipers of switches S3, S4, S5 and S6 are in positions 7, 5, 5 and 2, respectively, registering the digital values of the required product; while the wipers of switch P2 are in positions 5, registering that there are altogether five digits in the integral portions of the multiplicand and multiplier together, and so determining the position of the decimal point, and therefore also of the punctuation mark, in the product, as already explained.

*Solution 7,552 printed*

As a result of the operation of PCA, PD operates (circuit 434) and locks over PD front 2 to PAa front.

*Circuit 434.*—Battery, PD (Fig. 13), PCA front 3, PAa front 3, ground.

PFA operates (circuit 435) and locks (circuit 32a).

*Circuit 435.*—Battery, PFA (Fig. 54), PXA front 2, PKA back 1, PA front 2, PCA front 4, P1I closed, ground.

Magnets P1 and P4 (Fig. 14) operate in obvious circuits to PFA front 4 and PFA front 3, respectively. When both magnets P1 and P4 have operated their interrupter contacts, PFA releases, followed by said magnets. The wipers of switches P1 and P4 are now standing in positions 4. PCA holds (circuit 436), although its operating circuit is now open (circuit 433, open at P1A).

*Circuit 436.*—Battery, PCA (Fig. 13), PXD back 4, PE back 3, PL back 3, P1A in 4, PS2 wire 1 (Fig. 44), SS4 wire 4 (Fig. 39), SLA back 1, SS4 wire 3 (Fig. 44), S1C in N, PS4 wire 1 (Fig. 50), PE back 2, ground.

PFA and magnets P1 and P4 operate and release two more times in a similar manner. The wipers of P1 and P4 advance to positions 5, where PCA continues to hold (circuit 447), and then to positions 6, whereupon PCA releases.

*Circuit 437.*—Battery, PCA (Fig. 13), PXD back 4, PE back 3, PL back 3, P1A in 5, PS2 wire 2 (Fig. 44), SS wire 4 (Fig. 39), then as circuit 446.

It is to be noted that the conditions of wipers D of S1 and S2 have thus been scrutinized in turn as the wipers of switch P1 advanced and found to be standing in their normal positions. The wipers of switch S3 being off-normal, i. e. registering a significant digital value, the advance of the wipers of switch P1 (and switch P4) halts at positions 6 and printing of the number registered by the accumulating switches begins, as will now be explained. PE operates (circuit 438), followed by PCC (circuit 439), CSC (circuit 440), which locks to CAA front 4 and CPD7 front 2, and S1 (circuit 441).

*Circuit 438.*—Battery, PE (Fig. 50), PD front 3, PCA back 1, PA*a* front 2, ground.

*Circuit 439.*—Battery, PCC (Fig. 50), P3A in N, PA front 5, PS3 wire 1 (Fig. 48), S1D in N, SS6 wire 2 (Fig. 41), SKK back 2, SS6 wire 3 (Fig. 48), S10D in N, wire 4, SKL back 3—SKR back 3, wire 17, S17D in N, SS4 wire 5 (Fig. 39), SA front 3, SP wire 1 (Fig. 50), PE front 1, ground.

*Circuit 440.*—Battery, CSC (Fig. 11), CSB*a* front 3, PC wire 14 (Fig. 50), PD front 1, ground.

*Circuit 441.*—Battery, S1 (Fig. 44), PS4 wire 5, PE1 front 1 (Fig. 13), ground.

CSD releases (circuit 39, open at CSC back), followed by CKB (circuit 345, open at CSD front 4). CKA operates again (circuit 27, re-closed at CKB back), followed by PP (circuit 442).

*Circuit 442.*—Battery, PP (Fig. 53), PC wire 23 (Fig. 17), CKA front 3, PC wire 10 (Fig. 50), PE front 1, ground.

PFA operates (circuit 32) and locks (circuit 32*a*), followed by magnets P1 and P4, as before. PMA operates (circuit 443) and locks (circuit 444). PMB, being shortcircuited, does not operate at this stage.

*Circuit 443.*—Battery, PMA (Fig. 53), PMB back 2, PB front 2, PP front 4, ground.

*Circuit 444.*—Battery, PMA, PMA front 2, PMB, PVA back 3, PB front 4, ground.

CAX and CBX operate (circuit 445), followed by selector magnets K1 and K2 (circuits 74 and 75), which together select character 7 on the type-wheel.

*Circuit 445.*—Battery, CAX (Fig. 12), CBX, QC wire 7 (Fig. 65), QVB back 2, QS1 wire 7 (Fig. 49), S3B in 7, PS1 wire 3 (Fig. 57), P1C in 6, PRB back 2, PXE back 1, PW back 1, PP front 1, PJA back 3, PL back 1, ground.

QX (Fig. 17) operates in a circuit including CAX front 1 (Fig. 2) and CBX front 1, followed by other relays in the quotient circuit, but these relays have no useful function in a multiplication calculation, and will not be described further. CLL operates (circuit 217), followed by magnet K6 (circuit 218), and character 7 is printed. CKA releases, followed by PP (338, open at CKA2), PFA (circuit 32, open at PP front 5; and circuit 32*a*, open at P1I and P4I) and magnets P1 and P4. The wipers of switches P1 and P4 are now standing in positions 7, PMB operates (circuit 444), followed by PJA (circuit 446).

*Circuit 446.*—Battery, PJA (Fig. 51), PJC back 1, PMB front 1, P2C in 5, PXD back 3, P4C in 7, PVA back 2, PKB back 1, PA front 4, ground.

CAX and CBX release (circuit 445, open at PP front 1), followed by K1, K2, QX, CLL and K6. CKA re-operates, followed by PP and PJB (circuit 447), which locks (circuit 448). PJC, being short-circuited, does not operate at this stage.

*Circuit 447.*—Battery, PJB (Fig. 50), PJA front 1, PL back 2, PP front 5, ground.

*Circuit 448.*—Battery, PJB, PJB front 2, PJC, PMB front 1, then as in circuit 446.

CGX operates over a circuit similar to circuit 200 followed by circuit 449 and selector magnet K4 (circuit 94), which selects the comma (,) of the type-wheel (Fig. 66).

*Circuit 449.*—Ground, CGX front 2 (Fig. 12), PC wire 19 (Fig. 50), PJC back 1, PJB front 1 ground.

CLL and magnet K6 operate again, as before, and a comma is printed. CKA releases, followed by PP, and PJC operates (circuit 448). PJA releases (circuit 446, open at PJC back 1). CGX releases, followed by K4, CLL and K6. CKA and PP operate once more. PFA operates again and locks, followed by magnets P1 and P4, as before. CBX and CCX operate (circuit 450) followed by selector magnets K2 and K3 (circuit 75 and a similar circuit), which together select character 5 of the type-wheel (Fig. 66).

*Circuit 450.*—Battery, CBX (Fig. 12), CCX, QC1 wire 5 (Fig. 65), QVA back 5, QS1 wire 5 (Fig. 49), S4B in 5 (Fig. 23), PS1 wire 4 (Fig. 57), P1C in 7, PRB back 2, then as circuit 445.

CLL and magnet K6 operate again, as before, and character 5 is printed. CKA, PP, PFA, magnets P1 and P4, CBX, CCX, K2, K3, CLL and K6 release. The wipers of switches P1 and P4 are now standing in positions 8. PJB and PJC release (circuit 344, open at P4C). CKA and PP operate and release once more, and a second character 5 is selected and printed in the same manner, with CBX and CCX operated again (circuit 451), whereafter the wipers of switches P1 and P4 advance to positions 9.

*Circuit 451.*—Same as circuit 450 to QS1 wire 5; then S5B in 5, PS1 wire 5, P1C in 8, PRB back 2; then as circuit 341.

CKA and PP operate again, followed by PFA and magnets P1 and P4, as before. CBX and CEX operate (circuit 452), followed by selector magnets K2 and K4 (circuits 75 and 76), which together select character 2 of the typewheel (Fig. 66).

*Circuit 452.*—Battery, CBX (Fig. 12), CEX, QC wire 2 (Fig. 65), QVA back 1, QS1 wire 2 (Fig. 49), S6B in 2, PS1 wire 6 (Fig. 57), P1C in 9, PRB back 2, then as circuit 445.

CLL and magnet K6 operate, and character 2 is printed. CKA, PP, PFA, magnets P1 and P4, CBX, CEX, K2, K4, CLL and K6 release. The wipers of switches P1 and P4 are now standing in positions 10. PKA operates (circuit 452*a*), followed by PL (circuit 453), which locks (circuit 454).

*Circuit 452a.*—Battery, PKA (Fig. 55), PRB back 3, PXA front 5, P1B in 10, P2B in 5, PXX back 1, ground.

*Circuit 453.*—Battery PL (Fig. 53), PNB back 1, PKA front 2, PXC back 1, ground.

*Circuit 454.*—Battery, PL, PNB back 1, PL front 3, PA front 3, ground.

PKB (Fig. 55) operates in an obvious circuit to PKA front 1, and locks to PA front 4. PKB at PKB back 1 prevents PJA front reoperating, although wiper P2C is again extended to wiper P4C, and so prevents the printing of another comma. CKA reoperates, as before, but PP does not reoperate this time, its circuit (442) having been opened by PE, which releases in the meantime as will be explained, so that printing ceases. PCA operates (circuit 455), followed by CZ (circuit 456).

*Circuit 455.*—Battery, PCA (Fig. 52), PXD back 4, PE back 3, PL back 4, P1A in 10, PS2 wire 7

(Fig. 46), S8D in N, S9D in N, SS4 wire 6 (Fig. 39), SLA back 2 (Fig. 39), SKA back 2, SS6 wire 1 (Fig. 48), S1D in N; then as circuit 439.

*Circuit 456.*—Battery, CZ (Fig. 11), PC wire 15 (Fig. 50), PE front 3, PE front 1, ground.

*Circuits restored to normal*

As a consequence of the operation of PCA, PFA operates (circuit 435) and locks, followed by magnets P1 and P4. When both magnets have operated their interrupter contacts, PFA releases, followed by the magnets. The wipers of switches P1 and P4 are now standing in positions 11. PKA releases (circuit 452, open at P1B).

In the meantime, as a consequence of the operation of CZ, CSB releases (circuit 19, open at CZ back 2), and CZ then holds (circuit 457), independently of PE front 3. CSB*a* also releases due to opening of CZ back 2.

*Circuit 457.*—Battery, CZ (Fig. 11), back; PC wire 15 (Fig. 50), PE front 3, PCA front 1, PXG front 2, PD front 4, ground; CSB*a* back 1 (Fig. 16), SC wire 4 (Fig. 39), SZA back 1, SC wire 3 (Fig. 13), CMB back 2, ground.

PE releases (circuit 438, open at PCA back 1), preventing PP from reoperating, as stated. PCC and PCA releases (circuits 439 and 445, open at PE back 3), together with S1 (circuit 337*a*, open at PE front 1), and PKC operates (circuit 218). CKA releases (circuit 27, open at CSB*a* front 2), together with CRB (circuit 188, open at CSB front 4), IX (circuit 21, open at CSB front 5) and SA (circuit 23, open at CSB*a* front 1). CPB and CPC release (circuit 349, open at CSB front 2), followed by CW (Fig. 10, open at CPC front 4), CEA (circuit 427, open at CW front 3), IZ (circuit 22, open at IX front 1; and circuit 58, open at CPC front 3) and the six storage relays IAA, IAB, IAD, IBB, IBD and ICB (open at IZ front 1). The record of the digital values of the multiplicand has thus been obliterated. PA, PXA and PA*a* release (circuit 29, open at CSB*a* front 4), followed by PB (Fig. 54, open at PA*a* front 1), PD (Fig. 52, open at PXA front 1), PMA and PMB (circuit 444, open at PB front 3), PL (circuit 453, open at PKA front 2; and circuit 454, open at PA front 3), PKB (Fig. 55, open at PKA front 1 and PA front 4) and PKC (circuit 218, open at PKB front 1).

As a consequence of the release of PA*a*, PCD operates (circuit 221), followed by magnet P4 (circuit 222). Magnet P4 opens it own circuit at P4I, releases, recloses it, and reoperates; the wipers of switch P4 accordingly return to their normal positions, whereupon PCD releases. PCE operates (circuit 223) and locks to PCE front 3 (circuit 224). Magnet P5 operates (circuit 225), opens its own circuit at P5I, releases and reoperates; the wipers of switch P5 return to their normal positions, whereupon PCE releases. PCB operates (circuit 458), followed by magnet P2 (circuit 121), and the wipers of switch P2 return in a similar manner to their normal positions, whereupon PCB releases.

*Circuit 458.*—Battery, PCB (Fig. 50), P2A off-normal PA*a* back 4, PH back 2, ground.

As a consequence of the release of CSB, DZ operates (circuit 123) and locks (circuit 124), followed by magnet D1 (circuit 125), and the wipers of switch D1 return to their normal positions, whereupon DZ releases.

IK operates (circuit 126) and locks (circuit 254), followed by magnets I1 and I2 (circuit 128 and a similar circuit) and the wipers of switches I1 and I2 return to their normal positions, whereupon IK releases.

As a consequence of the release of SA (Fig. 39, circuit 23) SZC operates (circuit 292), followed by SZB (circuit 294). SZC releases again (circuit 292, open at SZB back 1), followed by SZB. SZC is slow to release and SZB slow to operate; SZC accordingly operates and releases in turn slowly. Each time SZC operates, SY operates to SZC front 1, followed by the magnets of all accumulating switches whose wipers are off-normal, namely, switches S3, S4, S5 and S6 (circuit 459 and similar circuits).

*Circuit 459.*—Battery, S3 (Fig. 44), SS1 wire 3*a* (Fig. 38), SY front 3, SS3 wire 3 (Fig. 46), S3C off-normal, ground.

The wipers of these switches accordingly return to their normal positions, where the several energizing circuits of the magnets are opened at S3A, etc. When the wipers of all accumulating switches are standing in their normal positions and the record of the accumulated product has been obliterated (VIII, Fig. 72), PCA operates (circuit 460), together with SZA (circuit 62*a*, reclosed at S6D in N) and followed by magnet P1 (circuit 461).

*Circuit 460.*—Battery, PCA (Fig. 52), PXD back 4, PE back 3, PL back 3, P1A in 11, PS2 wire 8 (Fig. 44), S8D, S7D, S6D, S5D, S4D, S3D, S2D, all in N, then as in circuit 192.

*Circuit 461.*—Battery, P1 (Fig. 56), PA back 2, PCA front 4, P1I closed, ground.

SZC remains de-energized (circuit 292, open at SZA back 1). Magnet P1 opens its own circuit at P1I and releases, advancing its wipers to positions 12, where PCA holds (circuit 462).

*Circuit 462.*—Battery, PCA (Fig. 52), PXD back 4, PE back 3, PL back 3, P1A in 12, PS3 wire 3 (Fig. 44), SS6 wire 3 (Fig. 41), SKK back 2, SS6 wire 2 (Fig. 46), S1D in N, SS6 wire 1 (Fig. 41), SKA back 2, SLA back 1, SS4 wire 6 (Fig. 44), S9D, S8D, then as circuit 460. Magnet P1 operates and releases again in turn and the wipers return to their normal positions, PCA finding a new holding circuit at each step of wiper P1A (circuit 463 and similar circuits, and then 464), until this wiper leaves position 21, whereupon PCA releases.

*Circuit 463.*—Battery, PCA (Fig. 52), PXD back 4, PE back 3, PL back 3, P1A in 13, PS3 wire 5 (Fig. 46), SS6 wire 5, SKL back 2, SS6 wire 4, S10 in N, SS6 wire 3, then as circuit 460.

*Circuit 464.*—Battery, PCA, PXD back 4, PE back 3, PL back 3, P1A in 21, ground.

During the return to normal of the wipers of switches D1, I1, I2, P1, P2, P4, P5, S3, S4, S5 and S6, CZ holds (circuit 457 and circuit 465). When all these wipers are standing in their normal positions, CZ releases.

*Circuit 465.*—Battery, CZ (Fig. 11), CSB*a* back 1; DC wire 4 (Fig. 36), DZ front 3 (Fig. 36), ground; PC wire 1 (Fig. 50), PCB front 1 (Fig. 50), PCD front 1 and PCE front 1, ground.

Also, during the return to normal of the wipers of switches D1, I1, I2, P2 and P5, CPD7 holds (circuit 466), although its operating circuit (circuit 229) is open at CRB2.

*Circuit 466.*—Battery, CPD7 (Fig. 12), CSA front 1; DC wire 5 (Fig. 36), DZ front 4 (Fig. 36), ground; IC wire 8 (Fig. 20), IK front 5, ground; PC wire 28 (Fig. 50), PCB front 2, ground; and PCE front 2, ground.

When all these wipers are standing in their normal positions, CPD7 releases, followed by magnet K7 (circuit 41). K7 frees the key-set, and key = restores as soon as the pressure thereon is removed. CE and CG release, followed by CEE, CGG and CSC.

At this stage, relays CSA, SBA, SBB and SZA alone remain operated and the wipers of all switches are standing in their normal positions.

*Three dots (...) printed*

As a consequence of the release of CZ, CSB re-operates (circuit 19, reclosed at CZ back 2), followed by IX, IZ, SA, CKA, CSC, PA, and PP; SZA releases; and the calculator causes three full stops to be printed, in precisely the same manner as when the calculator was originally taken into use. The situation is now identical with the situation immediately before the submission of the problem in the example which has been fully described herein. The operator may accordingly submit a fresh problem.

*Constant multiplicand 12.8 submitted, printed and stored*

It is supposed that the operator now requires the products of an invariable multiplicand 12.8 and successive multipliers 590 and 0.01, and eventually other numbers. The same numbers have been selected for the multiplicand and first multiplier in this second example of a computation carried out in accordance with the invention, as were used for the multiplicand and multiplier in the example which has been fully described herein, in order that the differences in the operation of the calculator may more easily be understood.

When the operator depresses in succession the keys 1, 2, . and 8, operations ensue in the calculator which are identical with those which followed the submission of these characters in the preceding example. As a result of these operations, the number 12.8 is printed on the tape, the digital values 1, 2 and 8 are stored in the input circuit, and a record of the position of the decimal point is made.

*Constant multiplicand sign × submitted and printed*

When key

CM
×

(Fig. 3) is depressed by the operator, to indicate that the factor already submitted is to be treated as a constant or invariable multiplicand, to which a plurality of multipliers are to be applied in succession, operations ensue which are similar to those which followed the keying of the sign × in the preceding example. Only those operations which differ therefrom will be described in detail. CB, CE and CG operate (circuit 467 and similar circuits) and lock, followed by CH and K7, as previously described.

*Circuit 467.*—Battery, CB (Fig. 10), AC wire 2 (Fig. 9), 1st AL wire 2 (Fig. 5), key

CM
× depressed, wire 8*a*, ground.

Selector magnets K2, K4 and K5 operate (circuit 75 and similar circuits) and together select character ×, of the type-wheel 101 (Fig. 66), after which it is printed, the relays and magnets involved release, CKA and CH release and CKB operates.

In the meantime, CBB, CEE and CGG operate in obvious circuits to CB front 4, etc. CSB, in operating as above stated, causes CSD to operate over circuit 39 with a result energizing CPD (circuit 468) followed by PG (circuit 469).

*Circuit 468.*—Battery, CPD (Fig. 15), CEE front 3, CCC back 3, CBB front 2, CAA back 3, CGG front 1, CSD front 3, ground.

CPD operates constant multiplicand relay PG (circuit 469) which locks circuit (470). PG differentiates the example being described from the previous example, as will be explained.

*Circuit 469.*—Battery, PG (Fig. 50), PC wire 9 (Fig. 17), CPD, ground.

*Circuit 470.*—Battery, PG, PG front 2, PC wire 7 (Fig. 17), CSA front 2, IC wire 11 (Fig. 20), IZ front 4, ground. As a consequence of the operation of PG, PH operates (circuit 471), followed by PU (circuit 472), which locks (circuit 473).

*Circuit 471.*—Battery, PH (Fig. 53), PRA back 2, PG front 3, P5C in 2, P2B in 2, PX back 2, ground.

*Circuit 472.*—Battery, PU (Fig. 51), PW back 3, PH front 1, ground.

*Circuit 473.*—Battery, PU, PU front 3, PA front 1, ground.

As a consequence of the operation of CPA, CPB operates and locks, CV releases, the wipers of switches D1, I1 and I2 return to their normal positions, and K7 releases and frees the key set, all as described. CPB locks to CSB front 2 (circuit 474).

*Circuit 474.*—Battery, CPB, CPC, CPB front 3, CSB front 2, ground.

Key

CM
× restores as soon as the pressure thereon is removed, and CB, CE and CG release, followed by CBB, CEE and CGG. CKB and CPA release and CKA, CPC and CW operate, as described. It is to be noted that CPC is held also (circuit 474).

At this stage, the situation is precisely the same as after the operations resulting from the keying of sign × in the preceding example, except that PG, PH and PU also are operated.

*First multiplier 590 submitted and printed; product accumulated*

When keys 5, 9 and 0 are depressed in succession by the operator, operations ensue which are identical with those which followed the keying of the corresponding characters in the preceding example, except that, when the wipers of switch P2 advance from positions 2 to positions 3 after the accumulation of the partial products of the digital values stored and the value 5, PH releases (circuit 471, open at P2B), the wipers of switches P2 and P5 being now out of phase.

As a result of these operations, the product of the constant multiplicand 12.8 and the first multiplier 590 is accumulated and the wipers of switch P2 determine the position of the decimal pont therein, in the manner already described, whereafter the situation is precisely the same as at the corresponding stage in the preceding example, except that PG and PU also are operated.

*Sign = submitted and printed; first product 7,552 printed*

When key = is depressed by the operator, operations ensue which are identical with those which followed the keying of sign = in the preceding multiplication example until the product 7,552 of the digital values stored and the first multiplier 590 has been printed, and duly punctuated, and the release relay CZ has operated (circuit 456). Thereafter, by reason of the operated condition of PG, the operations are somewhat different and the circuits restore only partially to normal, as will now be described.

*Circuits partially restored to normal*

As a consequence of the operation of PCA, the wipers of switches P1 and P4 advance to positions 11 and PKA releases.

As a consequence of the operation of CZ, CSB releases at CZ front 2, and holds CZ, independently of PE front 3. PE releases, followed by PEE, PCC and PCA, and PKC operates. CKA releases, together with CRB, IX and SA. CPB and CPC, however, remain operated (circuit 474), together with CW, CEA (circuit 430), IZ (circuit 22) and the six storing relays IAA, IAB, IAD, IBB, IBD and ICB, thus retaining the digital values of the multiplicand and the fact that the problem is one involving multiplication. PA releases, followed by PB, PD, PU (circuit 473, open at PA front 1), PMA and PMB, PL, PKB and PKG.

As a consequence of the release of PA, the wipers of switch P4 return to their normal positions, as described, but PCE does not operate (circuit 223, open at PG back 2), so that the wipers of switch P5 remain standing in positions 2, thus retaining the record of the number of digits in the integral portion of the multiplicand. PCB operates (circuit 458), followed by magnet P2 (circuit 121) and the wipers of switch P2 return to their normal positions. PCB does not yet release, however, since it is held (circuit 475), independently of P2A, and the wipers continue to advance and again move off normal.

*Circuit 475.*—Battery, PCB (Fig. 50), PH back 1, PG front 5, PAa back 1, ground.

When the wipers reach positions 2, i. e. positions corresponding to those in which the wipers of switch P5 are standing, PH operates (circuit 471, re-closed at P2B in position 2), whereupon PCB releases (circuit 458, open at PH back 2; and circuit 475, open at PH back 1), and PU operates circuit 472). The wipers of switch P2 remain standing in positions 2.

As a consequence of the release of CSB, the wipers of switches D1, I1 and I2 return to their normal positions; as a consequence of the release of SA, the wipers of switches S3, S4, S5 and S6 return to their normal positions, thus obliterating the aggregate accumulated (VIII, Fig. 72); SZA then operates; and the wipers of switch P1 return to their normal positions, all in the manner previously described. When the wipers of all the switches except P2 and P5 are standing in their normal positions, and the wipers of the latter are again in phase, CZ releases. CPD7 and K7 release, the key = restores as soon as the pressure thereon is removed. CE and CG release, followed by CEA, CEE, CGG and CSC.

At this stage (VIII, Fig. 72), relays CSA, SBA, SBB and SZA, inter alia, are operated and the wipers of all accumulating switches are standing in their normal positions, as at the corresponding stage in the previous example, in addition. In order that further computations involving the same multiplicand 12.8 may be performed, relays CPB, CPC, CW, IAA, IAB, IAD, IBB, IBD, ICB, IZ, PG, PH and PU are operated, and the wipers of switches P2 and P5, alone, are off-normal and are standing in positions 2.

*Three commas (, , ,) printed*

As a consequence of the release of CZ, CSB re-operates (circuit 19, re-closed at CZ back 2), followed by IX (circuit 21), SA (circuit 23), CKA (circuit 27), CSC (circuit 28) and PA, PXA and PA*a* (circuit 29) and the calculator causes three characters to be printed on the tape, as an indication that the submission of a further factor is awaited. These three characters are commas instead of dots, as a reminder to the operator that the multiplicand already submitted has been retained and that the factor awaited is a fresh multiplier. These operations are similar to those which occurred at the moment the calculator was taken into use, except that, to select the comma character of the type-wheel, CEX operates (circuit 476), followed by selector magnet K4 (circuit 76) instead of CCX followed by magnet K3 required to select the dot.

*Circuit 476.*—Battery, CEX (Fig. 12), CMB front 1, CP wire 6 (Fig. 50), PG front 4, PB back 2, PP4 front, ground.

The wipers of switches P1 and P4 advance, as described, by one step after each comma has been printed, to positions 3, whereupon PB operates (circuit 38) and locks, CSC releases, and CSD operates (circuit 39).

At this stage, the situation is precisely the same as after the operations resulting from the keying of sign ×. The operator may accordingly submit a second multiplier, for application to the multiplicand retained in the calculator, and may then request the product by keying the sign =, as before.

*Second multiplier 0.01 submitted and printed; product accumulated*

When key 0 is depressed, operations ensue which are identical with those which followed the keying of the digit 0 in the first multiplier 590 of the example being described, except that the wipers of switches D1, I1 and I2 have been standing in their normal positions, instead of positions 2, and accordingly advance to positions 1, when magnets D1, I1 and I2 release; and the wipers of switch P2 have been standing in positions 2, instead of positions 4, and advance to positions 3, when magnet P2 releases. Wiper P2B being now out of phase with wiper P5C, which is still standing in position 2, as stated, PH releases (circuit 471, open at P2B). As a result of these operations, character 0 is printed on the tape 118; the solution circuit is not affected.

When key (.) is depressed, operations ensue which are identical with those which followed the keying of the decimal point sign in the multiplicand 12.8, except that the locking circuit of CV is different (circuit 477, instead of circuit 242).

*Circuit 477.*—Battery, CV (Fig. 13), CV front 2, IC wire 9 (Fig. 20), IZ front 1, IX front 6, ground.

As a result of these operations, a decimal point character is printed on the tape.

When key 0 is depressed by the operator a second time, the operations which ensue are identical with those described in the previous paragraph, except that PFC does not operate (circuit 262, open at CV1). The wipers of switch P2 accordingly remain in position 3. The wipers of switches D1, I1 and I2, however, advance to positions 2. As before, character 0 is printed; and the solution circuit remains unaffected.

The net result of keying the two digits 0 and the decimal point sign (.) has thus been to advance the wipers of switches D1, I1, and I2 by two steps to positions 2, the wipers of switch P2 by one step to positions 3, to release PH, to operate CV, and to cause a record of the characters submitted to be printed.

When key 1 is depressed, the multiplication table circuit is set thereby for multiplication by the value 1 and the products of the retained digital values of the multiplicand and the value 1 are accumulated. Although the process of multiplication by the value 1 consists, in fact, in the transfer of the digital values of the multiplicand without change from the storage relays to accumulating switches, the same circuit elements are employed as for multiplication by any other value.

The wipers of switch T2 are caused to make a cycle of 22 steps in the manner already described in connection with multiplication by the values 5 and 9. During the first half-cycle, since the higher partial product of any digital value and the value 1 is zero, the accumulating switches are unaffected; during the second half-cycle, the lower partial products are accumulated with the multiplication table set by the operation of MA for multiplication by the value 1, as will now be described.

As a consequence of the depression of key 1, CA, CB, CE, CF, CAA, CBB, CEE, CFF, IJ, magnets I1 and I2, CH, key lock magnet K7, type selector magnets K1, K2 and K4, CLL and printing magnet K6 operate, precisely as after the depression of the key 1 during the submission of the multiplicand 12.8 Character 1 is printed, whereafter CKA, CH, K1, K2, K4, CLL and K6 release, and CKB operates, all as before.

In the meantime, CBA and CEA operate (circuit 360 and a similar circuit), followed by MA (circuit 478), and CN (circuits 364 and 407), which latter holds K7 (circuit 369).

*Circuit 478.*—Battery, MA (Fig. 58), MC wire 1 (Fig. 14), CEA front 2 (Fig. 14), CAA back 3, CBA front 1, CAA front 2, CFF front 3, CSD front 3, ground.

TC operates (circuit 365), followed by DC (circuit 412, closed at TC1 front), MZ (circuit 367) and magnet D1 (circuit 368). The eight relays IAZ–IHZ operate (circuits 370, 479, 480, 371 and similar circuits) and lock.

*Circuit 479.*—Battery, IBZ (Fig. 21), IBA back 1, IBB front 1, IBC back 1, ID front 1, IM wire 2 (Fig. 58), MZ front 3, MA front 8, MT1 wire 0 (Fig. 28), T2C in N, TC front 3, ground.

*Circuit 480.*—Battery, ICZ (Fig. 21), ICA back 1, ICB front 1, ICC back 1, ICD back 1, IM wire 8 (Fig. 58), MZ front 9, MA front 2, MT1 wire 0; then as circuit 479.

TJ1–5 set operates (circuit 131) and locks (circuit 481), followed by TK and magnet T2 (circuit 134).

*Circuit 481.*—Battery, TJ1–5 (Fig. 24), TJ5 front 3, T1 back I, T2 back I, ground.

TJ1–5 release, followed by magnet T2 and TK. TJ1–5 operate (circuit 141) and release eight more times and the wipers of switch T1 are now standing in positions 9.

Magnet T1 operates and releases twice more under the control of TL and TM respectively, in the manner already described in detail herein in connection with the accumulation of the higher partial products when multiplying by the value 5. During these operations, the eight relays IAZ–IHZ release; DC releases (circuit 412, open at TMM back 2); TE operates; MZ and magnet D1 release and the wipers of switch D1 advance to positions 3. The wipers of switch T1 advance to positions 11 and have now completed a half-cycle, during which, it is to be noted, no accumulation has taken place.

DD operates (circuit 482), together with the five relays IDZ–IHZ (292 and similar circuits), which latter lock.

*Circuit 482.*—Battery, DD (Fig. 32), D1D in 3, DT1 wire 3 (Fig. 24), TC front 1, ST wire 11 (Fig. 38), SH back 1, ST wire 12 (Fig. 25), TMM back 2, TLL back 1, ground.

TJ1–5 operate (circuit 393) and locks (circuit 483), followed by TK, magnets S5, S6 and S7 (circuit 484, and similar circuits) and magnet T2 (circuit 375).

*Circuit 483.*—Battery, TJ1–5 (Fig. 24), TJ5 front 3; T1 back I, T2 back I, ground; IT wire 11 (Fig. 23); IAZ back 3 (Fig. 9), DI wire 1b (Fig. 30), DD front 4, DKB back 4, DS1 wire 5b (Fig. 46), S5 back I (Fig. 20), ground; and two similar branches including IBZ back 3 to S6, S6 back I, and ICZ back 3 to S7 back I, respectively.

*Circuit 484.*—Battery, S5 (Fig. 46), DS1 wire 5a (Fig. 33), DKB back 3, DD front 1, DI wire 1a (Fig. 19), IAZ back 1, IT wire 1 (Fig. 24), TJ1, TJ front 4, ground.

TJ1–5, magnets S5, S6, S7 and T2, and TK release. The wipers of switches S5, S6 and S7 are now standing in positions 1 and those of switch T2 in positions 12. IAZ operates (circuit 485) and locks, opening the stepping circuit of magnet S5 and the locking circuit of TJ1–5 set to S5 back I.

*Circuit 485.*—Battery, IAZ (Fig. 19), IAA front 2, IAB front 3, IAC back 2, IAD front 3, IM wire 1 (Fig. 58), MZ back 2, MA front 17, MT2 wire 1 (Fig. 28), TC2 in 12, TC front 3, ground.

TJ operates (circuit 141) and releases once more and the wipers of switches S6, S7 and T2 (but not S5) advance by one more step and are now standing in positions 2, 2 and 13, respectively. IBZ operates (circuit 486) and locks, opening the stepping circuit of magnet S6 and the locking circuit of TJ1–5 to S6 back I.

*Circuit 486.*—Battery, IBZ (Fig. 21), IBA back 1, IBB front 1, IBC back 1, IBD front 1, IM wire 2 (Fig. 58), MZ back 3, MA front 16, MT2 wire 2 (Fig. 28), T2C in 13, TC front 3, ground.

TJ1–5 operate and release six more times and the wipers of switches S7 and T2 (but not S6) advance by six more steps and are now standing in positions 8 and 19, respectively. ICZ operates (circuit 487) and locks, opening the stepping circuit of magnet S7 and the locking circuit of TJ1–5 set to S7 back I.

*Circuit 487.*—Battery, ICZ (Fig. 21), ICA back 1, ICB front 1, ICC back 1, ICD back 1, IM wire 8 (Fig. 58), MZ back 9, MA front 11, MT2 wire 8 (Fig. 28), T2C in 19, TC front 3, ground.

TJ1–5 operate and release once more and the wipers of switch T2 (but not S7) advance by one more step to positions 20.

It is to be noted that the wipers of none of the accumulating switches have yet passed their ninth positions, so that the need for carry-over correction and compensation has not yet arisen.

Magnet T2 operates and releases twice more under the control of TL and TM, respectively, in the manner already described in connection with the accumulation of the lower partial products when multiplying by the value 5.

During these operations, the eight relays IAZ–IHZ release and the wipers of switch T2 advance to their normal positions, thus completing their cycle.

As another consequence of the operation of TL, CSC operates (circuit 399) and locks to CAA front 4, and CBB front 3; CSD releases, followed by CKB, MA (circuit 478, open at CSD front 3), CN (circuits 364 and 407, open at CSD front 6), K7, TC, DD (circuit 482, open at TC front 1) and TE. CKA operates again (circuit 27, reclosed at CKB back). K7 frees the key set and key 1 restores. CA, CB, CE and CF release, followed by CAA, CBA, CBB, CEA, CEE, CFF and CSC. CSD operates again (circuit 39). IJ releases, followed by magnets I1 and I2, and the wipers of switches I1 and I2 are now standing in positions 3.

At this stage, the same relays are operated as at the stage immediately preceding the submission of the second multiplier 0.01, except that PH has released and that CV has operated. The wipers of switches P1, P4, and P5 are still standing in positions 3, 3 and 2, respectively, whereas the wipers of switches D1, I1, I2 and P2 have all advanced to positions 3.

During the second half-cycle of the wipers of switch T2, the wipers of switches S5, S6 and S7 have advanced to positions 1, 2 and 8, respectively, in accordance with the lower partial products of the retained digital values of the multiplicand 12.8 and the value 1. The aggregate registered (IX, Fig. 72) is thus 0001280000000000.

*Sign=submitted and printed; second product 0.128 printed*

When key = is depressed, CE, CG, CH, magnets K7, K4 and K5, CLL and magnet K6 operate and the character = is printed; CKA, CH, K4, K5, CLL and K6 release; CKB operates; CEE, CEA, CGG, CRB, CPD7 and PCA operated. These operations are identical with those which followed the keying of the sign = in the first example described herein.

It is to be observed that at this stage the wipers of switches S5, S6 and S7 are standing in positions 1, 2 and 8, respectively, registering the digital values of the required product; the wipers of switch P2 are in positions 3 registering that there are altogether three digits in the integral portions of the multiplicand and multiplier together, and so determining the position of the decimal point in said product, as already explained; the wipers of switches P1 and P4 are in positions 3. The latter now advance in order to scrutinize the accumulating switches in turn in search of one registering a significant digital value, whereupon the solution is printed. The solution being wholly fractional, a character 0 is printed before the decimal point, as will now be explained.

As a consequence of the operation of PCA, PD operates (circuit 434) and locks, together with PFA (circuits 435 and 32) and followed by magnets P1 and P4. PFA and magnets P1 and P4 release and the wipers of switches P1 and P4 advance to positions 4, where PCA continues to hold (circuit 436). PFA operates and releases again similarly four more times and the wipers of switches P1 and P4 advance to positions 7, PCA continuing to hold (circuit 437 and similar circuits), and to positions 8, whereupon PCA releases.

The conditions of wipers S1D, S2D, S3D and S4D, have thus been scrutinized in turn and these wipers have been found to be standing in their normal positions. The wipers of switch S5 being off-normal, i. e. registering a significant digital value, the advance of the wipers of switch P1 and switch P4, halts at positions 8, in order that printing of the number registered by the accumulating switches may begin.

At the same time, PKA operates (circuit 488), indicating that the decimal point is to be placed before the digit whose value is registered by switch S5, i. e., that the required solution is wholly fractional and consequently that a character 0 is to be printed before the decimal point.

*Circuit 488.*—Battery, PKA (Fig. 55), PRB back 3, PAX front 6, P1B in 8, P2B in 3, PX back 2, ground.

PKB (Fig. 55) operates in an obvious circuit to PKA front 1 and locks over PKB front 1 to PA front 4.

As a consequence of the release of PCA, PE operates (circuit 438), followed by PCC (circuit 439), CSC (circuit 437), which locks, and S1 (circuit 437*a*). CSD release, followed by CKB, and CKA operates again, followed by PP (circuit 438). CLL operates (circuit 489), together with PMA (circuit 443) which locks (circuit 444), and followed by magnet K6 (circuit 37); and character 0 is printed.

*Circuit 489.*—Battery, CLL (Fig. 2), PC wire 18 (Fig. 50), PMB back 1, PL front 2, PP front 5, ground.

CKA, PP, CLL and K6 release and CKA operates again. PMB operates (circuit 444, short-circuit removed at PP3). PP operates again, followed by PNA (circuit 490) which locks (circuit 491). PNB, being short-circuited, does not operate at this stage.

*Circuit 490.*—Battery, PNA (Fig. 52), PMB front 2, PL front 2, PP front 5, ground.

*Circuit 491.*—Battery, PNA, PNA front 2, PNB, PMA front 1, ground.

CCX operates (circuit 492), followed by selector magnets K3 (circuit 35) which selects the decimal point character of the type-wheel (Fig. 66).

*Circuit 492.*—Battery, CCX (Fig. 2), CP wire 17 (Fig. 50), PNA front 3, PNB back 2, ground.

CLL operates (circuit 36), followed by magnet K6, and the decimal point is printed. CKA and PP release and PNB operates (circuit 491, short-circuit removed at PP4). CCX, K3, CLL and K6 release, and CKA and PP operate again. PL releases (circuits 453 and 454, open at PNB back 1). CAX, CBX and CEX operate (circuit 493), followed by selector magnets K1, K2 and K4 (circuits 74, 75 and 76), which together select character 1 of the type-wheel.

*Circuit 493.*—Battery, CAX (Fig. 12), CBX, CEX, QC wire 7 (Fig. 65), QV back 9 (Fig. 63), QS3 wire 1, S5B in 1 (Fig. 44), PS1 wire 5, P1C in 8 (Fig. 56), PRB back 4, PKC back 3, PW back 4, PP front 2, PJA back 3, PL back 2, ground.

With PL once again unoperated, PFA operates (circuit 32), followed by magnets P1 and P4. CLL operates again, followed by magnet K6, and character 1 is printed. CKA, PP, CAX, CBX, CEX, K1, K2, K3, K4, CLL and K6 release. PFA releases, followed by magnets P1 and P4, and the wipers of switches P1 and P4 are now standing in positions 9. PKA releases (Circuit 488, open at P1B). CKA and PP operate once more.

It is to be noted that PL in operating also opened at PL back 3 the circuit in which PCA had previously been holding, so that even if the wipers of switch S5 had been standing in their normal positions, i. e. registering the digital value 0, PCA would still have released and the character 0 would have been printed after the decimal point. Thus, all digits following the decimal point in a solution are printed, whether or not of finite value.

As a result of the reoperation of PP, CBX and CEX operate (circuit 494), followed by selector magnets K2 and K4 (circuit 215 and a similar circuit), which together select character 2 on the type-wheel (Fig. 1).

*Circuit 494.*—Battery, CBX (Fig. 12), CEX, QC wire 2 (Fig. 65), QVA back 1, QS1 wire 2 (Fig. 49), S6B in 2, PS1 wire 6 (Fig. 57), P1C in 9, PRB back 2, PXE back 1, PW back 1, PP front 1, PJA back 3, PL back 1, ground.

PFA and magnets P1 and P4 operate once more. CLL and magnet K6 operate to print the selected character 2. CKA, PP, CBX, CEX, K2, K4, CLL and K6 release. PFA and magnets P1 and P4 release and the wipers of switches P1 and P4 are now standing in positions 10. CKA and PP operate once more. CBX operates (circuit 495), followed by selector magnet K2 (circuit 75), which selects character 8 of the type-wheel.

*Circuit 495.*—Battery, CBX (Fig. 12), QC wire 8 (Fig. 65), QVB back 3, QS1 wire 8 (Fig. 49), S7B in 8, PS1 wire 7 (Fig. 57), P1C in 10, PRB back 3, then as circuit 494.

PFA and magnets P1 and P4 operate once more. CLL and magnet K6 operate and character 8 is printed. CKA, PP, CBX, K2, CLL and K6 release. PFA and magnets P1 and P4 release and the wipers of switches P1 and P4 are now standing in positions 11. CKA reoperates as before, but PP does not reoperate this time, its circuit (circuit 442) having been opened by PE, which releases in the meantime. PCA operates (circuit 496), followed by CZ (circuit 456).

*Circuit 496.*—Battery, PCA (Fig. 13), PXD back 4, PE back 3, PL back 3, PLA in 11, PS2 wire 8 (Fig. 44), S8D in N, S9D in N, SS4 wire 6 (Fig. 39), SKL back 2, SKA back 2, SS wire 1 (Fig. 48), S1D in N, then as circuit 439.

PFA operates and locks (circuits 435 and 32), followed by magnets P1 and P4. PFA and magnets P1 and P4 release and the wipers of switches P1 and P4 are now standing in positions 12. PE, SM, PCC and PCA release and PKC operates (circuit 218).

*Circuits partially restored to normal; three commas ( , , , ) printed*

As a consequence of the operation of CZ, the restoration of the calculator circuits to normal is initiated but, by reason of the continued operated condition of PG, they once again restore only partially, substantially in the manner already described. CSB releases, followed by CKA, CRB, IX and SA. CV releases (circuit 477, open at IX front 6). PA releases, followed by PB, PD, PU, PMA and PMB, PNA and PNB, PKB and PKC. PCD operates (circuit 221) and the wipers of switch P4 return to their normal positions, whereupon PCD releases. PCB operates (circuits 458 and 475) and the wipers of switch P2 return to their normal positions and then continue to advance until they reach position 2, corresponding to those in which the wipers of switch P5 are still standing, whereupon PH operates again (circuit 471, reclosed at P2B); PCB releases and PU operates (circuit 472). The wipers of switch P2 remain standing in positions 2.

As a consequence of the release of CSB, DZ operates (circuits 123 and 351) and the wipers of switch D1 return to their normal positions, whereupon DZ releases. Similarly, IK operates (circuit 126), the wipers of switches I1 and I2 return to their normal positions, and IK releases.

As a consequence of the release of SA, impulses are generated by SZC, SZB and SY, as already explained, to operate magnets S5, S6 and S7 (circuit 497 and similar circuits) and the wipers of switches S5, S6 and S7 return to their normal positions, thus obliterating once more the aggregate accumulated (X, Fig. 72).

*Circuit 497.*—Battery, S5 (Fig. 44), SS1 wire 5a (Fig. 38), SY front 5, SS3 wire 5 (Fig. 46), S5C off-normal, ground.

SZA operates (circuit 62a, reclosed at S5D). PCA operates (circuit 462) and holds (circuit 463 and similar circuits and then circuit 464), and the wipers of switch P1 return to their normal positions; whereupon PCA releases.

When the wipers of all switches, except switches P2 and P5, are again standing in their normal positions, and the wipers of the latter switches are again in phase, CZ releases. CPD7 and K7 release, and key = restores. CA, CE, CG, CAA, CEA, CEE, CGG and CSC release.

At this stage the situation is indistinguishable from the situation after the partial restoration of the circuits following the printing of the solution 7,552. Further computations involving the same multiplicand 12.8 may, therefore, be performed in a similar manner.

As a consequence of the release of CZ, the calculator causes three commas to be printed on the tape in the manner previously described, as an indication to the operator that the submission of a fresh multiplier is awaited. When all desired multipliers have been submitted in turn to the calculator and the products of them and the retained multiplicand have been duly printed on the tape, the record of said multiplicand may be obliterated by keying the cancel key

CNL
/ as will now be explained.

*Sign CNL / submitted and printed; circuits restored to normal; three dots (. . .) printed*

When key

CNL
/ is depressed by the operator, CG operates (circuit 498 and a similar circuit), followed by CGG; CPD7 operates (circuit 344), followed by magnet K7, which locks the key set; selector magnet K5 operates (circuit similar to 405), and selects character / of the type wheel; CLL and magnet K6 operate, and character / is printed; and CKA, CH, K5, CLL and K6 release.

*Circuit 498.*—Battery, CG (Fig. 2), AC wire 6 (Fig. 7), 1st AL wire 6 (Fig. 5), key

CNL
/ depressed (Fig. 3), ground.

In the meantime, CY operates (circuit 499), followed by CZ (circuit 500).

*Circuit 499.*—Battery, CY (Fig. 3), CEE back

1, CCC back 3, CBB front 2, CAA back 3, CGG front 1, CSD front 3, ground.

*Circuit 500.*—Battery, CZ (Fig. 4), CW front 2, CY front 2, ground.

IX releases (circuit open at CY front 2), together with PG (circuit 470, open at CY5) and PH (circuit 471, open at PG front 3). CSB releases, followed by PA, PXA, PA*a*, SA, CPB and CPC (circuit 474, open at CSB front 2), CSD (circuit 39, open at CSB front 1), CKB, CW, CY (circuit 490, open at CSD front 3), IZ (circuit 358, open at CPC front 3), the six relays IAA, IAB, IAD, IBB, IBD and ICB, PB and PU. SZA reoperates (circuit 62*a*, reclosed at SA back 2).

As a consequence of the release of PA, PCA operates (circuit 501) and holds (circuits 502, 460, 462, 463 and similar circuits and then circuit 464), and the wipers of switch P1 return to their normal positions, whereupon PCA releases.

*Circuit 501.*—Battery, PCA (Fig. 52), same as circuit 460 to PL back 3, then P1A in 3, PA back 1, ground.

*Circuit 502.*—Battery, PCA, same as circuit 460 to PL back 3, then P1A in 4, PS2 wire 1, S2D in N (Fig. 44), SS4 wire 4 (Fig. 39), SLA back 1, SS4 wire 3 (Fig. 44), S1C in N, PS4 wire 1 (Fig. 50), PE back 2, ground.

PCB, PCD and PCE operate (circuits 458, 221, 223), together with CPD7, and the wipers of switches P2, P4 and P5 return to their normal positions, whereupon PCB, PCD, PCE and CPD7 release. The wipers of all switches being now again in their normal positions, CZ releases. With CH and CPD7 both unoperated again, K7 releases and frees the key set, and key

CNL
/ restores as soon as the pressure thereon is removed. CG and CGG release. At this stage, relays CSA, SBA, SBB and SZA alone remain operated and the situation is the same as after the restoration of the circuits to normal following the printing of the solution in the first example described herein. The calculator accordingly causes three dots (. . .) to be printed, as an indication to the operator that an entirely fresh problem may be submitted for computation.

*Factors of eight, and more than eight, digits*

Although, in the multiplication example described herein in detail, factors entering into problems submitted to the calculator and containing a small number of digits have been chosen (12.8, 590 and 0.01), it is to be understood that in a problem involving multiplication computations, since eight sets of four storage relays each, viz: IAA–IAD, IBB–IBD, etc. (Figs. 18–23 and 77), are provided, any factor constituting a multiplicand and having eight digits or fewer may be submitted. It is also to be understood that, since sixteen accumulating switches, viz: switches S2–S17, are available for accumulating partial products, any product of sixteen digits or fewer can be accumulated, and that, in consequence, any factor constituting a multiplier and having eight digits or fewer may be submitted.

Should the operator key in error a factor having more than eight digits, the wipers of switch I2, which advance, as explained herein, by one step after each digit of a factor, whether constituting a multiplicand or a multiplier, has been received in the calculator, arrive in positions 9. CZ then operates (circuit 503), causing the circuits to restore to normal, after which the calculator causes three full stops to be printed, as an indication to the operator that the submission of the problem is to be recommenced.

*Circuit 503.*—Battery, CZ (Fig. 11), CI2 wire 2, IK back 6 (Fig. 20), I2E in 9, ground.

It will be appreciated that, whereas one object of advancing the wipers of switches I1 and I2 during the submission of a factor constituting a multiplicand is to ensure the distribution of the digital values received to successive sets of storage relays, the only object of advancing them during the submission of a factor constituting a multiplier is to count the digits thereof, and to cause the release of the circuits if the maximum permitted number of digits is exceeded.

*Partially fractional solution*

It has been explained herein that an integral solution, e. g. 7552, of a multiplication problem is printed on the tape, duly punctuated and without a specific indication of the position of the decimal point, and that a wholly fractional solution, e. g. 128, is printed with a decimal point indication in the appropriate position in relation to the other digits and with a character 0 preceding said decimal point indication.

It may happen that the solution of a problem is partially fractional, i. e. has significant digits both before and after the decimal point. Such a case would have arisen if the multiplier in the first example described herein had been 59 instead of 590, for the solution would then clearly have been 755.2. It has been explained that the only result of keying digit 0 of the multiplier 590 was to advance the wipers of switches D1, I1, I2 and P2 by one step. If, therefore, it be assumed that the digit 0 has been omitted and that key = is depressed immediately after key 9, it will be seen that the ensuing operations are as follows:

With the wipers of switches D1, I1 and I2 standing in positions 2 and those of switch P2 in positions 4, characters = and 7 are printed on the tape, precisely as described. When the wipers of switch P4 advance to positions 7, however, PJA fails to operate (circuit 446, now open at P2C). When PP next operates, PJB also fails to operate (circuit 447, open at PJA front 1) and no comma is printed. Instead, circuit 450 is closed immediately, character 5 is printed, followed by a second character 5, and the wipers of switch P1 advance to positions 9, as described. PKA operates (circuit 504, instead of circuit 349), followed by PKB and PL (circuits 453 and 454).

*Circuit 504.*—Battery, PKA (Fig. 15), PRB back 3, PA*a* front 1, P1B in 9, P2B in 4, PX back 2, ground.

When PP next operates, circuit 348 is open at P1C, PNA operates instead and locks (circuits 490 and 491), a decimal point character is printed, PNB operates and PL releases, as already described in connection with the printing of the solution 0.128. When PP next operates, with PL now again unoperated, circuit 452 is closed, character 2 is printed, the wipers of switch P1 advance to positions 10 and PCA operates (circuit 455, closed at P1A), whereafter the circuits restore to normal as described.

Thus a partially fractional solution is also printed with a decimal point indication in the appropriate position in relation to the other digits.

*Punctuation of product*

It has been shown herein that the calculator, during the printing of the solution of a problem, causes a comma to be printed between the first and second digits if four digits are present in the integral part thereof, e. g. 7552, whereas it causes no comma to be printed if there are less than four digits in the integral part, e. g. 0.128 and 755.2.

It has also been shown that a comma is printed as a consequence of the operation of PJA; that PMB operates when one digit of a solution has been printed; and that the circuit of PJA (circuit 446) is closed only when PMB is operated. It is to be understood that these conditions apply in all cases, and that a comma is printed in the product only after at least one digit thereof has been printed.

It has also been shown that the position of the decimal point in the product is determined by the relative positions of wipers P2B and P1B (Fig. 56) and that printing of the decimal point indication is controlled by the operation of PKA in a circuit including these wipers. It has also been shown that, once PKA and PKB have operated, the printing of further commas is prevented. It is to be understood that these conditions apply in all cases and that no comma is printed after the position of the decimal point has been reached.

A comparison of the interconnections between wipers P2B and P1B with those between wipers P2C and P4C (Fig. 56), it being remembered that the wipers of switches P1 and P4 advance in synchronism, will show that circuits for PKA and PJA are prepared in the same relative wiper positions and that additional circuits for PJA are prepared when wiper P4C is standing 3, 6, 9, etc., positions behind that in which the circuit for PKA is prepared. It will, therefore, be apparent that, when the product contains sufficient digits before the decimal point, the calculator causes a comma to be printed after the thousands digit, as has also been described in detail herein, and after the millions, thousand-millions, etc., digits.

It has thus been shown above that, although at any time the aggregate registered by the accumulating switches S2 to S17 consists of a number of 16 digits, the calculator, at the time this aggregate is to be recorded on the tape, causes only those digits which are significant to be printed, except in the case of a wholly fractional number when the decimal point is preceded by digit 0, and causes that part of the number which is integral to be punctuated by commas after the millions, etc., and thousands digits; that is, the calculator in all cases causes the number to be printed in accordance with the conventional presentation of such quantities.

*Division, detailed description*

The solution of a problem in division will now be considered. In the event that the operator's unit stands detached from the calculating equipment, the start key KST is depressed by the operator to effect the connection of one or more calculators as described in circuits 1–62*a*. The digits of the first factor dividend may then be keyed by the operator.

*Reception of digits*

Figure 30:
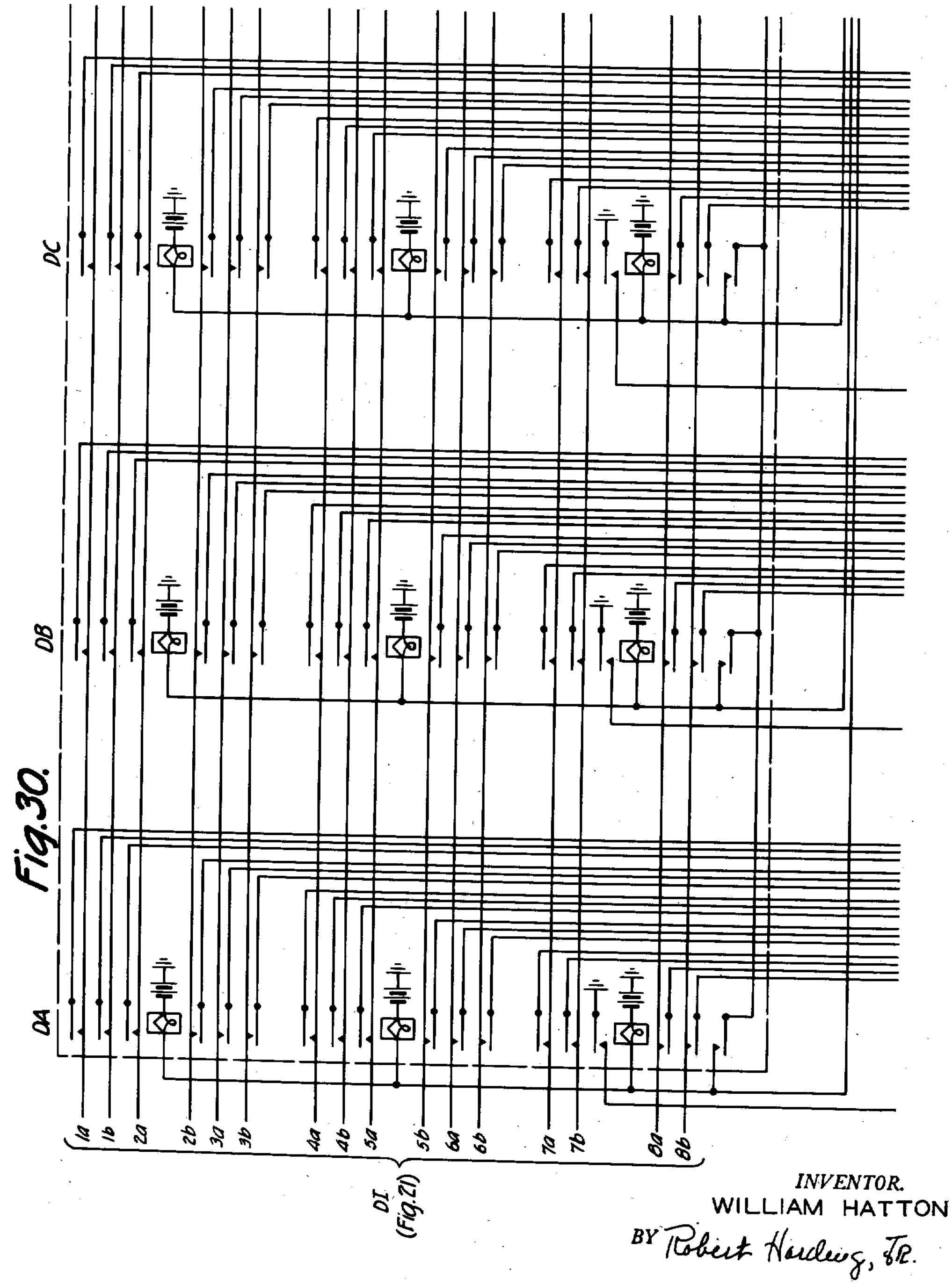
Figure 31:
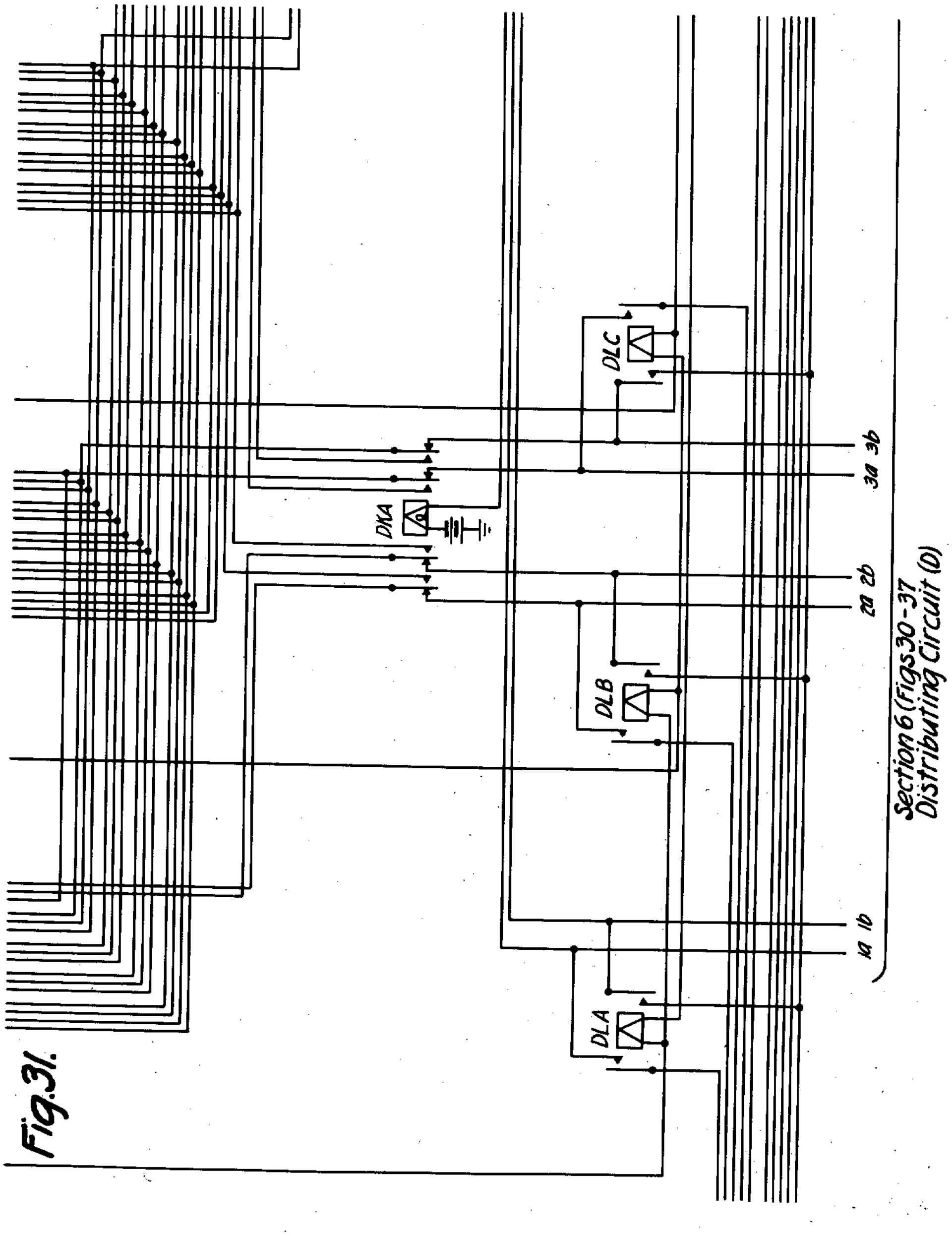
Figure 32:
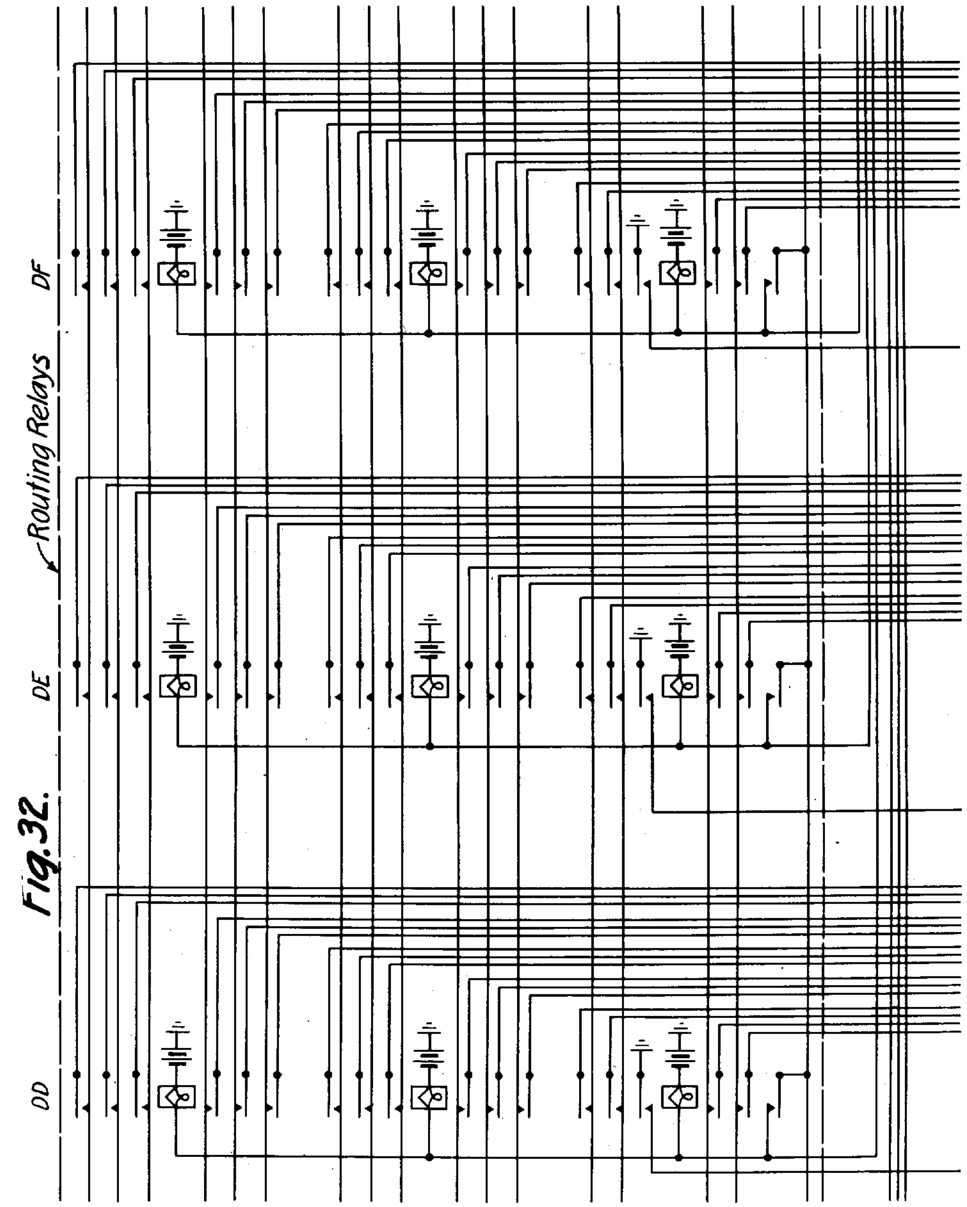
Figure 33:
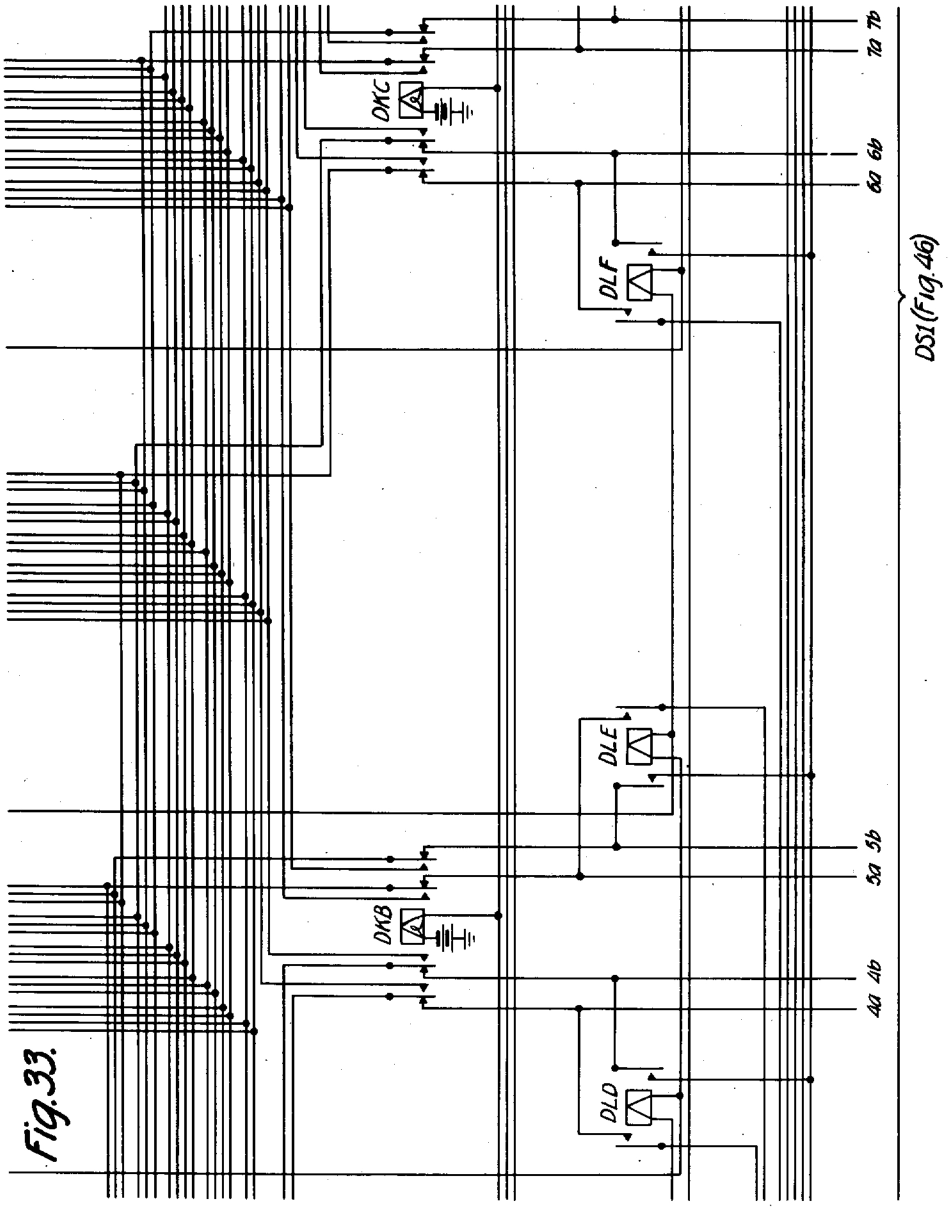
Figure 34:
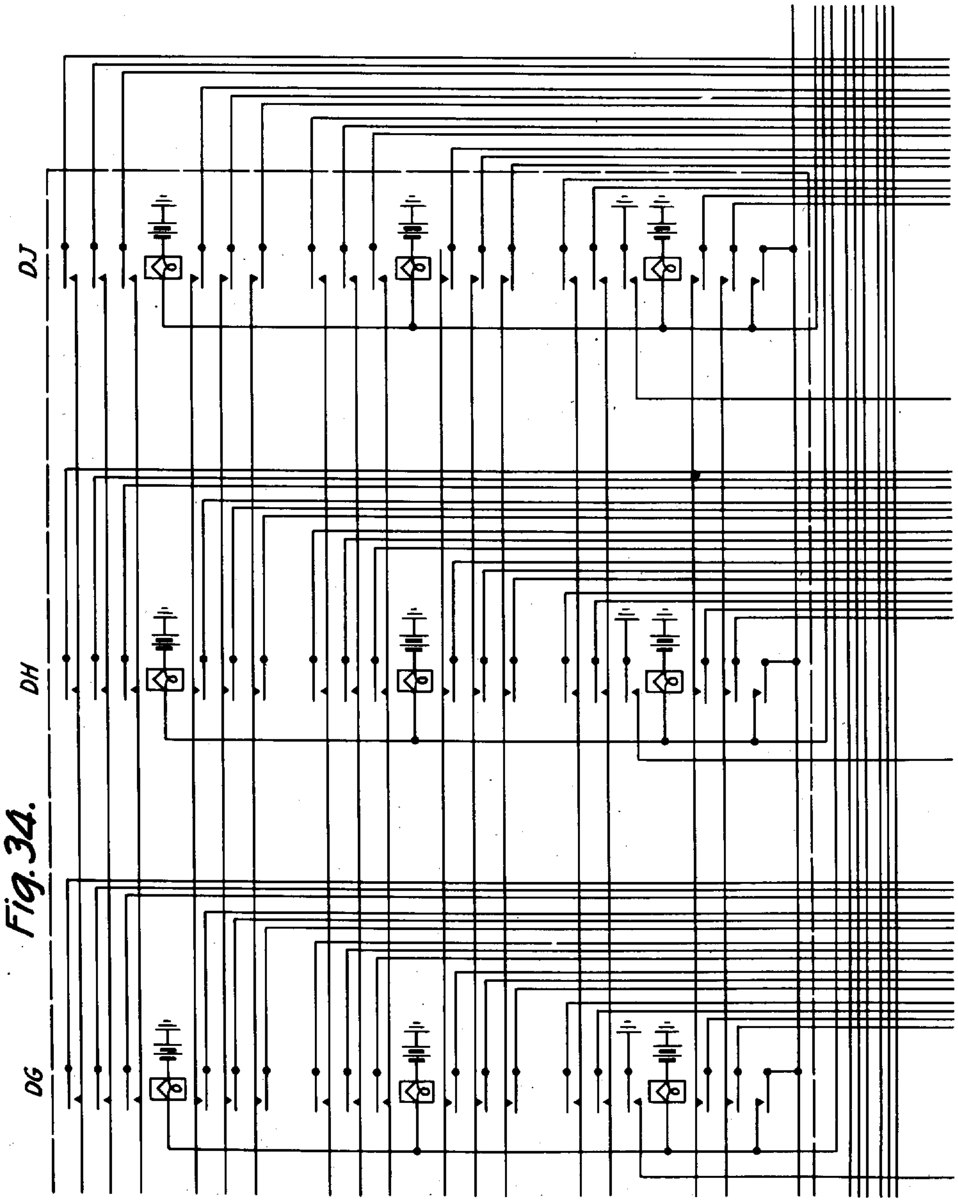
Figure 35:
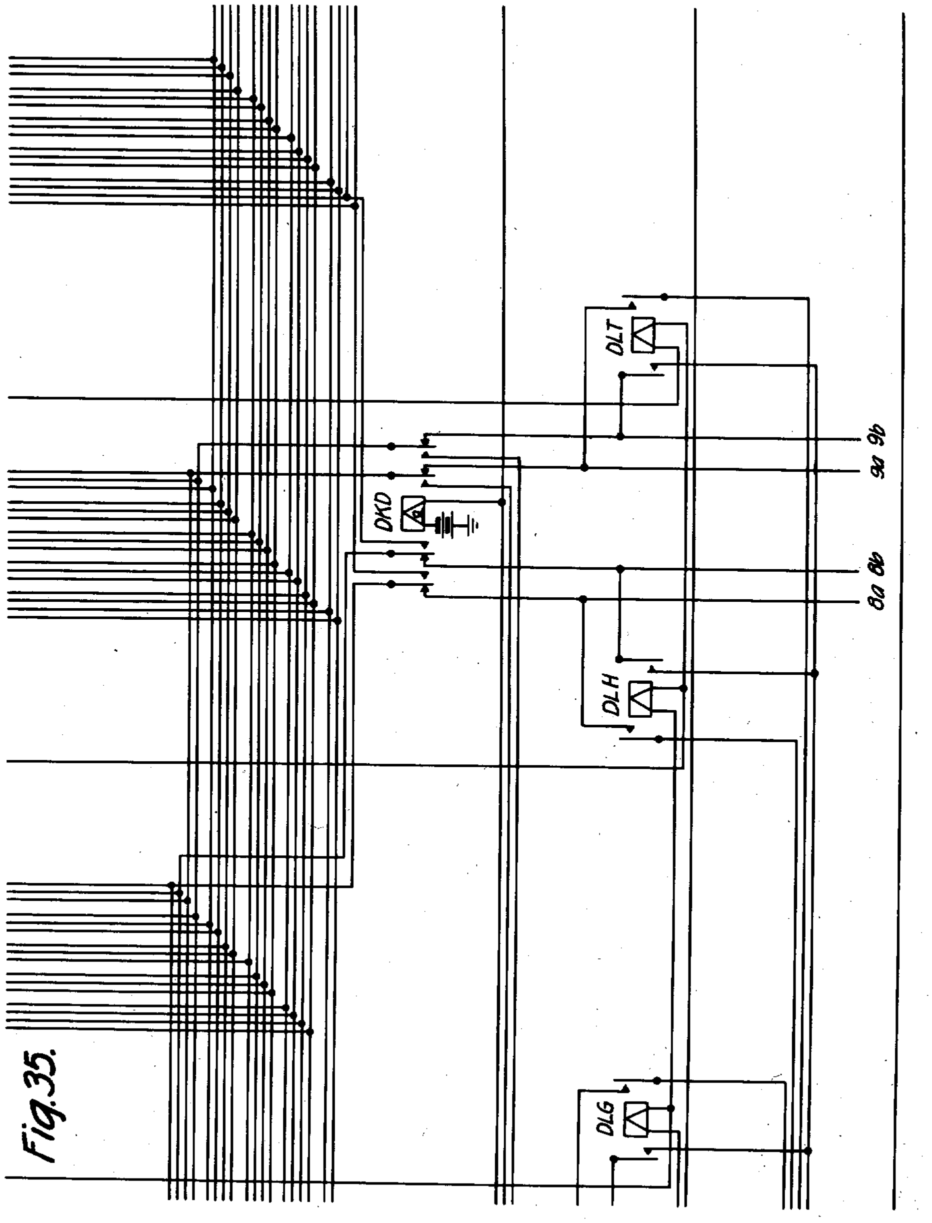
Figure 36:
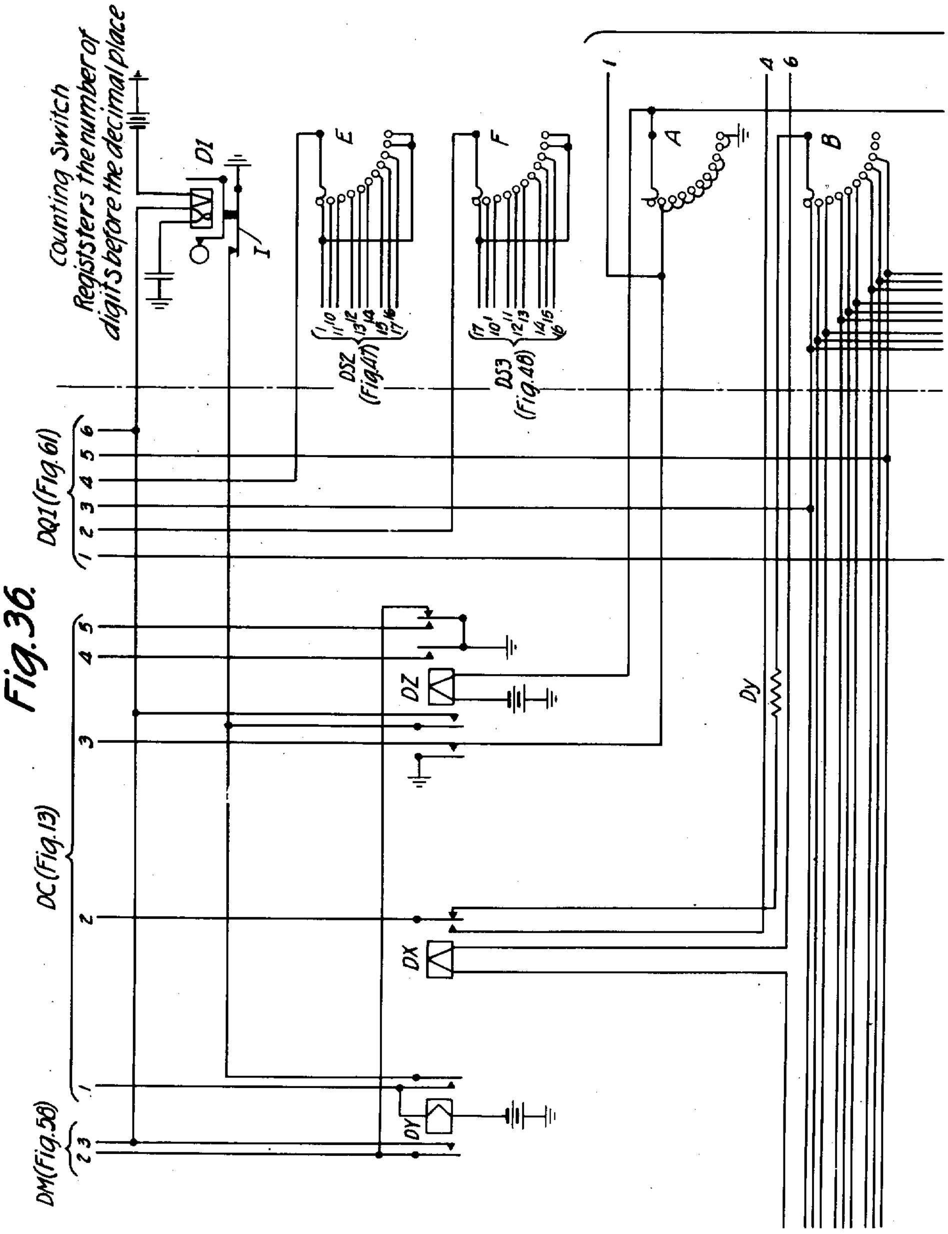
Figure 37:
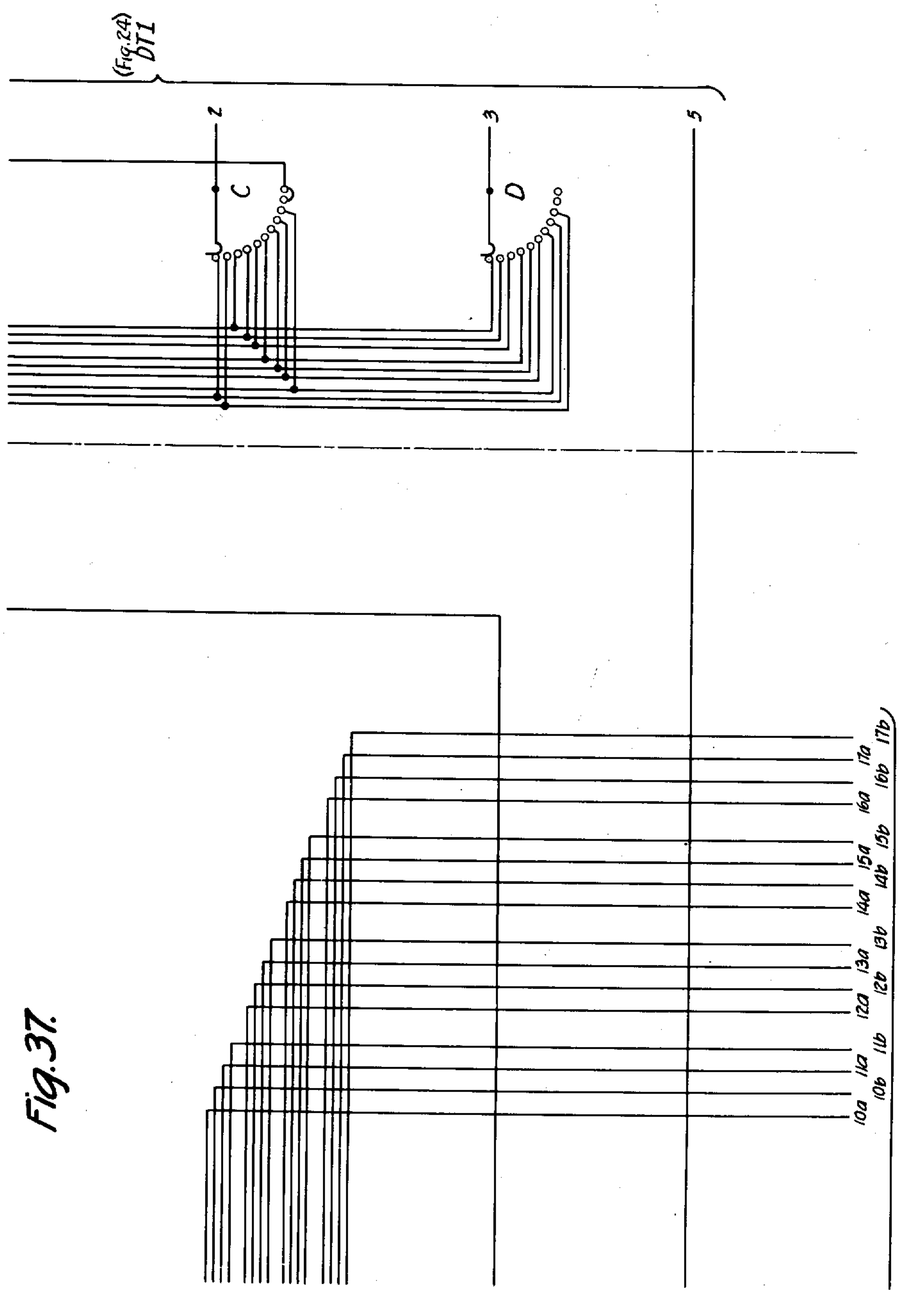

The figures of the numerator or dividend A are received in the R circuit and stored in the I circuit in the manner previously described. The division sign energizes relay CQA via contacts of CAA, CBB, CCC (Figs. 19, 20 and 21). CQA locks to CSD front 1 (Fig. 10) and causes the following operations:

CQA contact 1 energizes IK (Fig. 42) and DZ (Fig. 30). Consequently, the markers I1, I2 (Fig. 18) and D1 (Fig. 36) return to normal in order to be ready for the reception of the denominator or divisor B. CQA contact 2 operates CQB (Fig. 17) which then after the release of CQA locks itself in series with CQC (Fig. 17). CQA contact 3 energizes relay PCE (Fig. 52) via arc A of P5 (Fig. 55), which in this way returns equally to normal. The right inner front of CQB operates CA (Fig. 63) whereupon the figure A is transferred to the markers S10–17. The distributor circuit directs the transferring impulses to these markers due to the operation of relay set DJ (Fig. 34) via CA contact 5 front and via the normal terminal of Q1 arc B. The transfer is started by the contact 2 of CA, which energizes relay TA (Fig. 26) via arc C of Q1 position N. The contact 3 of CA operates via QL back 2 (Fig. 63) to relay set MA (Fig. 58) whereby the multiplication table is prepared for addition.

The transfer is performed in the manner above described. During the carry-over kick CSC (Fig. 11) energizes and CQA releases, whereas CQC (Fig. 17) operates. If the division sign key is still depressed, CSC locks to the fronts of relays CGG, CAA, CBB, until the key is released.

Relay TLL front 3 (Fig. 27) connects ground during the carry-over kick to the brush C of Q1. This ground energizes QC (Fig. 61), with the result that Q1 makes one step. Q1 advances from its normal position to position 1 and thus opens the circuit of TA which therefore releases and the transfer stops.

The storing relays I are released during the operation of TLL in the manner previously described.

The operator now sends the figures of the divisor B, which in due course are stored on the I relays similar to figures of the dividend A. Upon reception of the equal sign the number B is transferred to the markers S2–S9. The equal sign relay energizes PRA (Fig. 51) via contact 5 of CQC (Fig. 17), PRA locking itself in parallel to relay PRB (Fig. 53) kept energized by CQC. PRA front 4 (Fig. 51) operates QB (Fig. 60) and now the transfer starts. Relay set DA operates via QB contact 3 and Q1B position 1. The transfer impulses therefore will be directed to the markers S2–9. QB front 6 energizes TA again in order to start the transfer.

Figure 51:
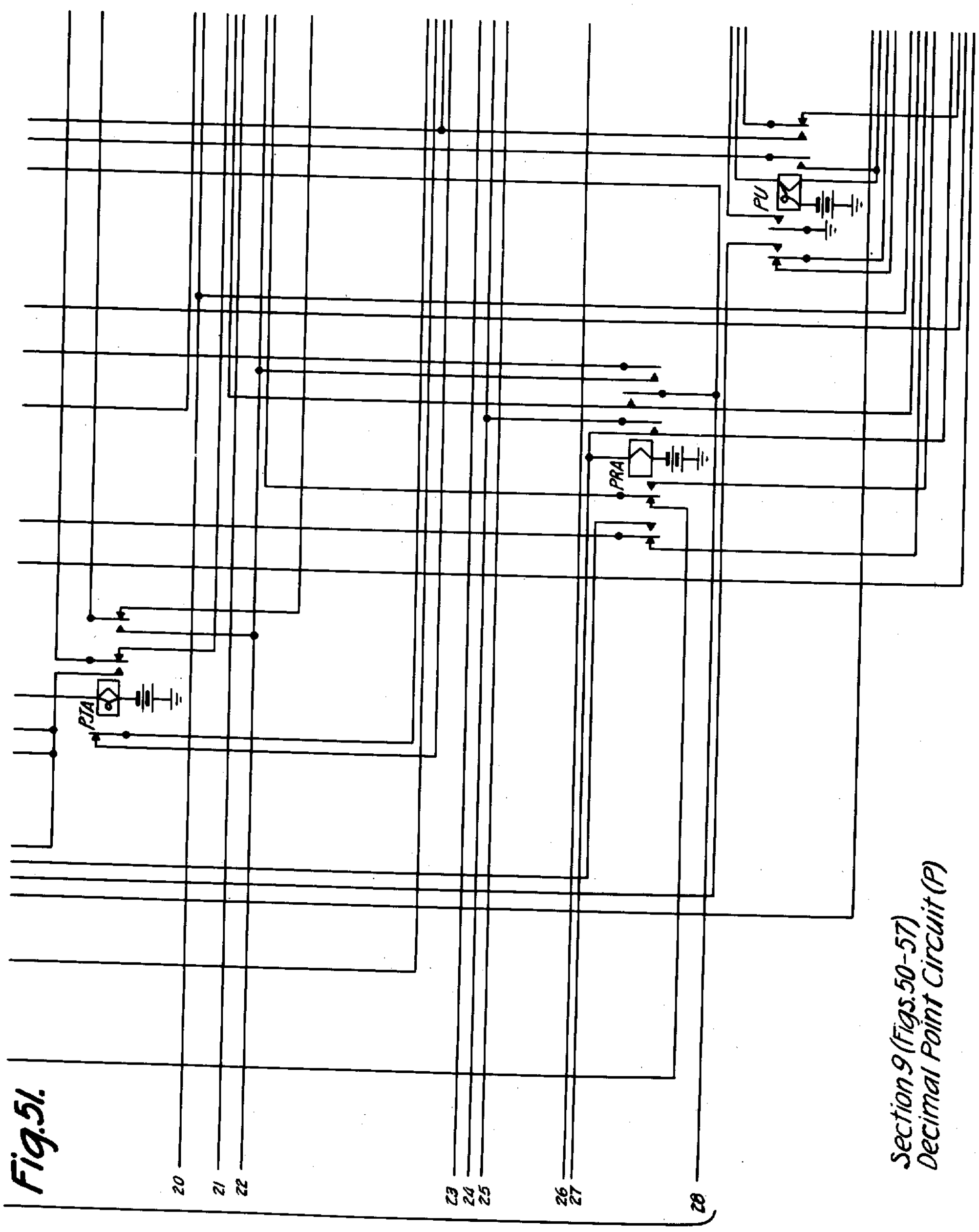

The carry-over impulse energizes CSC (Fig. 11) as before, whereupon the code relays release assuming that the equal key is already released by the operator. The operator's set remains blocked by relay CJ (Fig. 12) which is kept energized via PRA contact 1 (Fig. 51).

In the quotient circuit Q1 makes one step because of the operation of QC during the carry-over kick. Leaving position 1 the circuits of TA and DA will open and the transfer of the denominator B is completed.

*Approximative quotient*

It is to be understood that the figures of the dividend A are stored on the markers S10–12 etc. up to max. S17 whereas those of the divisor have been transferred to S2, 3, 4 . . . 9. It should also be understood that the input storing relays have not been released during the carry-over kick (TLL contact 1) since a holding circuit is provided by QB contact for relay IZ (Fig. 20). Relay IX releases, however, each time TLL operates and therefore causes the release of IAZ-IHZ. The markers I1 and I2 remain in the position to which they have been advanced during the reception of the denominator B.

Figure 62:
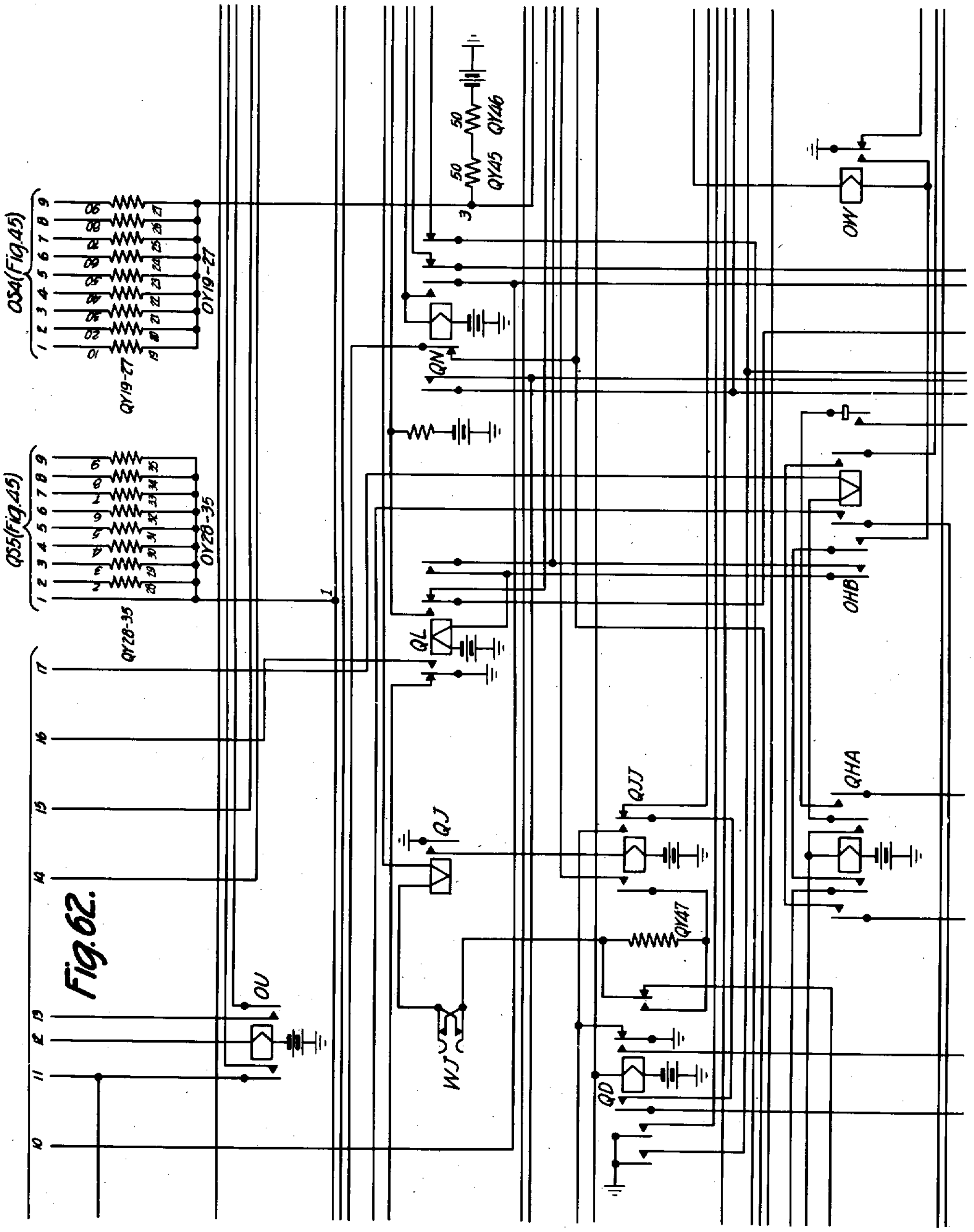
Figure 64:
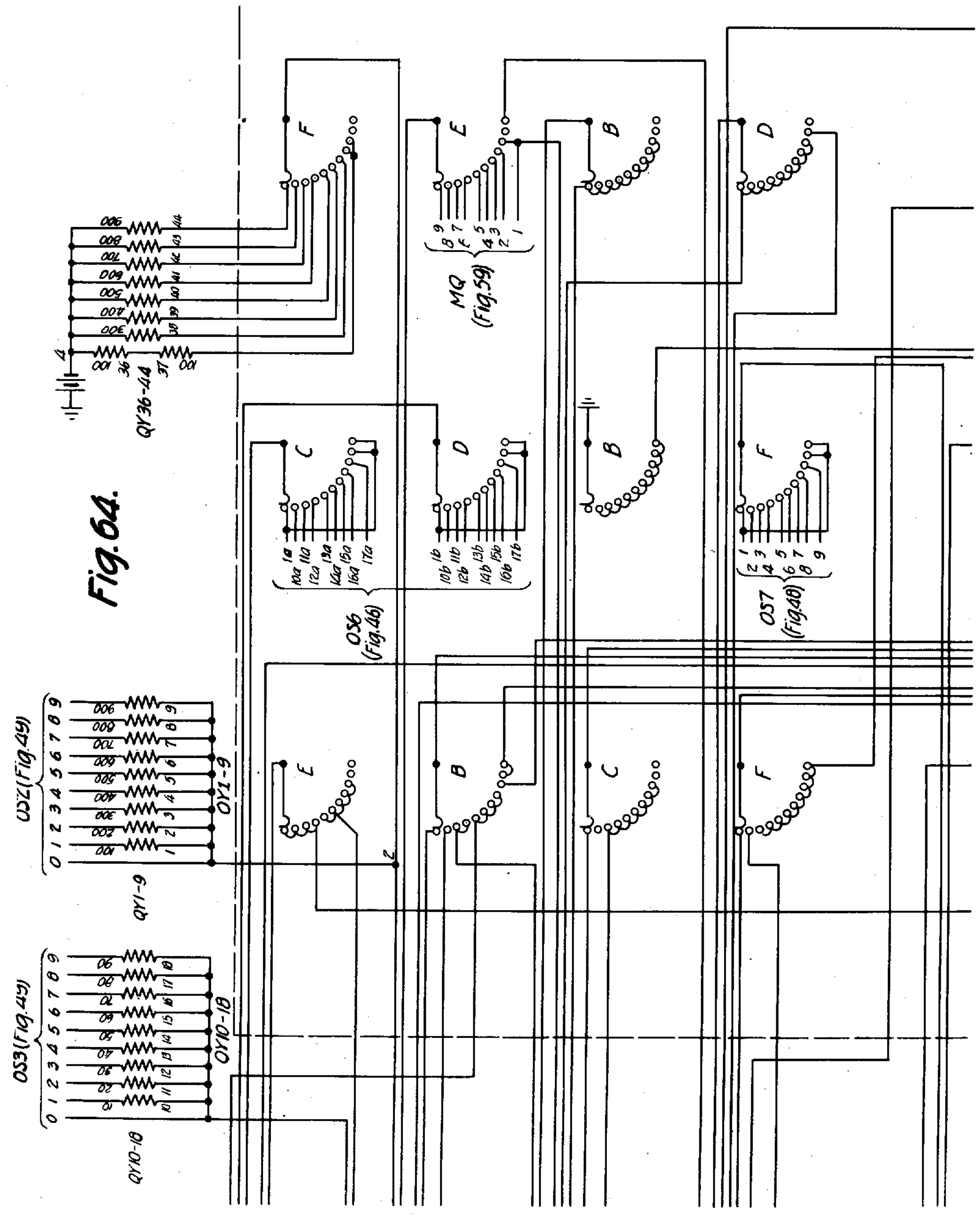
Figure 65:
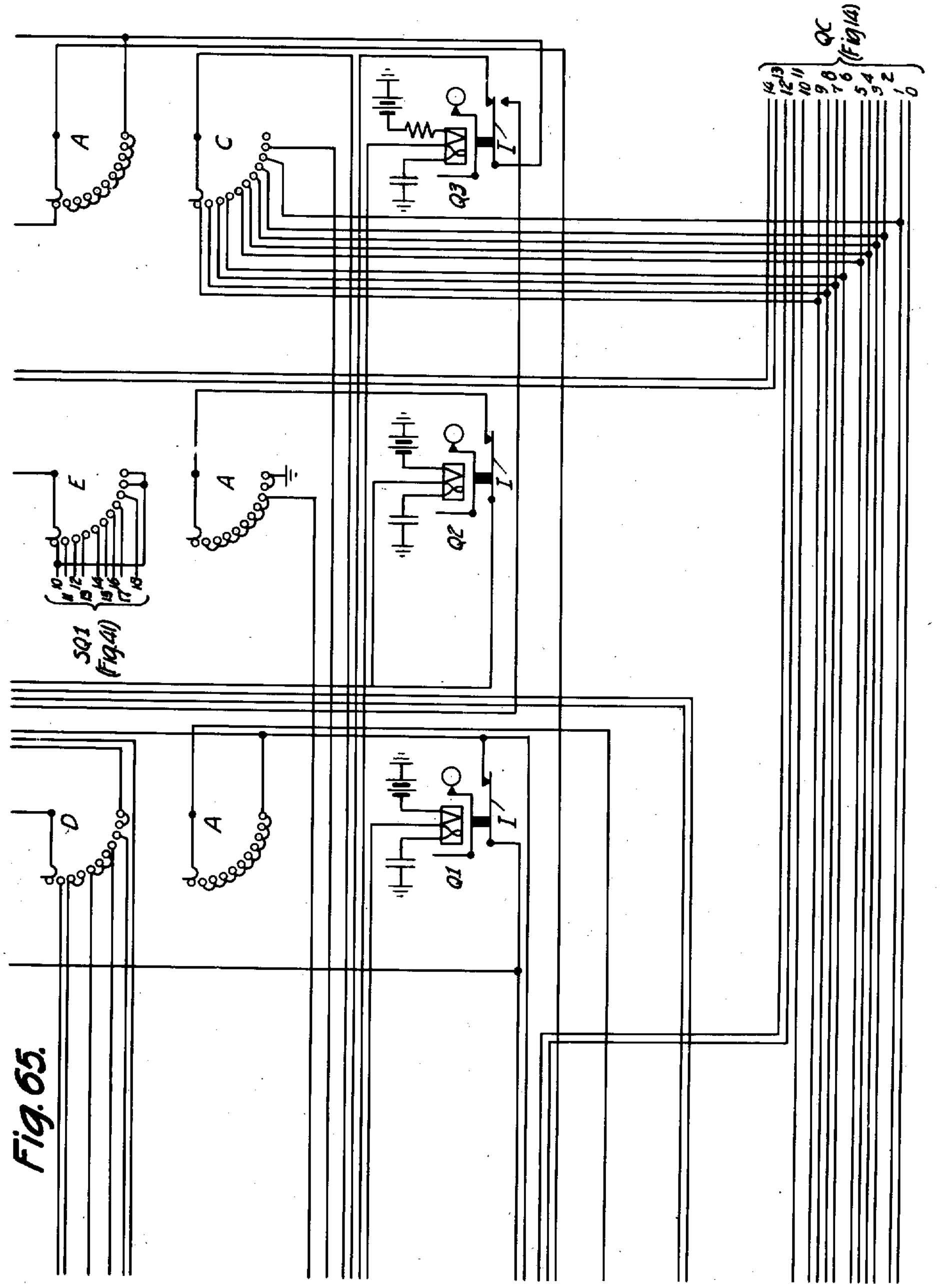

The quotient is determined approximatively by a Wheatstone bridge arrangement, which is composed of the following elements, shown in Fig. 73 (see also Figs. 62 and 64).

Figure 45:
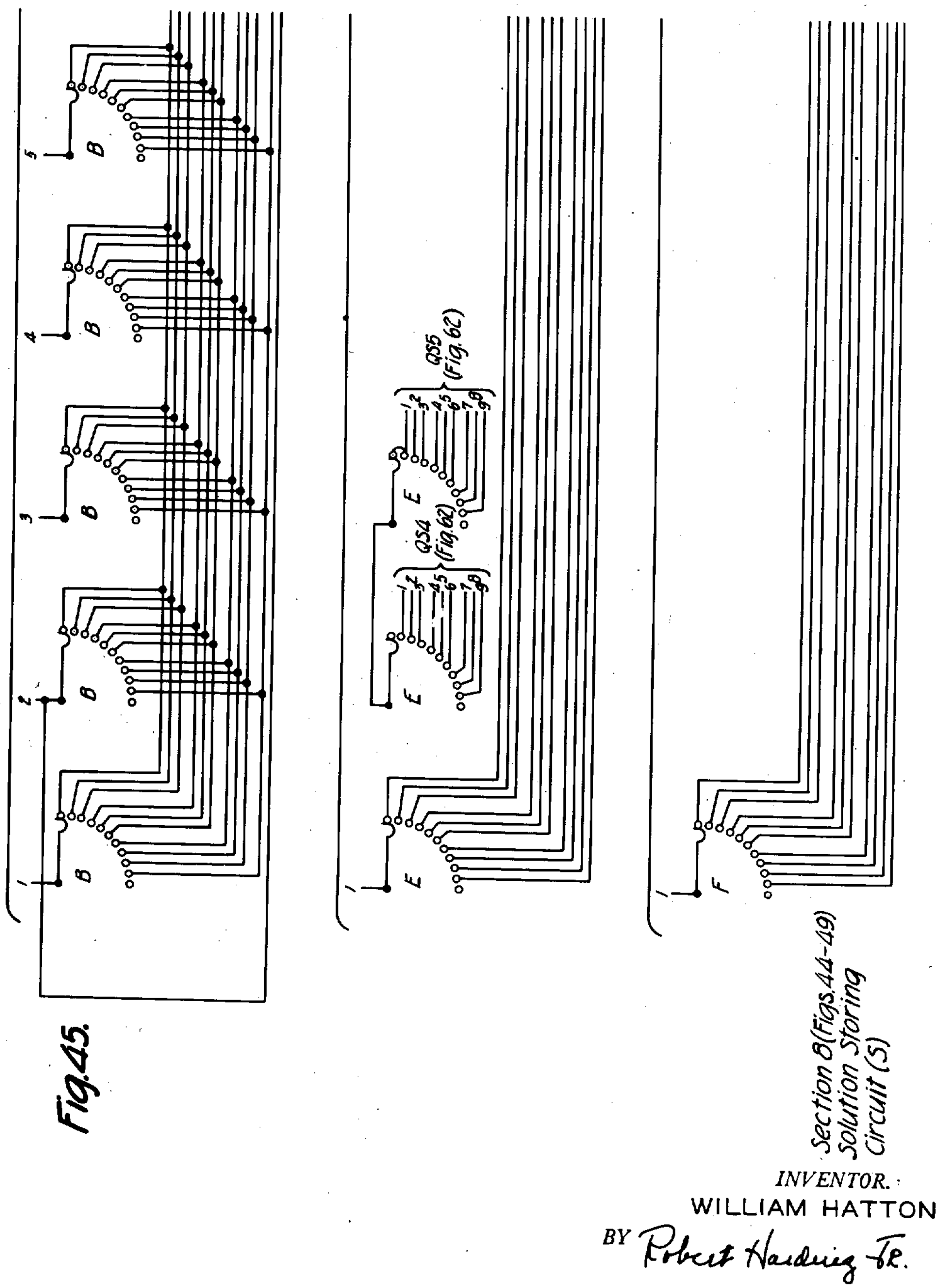
Figure 47:
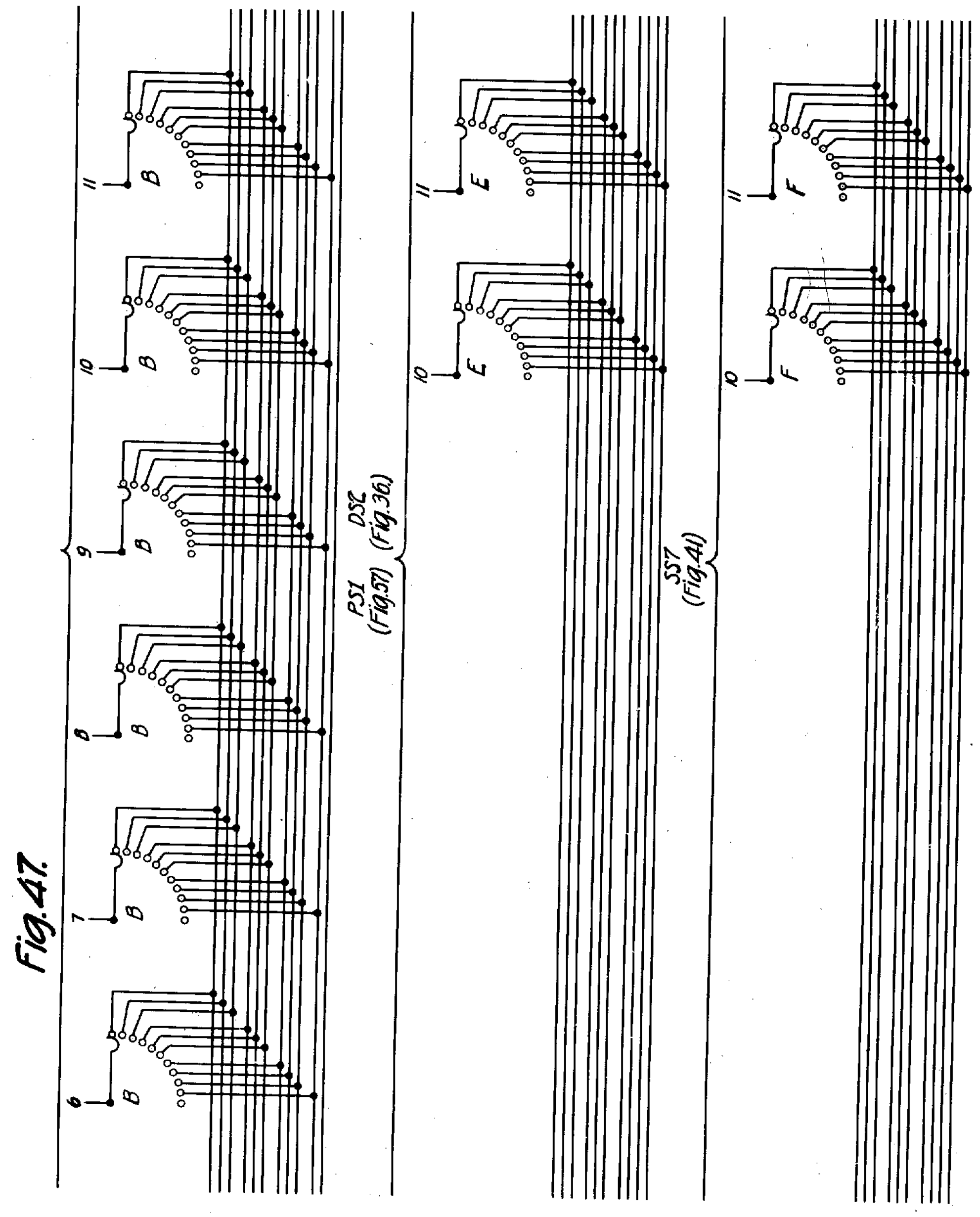
Figure 49:
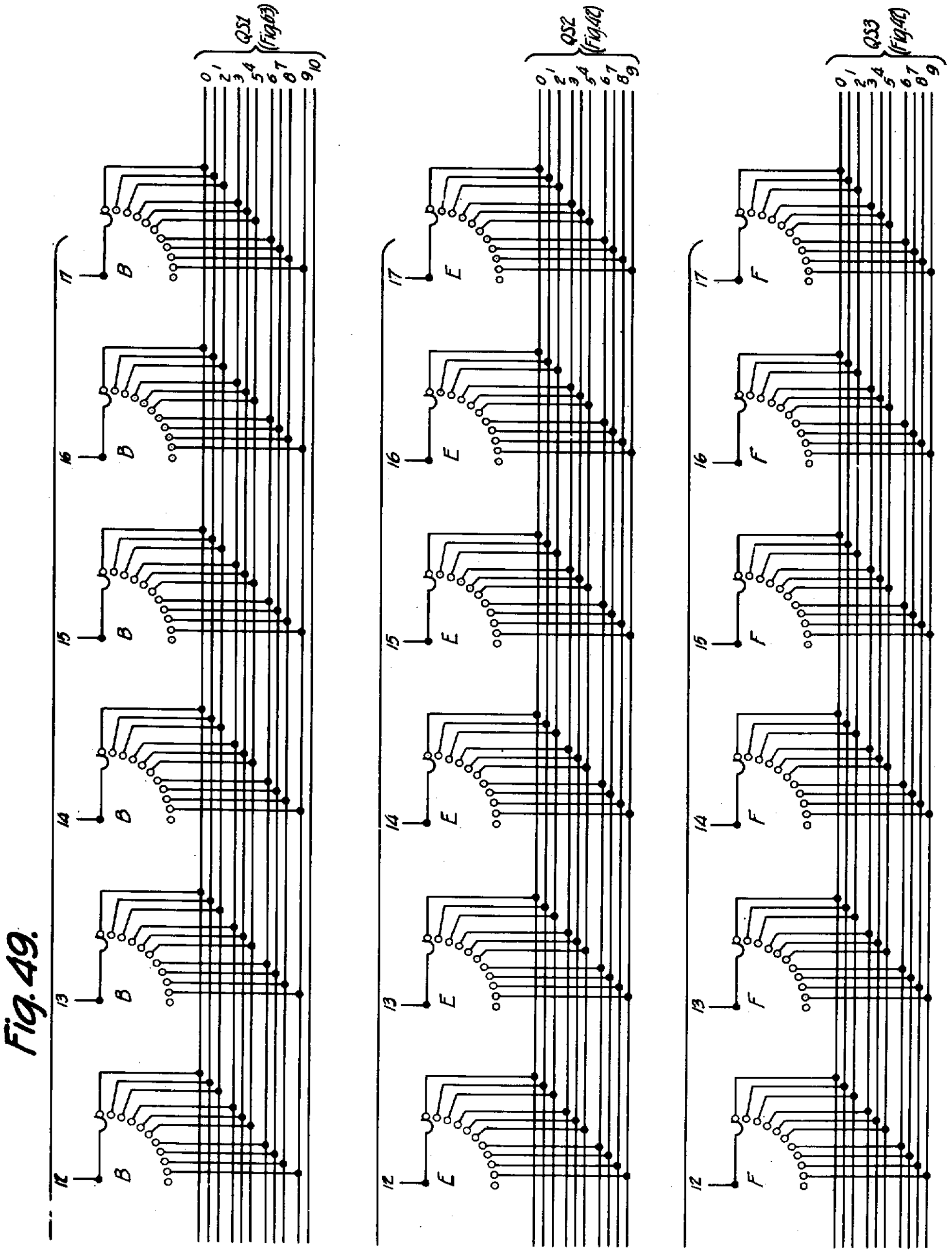
Figure 50:
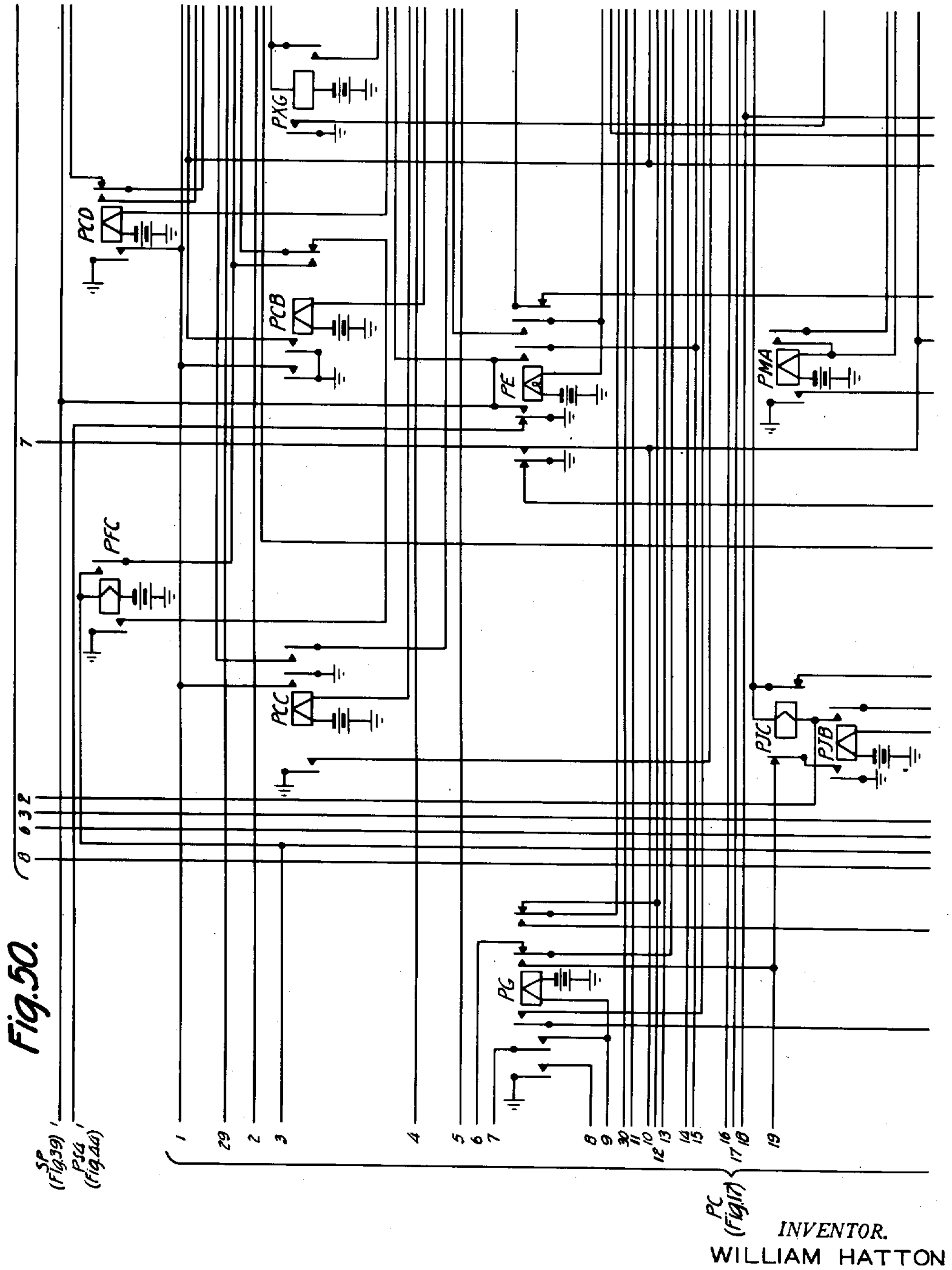

QY1–18 are resistances which represent the first 2 figures of the dividend A expressed in ohms. These resistances are connected to the arcs E and F of the markers S1 and S10–17 (Figs. 45, 47 and 49). The brushes E and F of these markers are connected during division in such a way that one of the resistances of QY1–9 will correspond to the value of the first figure of the dividend A and one of the resistances QY10–18 will express the value of the second figure of A. If, for instance, A starts with the figures 57. . . the resistance inserted between the points 1 and 2 of the Wheatstone bridge will be 570 ohms. Similarly QY19–27 represent the first figure of the dividend and since this is permanently stored on the marker S2 (Fig. 44) the above resistances are connected straight to the arc E of S2. The second figure of B is expressed by the resistances QY28–35 connected permanently to the arc E of the marker S3. The values of these resistances are $\frac{1}{10}$ of those for the number A; if, for example, the number B starts with the figures 85, the values of the resistances inserted between the points 1 and 3 of the Wheatstone is 85 ohms.

At the other side of the bridge QY1–2 have the fixed value of 100 ohms, whereas QY8–16 have the values 900, 800, 700 . . . etc. ohms. These resistances are connected to the arc *f* of Q3, in its different positions. In its normal position 900 ohms is connected and on each step of Q3 the resistance is replaced by the next one having a value lower by 100 ohms.

It will now be understood that the relay QJ (Figs. 62 and 72) connected between the points 2 and 3 of the Wheatstone bridge will be without current when the ratio of 1–2 to 1–3 is equal to the ratio of 2–4 to 3–4. The part 2–4 will be diminished in steps by Q3 and at the moment QJ is released, the marker is stopped and its position indicates the approximative quotient.

In the Q circuit O1 reaches position 2 when the transfer of B has been completed. QD (Fig. 64) operates via O1C. When QY2 has energized upon reception of the equal sign the following circuit closed; Battery, QB front 5, QD back 5, QJ, Q3 arc B via one of the resistances QY1–9, arc E of S1, SKA front S10 arc F, and via one of the resistances SY10–18 to ground. Relay SKA is energized via the normal terminal of Q2 arc F and over the QB contact 2. Relays QJ and QJJ (Fig. 62) operate; QJJ extends the circuit of QJ towards the resistances QY19–35. When QD operates, it removes the operating battery of QJ; this however may remain operated in the Wheatstone bridge. QD contact 3 connects ground to the armature 2 of QJJ and consequently Q3 (Fig. 65) starts to rotate. QD contact 2 energizes relay QK (Fig. 60) via the back contact of the interrupter Q3. The energization ground of the magnet O3 is controlled via QJJ front 2. When Q3 energizes it opens its interrupter I releasing thereby QK and makes one step. The circuit of QK is reclosed and again one step is made. In position normal QY16 is connected to the terminal F of Q3. After one step, this resistance of 900 ohms is replaced by QY15 which has only 800 ohms. When in this way the Wheatstone bridge becomes equilibrated, QJ and QJJ release and the marker Q3 stops. QJJ contact 1 opens the bridge circuit so that operation of QJ is prevented on eventual reversed current.

The quotient obtained in this way will of course be approximative. The digits of dividend A and divisor B are only represented by their first 2 figures; the influence of the remainder of the figures, if any, is thus not considered. Further elements, which may influence the correct operation of the Wheatstone bridge, are: variation in the values of the resistances used, contact resistances, voltage variation of the feeding battery and finally the fact that relay QJ will always have the tendency to release while it still has a small current. The answer, however, will in most cases be the correct one or by one step lower or higher. Only in very remote cases will the difference be higher than 1 between the obtained quotient and the correct one.

The reason why the check for the quotient is started from 9 is that the real ratio of A to B is in most cases between two figures and in which case the lower figure is wanted. If, for instance, $A=570$, $B=85$, the ratio is 67. The relay QJ still receives current when O3 is standing in the position corresponding to the quotient 7. It will therefore release only when passing from 7 to 6 and O3 will indicate the correct answer 6.

The determination of the approximative quotient is only an auxiliary operation with the purpose of speeding up the division. The solution will be correct even if the quotient indicated by this arrangement is completely false. If one of the resistances QY1–18 is open Q3 remains in normal position and the division starts with the quotient 9 and continues until the correct answer is reached. If one of the resistances SY19–35 is open or due to some other fault Q3 does not stop in the correct position, the bridge will be opened in all cases on arc B of Q3 in the position corresponding to 0. The division in this case starts with the quotient 0 and continues as it will appear from the description below until the correct figure is obtained.

*Transfer*

The division with the quotient found is carried out by the transfer circuit like a multiplication. The denominator or divisor B stored on relays I will be multiplied by the quotient but instead of adding to the corresponding part of numerator or dividend A the product will be subtracted.

The distributor circuit is controlled from the transfer circuit. At the commencement of the marker D1 is in its normal position. When the quotient is determined, QJJ releases and QL operates if the quotient is anything but 0. QL contact 2 energizes TD (Fig. 26) in order to start transfer and the QL contact 3 operates, via Q3 arc E, the corresponding 3 relays of the multiplication table. TD front 1 energizes relay set DH (Fig. 34) to connect through the transfer wires.

The following table shows clearly the position of the distributor circuit for the consecutive quotients. It should be understood that relays DKA, DKB, DKC and DKD (Figs. 31, 33 and 35) are kept energized all the time during division:

| Quotients of solution | Transfer of | Position of D1 | Position of O2 | Relay sets Operat | Transfer Wires to S | | | | | | | |
|---|---|---|---|---|---|---|---|---|---|---|---|---|
| | | | | | 1 | 2 | 3 | 4 | 5 | 6 | 7 | 8 |
| 1st, 10th | 10'S | N | N | DH | 1 | 10 | 11 | 12 | 13 | 14 | 15 | 16 |
| | U'S | 1 | N | DJ | 10 | 11 | 12 | 13 | 14 | 15 | 16 | 17 |
| 2nd, 11th | 10'S | 1 | 1 | DJ | 10 | 11 | 12 | 13 | 14 | 15 | 16 | 17 |
| | U'S | 2 | 1 | DA | 11 | 12 | 13 | 14 | 15 | 16 | 17 | 1 |
| 3rd, 12th | 10'S | 2 | 2 | DA | 11 | 12 | 13 | 14 | 15 | 16 | 17 | 1 |
| | U'S | 3 | 2 | DB | 12 | 13 | 14 | 15 | 16 | 17 | 1 | 10 |
| 4th, 13th | 10'S | 3 | 3 | DB | 12 | 13 | 14 | 15 | 16 | 17 | 1 | 10 |
| | U'S | 4 | 3 | DC | 13 | 14 | 15 | 16 | 17 | 1 | 10 | 11 |
| 5th, 14th | 10'S | 4 | 4 | DC | 13 | 14 | 15 | 16 | 17 | 1 | 10 | 11 |
| | U'S | 5 | 4 | DE | 14 | 15 | 16 | 17 | 1 | 10 | 11 | 12 |
| 6th, 15th | 10'S | 5 | 5 | DE | 14 | 15 | 16 | 17 | 1 | 10 | 11 | 12 |
| | U'S | 6 | 5 | DF | 15 | 16 | 17 | 1 | 10 | 11 | 12 | 13 |
| 7th, 16th | 10'S | 6 | 6 | DF | 15 | 16 | 17 | 1 | 10 | 11 | 12 | 13 |
| | U'S | 7 | 6 | DE | 16 | 17 | 1 | 10 | 11 | 12 | 13 | 14 |
| 8th, 17th | 10'S | 7 | 7 | DE | 16 | 17 | 1 | 10 | 11 | 12 | 13 | 14 |
| | U'S | 8 | 7 | DG | 17 | 1 | 10 | 11 | 12 | 13 | 14 | 15 |
| 9th, 18th | 10'S | 8 | 8 | DG | 17 | 1 | 10 | 11 | 12 | 13 | 14 | 15 |
| | U'S | N | 8 | DH | 1 | 10 | 11 | 12 | 13 | 14 | 15 | 16 |

First the 10's figures of the product of B×the 1st quotient will be reduced from the corresponding part of the dividend as indicated above. It should be understood that the marker S1 is at present in normal position as the figures of numerator A have been transferred to S10–17. The denominator B may contain a maximum of 8 digits; therefore 9 markers are required for A during division. For the first quotient it is considered that the first digit of A is a 0 and is stored on the marker S1.

The operation of TD causes the transfer of the complementary figures of the product (B×1st quotient). TD contact 5 grounds the arc B of T2. The terminals of this arc are connected to the 10's and U's multiples in the complementary way, if compared with the connections of the multiplication arc. TD contact 2 operates relay set MZ (Fig. 58) in order to connect the multiplication table for the transfer of the 10's figures. The contact 11 of MZ energizes D1 (Fig. 36) and when after the transfer of the 10's MZ releases, DM leaves its normal position and advances to position 1. TD front 4 connects the normal terminal of the arc A of T2 to relay TF (Fig. 25) in order to produce a single impulse exactly in the same way as for subtraction. TF front 1 energizes that solution marker which is the last in receiving impulses during the transfer. The front contact of the interrupter on this marker energizes TK (Fig. 28) so that TF releases. TGA (Fig. 27) operates to the front of TF and locks itself via TGB which operates also. TGB changes over the wire coming from the normal terminal *a* of T2 from TF to the impulsing relays TJ1–5. Nine impulses are produced followed by the carry-over impulse. The 11th kick energizes relay TE (Fig. 27), which locks to the TD front and at the same time disconnects relay set MZ so that D1 now makes a step. When TLL operates, its back contact 2 opens the circuit of DH, which therefore releases. When the 11th kick is over, the marker D1 is already in position 1 and relay set DJ becomes energized by the back contact mentioned above. The transfer is continued now while T2 is advanced over the second half of its arcs. Relays TGA and TGB are released during the 10th kick at TLL back 4 and therefore the transfer of the unit impulses is also preceded by a single unit impulse.

In the Q circuit the marker Q1 makes 2 steps during division. TLL contact 4 operates QC (Fig. 61) via arc E of Q1 during both 10th kicks and thus Q1 stops at the end of the transfer in position 4.

*Correction of quotient*

It should be remembered that the division so far is composed of two subtractions; one corresponding to the 10's and the other corresponding to the units of the product B×the quotient. If these subtractions are possible, the 1st solution marker involved has to produce a carry-over kick as in the case of an ordinary subtraction. If both kicks arrive they indicate that the product of B and of the quotient is less than the corresponding part of A. If, however, one or both kicks do not arrive, this will signify that the approximative quotient is too high and has to be diminished to the correct value. In the former case the Q circuit checks whether, after the division, a still further simple subtraction is possible or not. If it is, the subtraction is performed and the quotient is increased by 1. In case, however, the 10th kick has not been received the Q circuit initiates one simple addition and at the same time causes the displacement of Q3 by one step backwards. Both operations, subtraction and addition, can be repeated, if necessary, as many times as necessary until the correct quotient is obtained.

Figure 60:
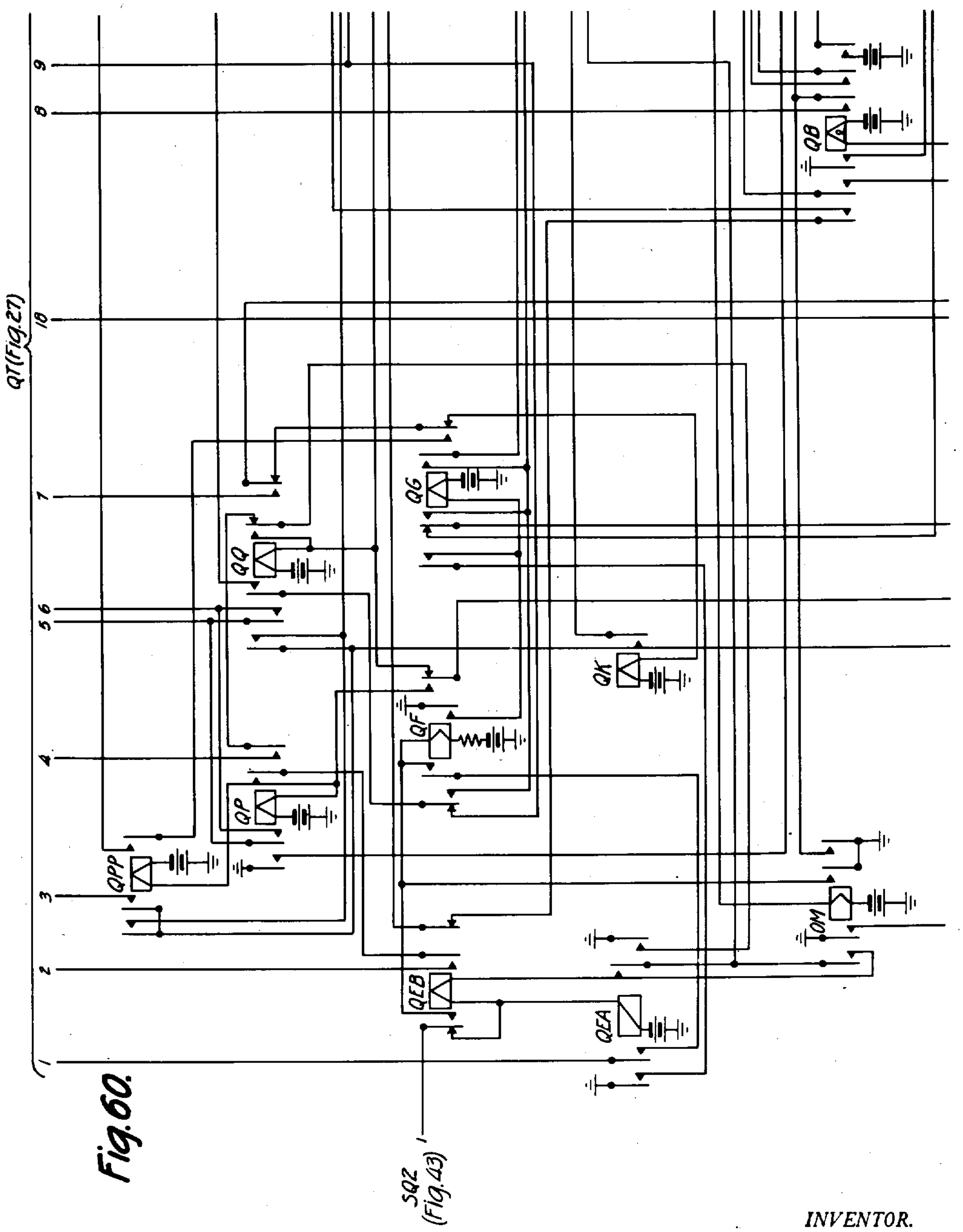

The S circuit contains nine relays SKA, SKK, SKL, SKM, SKN (Fig. 41), SKO, SKP, SKQ and SKR (Fig. 43), one being assigned for each of the 9 markers S1, 10–17 involved in the division operation. These relays are operated one after the other during the consecutive cycles of operations via the arc F of Q2 by a ground on QB front 2 (Fig. 60). Q2 being at present for the 1st quotient in normal position, relay SKA is energized, which introduces the following changes in the circuit:

The carry-over kick of S1 is used normally for checking purposes as previously explained in connection with addition and subtraction. This kick is connected during division via the change-over 4 of SL to the marker S17 whereby the nine markers form a complete cycle. SKA disconnects on its change-over 1 this carry-over kick and directs it to relay QEA (Fig. 60). SKA front 4 joins the two sets of resistances for the Wheatstone bridge corresponding to the 1st and 2nd digits of A. As previously explained, S1 (=0 for the 1st quotient) represents the first and S10 the second digit. SKA contact 2 opens the interrupter locking circuit of the carry-over kick since now this kick is not reaching the marker S17. The purpose of the change-over 3 will be explained later on.

Referring now to the table, the 10's impulses are sent to the markers S1, 10–16, the carry-over kick produced by S1 energizes QEA and when the kick is over QEA locks itself in series with QEB (Fig. 60). The unit impulses are sent to the markers S10–17 and since S1 may now be out of normal it has also to receive 9 impulses. The carry-over kick will have to be produced again by S1. The 9 impulses mentioned above are controlled by relay QU (Fig. 62). This relay operates via the fronts of TD, TE and TGA connected in series so that QU operates only during the transfer of the unit impulses. The right front of QU connects an impulse contact of TJ5 (otherwise used only for subtraction) to the brush C of Q2. The normal terminal of the arc C is connected to the magnet S1. The left front of Q2 connects the locking circuit of the impulse relays TJ1–5 over the arc D of Q2 to the interrupter contact I of S1. In this way 9 impulses are sent to S1, which then, at the end of transfer, has to produce a carry-over kick.

Now the following possibilities have to be considered:

*a.* Approximative quotient is proved to be correct.

*b.* Approximative quotient is lower than the correct one.

*c.* Approximative quotient is higher than the correct one.

*a.* The fact that both subtractions were possible is registered by the operation of QF (Fig. 60) on the second carry-over kick. QF energizes QG, which locks itself to QEA (Fig. 60). OF has also a locking circuit, which is controlled by back contact of TF (Fig. 25). The next step in the operation is to check whether the remainder of A is more or less (should be less) than the denominator or divisor B. This checking is done by a comparison of the first figures of A and B. This comparison can oly be effected when the 11th kick is over. The Q circuit contains two relays QHA and QHB (Fig. 62). QHA operates on each 11th kick via QB front 4 and TMM front 4. Upon operation QHA locks in series with QHB which is a slow operating relay in order to ensure that when it closes its contacts the S markers having received 11th kicks are already released. The locking ground of QHA and QHB is obtained via the TF back 1 so that they will release each time subtraction starts.

Figure 63:
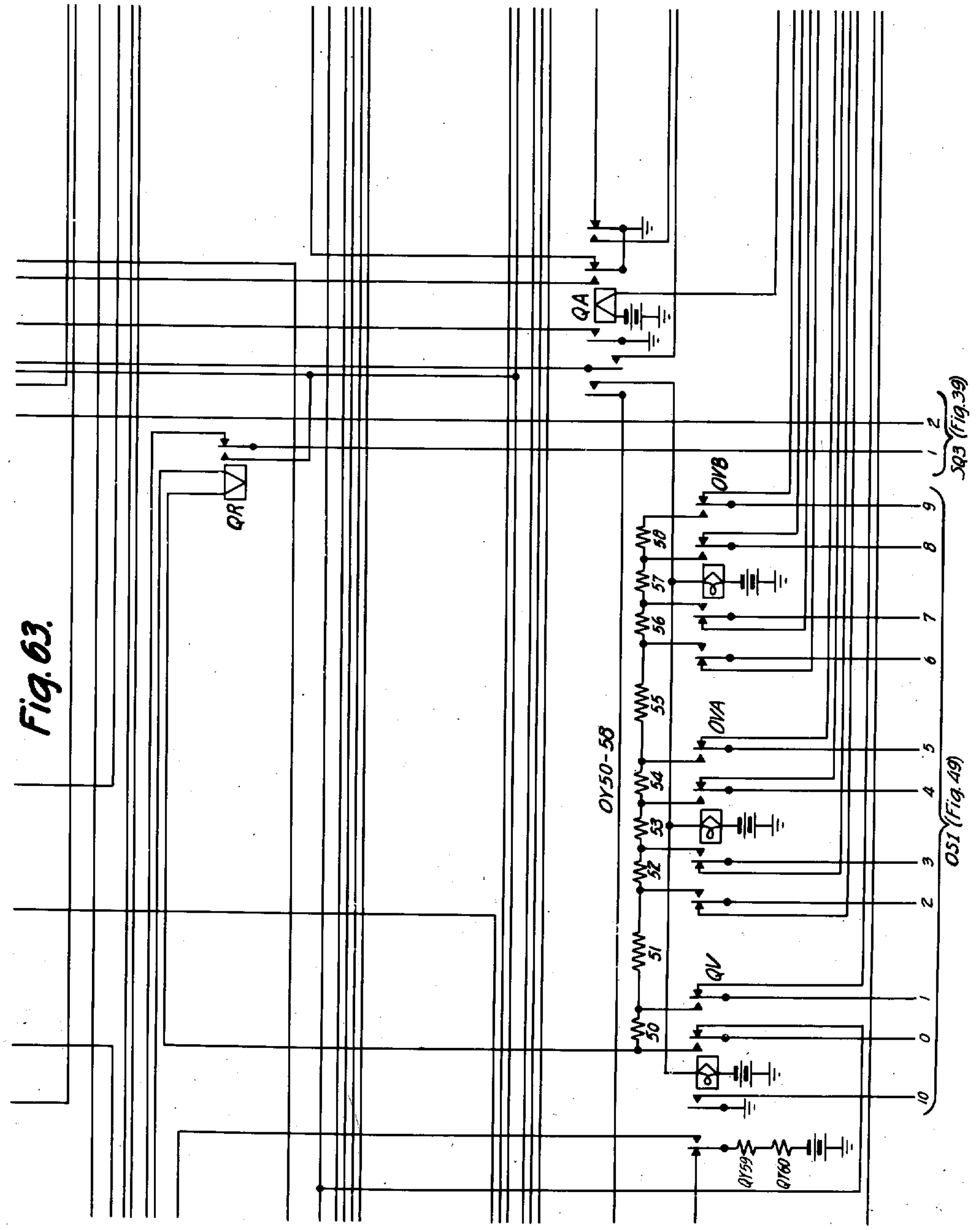

Q1 leaves position 4 due to QG operated by the ground via terminal 4 of Q1D. In position 7 of Q1 ground is connected over the fronts of QHA and QHB to the armature of QR (Fig. 63). This relay is connected to the comparing multiple which is composed of 9 resistances QY19–27 connected as in a potentiometer between the 10 wires of a multiple over all arcs B of the markers S. The brush B belonging to S2, i. e. the first digit of the divisor, is grounded over contact 2 of QV (Fig. 63). On the other hand, battery is connected over the brush B of the marker S representing the 2nd digit of A. At present S10B receives battery over D1C position and via the QV front 1. The resistances QY3–4 are necessary because both markers S2 and S10 may stand in the same position.

If now S2 is standing behind S10, i. e. S2, S10, and at the same time S1 is in normal position, relay QR (Fig. 63) operates by the above mentioned battery over D1E, S10B and ground over arc D1F from the normal terminal of the arc C of S1. This ground over D1F serves as direct ground on all further markers, but on S1 is controlled by SLA front 2 and PE back, required in connection with the other types of calculation.

Since QR operates when QHB closes its fronts the relay QC and thereby Q1 are energized. Q1 leaves position 7 and stops in position 8, where it indicates to the P circuit that the quotient has been obtained and may be printed.

*b.* The second possibility is that the quotient indicated by Q3 is too low. The subtractions in this case, of course, were possible, and thus relays QF and QG (Fig. 60) are operated. QR, however, does not operate, either because S2 is in front of S10 or because S1 is not in normal position. When OHB operates the ground connected to the armature of QR, relays QP and QPP (Fig. 60) are energized via QR back and over QF front 4. The operation of these relays initiates a simple subtraction.

QP front 3 energizes TB (Fig. 26) which starts the transfer circuit same as for an ordinary subtraction operation. QP front 2 connects ground to the brush C of D1 (Fig. 36) so that the relay set DJ operates as for the unit impulses of the division transfer. The position of Q3 indicates the quotient in complementary sense; therefore in order to register one subtraction, it is necessary that Q3 make one step backwards. This is accomplished in a manner such that Q2 makes 10 steps forward and thereby the same result is obtained. QJJ (Fig. 62) front 2 connects an impulse contact of TJ4 to the magnet of Q3, whereby 9 steps are obtained. One more impulse is obtained by the 10th kick. QPP contact 1 directs TLL front 4 via arc E of Q1 to the magnet of Q3. During these 10 impulses O3 back I is connected via QPP front 3 to the locking circuit of the impulse relays TJ1–5.

QF and QHA and QHB release during the single unit impulse produced by the transfer circuit. QP remains operated via QEB front 2 and TMM (Fig. 27) back 3.

If this subtraction is possible, QF receives the carry-over kick from S1. QF operates and locks in this case. QHB releases during the 11th kick when TMM operates and therefore QB releases also. At the same time QHA (Fig. 62) energizes again and when the impulse is over QHB comes up. If OR front is now on, Q1 passes over to position 8 and initiates printing.

It may be that QF has received the carry-over kick and QR does not operate. This signifies that A is greater than B and subtraction can be continued. When QHB energizes and finds QR on its back contact QP is energized and the same operation as described above is carried out. Q3 again receives 10 impulses and indicates a higher quotient.

Since QR cannot operate if S2 and S10 are in the same position, the subtraction in this case is attempted although it may be that subtraction is not possible in the event that A is less than B. At the end of this subtraction QF receives no carry-over impulse and QR can not operate. This indicates that the last subtraction was not possible and the value of B has to be restored once to the remainder of A. Relay QQ (Fig. 60) operates instead of QP and addition is started.

TA energizes via QF back 1, QQ front 4, terminal 5 of Q1B. TA starts addition in above described manner. QQ front 3 energizes relay set DJ in conformity with the table. The QQ contact 2 connects the 10th kick produced by TLL front 4 towards the magnet Q3. At the same time the Q3I is connected via QQ front 1 and TMM front 2 to the common locking circuit of TJ1–5. In this manner Q3 makes one step and diminishes the quotient by one. At the end of this addition QF has again to receive the carry-over kick. The ground on QF front 1 drives Q1 to position 8 and printing takes place.

c. The third case to be considered is that the quotient, by which the division transfer was carried out was too high and consequently the circuit Q has not received 2 impulses from S1. Due to QG down Q1 remains in position 4 and energizes QQ. This relay starts addition by energizing TA. When now the 10th kick is received from S1, QF operates and disconnects the operating ground of TA. Q1 passes to position 8 by the ground via arc B terminals 4, 5, 6 and 7 of Q1 and OF front 1. In position 8 of Q1 the printing of the quotient takes place.

If the carry-over kick is not sent by S1 the addition continues until this kick arrives. On each addition Q3 makes one step due to the operation of TLL and diminishes the quotient by one.

If due to some fault in the circuits the correct quotient cannot be found, neither by continuous addition, nor by subtractions, the Q circuit produces an alarm and stops division. This alarm is produced if Q3 stops after a calculation in position 10. In fact it cannot stop there, if the quotient is corrected by the circuit in the right sense. If it stops, relay QW (Fig. 62) operates in the following circuit: Ground via QHA front 2 (Fig. 62), OHB, relay QW and battery via the last terminal of Q3C and over the resistance QY5.

It will be understood from the drawings (Figs. 62, 64 and 72) that the Wheatstone bridge has the same resistance for the quotients 1 as for 2. If therefore the resistances OY8-9 do not equilibrate the bridge, then Q3 stops only in position 9 indicating the quotient 0. It is quicker this case to start single subtraction immediately than to multiply first by 1.

In case of 0 quotient, the release of QJJ is followed by the operation of QM (Fig. 15) via Q3D position 9. QM front 1 energizes D1 in order to replace the operating ground of MZ front 11. The other 3 fronts of QM energize relays QEA, QEB, QF, QG, QHA and OHB. Due to the ground on Q6 front 3 connected over Q1B the positions 2 and 3 of the division transfer is passed by. When Q1 leaves position 3, the operating circuit of QM opens on Q1D. QM releases and in position 4 of Q1 the circuit conditions are the same as after a successful division transfer, i. e. QF has received the carry-over kick. Position 4 is left via QG front 1 and in position 5 of Q1 subtraction starts if initiated by QR.

*Printing of quotient*

The printing starts when Q1 arrives at position 8. Ground is connected via arc Q1D over the SBB front 3 (Fig. 39) to operate PP (Fig. 53). The following circuits are closed: ground via PL back 1 (Fig. 53), PJA back (Fig. 51), PP front 2, PW back (Fig. 35), PXE back (Fig. 55), PRB front 4 (Fig. 53), to the brush of Q3C. The terminals of the arc Q3C are connected to the solution sending relays. A combination of SCK, SCL, SCM, SCN and SCO (Figs. 40 and 42) corresponding to the quotient is energized and the printing takes place. Another circuit is closed via front 4 of PP, PL back, PJA back, PVA back, PKC back and PRB front 1 to the relay QC (Fig. 61), whereby the marker Q1 is energized.

When the printing magnet K6 energizes, relay SBB (Fig. 39) and PP release, Q1 makes one step and then returns to normal over its arc B. During the passage over the terminals 7 and 10 relay QN (Fig. 62) operates over Q1D and locks. QN on its back contacts opens the circuits which served at the beginning to transfer the digits of A and B to the solution markers. QN front 2 closes a skipping circuit for Q1, which leaves normal and runs directly to position 2. The driving ground in normal position is controlled by the back contacts of PW, PNA, PNB and PKB with the purpose of stopping division when the decimal point is reached. This part of the circuit operation is hereinafter described.

While Q1 is in position 8 ground is connected via its arc B to energize Q2. When after printing Q1 leaves position 8, Q2 makes one step and stops in position 1.

When Q1 leaves position 8 it opens at its arc C, the holding circuit of QD. This relay and then in turn all relays engaged release, excepting QA, QB, QN, QV, QVA and QVB. The marker Q3 returns to normal with the help of QK (Fig. 60). When Q3 is in normal and Q1 is in position 2 the operating circuit of QD is reclosed via the normal terminal of the Q3A, QA front 2 and brush C of Q1 in position 2.

Since QD was released QJ (Fig. 26) has been energized again in the same manner as for the 1st quotient. When QD energizes the circuit starts the same operation for the 2nd quotient as previously described for the 1st quotient. Both D1 and Q2 are now in positions 1 and consequently SKK (Fig. 39) is energized. The quotient circuit, therefore, will receive the carry-over kicks from the marker S10 and the Wheatstone bridge is connected accordingly to the markers S10 and S11.

Figure 61:
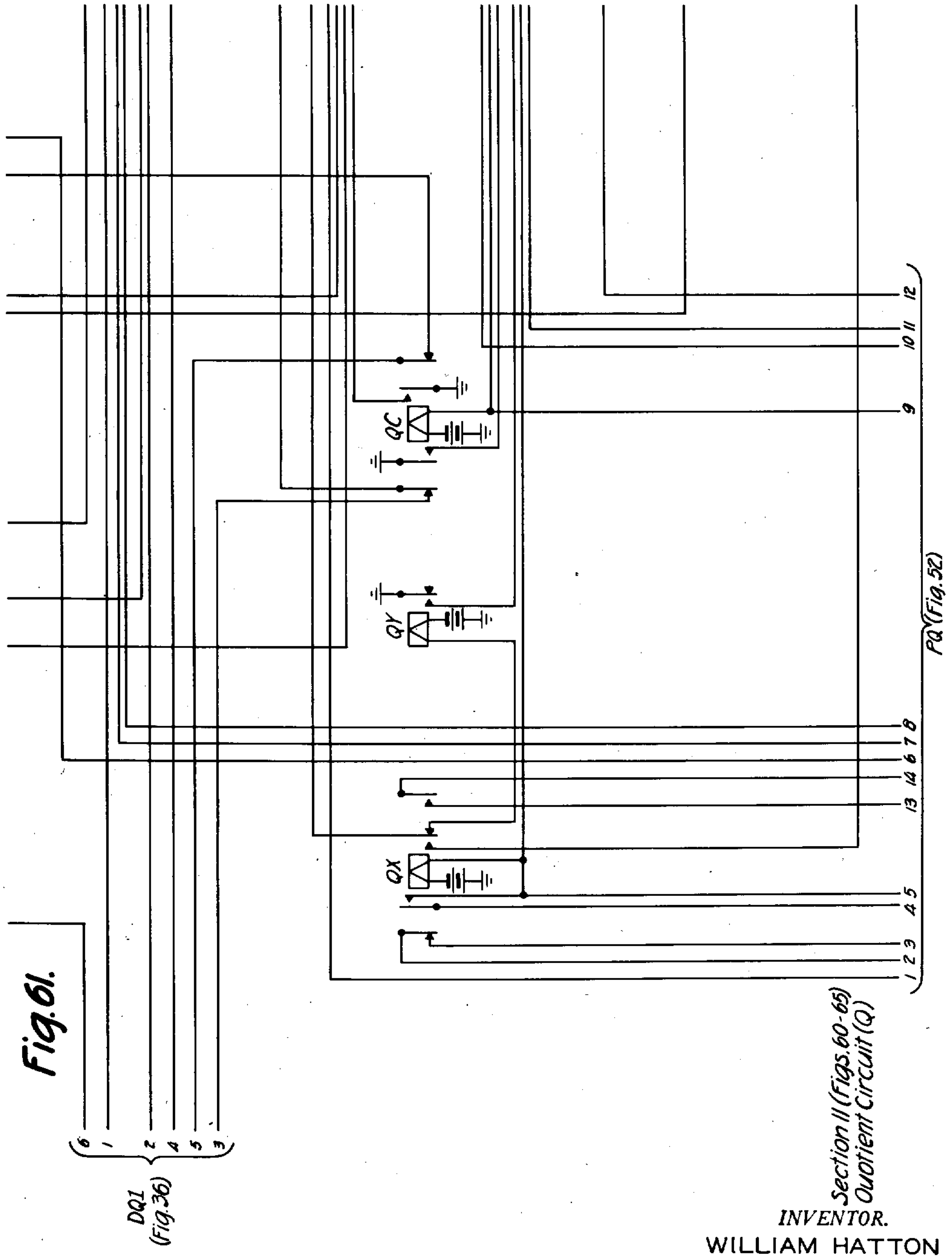

The first quotient in about 50% of the cases will be 0. This 0 will not be printed, except following the decimal point. It will be understood from the drawing that the terminal 9 of Q3C is connected via OX back (Fig. 61) to a slow operating relay QY (Fig. 61). If the first quotient to be printed is 0, relay QY operates and energizes in turn relay CKB. Owing to this CKA releases as it should after printing. QX is energized via the front of CAX or CBX, i. e. when a quotient other than 0 is printed or if PKB operates before printing of the decimal point.

*End of division*

The division in the above form could be repeated without any limitation as the use of markers S1, S10-11 may be repeated in the cycle. Practically, however, it is preferable to terminate division after a certain number of quotients. On the other hand the circuit has to record the number of quotients produced in order to fix the correct place of the decimal point in the remainder.

The capacity of the marker switches used for this purpose has imposed the limit of 18 quotients. There will be certain abnormal cases when the number of quotients will be somewhat less as will appear from the description of the decimal point.

In general the division will automatically continue until the decimal point is reached. It will stop due to the fact that Q1 remains in normal position, its driving ground being disconnected on backs of PNA (Fig. 52) and PNB (Fig. 53). This ground can be replaced by the operator by pushing the division key. Division then will be continued as long as this key is operated and until 18 quotients have been produced or in other words, until the quotient has 18 digits.

The division stops also if the remainder of A becomes 0. This check is carried out after each operation of relays QHA and QHB. In case the remainder is zero, the following circuit is closed: Ground on the front 3 of one of the relays SKA to SKR (Figs. 41 and 43), for example SKN, which may just have been operated, S12D normal, SKM back 3, S11D normal, SKL back 3, etc., SKK back 3, SKM, S1D normal, SKA back 3, SLA front 3 (Fig. 39), S19D normal, SKR back 3, etc., S13D normal, terminal 4 arc of Q2C, fronts QHB and QHA, PNB front 1, after decimal point, to relay CZ (Fig. 11), which is the release relay. This circuit thus releases and the final solution is indicated to the operator by the printing of 3 starting dots or points.

*Examples*

Below an example in division is given. Each step is explained and by following the positions of the solution markers, in the different phases of the calculation, the circuit operation will be more readily understood. It should be mentioned that the present calculation is carried out independently of the decimal point.

The problem considered is:

16543648÷4316=

The dividend A is transferred to the markers S10–17 and the divisor B to S2–5.

*First quotient*

The Wheatstone bridge has 10 ohms against 43 ohms; therefore O3 will indicate 0. In position 7, of O1 relay OR operates and the first cycle is terminated. The 0 is not printed but the circuit is advanced.

*Second quotient*

The Wheatstone bridge is composed now of 160 ohms against 43. Q3 will indicate either 4 or 3. Assuming that it is 3, the division will be as follows:

| Digits | 4 | 3 | 1 | 6 | ×3 |
|---|---|---|---|---|---|
| 10's | 1 | 0 | 0 | 1 | |
| U's | 2 | 9 | 3 | 8 | |
| 10's complementary | 8 | 9 | 9 | 8 | |
| U's complementary | 7 | 0 | 6 | 1 | |

Considering the markers S:

(The star indicates carry-over kicks for Q circuit.)

| Markers | S1 | S10 | S11 | S13 | S13 | S14 | S15 | S16 | S17 |
|---|---|---|---|---|---|---|---|---|---|
| Before transfer | 0 | 1 | 6 | 5 | 4 | 3 | 6 | 4 | 8 |
| Single impulse | | | | | 1 | | | | |
| 10's impulses | | 8 | 9 | 9 | 8 | | | | |
| After 10's transfer | | *0 | 6 | 5 | 3 | 3 | 6 | 4 | 8 |
| Single impluse | | | | | | 1 | | | |
| U's impulses | | 9 | 7 | 0 | 6 | 1 | | | |
| After U's transfer | 0 | *0 | 3 | 5 | 9 | 5 | 6 | 4 | 8 |

S10 produces 2 carry-over kicks. Therefore O1 goes to position 7 where S2 is compared with S11 and OR operates because S11 is behind (3) of the position of S2 (4). Q1 runs to 8 and the circuit prints 3.

*Third quotient*

The Wheatstone bridge is composed of 350 and 43 ohms. O3 will indicate 8, but let us suppose that it remains in normal, thus 9.

| Digits | 4 | 3 | 1 | 6 | ×9 |
|---|---|---|---|---|---|
| 10's | 3 | 2 | 0 | 5 | |
| U's | 6 | 7 | 9 | 4 | |
| 10's complementary | 6 | 7 | 9 | 4 | |
| U's complementary | 3 | 2 | 0 | 5 | |

The solution markers advance now as follows:

| Markers | S1 | S10 | S11 | S12 | S13 | S14 | S15 | S16 | S17 |
|---|---|---|---|---|---|---|---|---|---|
| Before transfer | 0 | 0 | 3 | 5 | 9 | 5 | 6 | 4 | 8 |
| Single imp | | | | | | 1 | | | |
| 10's impulses | | | 6 | 7 | 9 | 4 | | | |
| After 10's transfer | | | *0 | 3 | 9 | 0 | | | |
| Single imp | | | | | | | 1 | | |
| U's impulses | | | 9 | 3 | 2 | 0 | 5 | | |
| After U's transfer | 0 | 0 | 9 | 7 | 1 | 1 | 2 | 4 | 8 |

S11 has produced only one carry-over kick; therefore, Q1 goes to position 4 and starts addition, whereby Q3 makes one step.

| | | | | | | | | | |
|---|---|---|---|---|---|---|---|---|---|
| Addition | | | | 4 | 3 | 1 | 6 | | |
| After addition | 0 | 0 | 0 | 1 | 4 | 2 | 8 | 4 | 8 |

The kick is now given and thus Q1 goes to position 8 and prints 8.

*Fourth quotient*

140 ohms against 43 ohms, Q3 indicates 3.

| Markers | S1 | S10 | S11 | S12 | S13 | S14 | S15 | S16 | S17 |
|---|---|---|---|---|---|---|---|---|---|
| Single imp | | | | | | | 1 | | |
| 10's impulses | | | | 8 | 9 | 9 | 8 | | |
| After 10's transfer | 0 | 0 | 0 | *0 | 4 | 2 | 7 | 4 | 8 |
| Single imp | | | | | | | | 1 | |
| U's impulses | | | | 9 | 7 | 0 | 6 | 1 | |
| After U's transfer | 0 | 0 | 0 | *0 | 1 | 3 | 3 | 6 | 8 |

After 2 kicks, S13 being behind S2 the figure 3 is printed.

*Fifth quotient*

130 ohms against 43 ohms. Quotient 3.

| Markers | S1 | S10 | S11 | S12 | S13 | S14 | S15 | S16 | S17 |
|---|---|---|---|---|---|---|---|---|---|
| Before transfer | 0 | 0 | 0 | 0 | 1 | 3 | 3 | 6 | 8 |
| After transfer | 0 | 0 | 0 | 0 | 0 | 0 | 4 | 2 | 0 |

S14 being behind S2 the circuit prints 3.

*Sixth quotient*

40 ohms against 43 ohms. Q3 indicates 0.

Q1 advances to position 7 where QR cannot operate S15 being in the same position as S2.

| Markers | S1 | S10 | S11 | S12 | S13 | S14 | S15 | S16 | S17 |
|---|---|---|---|---|---|---|---|---|---|
| Before transfer | 0 | 0 | 0 | 0 | 0 | 0 | 4 | 2 | 0 |
| Single impulse | 1 | ------ | ------ | ------ | ------ | ------ | ------ | ------ | ------ |
| Subtraction | 3 | ------ | ------ | ------ | ------ | ------ | 5 | 6 | 8 |
| After subtraction | 4 | 0 | 0 | 0 | 0 | 0 | 9 | 8 | 8 |

No carry-over kick, therefore addition.

| | | | | | | | | | |
|---|---|---|---|---|---|---|---|---|---|
| Addition | 6 | ------ | ------ | ------ | ------ | ------ | 4 | 3 | 1 |
| After addition | 0 | ------ | ------ | ------ | ------ | ------ | 4 | 2 | 0 |

Q3 has made 10 steps during subtraction and then it has made one step during addition; so the circuit prints 0 and goes over to the next cycle.

*Seventh quotient*

420 ohms against 43 ohms in the bridge. The circuit will probably indicate 9 but let us suppose that it indicates only 8.

| Digits | 4 | 3 | 1 | 6 | × 8 |
|---|---|---|---|---|---|
| 10's | 3 | 2 | 0 | 4 | |
| U's | 2 | 4 | 8 | 8 | |
| 10's complementary | 6 | 7 | 9 | 5 | |
| U's complementary | 7 | 5 | 1 | 1 | |

| Markers | S1 | S10 | S11 | S12 | S13 | S14 | S15 | S16 | S17 |
|---|---|---|---|---|---|---|---|---|---|
| Before transfer | 0 | 0 | 0 | 0 | 0 | 0 | 4 | 2 | 0 |
| Single imp | 1 | ------ | ------ | ------ | ------ | ------ | ------ | ------ | ------ |
| 10's impulses | 5 | ------ | ------ | ------ | ------ | ------ | 6 | 7 | 9 |
| After 10's transfer | 6 | 0 | 0 | 0 | 0 | 0 | *0 | 9 | 9 |
| Single imp | ------ | 1 | ------ | ------ | ------ | ------ | ------ | ------ | ------ |
| U's impulses | 1 | 1 | ------ | ------ | ------ | ------ | 9 | 7 | 5 |
| After U's transfer | 1 | 2 | ------ | ------ | ------ | ------ | *0 | 7 | 4 |

Both kicks arrived; therefore Q1 goes to position 7 where QR does not operate S16 being in front of S2. Therefore subtraction starts.

| Markers | S1 | S10 | S11 | S12 | S13 | S14 | S15 | S16 | S17 |
|---|---|---|---|---|---|---|---|---|---|
| Single imp | ------ | 1 | ------ | ------ | ------ | ------ | ------ | ------ | ------ |
| Subtraction | 8 | 3 | ------ | ------ | ------ | ------ | 0 | 5 | 6 |
| After subtraction | 5 | 6 | ------ | ------ | ------ | ------ | *0 | 3 | 1 |

The kick produced by S15 energizes QF which prevents further addition. OR operates because S16 is now behind S2 and the circuit prints 9.

*Eighth quotient*

Let us suppose now that the approximative quotient indicated is quite wrong. The bridge has 310 ohms against 43 ohms, it should therefore indicate 7. Due to some fault it indicates Q. Q1 goes to position 7 and because S16 is off-normal QR cannot operate and subtraction starts:

| Markers | S1 | S10 | S11 | S12 | S13 | S14 | S15 | S16 | S17 |
|---|---|---|---|---|---|---|---|---|---|
| Before transfer | 5 | 6 | 0 | 0 | 0 | 0 | 0 | 3 | 1 |
| Single imp | ------ | ------ | 1 | ------ | ------ | ------ | ------ | ------ | ------ |
| Subtraction | 6 | 8 | 3 | ------ | ------ | ------ | ------ | 9 | 5 |
| After 1st subtr | 2 | 4 | 4 | ------ | ------ | ------ | ------ | *2 | 7 |
| After 2nd subtr | 9 | 2 | 8 | ------ | ------ | ------ | ------ | *2 | 2 |
| After 3rd subtr | 6 | 1 | 2 | ------ | ------ | ------ | ------ | *1 | 8 |
| After 4th subtr | 2 | 9 | 6 | ------ | ------ | ------ | ------ | *1 | 4 |
| After 5th subtr | 9 | 8 | 0 | ------ | ------ | ------ | ------ | *0 | 9 |
| After 6th subtr | 6 | 6 | 4 | ------ | ------ | ------ | ------ | *0 | 5 |
| After 7th subtr | 3 | 4 | 8 | ------ | ------ | ------ | ------ | *0 | 1 |

After the seventh subtraction QR operates because S17 is behind of S2. The circuit prints 7.

*Ninth quotient*

130 ohms against 43 ohms should indicate 3. Let us suppose that it indicates wrongly 9.

The solution markers advance as follows:

| Markers | S1 | S10 | S11 | S12 | S13 | S14 | S15 | S16 | S17 |
|---|---|---|---|---|---|---|---|---|---|
| Before transfer | 3 | 4 | 8 | 0 | 0 | 0 | 0 | 0 | 1 |
| Single imp | ------ | ------ | 1 | ------ | ------ | ------ | ------ | ------ | ------ |
| 10's impulses | 7 | 9 | 4 | ------ | ------ | ------ | ------ | ------ | 6 |
| After 10's transfer | 1 | 4 | 3 | ------ | ------ | no kick | | ——→ | 8 |
| Single imp | ------ | ------ | ------ | 1 | ------ | ------ | ------ | ------ | ------ |
| U's impulses | 3 | 2 | 0 | 5 | ------ | ------ | ------ | ------ | 9 |
| After U's transfer | 4 | 6 | 3 | 6 | ------ | ------ | ------ | ------ | *7 |
| Addition | 4 | 3 | 1 | 6 | ------ | ------ | ------ | ------ | ------ |
| After 1st addition | 8 | 9 | 5 | 2 | ------ | ------ | ------ | ------ | 7 |
| After 2nd addition | 3 | 2 | 6 | 8 | ------ | ------ | ------ | ------ | 8 |
| After 3rd addition | 7 | 5 | 8 | 4 | ------ | ------ | ------ | ------ | 8 |
| After 4th addition | 1 | 9 | 0 | 0 | ------ | ------ | ------ | ------ | 9 |
| After 5th addition | 6 | 2 | 1 | 6 | ------ | ------ | ------ | ------ | 9 |
| After 6th addition | 0 | 5 | 3 | 2 | 0 | 0 | 0 | 0 | *0 |

After the sixth addition the carry-over kick arrives and addition stops. Q3 makes six steps and indicates the quotient 3.

The next quotient will be determined on the same markers as the first one and this process continues until it is stopped by the P circuit.

*Decimal point*

The decimal point in the solution depends on the position of the decimal points in the dividend and in the divisor. In principle the number quotients before the decimal point in the solution is equal to the difference between the two decimal points of A and B increased by one.

The position of the decimal points in A and B is registered by 2 markers P2 and P4 (Fig. 56).

Figure 52:
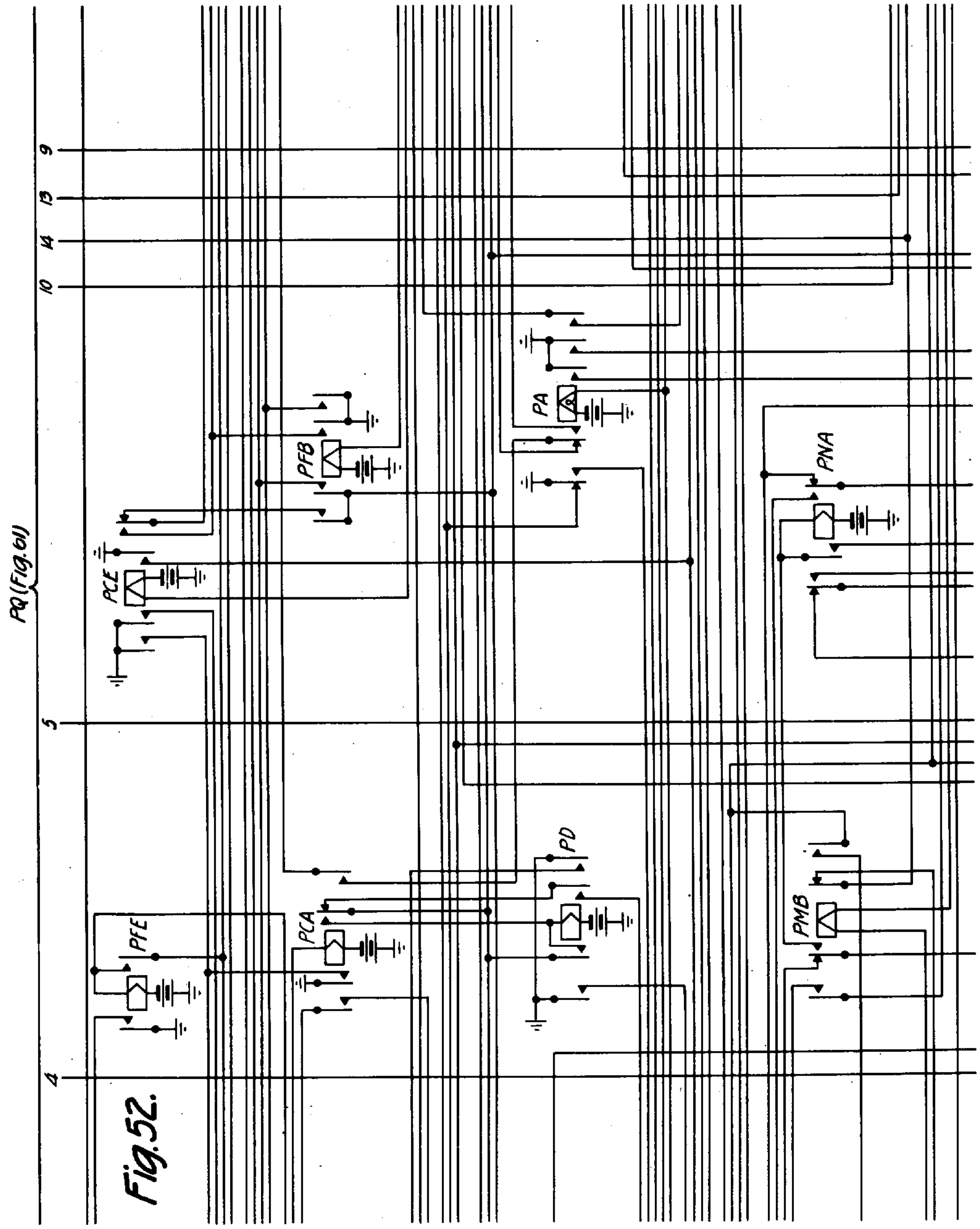

On each digit of the number A relay CFF operates and energizes PFB (Fig. 52). Therefore, P2 and P5 make one step. The marker P5 can be disregarded for the time being. When the decimal point is received CV (Fig. 11) operates and opens the circuit of PFB. The marker P2 in this way is advanced by as many steps as there are digits in A before the decimal point.

The division sign operates relay CQB (Fig. 17) and then for each operation of CFF relay PFE (Fig. 52) is energized. PFE steps the marker P4. The circuit of PFE is also controlled by CV back and therefore P4 makes as many steps as there are digits in B before the decimal point.

There may be 3 cases:

*a.* A has more digits than B, before the decimal point.

*b.* A has the same number of digits as B before the decimal point.

*c.* A has less digits than B before the decimal point.

*a.* It is to be remembered that P4, which is used also for punctuation has already made 3 steps while the 3 points were printed at the beginning. P4 therefore is advanced from position 3. There is a multiple provided between the arcs B of P2 and P4 in such a way that normally P4 is one step behind.

When the quotient is obtained PP (Fig. 53) operates in the circuit, previously described, over the arc D of Q1. PP front 1 closes the following circuit: Ground on front 2 of PA (Fig. 52), backs of PL (Fig. 53) and PKB (Fig. 55), PP front, PJA back, PRB front 2, PW back and PFD (Fig. 54). Three markers P3, P4 and P5 are energized; relay PFD upon operating locks itself to the interrupter contacts I of the markers P3, P4 and P5. P3 and P5 are required in connection with the remainder. PP initiates printing via its front 2 in the manner previously described and when printing of the quotient is over PP and PFD release and the markers make one step. In this manner, P4 approaches the position of P2 by one step for each quotient.

The first time PP operates, relay PMA (Fig. 50) is energized and when PP releases PMA locks itself in series with PMB (Fig. 52).

When, after a printing operation, P4 steps to the same wire on which P2 is standing, relay PKA (Fig. 55) operates via PRB front 3, arcs B of P4 and P2, ground on back contact of PX. PKA energizes PL which locks itself via its front 2.

PL front 1 operates again PP via PRA front 2 and CKA front 3 (Fig. 12). PP front 4 now energizes relay PNA via PMB front 3. Relays CBX and CGX (Fig. 12) energizes over back 3 of PMB and PNA front and consequently a dot is printed. When CKA releases, PP releases as well and PNA locks in series with PNB. The ground, which helps O1 through normal position, is now disconnected by back contacts of PNA and PNB.

When PNB operates PL releases and reestablishes the stepping circuits of the various markers. PKA energizes PKB (Fig. 55) which locks itself, whereas PKA will release, if division continues. PNB back 4 opens the locking circuit of the operator's key set. In fact, PNB back 4 has kept relay CJ (Fig. 12) operated, which in turn energized the locking magnet K7. Now the keys are unlocked and the operator may send either the + sign for the remainder or operate the division key for further quotients.

*b.* This case is nearly the same as that described above. The Q circuit tries to obtain the 1st quotient and will print it, if it is not zero, whereupon the decimal point will be printed and the division stopped. If, however, the first quotient appears to be 0, it will not be printed, P4 nevertheless makes one step and meets the position of P2, PKB and QX energize and PP operates again in order to print the decimal point. Since, at present, PMA and PMB are not yet operated, a zero (0) will first be printed (not quotient) and then the decimal point in the manner previously described.

*c.* If B has more digits than A before the decimal point relays PKA and PKB energize while P2 and P4 are standing on the same multiple wire B. PKB locks, whereas PKA releases if P4 makes a further step. Relay PKC (Fig. 55) energizes from the ground PE back 2 via PA*a* front 2 (Fig. 54). When the = sign is received PRA (Fig. 51) energizes, but PKC remains energized to PKA back 3 of P4.

The division does not start, the operation of O1 being prevented as long as PKC is on its front. On the other hand PKC front 4 energizes PP via PRA front 2 and CKA front 3. First a zero is printed while relays PMA and PMB are energized, then the decimal point is printed by the operation of relays PNA and PNB. During the next operation of PP relay CLL (Fig. 12) is energized in order to print 0 in the following circuit: PL back 1, PJA back, PP front 1, PW back, PKC front. At the same time PP front 5 energizes the relay PFB (Fig. 52) via PL back 2, PJA back 3, PVA back, PXE front 4. P2 and P5 advance by one step for each 0 printed until P2 reaches the marker P4 over the multiple B. At this moment PKA reoperates and the locking circuit of PKC is opened at PKA back 3. PKC releases, whereupon the circuit of QD (Fig. 64) is closed and one quotient is calculated. Then division stops owing to the open back contact 5 of PKB and will only be continued if the division key is operated whereby the ground of PKB is replaced.

*Punctuation*

The comma before each third digit of the solution is printed in the same manner as for addition and multiplication. The relative position of P2 and P4 determines the decimal point and therefore each time P4, during its advance, meets the position of P2 over the multiple C a comma is printed. The printing is effected by relays PJA, PJB and PJC as previously described. After the decimal point is passed no further comma is printed.

If, for example, P2 is standing in position 12 and P4 in 3, then the decimal point will be printed, when P4 will be in position 16, i. e. after 13 quotients. P2 is thus standing on the first wire of the multiple C which wire will be met by P4 after 1, 4, 7, etc. steps. Consequently, a comma will be printed after the first, fourth, seventh and tenth quotient. The thirteenth quotient will be followed by the decimal point and the printing of commas is suppressed.

*Remainder*

The digits of the remainder are stored after each division on the markers S1 and S10-17. There are two operations in connection with the remainder: first to determine in which sequence the figures stored have to be printed and second to fix the position of the decimal point. The markers P3 and P5 have been prepared for this purpose. P3 makes one step for each quotient and its position indicates each time the S marker which stores the first digit of the remainder having the highest decimal value. The marker P5 is advanced in such a way that its relative position to P2 determines the number of digits in the remainder before the decimal point. P5 makes one step for each quotient. When P5 reaches the position of P2, over the multiple B, relays PH and PU operate. The latter locks itself to the PA front 1. The operation of PU indicates that the remainder will start with the decimal point followed by as many zeros as the number of terminals by which P5 has advanced beyond P2.

The division stops if the division key is released by the operator. It stops as well if 18 quotients have already been determined. In this case P3 arrives at position 18 and energizes, via its arc B, relay PW. PW back 1 removes the ground which controls the circuit of Q1 in normal position, so that division stops.

If the remainder is desired, the operator pushes the + key, whereupon relays PVA and PXC operate. After printing of the + sign PVB operates der. PP operates via the CKA front 3 in the usual manner. If PU is not operated PP closes the following two circuits: PP front 1, PJA back, PRB front, PW front, PU back to relay PFD so that for each figure P3-5 make one step. The other circuit closed by PP contact 2 energizes via PW front, PU back, over P3C and over the arc of the corresponding S marker, to the code sending relays. When P5 reaches the position of P2, PH energizes over the multiple B. PH front 1 energizes the decimal point relay PL via PVB front 3. The decimal point is printed in the usual known manner, whereafter the printing of further figures continues. When P3 meets, over arc A, the releasing ground provided over the front 3 of one of the relays SKA to SKR relay PCC (Fig. 50) energizes. The front 1 of PCC closes the circuit of the releasing relay CZ.

In case PU is operated, when the + sign is received, then the above-mentioned two circuits of PP are modified on the change-overs 2 and 4 of PW in such a way that instead of P5 the marker P2 advances and for each step a zero is printed after having first printed a zero followed by the decimal point. When P2 is brought forward up to the position of P5, PH energizes and it short-circuits relay PU via PW front 3. When PU is released the sending of further figures continues as previously described, until the releasing ground is found.

*Examples*

A few examples are given below, which illustrate the method of operations required to determine the decimal point in the solution, the figures of the remainder and their decimal values.

*a.* Problem 328.456÷26.9=

The various markers involved in the calculations advance as follows:

| | Solution Markers S | | | | | | | | | Quotient | P2 | P3 | P4 | P5 | D1 Q2 |
|---|---|---|---|---|---|---|---|---|---|---|---|---|---|---|---|
| | 1 | 10 | 11 | 12 | 13 | 14 | 15 | 16 | 17 | | | | | | |
| Before division | 0 | 3 | 2 | 8 | 4 | 5 | 6 | 0 | 0 | -------- | 3 | N | 5 | N | N |
| After 1st division | 0 | 0 | 5 | 9 | 4 | 5 | 6 | 0 | 0 | 1 | 3 | 1 | 6 | 1 | 1 |
| After 2nd division | 0 | 0 | 0 | 5 | 6 | 5 | 6 | 0 | 0 | 2 | 3 | 2 | 7 | 2 | 2 |
| | | | | | | | | | | Point | | | | | |
| After 3rd division | 0 | 0 | 0 | 0 | 2 | 7 | 6 | 0 | 0 | 2 | 3 | 3 | 8 | 3 | 3 |
| After 4th division | 0 | 0 | 0 | 0 | 0 | 0 | 7 | 0 | 0 | 1 | 3 | 4 | 9 | 4 | 4 |
| After 5th division | 0 | 0 | 0 | 0 | 0 | 0 | 7 | 0 | 0 | 0 | 3 | 5 | 10 | 5 | 5 |
| After 6th division | 0 | 0 | 0 | 0 | 0 | 0 | 1 | 6 | 2 | 2 | 3 | 6 | 11 | 6 | 6 |
| After 7th division | 0 | 0 | 0 | 0 | 0 | 0 | 0 | 0 | 0 | 6 | 3 | 7 | 12 | 7 | 7 |
| After 8th division | 6 | 0 | 0 | 0 | 0 | 0 | 0 | 0 | 0 | 0 | 3 | 8 | 13 | 8 | 8 |
| After 9th division | 0 | 6 | 2 | 0 | 0 | 0 | 0 | 0 | 0 | 2 | 3 | 9 | 14 | 9 | N |

in series with PVA. The three relays PVA, PVB and PW introduce the following changes in the circuit:

PVB back 1 releases relays OV, OVA and OVB in order to allow the use of the arcs B of the markers S was sending the figures of the remainder. PVA back 2 releases PMA and PMB, which in turn release PNA and PNB with the purpose of making these relays available to print the decimal point of the remainder. A locking ground for these relays is again connected by PVB front 4. PVA back 5 opens the punctuation circuit. PVB front 2 prepares a short-circuit for P3 over its terminals 18-21. If the division was stopped due to the fact that 18 quotients have been produced, P3 is already in position 18 and runs over immediately into normal position. The PVB front 5 prepares the releasing circuit, whereas the front 3 of the same relay prepares the circuit for the decimal point.

PVB front 1 starts the sending of the remainder P2 has made 3 steps corresponding to 328 before the decimal point. P4 similarly has been advanced 2 steps. For each quotient PFD advances P3, P4 and P5 one step. In position 7 P4 meets, over multiple B, the position of P2 and therefore the decimal point is printed. In position 4 P5 meets, over multiple B, the position of P2 and relay PU operates.

When, after the ninth quotient, the operator actuates the + key the circuit sends out the remainder. Since PU is operated first 0 and the decimal point are printed. Now the circuit produces as many zeros as required by P2 to reach the position of P5. In this manner five steps are made and five zeros are printed. PU then releases and the circuit continues to send out the figures of the remainder in the sequence indicated by P3. In position 9 of P3 the figures stored on S1 (=0), then on S10 etc. is sent out. For each figure P3 and P5 make one step. On terminal 12 the releasing ground is reached via arc A of P3 over arcs normal of S12–17 and ground over SKA front 3 which is energized over O2F normal position.

The remainder will be printed as follows:

+0.00000062...

Should the operator require the remainder after the decimal point, the situation is as follows: Since PU is not operated the circuit prints the figure stored on that S marker which is indicated by P3. This is in position 2; thus this is marker S11. The circuit prints 0 and 5 and P5 makes two steps and meets the position of P2. The decimal point is printed before the next figure. The remainder will in this case be:

+5.656...

*b.* The second problem represents the case when B has more figures before the decimal point than A.

The problem is:

642.1÷547 237=

The different phases of the operations are as as follows:

| | Solution Markers S | | | | | | | | | Quotient | P2 | P3 | P4 | P5 | DM Q2 |
|---|---|---|---|---|---|---|---|---|---|---|---|---|---|---|---|
| | 1 | 10 | 11 | 12 | 13 | 14 | 15 | 16 | 17 | | | | | | |
| Before division | 0 | 6 | 4 | 2 | 1 | 0 | 0 | 0 | 0 | ------- | 3 | N | 9 | N | N |
| | ---- | ---- | ---- | ---- | ---- | ---- | ---- | ---- | ---- | 0 | ---- | ---- | ---- | ---- | ---- |
| | | | | | | | | | | 0 | 4 | N | 9 | 1 | N |
| | ---- | ---- | ---- | ---- | ---- | ---- | ---- | ---- | ---- | | | | | | |
| Starts division | 0 | 6 | 4 | 2 | 1 | 0 | 0 | 0 | 0 | 0 | 5 | N | 9 | 2 | N |
| After 1st division | 0 | 0 | 9 | 4 | 8 | 6 | 3 | 0 | 0 | 1 | 5 | 1 | 10 | 3 | 1 |
| After 2nd division | 0 | 0 | 4 | 0 | 1 | 3 | 9 | 3 | 0 | 1 | 5 | 2 | 11 | 4 | 2 |
| After 3rd division | 0 | 0 | 0 | 1 | 8 | 3 | 2 | 7 | 1 | 7 | 5 | 3 | 12 | 5 | 3 |
| After 4th division | 9 | 0 | 0 | 0 | 1 | 9 | 0 | 9 | 9 | 3 | 5 | 4 | 13 | 6 | 4 |
| After 5th division | 7 | 9 | 0 | 0 | 0 | 2 | 6 | 8 | 2 | 3 | 5 | 5 | 14 | 7 | 5 |
| After 6th division | 8 | 4 | 2 | 0 | 0 | 0 | 4 | 9 | 3 | 4 | 5 | 6 | 15 | 8 | 6 |

Since PKC is operated first the decimal point and two zeros are printed, whereby P2 is brought to the position of P4. P5 steps at this time with P2. Then division starts and P3, 4 and 5 advance in parallel. When P5 meets the position of P2 relay PU operates. Subsequent to the operator sending the + sign after the sixth division, the remainder is printed as follows:

Since PU is operated, first 0 and the decimal point are printed, followed by two zeros, which shift P2 into the position of P5. Then the figure stored on S 5 as indicated by P3 is printed. Then follows the printing of the figures of S16, S17, S1, S10 and S11. On S12, i. e. in position 12 of P3, the ground on the front 3 of the relay SKP releases the calculator.

The problem and the solution will thus appear on the paper strip as follows:

642.1÷547327=0.00117334+0.00493842...

*c.* Another example is when B starts with the decimal point and is followed by one or more zeros.

The problem is:

24816310—0.000063=

In this case P2 makes eight steps for the eight digits in A and in addition it advances four steps for each 0 of B following the decimal point. At the beginning P4 is in normal position. It does not stop on zeros; thus 6 and 3 are stored on the first and second sets of storing relays. P5 steps for the zeros of B together with P2.

The different phases of the operations are as follows:

| | Solution Markers S | | | | | | | | | Quotient | P2 | P3 | P4 | P5 | D1 Q2 |
|---|---|---|---|---|---|---|---|---|---|---|---|---|---|---|---|
| | 1 | 10 | 11 | 12 | 13 | 14 | 15 | 16 | 17 | | | | | | |
| Before division | 0 | 2 | 4 | 8 | 1 | 6 | 3 | 1 | 0 | ------- | 12 | N | 3 | 4 | N |
| After 1st division | 0 | 2 | 4 | 8 | 1 | 6 | 3 | 1 | 0 | 0 | 12 | 1 | 4 | 5 | 1 |
| After 2nd division | 0 | 0 | 5 | 9 | 1 | 6 | 3 | 1 | 0 | 3 | 12 | 2 | 5 | 6 | 2 |
| After 3rd division | 0 | 0 | 0 | 2 | 4 | 6 | 3 | 1 | 0 | 9 | 12 | 3 | 6 | 7 | 3 |
| After 4th division | 0 | 0 | 0 | 0 | 5 | 7 | 3 | 1 | 0 | 3 | 12 | 4 | 7 | 8 | 4 |
| After 5th division | 0 | 0 | 0 | 0 | 0 | 0 | 6 | 1 | 0 | 9 | 12 | 5 | 8 | 9 | 5 |
| After 6th division | 0 | 0 | 0 | 0 | 0 | 0 | 6 | 1 | 0 | 0 | 12 | 6 | 9 | 10 | 6 |
| After 7th division | 0 | 0 | 0 | 0 | 0 | 0 | 0 | 4 | 3 | 9 | 12 | 7 | 10 | 11 | 7 |
| After 8th division | 2 | 0 | 0 | 0 | 0 | 0 | 0 | 0 | 5 | 6 | 12 | 8 | 11 | 12 | 8 |
| After 9th division | 1 | 6 | 0 | 0 | 0 | 0 | 0 | 0 | 0 | 8 | 12 | 9 | 12 | 13 | N |
| After 10th division | 0 | 3 | 4 | 0 | 0 | 0 | 0 | 0 | 0 | 2 | 12 | 10 | 13 | 14 | 1 |
| After 11th division | 0 | 0 | 2 | 5 | 0 | 0 | 0 | 0 | 0 | 5 | 12 | 11 | 14 | 15 | 2 |
| After 12th division | 0 | 0 | 0 | 6 | 1 | 0 | 0 | 0 | 0 | 3 | 12 | 12 | 15 | 16 | 3 |
| After 13th division | 0 | 0 | 0 | 0 | 4 | 3 | 0 | 0 | 0 | 9 | 12 | 13 | 16 | 17 | 4 |
| After 14th division | 0 | 0 | 0 | 0 | 0 | 5 | 2 | 0 | 0 | 6 | 12 | 14 | 17 | 18 | 5 |
| After 15th division | 0 | 0 | 0 | 0 | 0 | 0 | 1 | 6 | 0 | 8 | 12 | 15 | 18 | 19 | 6 |

The decimal point is printed after the twelfth quotient when P2 and P4 are standing on the same multiple wire B. The relay PU operates after the ninth division when P2 and P5 meet over the multiple B. The remainder will start with the decimal point and will be followed by 6 zeros required to bring up P2 to the position of P5. P3 in position 15 indicates the first significant figure (after the zeros) of the remainder to be on S15.

The problem and solution will be thus printed as follows:

24816310÷0.000063=393,909,682,539.68
+0.00000016...

*d.* Next is an example when both A and B start with decimal points.

The problem:

0.00645÷0.0000087

| | Solution Markers S | | | | | | | | | Quotient | P2 | P3 | P4 | P5 | D1 Q2 |
|---|---|---|---|---|---|---|---|---|---|---|---|---|---|---|---|
| | 1 | 10 | 11 | 12 | 13 | 14 | 15 | 16 | 17 | | | | | | |
| Before division | 0 | 0 | 0 | 0 | 6 | 4 | 5 | 0 | 0 | -------- | 6 | N | 3 | 5 | N |
| After 1st division | 0 | 0 | 0 | 0 | 6 | 4 | 5 | 0 | 0 | 0 | 6 | 1 | 4 | 6 | 1 |
| After 2nd division | 0 | 0 | 0 | 0 | 6 | 4 | 5 | 0 | 0 | 0 | 6 | 2 | 5 | 7 | 2 |
| After 3rd division | 0 | 0 | 0 | 0 | 6 | 4 | 5 | 0 | 0 | 0 | 6 | 3 | 6 | 8 | 3 |
| After 4th division | 0 | 0 | 0 | 0 | 6 | 4 | 5 | 0 | 0 | 0 | 6 | 4 | 7 | 9 | 4 |
| After 5th division | 0 | 0 | 0 | 0 | 0 | 3 | 6 | 0 | 0 | 7 | 6 | 5 | 8 | 10 | 5 |
| After 6th division | 0 | 0 | 0 | 0 | 0 | 0 | 1 | 2 | 0 | 4 | 6 | 6 | 9 | 11 | 6 |
| After 7th division | 0 | 0 | 0 | 0 | 0 | 0 | 0 | 3 | 3 | 1 | 6 | 7 | 10 | 12 | 7 |
| After 8th division | 9 | 0 | 0 | 0 | 0 | 0 | 0 | 0 | 6 | 3 | 6 | 8 | 11 | 13 | 8 |
| After 9th division | 8 | 1 | 0 | 0 | 0 | 0 | 0 | 0 | 0 | 7 | 6 | 9 | 12 | 14 | N |

The answer is:

0.00645÷0.0000087=741.37+0.000000081 . . .

*e*. Finally an example with full numbers:

93000000÷175400=

| | Solution Markers S | | | | | | | | | Quotient | P2 | P3 | P4 | P5 | D1 Q1 |
|---|---|---|---|---|---|---|---|---|---|---|---|---|---|---|---|
| | 1 | 10 | 11 | 12 | 13 | 14 | 15 | 16 | 17 | | | | | | |
| Before division | 0 | 9 | 3 | 0 | 0 | 0 | 0 | 0 | 0 | -------- | 8 | N | 9 | N | N |
| After 1st division | 0 | 0 | 5 | 3 | 0 | 0 | 0 | 0 | 0 | 5 | 8 | 1 | 10 | 1 | 1 |
| After 2nd division | 0 | 0 | 0 | 0 | 3 | 8 | 0 | 0 | 0 | 3 | 8 | 2 | 11 | 2 | 2 |
| After 3rd division | 0 | 0 | 0 | 0 | 3 | 8 | 0 | 0 | 0 | 0 Point | 8 | 3 | 12 | 3 | 3 |
| After 4th division | 0 | 0 | 0 | 0 | 0 | 2 | 9 | 2 | 0 | 2 | 8 | 4 | 13 | 4 | 4 |

The answer is:

93000000÷175400=530.2+2920 . . .

I claim:

1. In a calculating device, means for accumulating digits including a number of stepping switches, one for each numerical denomination, means including a stepping switch for cyclically scrutinizing said accumulating switches one after the other, digit signifying means under control of said scrutinizing means for signifying digits accumulated on said accumulating switches, and means including another stepping switch adapted to advance in synchronism with said first stepping switch for controlling said digit signifying means to punctuate digits at predetermined points in the cycle of a scrutinizing operation.

2. A calculating device as claimed in claim 1 wherein said digit signifying means is pluralized and is remotely located from said accumulating means and wherein a numerical problem entering means is associated with each of said signifying means; and means for selectively coupling said associated signifying and entering means with said accumulating means.

3. A calculating device as claimed in claim 1 wherein a problem entering means is associated with said digit signifying means and wherein said signifying means signifies digits and signs of problems entered by said entering means concurrently with the entry of said digits and signs; and means responsive to the entry of one of said signs for operating said signifying means under control of said scrutinizing means to signify the digits accumulated on said accumulating switches along with a signification of a clear condition of said accumulating switches.

4. A calculating device as claimed in claim 1 comprising entering means including a keyboard having a set of keys for producing electric signals in coded form representing digits and operation signs, means responsive to a particular signal code representing an operation sign for operating said signifying means under control of said scrutinizing means and for returning the accumulating switches to normal, and means responsive to a different signal code representing another operation sign for operating said signifying means under control of said scrutinizing means and for retaining said accumulating switches in off normal condition thereby retaining the result accumulated thereon as an element of a further calculation to be performed.

5. A calculating device as claimed in claim 1 comprising entering means including a keyboard for entering successive numbers which are factors of a problem and an operation signal; and means responsive to said signal for operating said signifying means under control of said scrutinizing means to signify the solution of the problem.

6. A calculating device as claimed in claim 1 wherein a problem entering means is associated with said signifying means, and wherein said signifying means signifies digits and signs of problems as they are entered.

7. A calculating device as claimed in claim 1 comprising entering means including a keyboard having a set of keys for producing electric signals in coded form representing digits and operation signs, means responsive to a particular signal code representing an operation sign for operating said signifying means under control of said scrutinizing means and for returning the accumulating switches to normal, means responsive to a different signal code representing another operation sign for operating said signifying means under control of said scrutinizing means and for retaining said accumulating switches in off normal condition thereby retaining the result accumulated thereon as an element of a further calculation to be performed; and means responsive to another signal code representing a special operation signal for clearing the result accumulated on said accumulating switches.

8. A calculating device as claimed in claim 1 comprising problem entering means including a keyboard having a set of keys for producing electric signals in coded form representing successive numbers and one or another of two particular operation signs and means for controlling said signifying means to signify numbers and signs of problems concurrently with the entry thereof; means for receiving the signals representing numbers, means responsive to one of said operation signs for performing a calculation under control of said receiving means, for entering the result thereof on said accumulating means, for operating said signifying means under control of said scrutinizing means and for returning said accumulating means to normal; and means responsive to the second operation sign for similarly controlling a calculation and scrutinizing of the result thereof while retaining said result on said accumulating means for further calculation.

9. A calculating device as claimed in claim 1 comprising problem entering means including a keyboard having a set of keys for producing electric signals in coded form representing successive numbers and one or another of two particular operation signs followed by a third operation sign, and means for controlling said signifying means to signify numbers and signs of problems concurrently with the entry thereof; means for receiving the signals representing numbers; means responsive to a first operation sign followed by the third sign for performing a calculation under control of said receiving means, for entering the result thereof on said accumulating means, for operating said signifying means under control of said scrutinizing means and for returning said accumulating means to normal; and means responsive to the second operation sign followed by the third sign for similarly controlling a calculation and scrutinizing of the result thereof while retaining one of said numbers on said receiving means for a further calculation.

10. A calculating device as claimed in claim 1 comprising problem entering means including a keyboard having a set of keys for producing electric signals in coded form representing successive numbers and operation signs of problems, and means for controlling said signifying means to indicate said numbers and signs concurrently with the entry thereof; means for receiving the signals representing numbers; means responsive to a particular signal code representing an operation sign for performing a calculation under control of said receiving means, for entering the result thereof on said accumulating means, for operating said signifying means under control of said scrutinizing means and for returning said accumulating means to normal; and means responsive to a particular signal code preceding said aforementioned signal code and representing another operation sign for retaining one of said numbers on said receiving means for a further calculation; and wherein said signifying means is operated under control of both operation signs to signify the result accumulated along with a signification that one of said numbers has been retained.

11. A calculating device according to claim 1 comprising problem entering means including a keyboard having a set of keys for producing electric signals in coded form representing successive numbers and operation signs of problems, means for receiving the signals representing numbers; means responsive to a particular signal code representing an operation sign for performing a calculation under control of said receiving means, for entering the result thereof on said accumulating means, for operating said signifying means under control of said scrutinizing means and for returning said accumulating means to normal; means responsive to a different signal code representing another operation sign for retaining one of said numbers on said receiving means for a further calculation; and means responsive to another signal code representing a special operation sign for clearing said number and operating said signifying means to signify that said number has been cleared.

WILLIAM HATTON.

REFERENCES CITED

The following references are of record in the file of this patent:

UNITED STATES PATENTS

| Number | Name | Date |
|---|---|---|
| 2,099,754 | Robinson | Nov. 23, 1937 |
| 2,236,793 | Furber | Apr. 1, 1941 |
| 2,262,235 | Hofgaard | Nov. 11, 1941 |
| 2,340,809 | Hatton et al. | Feb. 1, 1944 |
| 2,344,885 | Kozma et al. | Mar. 21, 1944 |
| 2,352,027 | Smith | June 20, 1944 |
| 2,364,758 | Roggenstein | Dec. 12, 1944 |
| 2,434,681 | Williams | Jan. 20, 1948 |